US011718020B2

(12) United States Patent
Llamazares Vegh et al.

(10) Patent No.: US 11,718,020 B2
(45) Date of Patent: Aug. 8, 2023

(54) PLATFORM, SYSTEMS, AND DEVICES FOR 3D PRINTING

(71) Applicant: Stamm Vegh Corporation, San Francisco, CA (US)

(72) Inventors: Juan Francisco Llamazares Vegh, San Francisco, CA (US); Ignacio Hector Campanelli, San Francisco, CA (US); Gaston Oscar Corti, San Francisco, CA (US); Emiliano Hoss, San Francisco, CA (US)

(73) Assignee: STAMM VEGH CORPORATION, San Francisco, CA (US)

( * ) Notice: Subject to any disclaimer, the term of this patent is extended or adjusted under 35 U.S.C. 154(b) by 0 days.

(21) Appl. No.: 17/759,433

(22) PCT Filed: Feb. 2, 2021

(86) PCT No.: PCT/US2021/016187
§ 371 (c)(1),
(2) Date: Jul. 25, 2022

(87) PCT Pub. No.: WO2021/158529
PCT Pub. Date: Aug. 12, 2021

(65) Prior Publication Data
US 2023/0116685 A1    Apr. 13, 2023

Related U.S. Application Data

(60) Provisional application No. 63/010,405, filed on Apr. 15, 2020, provisional application No. 62/969,434, filed on Feb. 3, 2020.

(51) Int. Cl.
*B29C 64/135* (2017.01)
*B29C 64/245* (2017.01)
(Continued)

(52) U.S. Cl.
CPC ........ *B29C 64/135* (2017.08); *B29C 64/245* (2017.08); *B29C 64/268* (2017.08);
(Continued)

(58) Field of Classification Search
CPC ... B29C 64/135; B29C 64/245; B29C 64/268; B29C 64/277; B29C 64/236; G06T 17/20; B33Y 10/00; B33Y 30/00
See application file for complete search history.

(56) References Cited

U.S. PATENT DOCUMENTS

| 9,157,550 B2 | 10/2015 | Wheeler et al. |
| 2002/0173033 A1 | 11/2002 | Hammerick et al. |

(Continued)

FOREIGN PATENT DOCUMENTS

| WO | WO-9505944 A1 | 3/1995 |
| WO | WO-2016172350 A1 | 10/2016 |

(Continued)

OTHER PUBLICATIONS

EP Application No. 19871830.6 Extended European Search Report dated Jun. 9, 2022.

(Continued)

*Primary Examiner* — Michael M. Robinson
(74) *Attorney, Agent, or Firm* — Wilson Sonsini Goodrich & Rosati

(57) ABSTRACT

Described are 3D printing platforms comprising stereolithographic 3D printing devices utilizing a static optical assembly and procedural modeling applications representing 3D scenes as signed distance function. Described are also structures such as bioreactors that can be printed using such platforms, as well as characteristics and used thereof.

49 Claims, 71 Drawing Sheets

(51) Int. Cl.
  *B29C 64/277* (2017.01)
  *G06T 17/20* (2006.01)
  *B29C 64/268* (2017.01)
  *B29C 64/236* (2017.01)
  *B33Y 10/00* (2015.01)
  *B33Y 30/00* (2015.01)

(52) U.S. Cl.
  CPC ............ *B29C 64/277* (2017.08); *G06T 17/20* (2013.01); *B29C 64/236* (2017.08); *B33Y 10/00* (2014.12); *B33Y 30/00* (2014.12)

(56) References Cited

U.S. PATENT DOCUMENTS

| | | |
|---|---|---|
| 2005/0032208 A1 | 2/2005 | Oh et al. |
| 2006/0091051 A1 | 5/2006 | Takada et al. |
| 2006/0240548 A1 | 10/2006 | Deutsch et al. |
| 2008/0306000 A1 | 12/2008 | Zhang et al. |
| 2014/0116881 A1 | 5/2014 | Chapman et al. |
| 2015/0343396 A1 | 12/2015 | Aamer et al. |
| 2016/0312165 A1 | 10/2016 | Lowe, Jr. et al. |
| 2018/0154443 A1 | 6/2018 | Milshtein et al. |
| 2018/0292053 A1 | 10/2018 | Minor et al. |
| 2021/0348096 A1 | 11/2021 | Llamazares |

FOREIGN PATENT DOCUMENTS

| | | |
|---|---|---|
| WO | WO-2017161210 A1 | 9/2017 |
| WO | WO-2020076852 A1 | 4/2020 |
| WO | WO-2021158529 A1 | 8/2021 |

OTHER PUBLICATIONS

PCT/US2019/055231 International Search Report and Written Opinion dated Feb. 11, 2020.
PCT/US2021/016187 International Search Report and Written Opinion dated Jun. 3, 2021.

XY Pixel Movement

2711 Threaded rod
2710 Guides
2709 Printing Bed
2708 Printing result
2707 Photocurable resin
2706 Vat Window
2705 Projection Lenses
2704 Piezoelectric
2703 Monolithic MLA
2702 Collimator
2701 Light Engine 1- Connector support
2- Input 1
3- Output 1
4- Waste 1
5- Waste 2
6- Input 2
7- Output 2
8- SoC Case 1
9- Cleaning Chamber
10- Safety film
11- CM input channel
12- Harvest Channel
13- Filtered CM output
14- Filtered flow
15- Porous membrane
16- Microorganisms
17- Gas flow
18- SoC Case 2
19- Septum

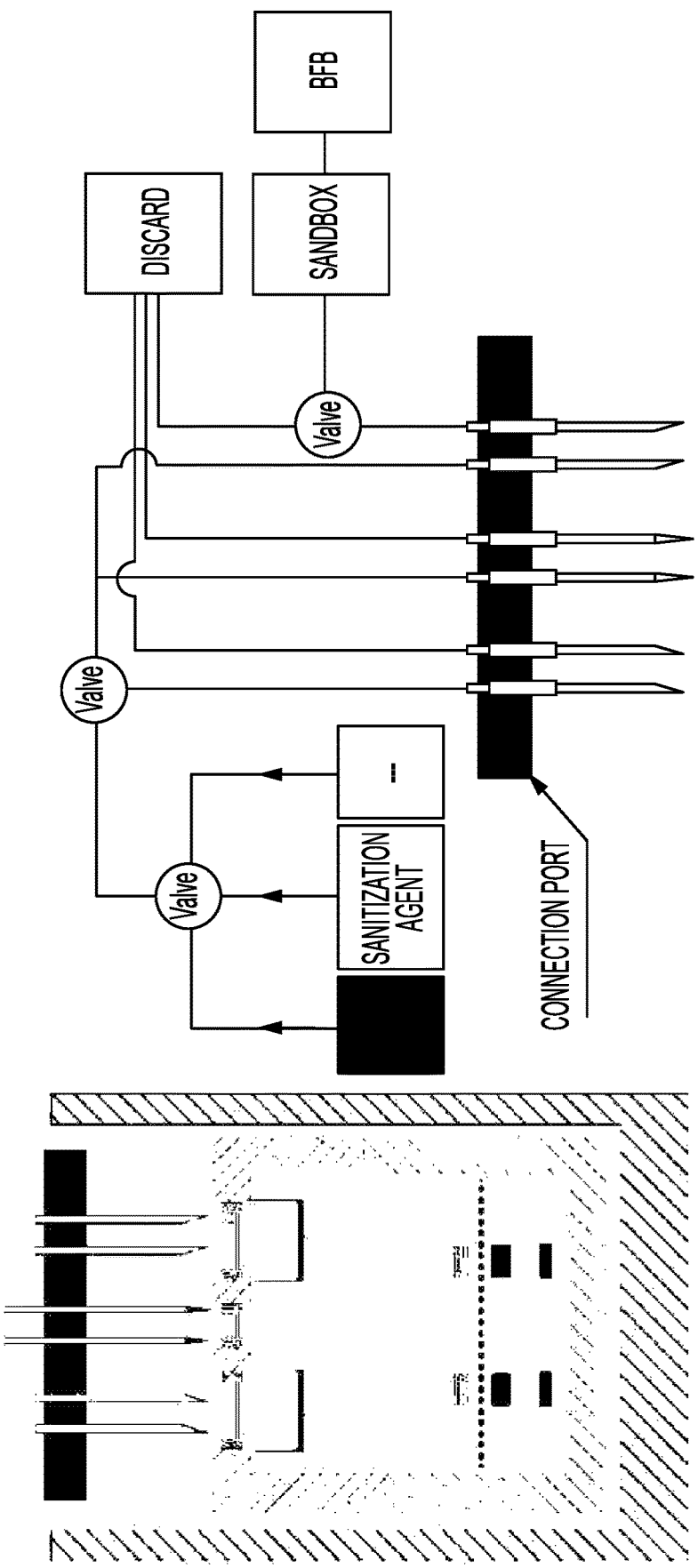

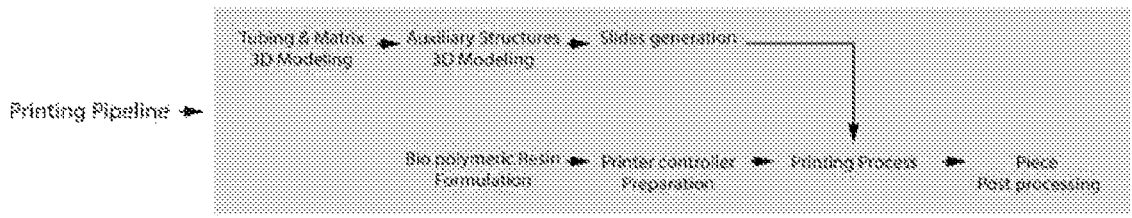
FIG. 57A
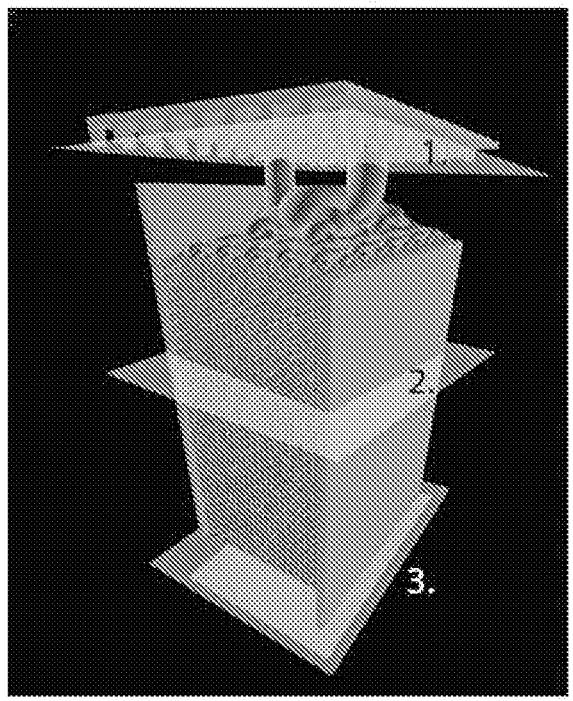 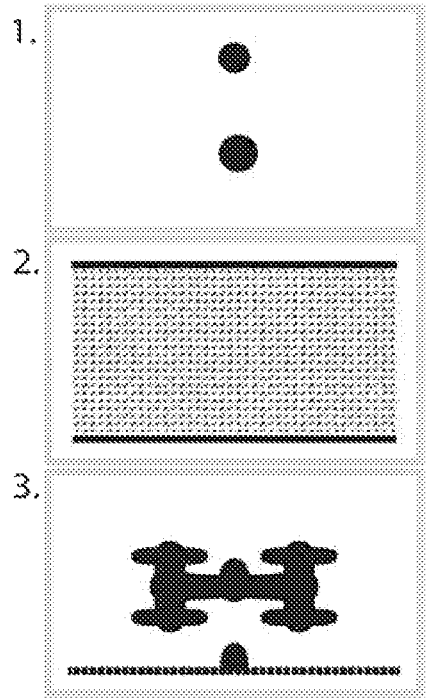
FIG. 57B

PLATFORM, SYSTEMS, AND DEVICES FOR 3D PRINTING

CROSS-REFERENCE

This application is a U.S. National Phase Application of International Application No. PCT/US2021/016187, filed Feb. 2, 2021, which claims the benefit of U.S. Provisional Patent Application No. 62/969,434, filed Feb. 3, 2020, and U.S. Provisional Patent Application No. 63/010,405, filed Apr. 15, 2020, each of which is entirely incorporated herein by reference.

BACKGROUND

Crystal lattices may be units (e.g., symmetrical units) which may comprise one-dimensional or multi-dimensional patterns which, upon being repeated in given intervals (e.g., regular intervals), may create structures, such as crystallographic structures. Such structures are widely studied in diverse areas of science and technology.

In the field of 3D printing, stereolithography (SLA) works by light projection on a photosensitive resin contained in a printing vat. The projected light may enable the initiation of the polymerization reaction which may generate a cross-linked polymeric structure which may adhere to the printing stage.

SUMMARY

Modeling and/or making objects using crystallographic structures may be time-consuming. Moreover, depending on the number of crystals involved in the scene, it may be very difficult to visualize such scenes using techniques such as mesh-based renderers and/or human manipulation. In many cases, such techniques may need modeling tools which would provide the suitable functionality to the user. In some cases, testing such complex scenes using traditional geometric-based modeling tools may be computationally expensive and time consuming, and in some cases, even infeasible.

Procedural geometry may be an alternative method to traditional geometric-based modeling that may comprise describing one or more scenes using one or more algorithms as an alternative to or in combination with a list of geometric primitives. Within several areas of computer graphics, procedural modeling may have applications as an alternative or complimentary method for geometric-based approaches. In some examples, modeling tools like AutoCAD, SolidWorks, or Inventors may use procedural modeling to generate certain types of geometry. However, for practical reasons, existing tools may not be targeted to efficiently visualize or manipulate the geometry as a function; instead, in most cases, they may convert the implicit representation of the geometry into a list of vertices. In many cases, such approach may at least partially comprise or invalidate potential advantages of a procedural modeling approach. Such advantages of a procedural modeling approach may comprise the capability to efficiently visualize scenes, including large and detailed scene and/or storing such visualization by occupying less disk space, in some cases, using just a few bytes of disk space.

In one aspect, described herein are procedural modeling suites that offer numerous advantages, such as the ability to visualize and manipulate crystallographic structures composed of an infinite number of crystal lattices with an infinite level of detail. In terms of utilization of storage space, it also provides a novel and compact approach to save those complex scenes within files of just a few kilobytes instead of wasting terabytes of space to store the geometry of just one scene. In some cases, the procedural modeling suite described herein transmits instructions to one or more 3D printing device(s) such that the modeled structures can be physically realized to benefit many areas of science and technology.

In another aspect, described herein are 3D printing technologies that include improvements to SLA, and in particular, Digital Light Processing (DLP)-based SLA. In the case of DLP-based SLA, a projected pattern is delivered by a digital mask. Once a first layer is projected for a predefined time and the polymerized layer is adhered to the printing stage, the printing stage moves up along the Z axis and a second layer is projected. Then, this layer is adhered to the previous one. With the subsequent projection of the layers, a 3D geometry is generated.

In some embodiments, the DLP-based SLA described herein enables a pixel-based modulation and management of the light and is suitable for the fabrication of micrometer sized structures. Important micrometer sized structures include, but are not limited to, those comprising a crystallographic geometry spatially distributed in a periodic manner to form a crystal lattice. In some cases, such structures are porous structures, and in further examples, such structures are microfluidic structures. In particular cases, the 3D printing technologies described herein are suitable for printing continuous flow microbioreactors, such as those disclosed in U.S. Pat. App. Ser. No. 62/743,974 and International App. No. PCT/US19/55231, which are incorporated by reference in their entirety herein, at commercial scale and dimensions.

Primary limitations faced in these endeavors include the fact that the SLA technology available in the market (e.g., LCD, laser, and DLP-based) cannot achieve the resolution required for many microstructures. LCD and laser technologies do not reach the resolution needed due to the size of the pixel, or the laser spot, respectively. Moreover, SLA-DLP-based technology commercially available can reach the resolution required, but only for the printing of low "hole volume" parts.

Keeping the resolution high in the 3D printing of large dimension parts is particularly challenging. One approach to printing a large part while maintaining high resolution is known as scanning-projection stereolithography. It is based on the use of a gantry that enables scrolling of the projector below the printing vat. With regard to scanning-projection stereolithography, key limitations include the fact that the mechanical noise could be translated into the printing process, leading to printing errors in the range of the printing resolution and also slowing the printing speed of the process due to the large distance displacement of the projector across the printing area.

One continuous 3D printing technology is known as Continuous Liquid Interface Production (CLIP), but with regard to CLIP, the printing volume is small and large structures cannot be printed. To overcome these limitations of existing approaches, we propose a 3D printing technology based on a static optic set-up for the printing of large structures with high resolution.

Accordingly, in one aspect, disclosed herein are stereolithographic 3D printing devices comprising: a static optical assembly comprising: a light engine configured to project a luxbeam comprising a plurality of pixels along a Z axis; at least one collimation lens configured to collimate the luxbeam; a microlens array (MLA) configured to focus the collimated luxbeam to a final beam of smaller diameter, wherein each pixel of the luxbeam is subdivided into a plurality of sub-pixels to multiply resolution of the final beam; a microdiaphragm array (MDA) configured to reduce noise and cross-talk between lenses of the MLA; at least one projection lens; and a movable stage configured to translate one or more of the at least one projection lenses in a X-Y plane; wherein the distances along the Z axis between the light engine, the collimation lens, the MLA, the at least one projection lens, and the movable stage of the static optical assembly are fixed; a printing vat comprising a printing stage movable on the Z axis; and control circuitry configured to control at least the light engine, the movable stage, and the printing stage to achieve stereolithographic 3D printing. In some embodiments, the light engine comprises a UV projector and/or a deep UV projector. In various embodiments, the light engine has an operating wavelength between 370 nm and 415 nm. In particular embodiments, the light engine has an operating wavelength of about 405 nm. In other particular embodiments, the light engine has an operating wavelength of about 380 nm. In some embodiments, the light engine is a first light engine configured to project a first operating wavelength and the 3D printing device further comprises a second light engine configured to project a second operating wavelength. In further embodiments, the second light engine operates in parallel to the first light engine and the second operating wavelength is selected to inhibit polymerization of a photocurable resin in the printing vat. In some embodiments, the light engine comprises a digital micromirror device (DMD). In various further embodiments, the DMD has a resolution of about 2560 pixels by about 1600 pixels. In some embodiments, the light engine comprises a Liquid Crystal on Silico (LCoS) device. In various further embodiments, the LCoS device has a resolution of about 4096 pixels by about 2400 pixels. In particular embodiments, the light engine has a light generating area of about 90 mm by about 50 mm. In other particular embodiments, the light engine has a light generating area of about 140 mm by about 90 mm. In some embodiments, the 3D printing device comprises a system of collimation lenses. In further embodiments, the system of collimation lenses comprises 2 to 6 collimation lenses. In some embodiments, the movable stage comprises a piezoelectric mechanism configured to translate the one or more of the at least one projection lenses in the X-Y plane. In further embodiments, the piezoelectric mechanism translates the one or more of the at least one projection lenses in the X-Y plane with nanometer resolution. In further embodiments, the stage has a translation range of at least 50 µm on the X axis and at least 50 µm on the Y axis. In still further embodiments, the stage has a translation range of about 100 µm on the X axis and about 100 µm on the Y axis. In some embodiments, the stage has a translation resolution of less than or equal to a length of the sub-pixels. In various embodiments, the MLA comprises a biconvex array, a biconcave array, a monoconvex array, a monoconcave array, or a combination thereof. In particular further embodiments, the MLA comprises a monolithic biconvex array. In some embodiments, the MLA comprises a planar substrate and a plurality of microlenses on each of the two largest facing sides of the substrate plane. In various further embodiments, the planar substrate is borosilicate or etched glass and the plurality of microlenses are polymeric or glass. In particular embodiments, the MDA is positioned between the planar substrate and one of the pluralities of microlenses of the MLA. In some embodiments, the 3D printing device comprises a plurality of MDAs, such as 2, 3, or 4 MDAs. In various embodiments, the MDA has a diaphragm aperture size of 10 µm to 15 µm. In various embodiments, the MLA subdivides each pixel of the luxbeam into between 4 and 7498 sub-pixels. In further various embodiments, the MLA subdivides each pixel of the luxbeam into between 4 and 100 sub-pixels. In particular embodiments, the MLA subdivides each pixel of the luxbeam into 9 sub-pixels. In other particular embodiments, the MLA subdivides each pixel of the luxbeam into 25 sub-pixels. In other particular embodiments, the MLA subdivides each pixel of the luxbeam into 49 sub-pixels. In some embodiments, the at least one projection lens expands the final printing area. In alternative embodiments, the at least one projection lens reduces the final printing area. In some embodiments, the final printing area is at least 2× the light generating area of the light engine. In further embodiments, the final printing area is at least 4× the light generating area of the light engine. In some embodiments, the control circuitry is configured to control at least the light engine, the movable stage, and the printing stage to achieve stereolithographic 3D printing in a semi-continuous, substantially continuous, or continuous pattern. In some embodiments, the control circuitry is configured to control the printing stage to move at a predefined constant velocity on the Z axis. In some embodiments, the control circuitry is configured to control the movable stage to translate the one or more of the at least one projection lenses in the X-Y plane to scan the luxbeam in a predefined pattern. In further embodiments, the predefined pattern comprises a spiral pattern. In some embodiments, the predefined pattern comprises a continuous space filling curve. In further embodiments, the predefined pattern comprises a Sierpinski Curve. In particular non-limiting embodiments, the control circuitry is configured to control at least the light engine, the movable stage, and the printing stage to achieve stereolithographic 3D printing of a porous structure comprising gyroid geometry spatially distributed in a periodic manner. In some embodiments, the 3D printing device further comprises a robotic gantry configured to scroll the static optical assembly in the X-Y plane relative to the printing vat. In further embodiments, the control circuitry is further configured to control the robotic gantry. In some embodiments, control circuitry is configured to control the printing stage to achieve bottom-up stereolithographic 3D printing. In alternative embodiments, the control circuitry is configured to control the printing stage to achieve top-down stereolithographic 3D printing. In some embodiments, the printing vat comprises a multiphase light-curable resin. In some embodiments, the 3D printing device is configured for sterile 3D printing and the printing vat comprises a sterile light-curable resin.

In another aspect, disclosed herein are computer-implemented systems comprising: at least one processor, a memory, and instructions executable by the at least one processor to create a procedural modeling application comprising: a graphic user interface (GUI) comprising a viewport; a presentation module configured to represent a scene as signed distance function and render the scene by utilizing ray marching, the presentation module comprising: a scene library comprising one or more procedural objects (POs); a scene editor allowing a user to add one or more POs to the scene and creating a constructive solid geometry (CSG) tree for the scene; a procedural object (PO) editor allowing the user to edit properties of each PO added to the scene; a simulation editor allowing the user to configure one or more simulations of the scene; and a printing editor allowing the user to configure the scene for printing; a simulation module configured to conduct the one or more simulations in the scene; and a printing module configured to generate a queue of slice files and transmitting the slice files to a 3D printer. In some embodiments, the presentation module allows a user to drag a PO from the scene library and drop it into the viewport to add it to the scene. In some embodiments, the presentation module allows a user to save an edited PO in the scene library. In some embodiments, the one or more POs comprises a crystallographic unit. In further embodiments, the presentation module allows a user to replicate the crystallographic unit to form a crystal lattice in the scene. In some embodiments, the properties of a PO comprise links for connecting to one or more adjacent POs and conduits connecting the links. In some embodiments, the signed distance function comprises a mathematical equation representing the entire crystal lattice. In particular non-limiting embodiments, the crystallographic unit comprises a gyroid. In further particular non-limiting embodiments, the crystal lattice comprises gyroid geometry spatially distributed in a periodic manner. In some embodiments, the signed distance function does not comprise a list of geometric primitives. In various embodiments, the one or more simulations comprises one or more of: a microfluid simulation, a Computational Fluid Dynamics (CFD) simulation, use of a Lattice Boltzmann Method (LBM) in combination with the signed distance function in order to solve a CFD simulation, or a combination thereof. In some embodiments, the one or more simulations comprises a visualization of one or more characteristics of the simulation. In various embodiments, the printing editor allows the user to configure one or more of: a surface profile, printer execution orders, a layer thickness, a time of luxbeam exposure, and a pixel resolution. In some embodiments, performance of the procedural modeling application does not degrade with increase in size of the scene or detail of the scene. In some embodiments, the at least one processor comprises a plurality of graphics processing units (GPUs). In some embodiments, the at least one processor comprises a cloud computing platform.

In another aspect, disclosed herein are non-transitory computer-readable storage media encoded with instructions executable by at least one processor to create a procedural modeling application comprising: a graphic user interface (GUI) comprising a viewport; a presentation module configured to represent a scene as signed distance function and render the scene by utilizing ray marching, the presentation module comprising: a scene library comprising one or more procedural objects (POs); a scene editor allowing a user to add one or more POs to the scene and creating a constructive solid geometry (CSG) tree for the scene; a procedural object (PO) editor allowing the user to edit properties of each PO added to the scene; a simulation editor allowing the user to configure one or more simulations of the scene; and a printing editor allowing the user to configure the scene for printing; a simulation module configured to conduct the one or more simulations of the scene; and a printing module configured to generate a queue of slice files and transmitting the slice files to a 3D printer. In some embodiments, the presentation module allows a user to drag a PO from the scene library and drop it into the viewport to add it to the scene. In some embodiments, the presentation module allows a user to save an edited PO in the scene library. In some embodiments, the one or more POs comprises a crystallographic unit. In further embodiments, the presentation module allows a user to replicate the crystallographic unit to form a crystal lattice in the scene. In some embodiments, the properties of a PO comprise links for connecting to one or more adjacent POs and conduits connecting the links. In some embodiments, the signed distance function comprises a mathematical equation representing the entire crystal lattice. In particular non-limiting embodiments, the crystallographic unit comprises a gyroid. In further particular non-limiting embodiments, the crystal lattice comprises gyroid geometry spatially distributed in a periodic manner. In some embodiments, the signed distance function does not comprise a list of geometric primitives. In various embodiments, the one or more simulations comprises one or more of: a microfluid simulation, a Computational Fluid Dynamics (CFD) simulation, use of a Lattice Boltzmann Method (LBM) in combination with the signed distance function in order to solve a CFD simulation, or a combination thereof. In some embodiments, the one or more simulations comprises a visualization of one or more characteristics of the simulation. In various embodiments, the printing editor allows the user to configure one or more of: a surface profile, printer execution orders, a layer thickness, a time of luxbeam exposure, and a pixel resolution. In some embodiments, performance of the procedural modeling application does not degrade with increase in size of the scene or detail of the scene. In some embodiments, the at least one processor comprises a plurality of graphics processing units (GPUs). In some embodiments, the at least one processor comprises a cloud computing platform.

In another aspect, disclosed herein are computer-implemented methods for procedural modeling comprising: providing a procedural modeling application comprising: a scene library comprising one or more procedural objects (POs); a scene editor allowing a user to add one or more POs to a scene and creating a constructive solid geometry (CSG) tree for the scene; a procedural object (PO) editor allowing the user to edit properties of each PO added to the scene; a simulation editor allowing the use to configure one or more simulations of the scene; and a printing editor allowing the user to configure the scene for printing; representing the scene as signed distance function; rendering the scene by utilizing ray marching; conducting the one or more simulations in the scene; generating a queue of slice files; and transmitting the slice files to a 3D printer. In some embodiments, the presentation module allows a user to drag a PO from the scene library and drop it into the viewport to add it to the scene. In some embodiments, the presentation module allows a user to save an edited PO in the scene library. In some embodiments, the one or more POs comprises a crystallographic unit. In further embodiments, the presentation module allows a user to replicate the crystallographic unit to form a crystal lattice in the scene. In some embodiments, the properties of a PO comprise links for connecting to one or more adjacent POs and conduits connecting the links. In some embodiments, the signed distance function comprises a mathematical equation representing the entire crystal lattice. In particular non-limiting embodiments, the crystallographic unit comprises a gyroid. In further particular non-limiting embodiments, the crystal lattice comprises gyroid geometry spatially distributed in a periodic manner. In some embodiments, the signed distance function does not comprise a list of geometric primitives. In various embodiments, the one or more simulations comprises one or more of: a microfluid simulation, a Computational Fluid Dynamics (CFD) simulation, use of a Lattice Boltzmann Method (LBM) in combination with the signed distance function in order to solve a CFD simulation, or a combination thereof. In some embodiments, the one or more simulations comprises a visualization of one or more characteristics of the simulation. In various embodiments, the printing editor allows the user to configure one or more of: a surface profile, printer execution orders, a layer thickness, a time of luxbeam exposure, and a pixel resolution.

In another aspect, disclosed herein are methods of manufacturing a 3D object comprising a plurality of repeated units, the method comprising: providing a procedural modeling application allowing a user to perform at least: adding one or more crystallographic units to a 3D scene; replicating the one or more crystallographic units to form a crystal lattice in the scene; and configuring links for connecting the replicated crystallographic units and conduits connecting the links; creating a constructive solid geometry (CSG) tree for the scene; representing the 3D scene as signed distance function; rendering the scene by utilizing ray marching; generating a queue of slice files; and transmitting the slice files to a 3D printing device, such as a stereolithographic 3D printing device. In some embodiments, the crystallographic units are spatially distributed in a periodic manner to form the crystal lattice. In various embodiments, the procedural modeling application further allows the user to perform at least one or more of: selecting one or more crystallographic units from a scene library; editing properties of each crystallographic unit added to the scene; configuring one or more simulations of the scene; and configuring the scene for 3D printing. In some embodiments, the method further comprises conducting the one or more simulations in the scene. In further embodiments, the one or more simulations comprises a microfluid simulation. In other embodiments, the one or more simulations comprises a Computational Fluid Dynamics (CFD) simulation. In yet other embodiments, the one or more simulations comprises use of a Lattice Boltzmann Method (LBM) in combination with the signed distance function in order to solve a CFD simulation. In some embodiments, the one or more simulations comprises a visualization of one or more characteristics of the simulation. In some embodiments, the signed distance function comprises a mathematical equation representing the entire crystal lattice. In some embodiments, the signed distance function does not comprise a list of geometric primitives. In some embodiments, the crystallographic units are repeated in the crystal lattice at a high density. In particular non-limiting embodiments, the 3D object comprises a bioreactor.

In another aspect, disclosed herein are methods of manufacturing a bioreactor, the method comprising: providing a procedural modeling application allowing a user to perform at least: adding a plurality of minimodules to a 3D scene; and assembling the plurality of minimodules into a macrostructure to create a bioreactor; creating a constructive solid geometry (CSG) tree for the scene; representing the 3D scene as signed distance function; rendering the scene by utilizing ray marching; generating a queue of slice files; and transmitting the slice files to a stereolithographic 3D printing device. In some embodiments, one or more of the minimodules is a double gyroid (DG) or a modified DG. In some embodiments, the minimodules are arranged in a plurality of layers within the macrostructure. In further embodiments, the plurality of layers are assembled into a first matrix and a second matrix, wherein the second matrix occupies free spaces in the first matrix, and wherein the first matrix and the second matrix occupy the same volume, have no point of contact, and maintain a constant minimum distance. In some embodiments, the 3D scene and the slice files are configured for a printing surface of up to about 320 mm by 320 mm. In some embodiments, a cubic mm of volume of the 3D scene comprises up to about 14 minimodules. In some embodiments, a printing volume of the bioreactor is up to about 102,400,000 cubic millimeters. In some embodiments, a printing volume of the bioreactor comprises up to about 1,496,704,035 minimodules. In some embodiments, one or more of the minimodules comprises a channel, and wherein the channel has a diameter of about 8 μm to about 2000 μm. In various embodiments, each minimodule has an edge length of about 40 μm to about 9797 μm. In various embodiments, each minimodule has a volume of about 68417 to about $9.4 \times 10^{11}$ cubic micrometers.

In another aspect, disclosed herein are bioreactors, comprising: a plurality of volumes, each volume comprising a crystallographic unit repeated symmetrically into a three-dimensional crystal lattice, each three-dimensional crystal lattice functionalized and fluidically interconnected to provide at least one microchannel or a chamber; an inoculation microchannel configured to receive a plurality of cells into the bioreactor; a harvesting microchannel configured to receive a plurality of cells, or derivatives thereof, from the bioreactor; a first channel system comprising at least one microchannel formed by the at least one microchannel or chamber of one or more of the plurality of volumes; and a second channel system comprising at least one microchannel formed by the at least one microchannel or chamber of one or more of the plurality of volumes; wherein the first channel system and the second channel system provide separate inputs to the bioreactor. In some embodiments, the bioreactor is a bubble-free bioreactor. In some embodiments, the bioreactor produces continuous, laminar flow of media. In some embodiments, the bioreactor produces continuous, laminar flow of gas. In some embodiments, the bioreactor has a spherical topology. In further embodiments, the plurality of volumes are arranged in concentric layers at varying distances from a center of the spherical topology. In various embodiments, the bioreactor comprises 3, 4, 5, 6, 7, 8, 9, or 10 volumes. In particular embodiments, the bioreactor comprises 8 volumes. In some embodiments, the crystallographic unit comprises a double gyroid structure or a modified double gyroid structure. In some embodiments, the inoculation channel delivers the plurality of cells to a central volume of the bioreactor. In some embodiments, the first channel system is a liquid media system fluidically connecting the inoculation microchannel and the harvesting microchannel. In further embodiments, the media system further comprises at least one media intake microchannel. In further embodiments, the bioreactor further comprises a liquid medium input device configured to flow a liquid medium into each media intake microchannel. In further embodiments, the media system is configured to provide uniform distribution of media. In some embodiments, the plurality of volumes comprises one or more volumes functionalized for cell culture. In particular embodiments, the plurality of volumes comprises 4 volumes functionalized for cell culture. In some embodiments, the second channel system is a gas system. In further embodiments, the gas system further comprises at least one gas intake microchannel. In further embodiments, the gas system fluidically connects the at least one gas intake microchannel and an exterior of the bioreactor. In further embodiments, the bioreactor further comprises a gas input device configured to flow a gas composition into each gas intake microchannel. In further embodiments, the gas system is configured to provide uniform distribution of gas. In some embodiments, the plurality of volumes comprises one or more volumes functionalized for gas distribution and comprising a gas distribution chamber. In particular embodiments, the plurality of volumes comprises 5 volumes functionalized for gas distribution and comprising a gas distribution chamber. In some embodiments, the media system and the gas system are non-overlapping systems separated by one or more porous membranes. In some embodiments, the plurality of volumes comprises harvesting layer in fluidic communication with the harvesting microchannel and comprising a harvesting chamber. In some embodiments, the bioreactor further comprises an outer layer. In some embodiments, the plurality of volumes comprises one or more transition layers between volumes of different functionalization and the crystallographic unit comprises a transition crystal.

In another aspect, disclosed herein are methods for growing a plurality of cells, or derivatives thereof, comprising: providing a bioreactor comprising: a plurality of volumes, each volume comprising a crystallographic unit repeated symmetrically into a three-dimensional crystal lattice, each three-dimensional crystal lattice functionalized and fluidically interconnected to provide at least one microchannel or a chamber; an inoculation microchannel configured to receive a first plurality of cells into the bioreactor; a harvesting microchannel configured to receive a second plurality of cells or a bioproduct from the bioreactor; a first channel system comprising at least one microchannel formed by the at least one microchannel or chamber of one or more of the plurality of volumes; and a second channel system comprising at least one microchannel formed by the at least one microchannel or chamber of one or more of the plurality of volumes; wherein the first channel system and the second channel system provide separate inputs to the bioreactor; and directing the first plurality of cells to the inoculation microchannel, which plurality of cells, is flowed from the inoculation microchannel through the at least one microchannel or chamber of the plurality of volumes, and wherein the first plurality of cells undergoes cell growth to produce the second plurality of cells. In some embodiments, the method further comprises harvesting the second plurality of cells or a sub-population thereof from the harvesting microchannel. In some embodiments, the second plurality of cells or a sub-population thereof produce the bioproduct. In some embodiments, the method further comprises harvesting the bioproduct from the harvesting channel. In some embodiments, the bioproduct is a protein, an antibody, a small molecule, and/or a metabolite. In some embodiments, the first plurality of cells comprises prokaryotic cells. In some embodiments, the first plurality of cells comprises eukaryotic cells. In various embodiments, the plurality of cells is selected from the group consisting of: bacterial cells, fungal cells, yeast cells, algae cells, plant cells, avian cells, mammalian cells, and any combinations thereof. In some embodiments, the bioreactor is a bubble-free bioreactor. In some embodiments, the bioreactor produces continuous, laminar flow of media. In some embodiments, the bioreactor produces continuous, laminar flow of gas. In some embodiments, the bioreactor has a spherical topology. In further embodiments, the plurality of volumes are arranged in concentric layers at varying distances from a center of the spherical topology. In various embodiments, the bioreactor comprises 3, 4, 5, 6, 7, 8, 9, or 10 volumes. In particular embodiments, the bioreactor comprises 8 volumes. In some embodiments, the crystallographic unit comprises a double gyroid structure or a modified double gyroid structure. In some embodiments, the inoculation channel delivers the plurality of cells to a central volume of the bioreactor. In some embodiments, the first channel system is a liquid media system fluidically connecting the inoculation microchannel and the harvesting microchannel. In further embodiments, the media system further comprises at least one media intake microchannel. In further embodiments, the bioreactor further comprises a liquid medium input device configured to flow a liquid medium into each media intake microchannel. In further embodiments, the media system is configured to provide uniform distribution of media. In some embodiments, the plurality of volumes comprises one or more volumes functionalized for cell culture. In particular embodiments, the plurality of volumes comprises 4 volumes functionalized for cell culture. In some embodiments, the second channel system is a gas system. In further embodiments, the gas system further comprises at least one gas intake microchannel. In further embodiments, the gas system fluidically connects the at least one gas intake microchannel and an exterior of the bioreactor. In further embodiments, the bioreactor further comprises a gas input device configured to flow a gas composition into each gas intake microchannel. In further embodiments, the gas system is configured to provide uniform distribution of gas. In some embodiments, the plurality of volumes comprises one or more volumes functionalized for gas distribution and comprising a gas distribution chamber. In particular embodiments, the plurality of volumes comprises 5 volumes functionalized for gas distribution and comprising a gas distribution chamber. In some embodiments, the media system and the gas system are non-overlapping systems separated by one or more porous membranes. In some embodiments, the plurality of volumes comprises harvesting layer in fluidic communication with the harvesting microchannel and comprising a harvesting chamber. In some embodiments, the bioreactor further comprises an outer layer. In some embodiments, the plurality of volumes comprises one or more transition layers between volumes of different functionalization and the crystallographic unit comprises a transition crystal.

In another aspect, disclosed herein are computer-implemented systems comprising: at least one processor, a memory, and instructions executable by the at least one processor to create a procedural modeling application comprising: an interface allowing a user to perform at least the following: define at least one volume in a scene, identify a crystallographic unit for the at least one volume, identify a symmetry for the crystallographic unit, and edit properties of the crystallographic unit; a presentation module configured to: replicate the identified crystallographic unit according to the identified symmetry to generate three-dimensional crystal lattice, the three-dimensional crystal lattice functionalized and fluidically interconnected to provide at least one microchannel or a chamber; represent the scene as signed distance function, and render the scene; a simulation editor allowing the user to configure one or more simulations of the scene; a simulation module configured to conduct the one or more simulations in the scene; a printing editor allowing the user to configure the scene for printing; and a printing module configured to generate a queue of slice files and transmitting the slice files to a 3D printer. In some embodiments, the interface further allows the user to configure one or more microchannels in the at least one volume. In some embodiments, the at least one microchannel or a chamber comprise a fluidically continuous liquid or gas transfer system. In some embodiments, the properties of the crystallographic unit comprise links for connecting to one or more adjacent crystallographic units and conduits connecting the links. In some embodiments, the signed distance function comprises a mathematical equation representing the entire crystal lattice. In some embodiments, the crystallographic unit comprises a gyroid. In further embodiments, the crystal lattice comprises gyroid geometry spatially distributed in a periodic manner. In some embodiments, the procedural modeling application further comprises a deep learning algorithm trained to predict: a transitional volume between volumes of different functionalization, and a transition crystallographic unit for the transitional volume. In some embodiments, the algorithm comprises one or more Neuronal Network (NNs). In various further embodiments, the one or more NNs comprises one or more Generative Adversarial Networks (GANs) or one or more Variational Autoencoders (VAEs). In some embodiments, the one or more simulations comprise Finite Element Analysis (FEA). In some embodiments, the one or more simulations evaluate microfluidic continuity of the at least one microchannel or a chamber. In some embodiments, the signed distance function does not comprise a list of geometric primitives. In some embodiments, performance of the procedural modeling application does not degrade with increase in size of the scene or detail of the scene. In some embodiments, the at least one processor comprises a plurality of graphics processing units (GPUs). In some embodiments, the at least one processor comprises a cloud computing platform.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 33A shows an example of a minimodule; FIG. 33B shows an example of minimodule assembly into an example three-dimensional matrix; FIG. 33C shows an example three-dimensional matrix; FIG. 33D shows an example layer of a three-dimensional matrix;

FIGS. 33E-33F show example assemblies comprises multiple three-dimensional layers;

FIGS. 43A-43E show an example connection system; FIG. 43A shows an overview of an example connection system comprising a connector between a cell chip module and fluid source; FIG. 43B shows an example connection system with input and output needles; FIG. 43C show example connections made by an example connector system; FIG. 43D shows an example embodiment of a connection system with needles penetrating a chamber in an example cell chip module; FIG. 43E shows an example connection system with needles penetrating a second chamber;

FIGS. 57A and 57B show an example printing process and digital rendering of 3D printed bioreactor; FIG. 57A shows an example printing process; FIG. 57B shows a digital rendering of 3D printed bioreactor and cross sectional views as a function of location height.

DETAILED DESCRIPTION

Provided herein are systems, methods, and devices for printing objects. The systems, devices, and methods may comprise devices and methods for 3D printing objects.

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
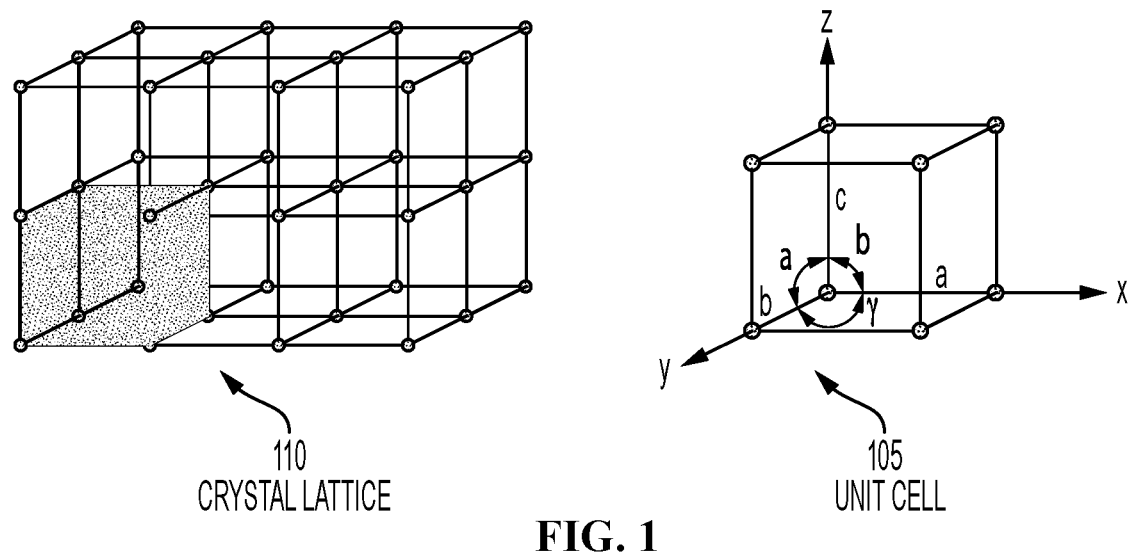
FIG. 1 shows an example of a 3D geometry; in this case, a crystallographic structure comprising a three-dimensional pattern formed by a unit cell being repeated at regular intervals.

As used herein, the term "unit cell" generally refers to the smallest repeating unit having the full symmetry of the crystallographic structure (see, e.g., FIG. 1 at 105).

As used herein, the term "crystal lattice" generally refers to a unit with a three-dimensional pattern, which upon being repeated, create crystallographic structures (see, e.g., FIG. 1 at 110).

As used herein, the term "gyroid," generally refers to a connected periodic minimal surface containing no straight lines. Such surface may have a mathematically infinite number of connections. In some examples, a gyroid is a unique non-trivial embedded member of the associate family of the Schwarz P and D surfaces with angle of association approximately 38.01°. A gyroid may be configured as a single gyroid or a double gyroid. A double gyroid may be oriented and configured for a particular application in a microfluidic device. The double gyroid may be configured by balancing geometric aspects related to fluid dynamic performances observed in minimodules and macrostructures (e.g., macroshapes), such as the double gyroids crystallographic structure and space group. The gyroid or double gyroid may be implemented in a variety of crystallographic structures.

The term "production bioreactor" or "bioreactor," as used herein, generally refers to a bioreactor device suitable for scaling production of cells and/or products produced by cells. A production bioreactor may include one or more channels or other openings for inputting cells, for providing liquid media, gas composition and other cell environment factors and one or more channels for harvesting cells and/or products produced by cells.

The term "culture media formulator," as used herein, generally refers to a component or device for mixing ingredients for use as culture media for growing cells.

The term "minimodule," as used herein, generally refers to a segment of a bioreactor that may be interconnected and assembled into a larger structure (e.g., macrostructure or macroshape) to constitute at least a portion or an entirety of the bioreactor.

The term "gyroid," as used herein, generally refers to a connected periodic minimal surface containing no straight lines. Such surface may have a mathematically infinite number of connections. In some examples, a gyroid is a unique non-trivial embedded member of the associate family of the Schwarz P and D surfaces with angle of association approximately 38.01°. A gyroid may be configured as a single gyroid or a double gyroid. A double gyroid may be oriented and configured for a particular application in a microfluidic device. The double gyroid may be configured by balancing geometric aspects related to fluid dynamic performances observed in minimodules and macrostructures (e.g., macroshapes), such as the double gyroids crystallographic structure and space group. The gyroid or double gyroid may be implemented in a variety of crystallographic structures.

As used herein, the term "bubble-free" generally refers to a bioreactor or other device having substantially laminar or laminar fluid flow such that there are no bubbles or substantially no bubbles. Bubble-free bioreactors generally do not have mixing elements, such as moving blades, fins, propellers or the like that can generate bubbles in fluid.

Provided herein are devices and systems for 3D printing. The devices may comprise stereolithographic 3D printing devices. Provided are also methods of using such devices for applications such as 3D printing. A stereolithographic device may comprise an optical assembly. The optical assembly may be a static optical assembly. Alternatively, in some examples, the optical assembly may be a dynamic optical assembly. The device may further comprise a light engine which may be configured to project one or more beams. A beam may comprise or be a luxbeam. The beam (e.g., luxbeam) may comprise one or more pixels. The one or more pixels may comprise a plurality of pixels. The one or more pixels may be located along an axis (e.g., Z axis).

The device and/or the optical assembly may further comprise one or more lenses. The one or more lenses may comprise a collimation lens. A lens (e.g., a collimation lens) may be configured to collimate the luxbeam. In some examples, the optical assembly may comprise a microlens array (MLA). The MLA may be configured to focus the collimated luxbeam to a modified beam which may have a smaller diameter compared to the luxbeam. In some cases, the modified beam may be a final beam. Alternatively, the modified beam may not be the final beam, for example, it may be an intermediate beam and more beams may be further generated. In some examples, one or more pixels of the luxbeam (e.g., each pixel of the luxbeam) may be divided into a plurality of sub-pixels which may multiply the resolution of the modified beam and/or the final beam.

The device may further comprise a microdiaphragm array (MDA) which may be configured to reduce noise and/or cross-talk between lenses of the MLA.

The device may further comprise at least one projection lens and a movable stage which may be configured to translate one or more of the at least one projection lenses in a plane. The plane may be a two-dimensional (2D) plane, such as a plane in a space. The 2D plane may be a plane between two axes in the space. The space may be a multi-dimensional space, such as a three-dimensional (3D) space. For example, a plane may be a plane between the X axis and the Y axis (e.g., an X-Y plane). Alternatively, the plane may be a X-Z plane or a Y-Z plane. The plane may be defined by two vectors, where each of the vectors may be parallel with two axes in the space. For example, a plane may be an X-Y plane and distances between the light engine, the collimation lens, the MLA, the at least one projection lens, and the movable stage of the optical assembly along the Z axis (or any other axis perpendicular to the plane) may be fixed. Alternatively, in some cases, the distances may not be fixed, and may be subject to change over time.

The device may further comprise a printing vat. The printing vat may comprise a printing stage. In some examples, the printing stage may be fixed. In some examples, the printing stage may be movable. The printing stage may be configured to move in any direction or along any axis in the space. The movement of the stage may be defined in the cartesian coordinates, the polar coordinates, the spherical coordinates, or any other coordinate system. In some examples, the printing stage may be configured to move (e.g., may be movable) along the X axis, the Y axis, and/or the Z axis in the 3D space in a cartesian coordinate system. In some examples, the stage may move along more than one axis. In some examples, the stage may be configured to rotate, and/or move in the direction of an angle or a radius of an example circle in a polar coordinate system or a spherical coordinate system.

The device, such as the printing vat of the device, may further comprise control circuitry. Control circuitry may be configured to control on or more device components, for examples, the light engine, movable stage, and/or the printing stage to achieve a given goal, such as printing an object, such as by stereolithographic 3D printing.

Also described herein, in some examples, are computer systems and computer-implemented systems and methods which may comprise one or more processors, and one or more memories. The computer systems may comprise instructions which may be executable by the at least one processor and may create an application. The application may comprise modeling, such as procedural modeling.

A procedural modeling application may comprise a graphic user interface (GUI). The graphic user interface may comprise a viewport. The methods and systems, such as the procedural modeling application may further comprise a presentation module. The presentation module may be configured to represent a scene. In some examples, the scene may be represented as a signed distance function and may render the scene by utilizing ray marching.

The presentation module may comprise a scene library. The scene library may comprise one or more procedural objects (POs). The presentation module may further comprise a scene editor. The scene editor may allow a user to add one or more POs to the scene and/or create a constructive geometry (e.g., constructive solid geometry (CSG)) tree for the scene. The presentation module may further comprise a procedural object (PO) editor which may allow the user to edit properties of a PO which may have been added to the scene. The presentation module may further comprise a simulation editor which may allowing the user to configure one or more simulations of the scene. The presentation module may further comprise a printing editor which may allow the user to configure the scene for printing.

The methods and systems, for example the presentation module may further comprise a simulation module. The simulation module may be configured to conduct the one or more simulations. The simulations may be conducted in the scene. The methods and systems, for example the presentation module may further comprise a printing module. The printing module may be configured to generate a queue of slice files and transmitting the slice files to a 3D printer. The 3D printer may comprise or be a device or system provided elsewhere herein or another device or system.

Provided herein are non-transitory computer-readable storage media which may be encoded with instructions. The instructions may be executable by at least one processor, for example, to create a procedural modeling application.

The procedural modeling application may comprise a graphic user interface (GUI). The GUI may comprise a viewport and a presentation module. The presentation module may be configured to represent a scene, for example, as a signed distance function and may render the scene by utilizing ray marching. The presentation module may comprise a scene library.

The scene library may comprise one or more procedural objects (POs). The presentation module may further comprise a scene editor which may allowing a user to add one or more POs to the scene and/or create a constructive geometry, such as a constructive solid geometry (CSG) tree for the scene. The presentation module may comprise a procedural object (PO) editor which may allow the user to edit properties of each PO added to the scene, a simulation editor which may allowing the user to configure one or more simulations of the scene, and a printing editor which may allowing the user to configure the scene for printing, a simulation module which may be configured to conduct the one or more simulations of the scene, and a printing module which may be configured to generate a queue of slice files and transmit the slice files to a device such as a 3D printer. The 3D printer may be a device or system provided elsewhere herein, or another device or system.

Provided herein are computer-implemented methods for procedural modeling. The computer-implemented methods for procedural modeling may comprise providing a procedural modeling application. The procedural modeling application may comprise a scene library. The scene library may comprise one or more procedural objects (POs). The procedural modeling application may further comprise a scene editor which may allow a user to add one or more POs to a scene and/or creating a geometry such as a constructive solid geometry (CSG) tree for the scene. The procedural modeling application may further comprise a procedural object (PO) editor which may allow the user to edit properties of a PO, for example each PO added to the scene. The procedural modeling application may further comprise a simulation editor. The simulation editor may allow the user to configure one or more simulations of the scene. The procedural modeling application may comprise a printing editor which may allow the user to configure the scene for printing, represent the scene as signed distance function, render the scene by utilizing ray marching, conduct the one or more simulations in the scene, generating a queue of slice files, and/or transmitting the slice files to a 3D printer. The 3D printer may be a device or system provided elsewhere herein, or another device or system.

Provided herein are methods of manufacturing a multi-dimensional object such as a 2D or 3D object. In some cases, a multi-dimensional object (e.g., 3D object) may comprise one or more units. In some examples, the one or more units may comprise multiple units or a plurality of units. In some examples, the units may comprise or be repeated or repeating units. The method may comprise: providing a procedural modeling application. The procedural modeling application may be according to e procedural modeling application provided elsewhere herein or another procedural modeling application. The procedural modeling application may be configured to perform one or more functions. In some examples, the functions may be performed at a request of a user which may provide an input or instructions to the application. Alternatively, artificial intelligence, machine learning, or other techniques may be used to perform the one or more functions.

In some examples, the procedural modeling application may be configured to add one or more units to a scene. The scene may be a multi-dimensional scene. The scene (e.g., multi-dimensional scene) may comprise any number of dimensions, such as 1, 2, 3, 4, 5, 6, 7, or more. In some examples, a unit may be a crystallographic units. For example, a crystallographic unit may be added to a scene (e.g., a 3D scene). The method may further comprise replicating the one or more units (e.g., crystallographic units) to form a structure. The structure may comprise or be a lattice. For example, the structure may comprise a crystal lattice in the scene. The method may further comprise and configuring links and/or connections which may connect the units (e.g., the replicated crystallographic units). The structure may further comprise one or more conduits. The conduits may connect the links. The method may comprise creating a constructive solid geometry (CSG) tree for the scene. The method may further comprise representing the 3D scene as signed distance function, rendering the scene by utilizing ray marching, generating a queue of slice files, and/or transmitting the slice files to a device such as a 3D printing device, such as a stereolithographic 3D printing device. The device may comprise be any device provided elsewhere herein, other devices, or any combination thereof.

When visualizing and manipulating any virtual scene, something to be concerned about may be the representation of a geometry or a plurality geometries included in the scene or any structure therein. Examples of the approaches that can be taken to tackle this problem may comprise using explicit representation and/or implicit representation.

In some examples, in explicit representation, geometry may be stored as a list of geometric primitives. Geometric primitives may comprise a geometry primitive with any dimension in any shape. For example, geometric primitives may comprise points, triangles, polygons, or other geometric primitives. Geometric primitives may comprise one or more dimensions such as 1, 2, 3, 4, 5, 6, 7, or more dimensions. In some examples, geometric primitives may comprise n dimension, wherein n is an integer from 0 to infinity in an n-dimensional space.

In some cases, explicit representation may not need conversion to extract a 3D representable model for printing and it may allow for local manipulation of the model, for example, vertex by vertex. In some cases, explicit representation may comprise disadvantages Examples of the disadvantages explicit representation may comprise fixing the maximum level of detail established by the distribution of vertices, losing the inherent information of the geometry, which may in some cases, be merely represented by a list of a few geometric primitives, difficulty associated with performing global manipulations, and lacking a definition of a compact data representation of the complete scene. For example, in some cases, data representation of the complete scene may not be compact and may occupy a large space, for example, on the memory. Examples of widely used explicit representation may comprise geometric primitives such as polygons and/or triangles. In some examples, a surface may be divided or sub-divided, and be rendered, for example using rasterization.

In implicit representation, geometry may be stored as a mathematical function or equation which may be defined over a manifold. Implicit representation may benefit from a mechanism to extract the necessary information for printing purposes and may facilitate local or global manipulation of the model. Implicit representation may comprise several advantages. For example, implicit representation may not fix a given level of detail and may provide the possibility of obtaining an infinite level of detail. Implicit representation may not cause losing the inherent information of the geometry. It may be convenient to make global manipulations in an implicit representation. In some examples, data may be compact and may occupy less disk space for example compared to explicit representation approach.

Marching Cubes/Tetrahedra: This technique consists of converting the implicit representation of the entire scene into its explicit representation. This is not well-suited for large scenes since it loses the data compactness of implicit representation after converting.

Rasterization: This technique has been widely used in real-time computer graphics over the last decades for its good performance and versatility to achieve good enough visual results. The rendering has a running time complexity is typically linear in the number of triangles that are required to be drawn. On the other hand, the space time complexity of the problem is linear in the number of vertices needed to represent the entire scene.

Figure 2:
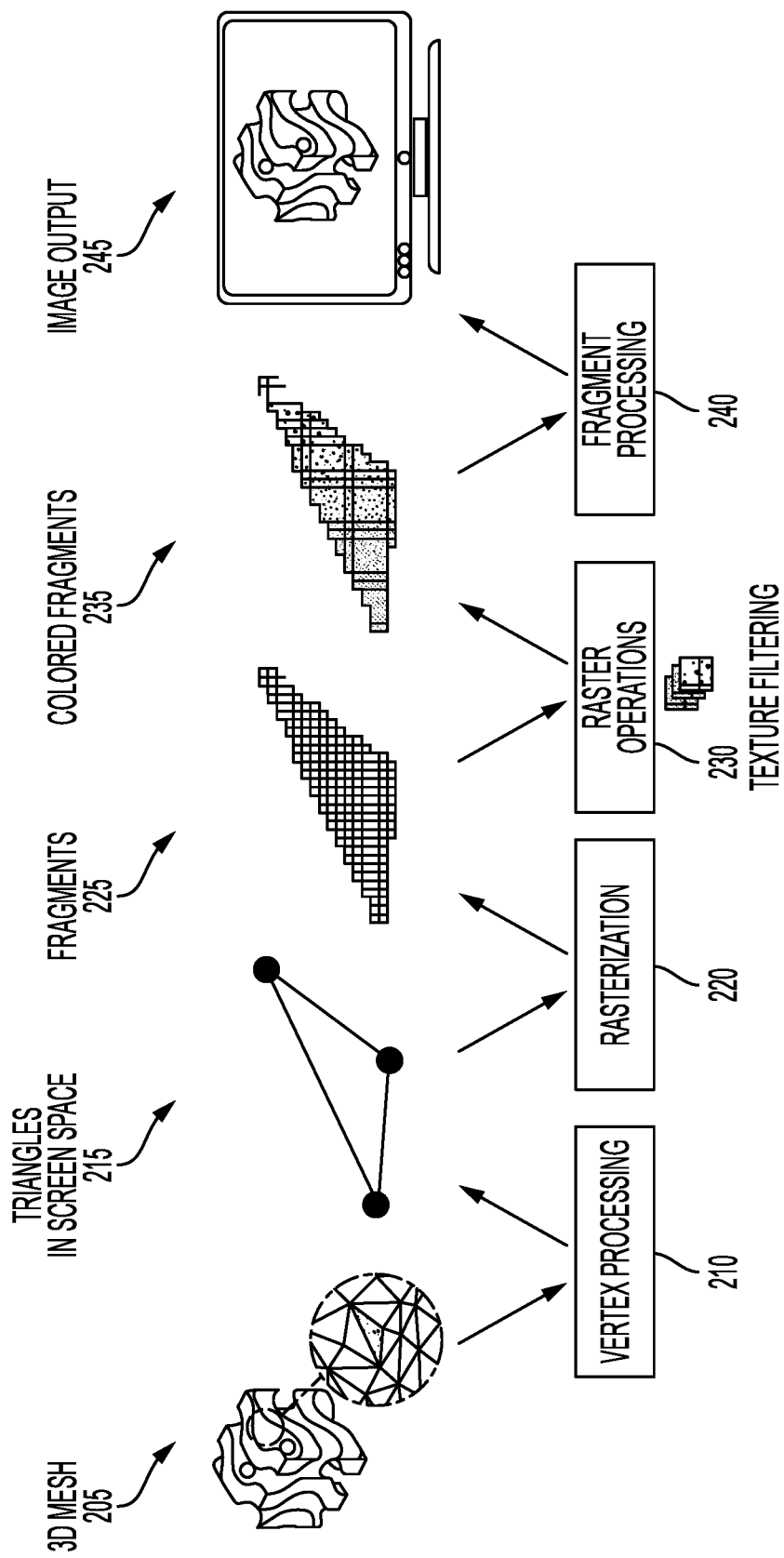
FIG. 2 shows a non-limiting schematic diagram of a rasterization pipeline; in this case, a rasterization pipeline starting with a 3D mesh and comprising performance of vertex processing, rasterization, raster operations, and fragment processing to generate an image output.

Referring to FIG. 2, an example rasterization pipeline is provided. In this example, a rasterization pipeline starts with a 3D mesh 205. In a first example vertex processing step 210, the host program fills the API's vertex buffer memory with arrays of vertices. Those vertices are usually defined in global coordinates; therefore, they are transformed into camera-space coordinates. Vertices can now be projected to screen coordinate. This transformation goes from 3D camera-space coordinates to 2D screen system coordinates. In this example, vertices are now interpreted as 2D triangles in screen space 215. In a second example rasterization step 220, the triangles are converted into pixel fragments 225. In a third example raster operations step 230, the fragments are colored according to desired lighting technique(s), and optionally texture filtering, to produce colored fragments 235. Finally, in this example, a fragment processing step 240 yields the final image output 245.

This process, sometimes referred to as a "graphics pipeline," is typically implemented in hardware, but can be manipulated by intermediate steps called "shaders." During the last two decades this graphics pipeline has been improved in order to maximize the number of triangles available to be drawn. Rasterization has significant performance considerations; specifically, that the execution time complexity of the algorithm is linear with regard to the number of vertices, since all of them need to be tested in order to produce the final image. It should be noted that this can be reduced to a logarithm order of complexity by using an AABB to sort the element in the scene; nevertheless, the time complexity is still strongly bound to the number of elements in the scene. Therefore, the algorithm does not scale well. That said, this method has gained popularity for its ease of parallelization using GPUs.

Ray Tracing (Ray Casting): In instant approach described herein, in some examples, ray tracing is utilized as the method of rendering, which has key advantages over rasterization. Modern GPUs have evolved to become, as today, highly programmable parallel floating processors. This new paradigm of multiple threads executing concurrently on multiple sources of data (MTMD processors) has opened the door to new opportunities for traditional well known ray casting rendering techniques.

Figure 3:
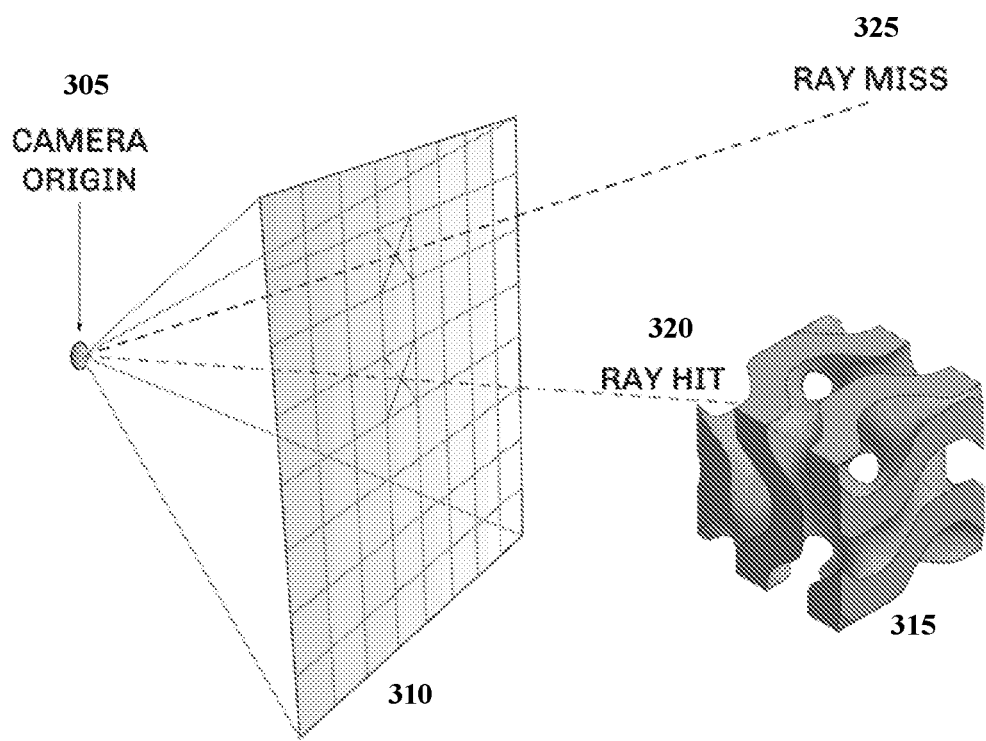
FIG. 3 shows a non-limiting schematic diagram of a ray tracing methodology; in this case, a ray tracing methodology comprising projecting rays from a camera origin to find which part of a scene each ray covers.

Referring to FIG. 3, an example ray tracing diagram is provided. Unlike the rasterization pipeline, this method starts on the pixels of the raster image 310 to produce it shooting rays along the camera frustum 305 to find which part of the scene each ray/pixel covers. Some rays may hit 320 an object in the scene 315, some may miss 325.

Figure 4:
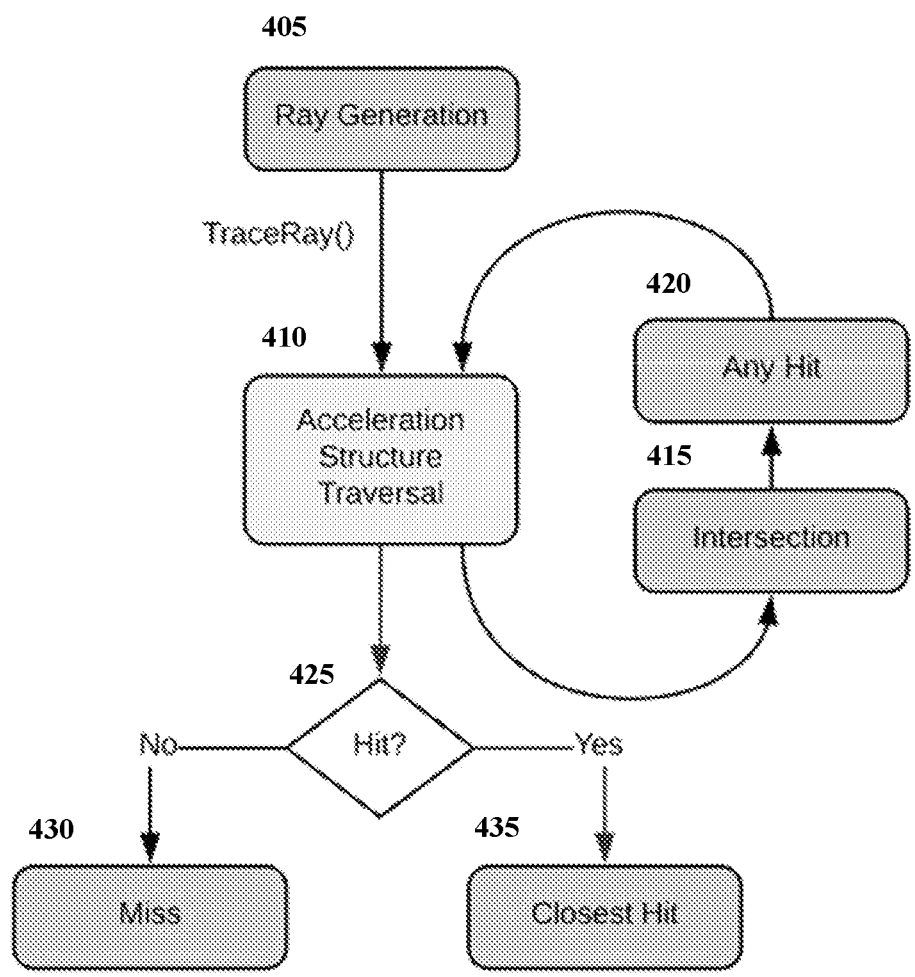
FIG. 4 shows a non-limiting example of a flow chart; in this case, a flow chart illustrating a raymarching pipeline used to represent fully procedural environments from a single mathematical equation, such as a signed distance function.

Referring to FIG. 4, an example ray marching methodology is provided. In this example, for each pixel in the screen a ray is traced 405 through the scene, usually it is done by using a BVH. Further, in this example, if the ray intersects 415 any object, the hit 420 is computed and saved. After traversing the entire structure 410, the algorithm evaluates 425 if the ray hits a surface 435 or not 430, if it does, a color is computed, or an additional ray is cast from the desired position.

Ray Tracing and Crystal Lattices

A lattice is an ordered array of points describing the arrangement of particles that form a crystal. This order in the arrangement of particles gives useful properties which are beneficial to improve the execution time of the rendering technique.

Ray Marching

This technique involves determining intersection of an orthographic projection of the entire scene, with a single plane. Normally, 3D printers only need a limited set of layers, usually just one layer. Once a printing process starts it can be updated one layer at a time; therefore, there is no need to store the entire representation of the scene prior to starting the printing process. Implicit representations using signed distance functions (SDFs) are well suited for these tasks due to the simplicity to extract the intersection of the 3D scene with a plane.

This technique may be similar to ray casting, but it can be used to generate fully procedural environments entirely from a single mathematical equation. The idea is to change both the abstract representation of the scene and the rendering technique to combine them within a method that can handle both better space and execution time complexity. The scene is now represented as a mathematical function such as a SDF. Since crystal lattices are composed of an ordered arrangement of particles, it is not impossible to find such a function. A SDF takes a point in space and calculates how far that point is from the surface.

Example: The following function describes a circle in two dimensions:

// params:
// p: arbitrary point in 3D space
// c: the center of our sphere
// r: the radius of our sphere
float sphere_distance(in vec3 p, in vec3 c, float r)
{
return length(p−c)−r;
}

Figure 5:
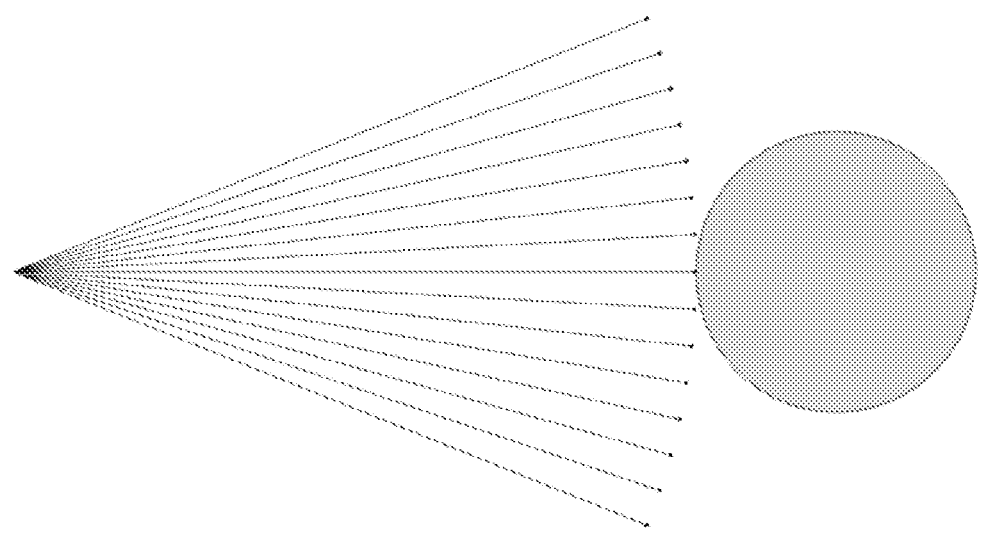
FIGS. 5-7 show a non-limiting example of a raymarching methodology used to render a 3D scene; in this case, a raymarching methodology wherein rays are projected from a virtual camera looking at the 3D scene and wherein, for each of the rays, the technique involves marching in the direction of the ray and, at each step, evaluating a mathematical equation representing the scene to calculate how far it is from the closest point on the surface.
Figure 6:
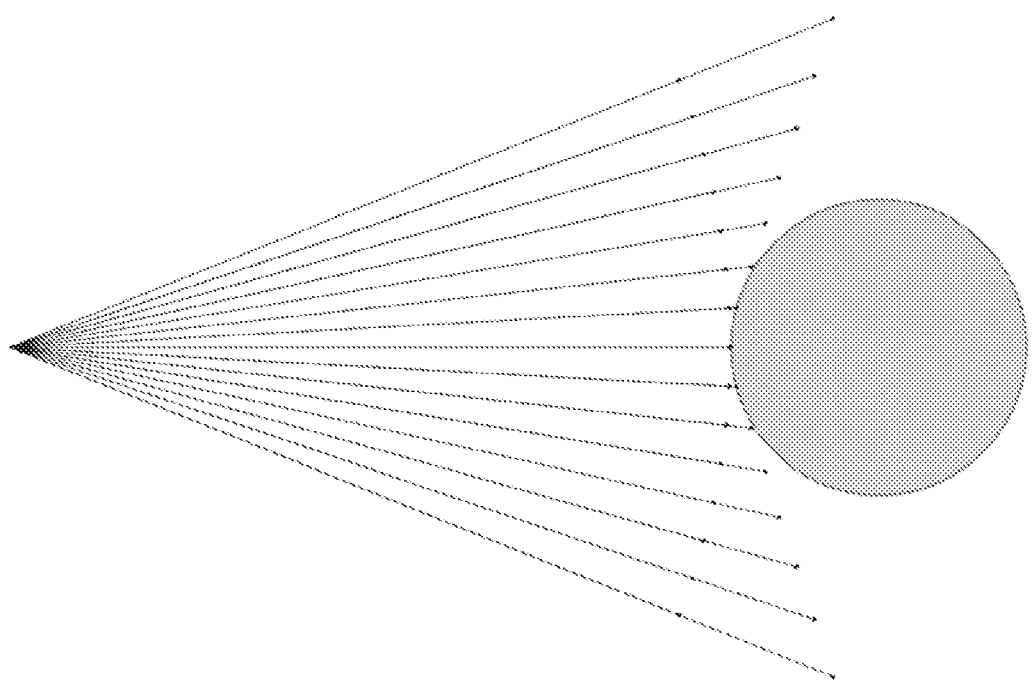
Figure 7:
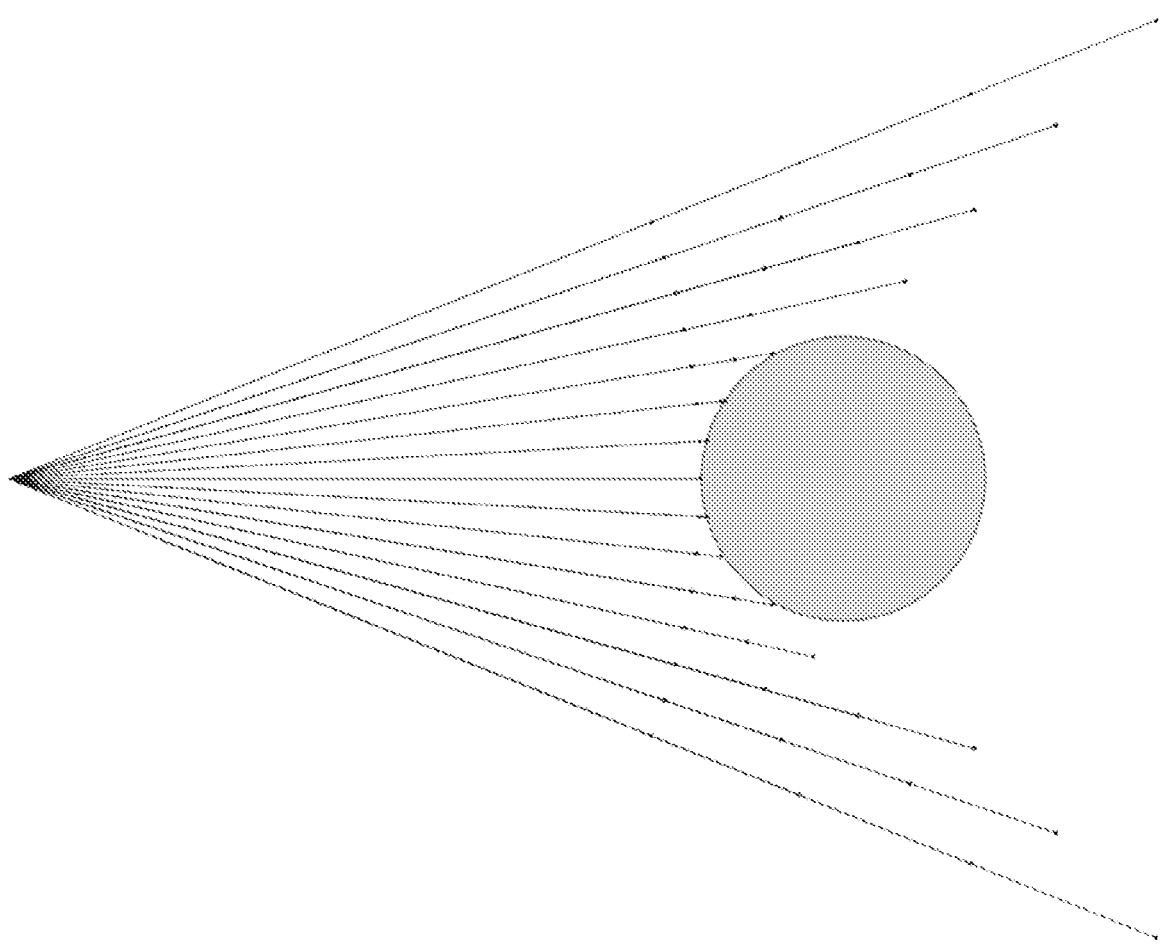

In order to render the scene, this technique shoots out rays from a virtual camera that is looking the scene (see, e.g., FIG. 5.) For each of the pixels of the raster image, the technique marches along the direction of the ray (see, e.g., FIG. 6), and at each step, evaluate the SDF to calculate how far it is from the closest point on the surface (see, e.g., FIG. 7).

Ray marching confers significant performance improvements. Since, when using ray marching, the entire scene is represented as a single mathematical equation, the execution time complexity does not rely on the number of objects in the scene, but on the complexity of the SDF. When analyzing the space complexity, it is clear that the scene can be described by a single mathematical function, there is no need to discretize the scene by vertices. This gives the possibility of drastically reducing the space needed to store the scene and, at the same time, preserves the details of the original geometry inherit by the mathematical function.

These performance improvements are magnified when modeling crystal lattices, which are composed by ordered repetitions of the same unit cell structure. In order to achieve the requisite amount of repetition, in some examples, the rendering suite described herein does not specify individually each unit cell position, but, on the contrary, in such examples. a mathematical equation is founded in order to represent the entire crystal structure.

Procedural Modeling Application

Figure 8:
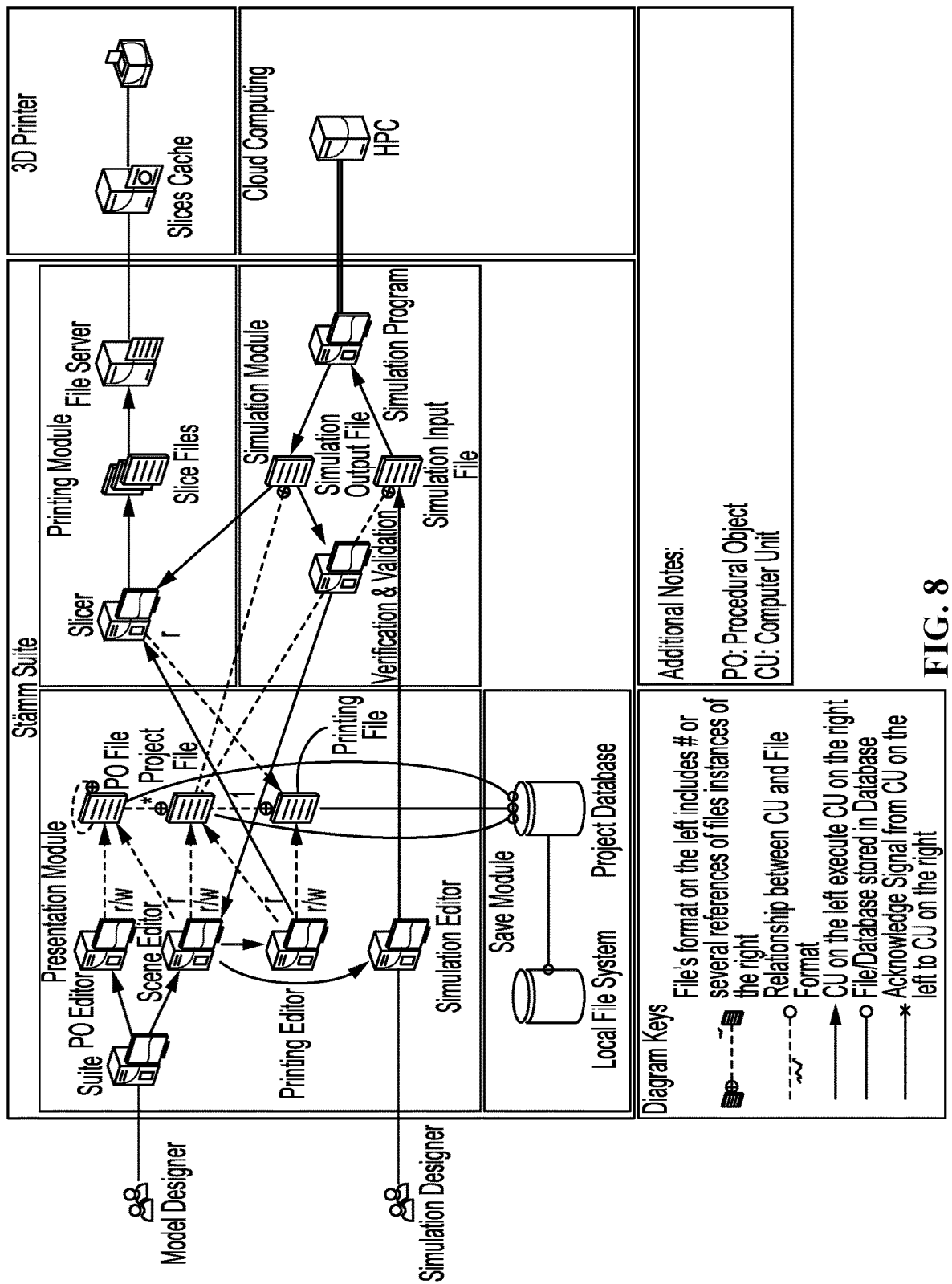
FIG. 8 shows a non-limiting platform architecture diagram; in this case, a platform architecture diagram comprising a software suite with a presentation module used by model and simulation designers, a save module, a simulation module, and a printing module, a 3D printer device, and a cloud computing system.

Referring to FIG. 8, in a particular embodiment, a procedural modeling application has an architecture comprising a presentation module, a save module, a printing module, and a simulation module. In this embodiment, the application architecture is also operably in communication with a cloud computing system as well as at least one 3D printing apparatus, such as the 3D printing devices described herein.

Continuing to refer to FIG. 8, in this embodiment, the presentation module comprises a suite with tools configured for use by a model designer user. Non-limiting examples of tools configured for use by a model designer user include a scene library, a procedural object (PO) editor and a scene editor. In this embodiment, the scene editor allows the user to access features of a printing editor and a simulation editor.

In some examples, the presentation module of the procedural modeling application comprises a scene library. In further examples, the scene library comprises one or more POs available to add to a scene. In various examples, the POs in the scene library include those that are premade and provided with the application, created by a user de novo, created by a user via editing a properties of other POs, loaded from external sources, and the like. In a particular embodiment, a user optionally adds a PO to a scene by dragging an icon representing the PO from the scene library and dropping it into a viewport or other feature of the presentation module representing the scene.

In some examples, the presentation module of the procedural modeling application comprises a PO editor. In further examples, the PO editor allows creation and editing of a PO file for each PO. In further examples, the PO editor provides features allowing the user to edit one or more properties of each PO in the scene library and/or each PO added to a scene. Non-limiting examples of editable PO properties include type, scale, position, links for connecting to one or more adjacent POs (including type, scale, shape, and position of each link), conduits connecting the links (including type, scale, shape, path, and position of each conduit), and replication properties, such as number of replications, pattern of replications, density of replications, and the like.

In some examples, the presentation module of the procedural modeling application comprises a scene editor. In further examples, the scene editor allows creation and editing of a project file for the scene. In still further examples, the scene editor provides features allowing a user to add one or more POs to the scene. In yet further examples, the scene editor creates a constructive solid geometry (CSG) tree for the scene and updates the CSG tree as the scene is constructed and revised. In a particular embodiment, the scene editor provides features allowing a user to replicate a crystallographic unit with precisely specified scale, pattern, density, etc. to form a crystal lattice in the scene.

In some examples, the procedural modeling application comprises a save module. In further examples, the PO file(s) are referenced by a project file and the project file is referenced by the printing file. In still further examples, the PO file(s), project file(s), and/or printing file(s) are stored by the save module in a project database in communication with a local file system allowing search, retrieval, and the like of files.

Still referring to FIG. 8, in this embodiment, the presentation module also comprises tools configured for use by a simulation designer user, who may be the same user or a different user than the model designer user, and the procedural modeling application comprises a simulation module. Non-limiting examples of tools configured for use by a simulation designer user include a simulation editor. In further examples, a simulation editor provides features allowing the user to configure one or more simulations of the scene. In still further examples, the simulation editor generates and maintains a simulation input file that is ingested, in conjunction with scene and project information, by a simulation module to conduct simulations utilizing cloud computing resources.

Many types of simulations are suitable for use in the procedural modeling applications described herein. Suitable simulations include, by way of non-limiting examples, microfluid simulations, Computational Fluid Dynamics (CFD) simulations, and a Lattice Boltzmann Method (LBM) in combination with a signed distance function in order to solve a CFD simulation. In particular examples, a simulation module provides a visualization of one or more characteristics of the simulation, such as performance characteristics.

Still referring to FIG. 8, in this embodiment, the presentation module comprises a printing editor and the procedural modeling application comprises a printing module. In some examples, the printing editor allows creation and editing of a printing file for the scene. In further examples, the printing editor provides features allowing the user to configure a scene for printing. In still further examples, the printing editor provides features allowing the user to configure, by way of non-limiting examples, surface profile(s), printer execution orders, layer thickness(es), time(s) of luxbeam exposure, and pixel resolution(s). In some examples, a printing module ingests a printing file and other information from the printing editor along with simulation information via a slicer to produce slice files. In further examples, a file server provides the slice files to a cache that is internal or external to one or more 3D printing devices. An example slicer/printer synchronization architecture is provided at FIG. 22.

Graphic User Interface

In some examples, the procedural modeling application comprises a GUI to present elements and features allowing one or more users to access functions of the application.

Figure 9:
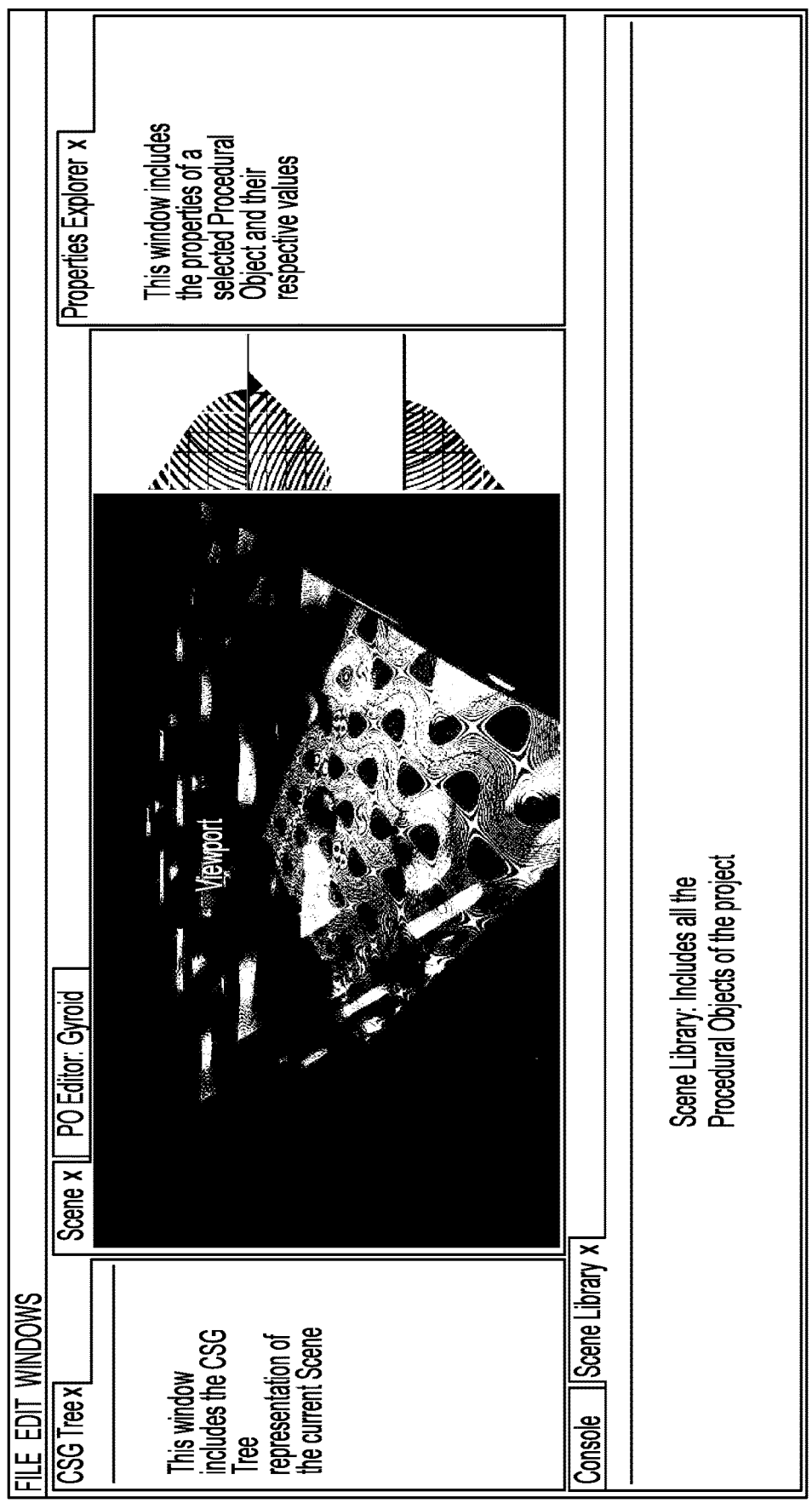
FIG. 9 shows a non-limiting example of an overview of a graphic user interface (GUI) for a procedural modeling application; in this case, an overview of a GUI comprising a central viewport, a window to display a CSG tree representation of the current scene, a scene library including procedural objects, and a window to display properties of a currently selected procedural object.

Referring to FIG. 9, in a particular embodiment, a procedural modeling application described herein includes a GUI comprising a central viewport, a window to display a CSG tree representation of the current scene, a scene library including procedural objects, and a window to display properties of a currently selected procedural object.

Figure 10:
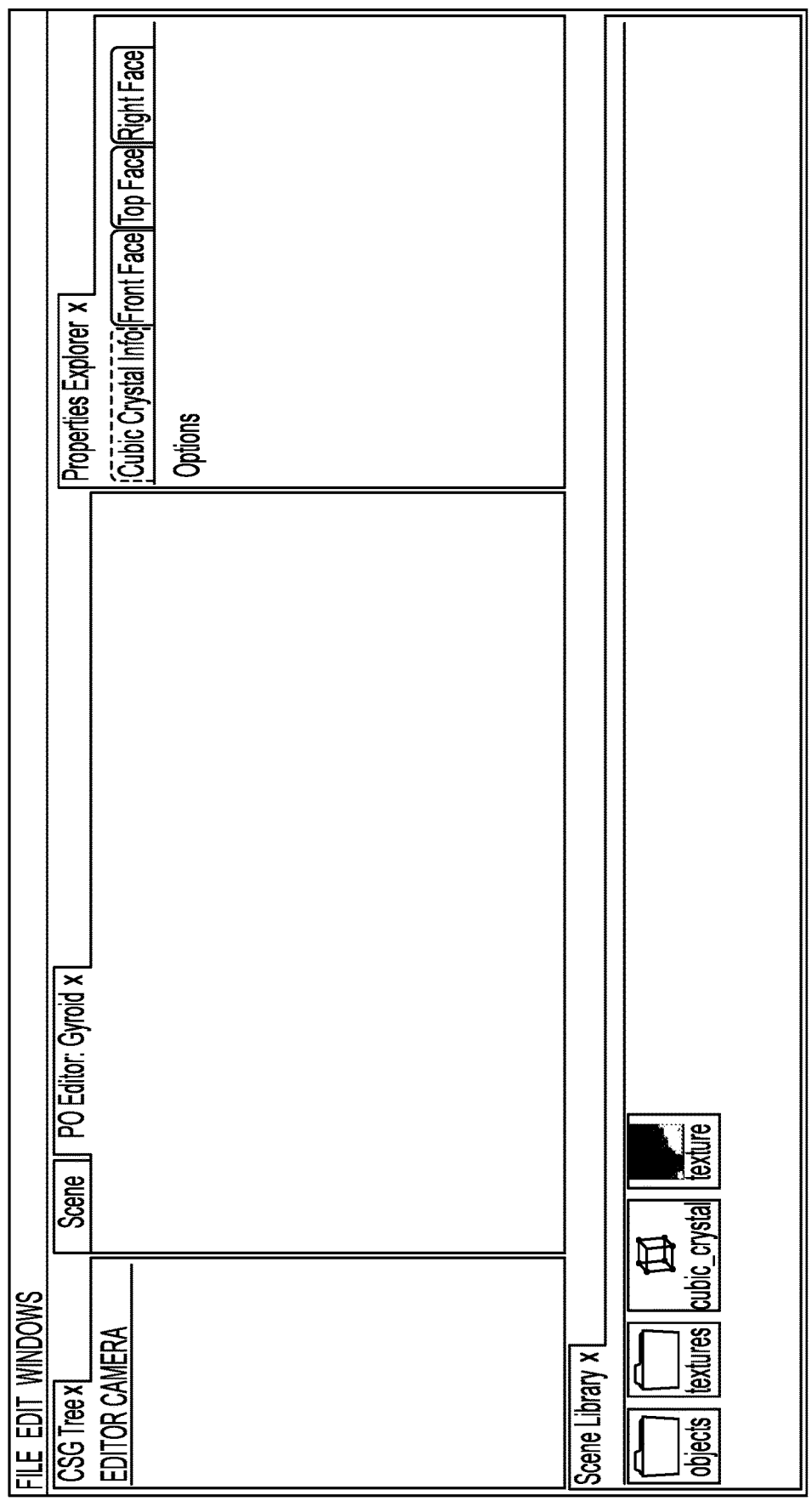
FIG. 10 shows a non-limiting example of a GUI for a procedural modeling application; in this case, a GUI allowing a user to select a procedural object, wherein interface elements for the user to edit properties of the procedural object are provided.
Figure 11:
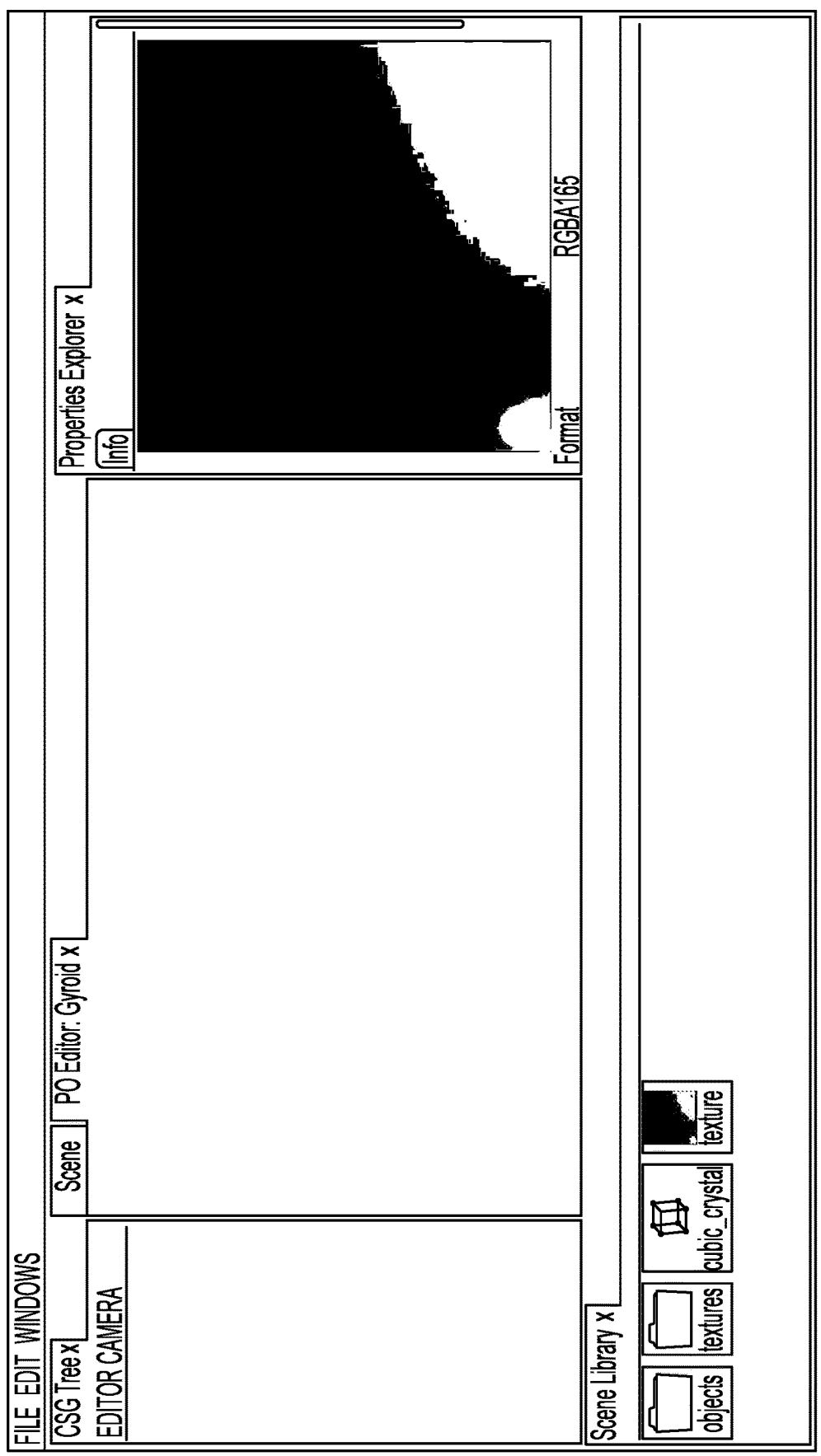
FIG. 11 shows a non-limiting example of a GUI for a procedural modeling application; in this case, a GUI allowing a user to select a texture, wherein a format and a preview are provided.
Figure 12:
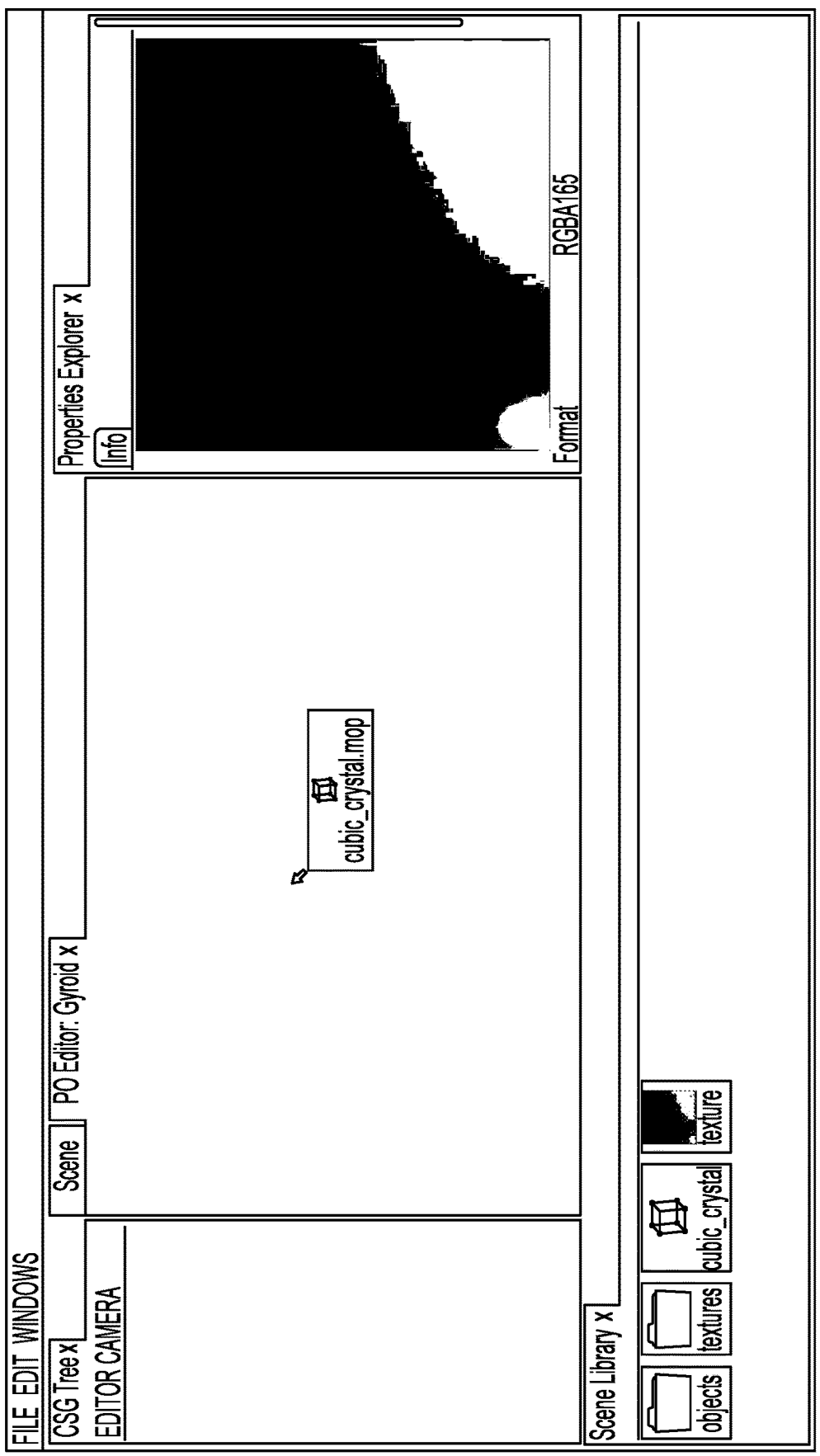
FIG. 12 shows a non-limiting example of a GUI for a procedural modeling application; in this case, a GUI allowing a user to drag a procedural object from a scene library and drop it into a procedural object editor to start editing the properties of the procedural object.
Figure 13:
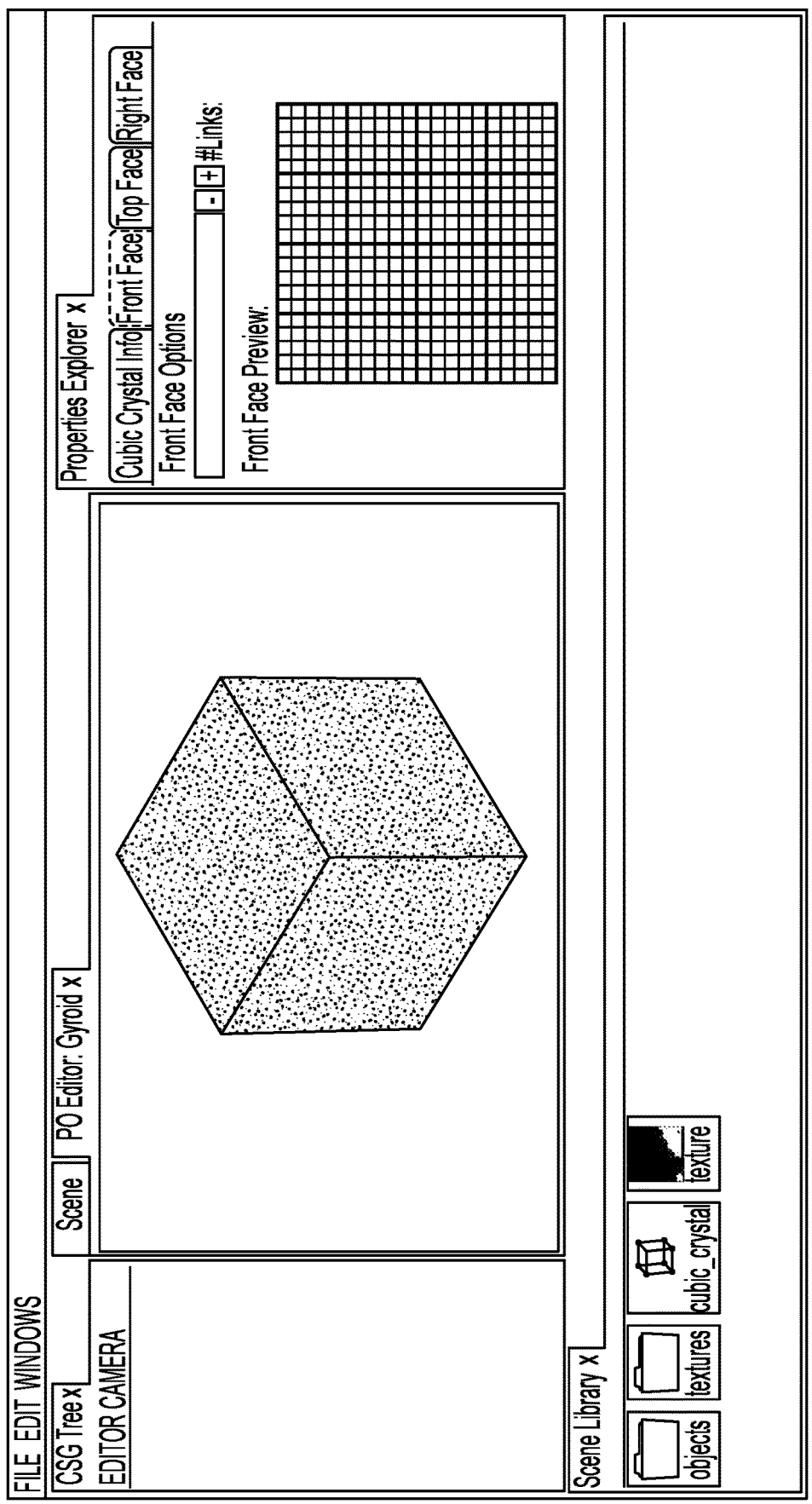
FIG. 13 shows a non-limiting example of a GUI for a procedural modeling application; in this case, a GUI allowing a user to view editable properties of a selected procedural object (a cubic crystal), which is depicted in a viewport, and create a plurality of crystal cells from the cubic crystal.
Figure 14:
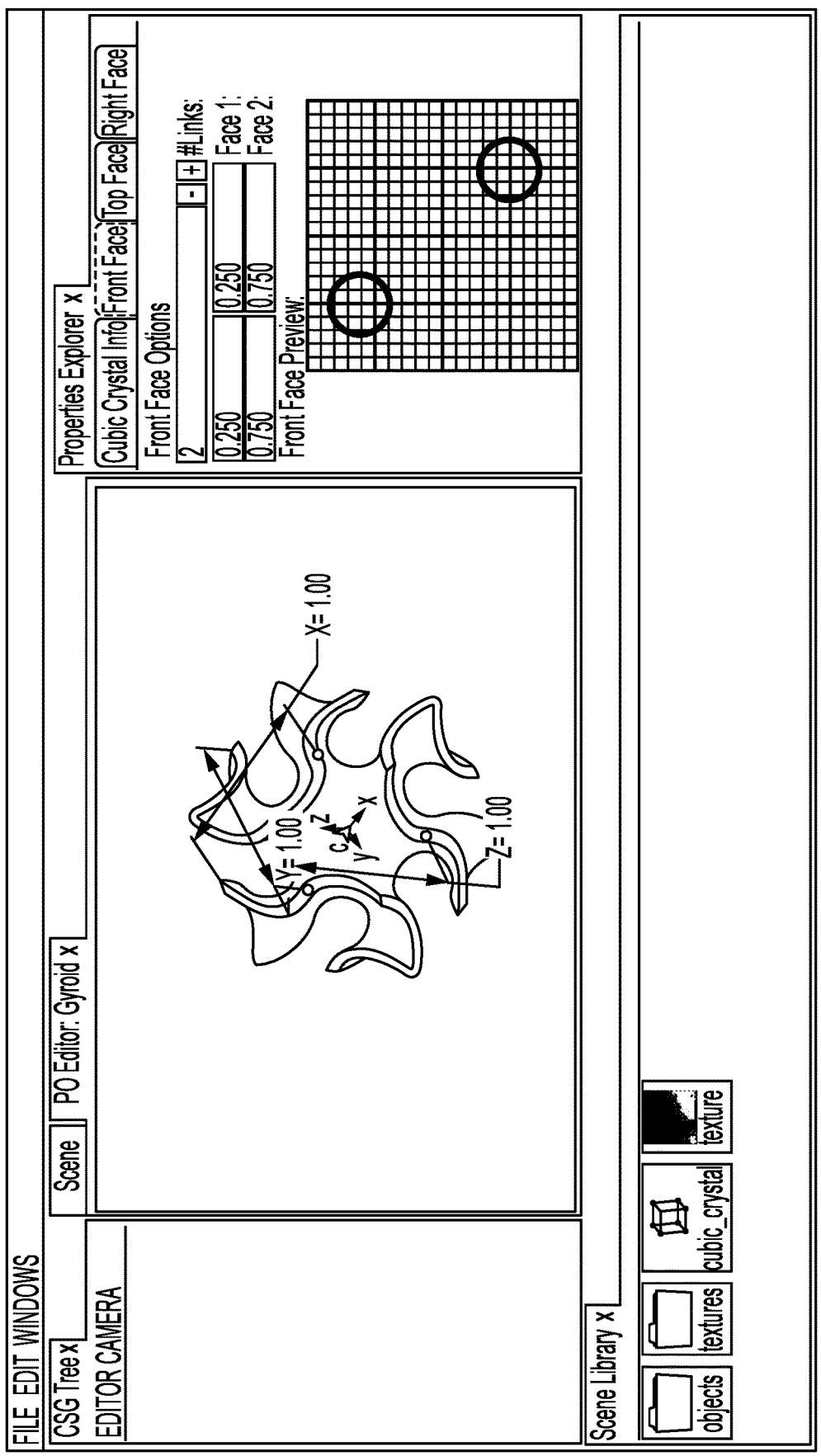
FIG. 14 shows a non-limiting example of a GUI for a procedural modeling application; in this case, a GUI allowing a user to set links for each face of a cubic crystal procedural object and set positions for the links on the faces to form, for example, a gyroid.
Figure 15:
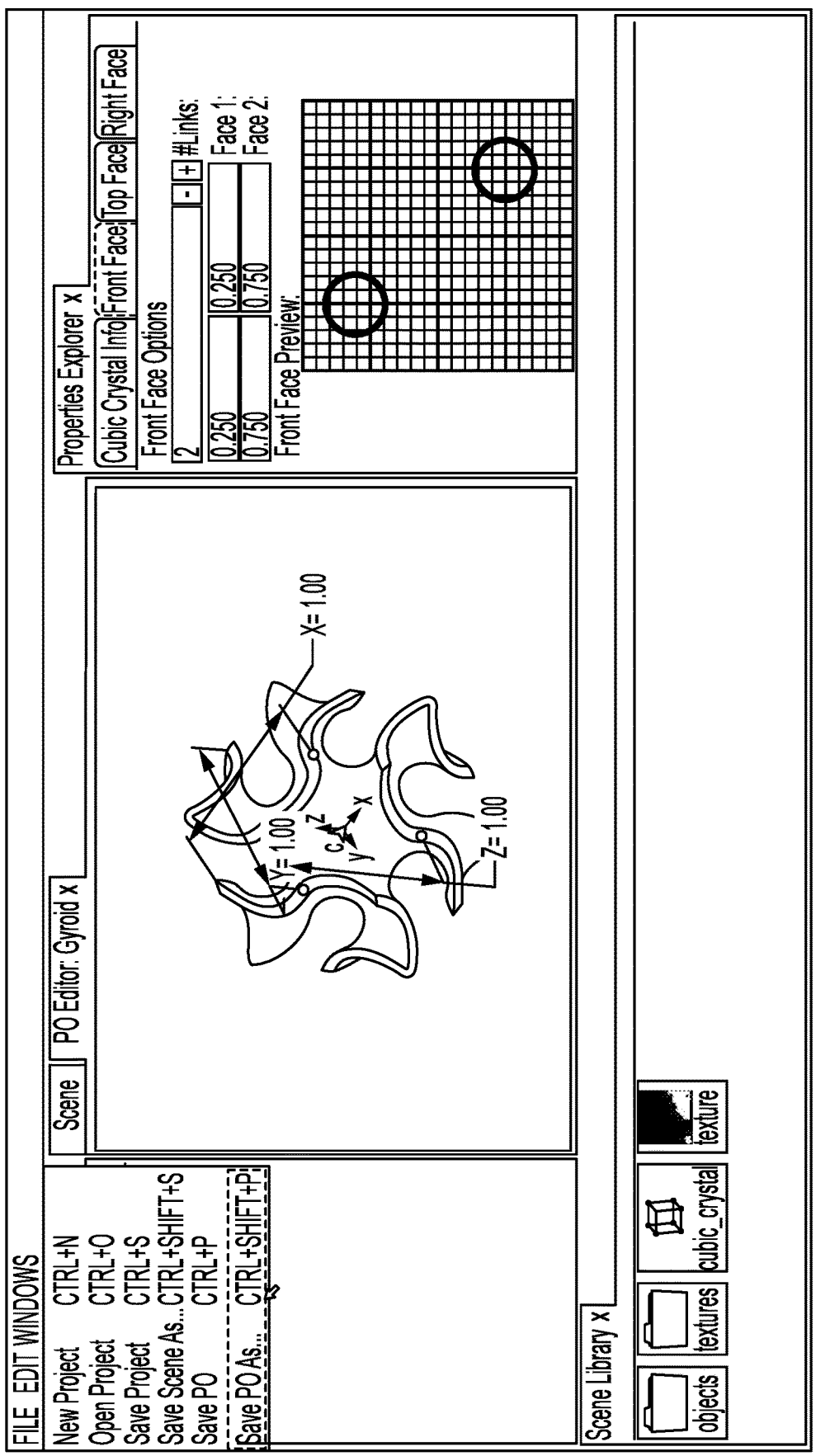
FIG. 15 shows a non-limiting example of a GUI for a procedural modeling application; in this case, a GUI allowing a user to save an edited procedural object (a gyroid unit cell) in a scene library.
Figure 16:
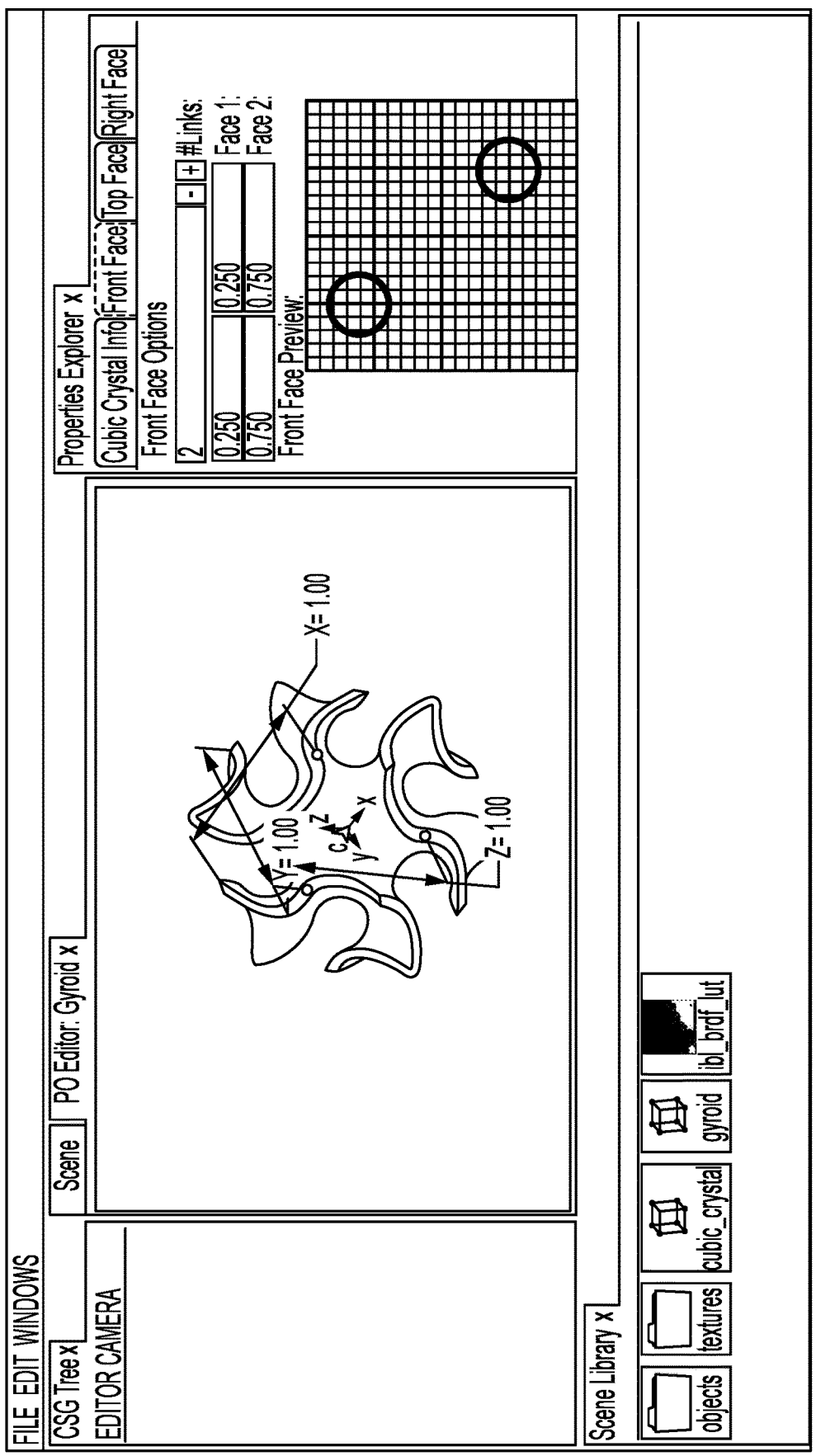
FIG. 16 shows a non-limiting example of a GUI for a procedural modeling application; in this case, a GUI allowing a user to identify the saved procedural object in a scene library, wherein the edited object (a gyroid unit cell) inherits properties from the procedural object from which it was created, and wherein the GUI also allows the user to replicate a procedural object to form a crystal lattice, such as a gyroid lattice.

In some examples, a procedural modeling application described herein includes a GUI allowing a user to access a plurality of functions including, by way of non-limiting examples, allowing a user to select a procedural object, wherein interface elements for the user to edit properties of the procedural object (see, e.g., FIG. 10), allowing a user to select a texture, wherein a format and a preview are provided (see, e.g., FIG. 11), allowing a user to drag a procedural object from a scene library and drop it into a procedural object editor to start editing the properties of the procedural object (see, e.g., FIG. 12), allowing a user to view editable properties of a selected procedural object (a cubic crystal), which is depicted in a viewport, and create a plurality of crystal cells from the cubic crystal (see, e.g., FIG. 13), allowing a user to set links for each face of a cubic crystal procedural object and set positions for the links on the faces to form, for example, a gyroid (see, e.g., FIG. 14), allowing a user to save an edited procedural object (a gyroid unit cell) in a scene library (see, e.g., FIG. 15), and allowing a user to identify the saved procedural object in a scene library, wherein the edited object (a gyroid unit cell) inherits properties from the procedural object from which it was created, and wherein the GUI also allows the user to replicate a procedural object to form a crystal lattice, such as a gyroid lattice (see, e.g., FIG. 16).

Figure 19:
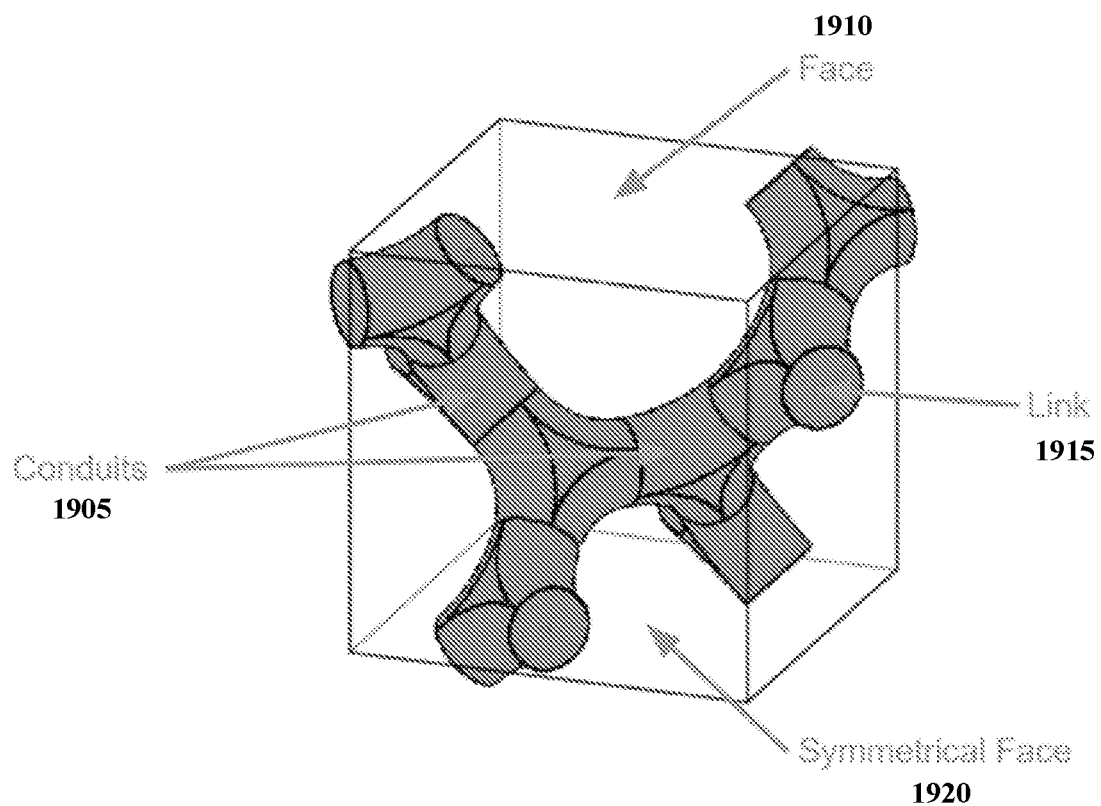
FIG. 19 shows a non-limiting example of a schematic diagram of a crystal unit cell; in this case, a schematic diagram illustrating nomenclature of features of a crystal unit cell such as faces, links, and conduits.

Referring to FIG. 19, a schematic diagram of a crystal unit cell, including nomenclature is provided. The nomenclature diagramed includes the terms "face" 1910, "symmetrical face" 1920, "link" 1915, and "conduit" 1905.

Figure 20:
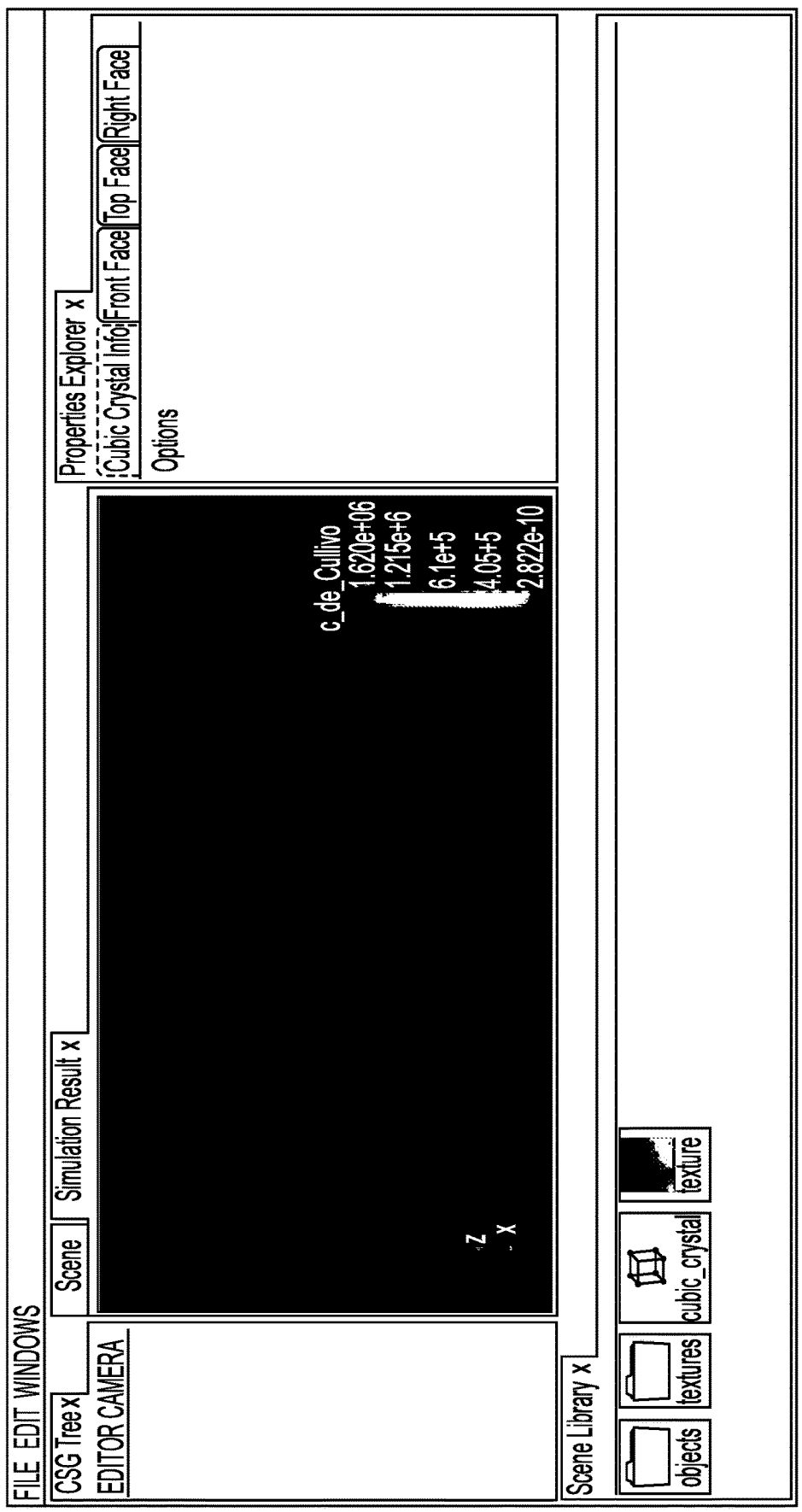
FIG. 20 shows a non-limiting example of a GUI for a procedural modeling application; in this case, a GUI showing set up of a simulation to be performed in a 3D scene model.
Figure 21:
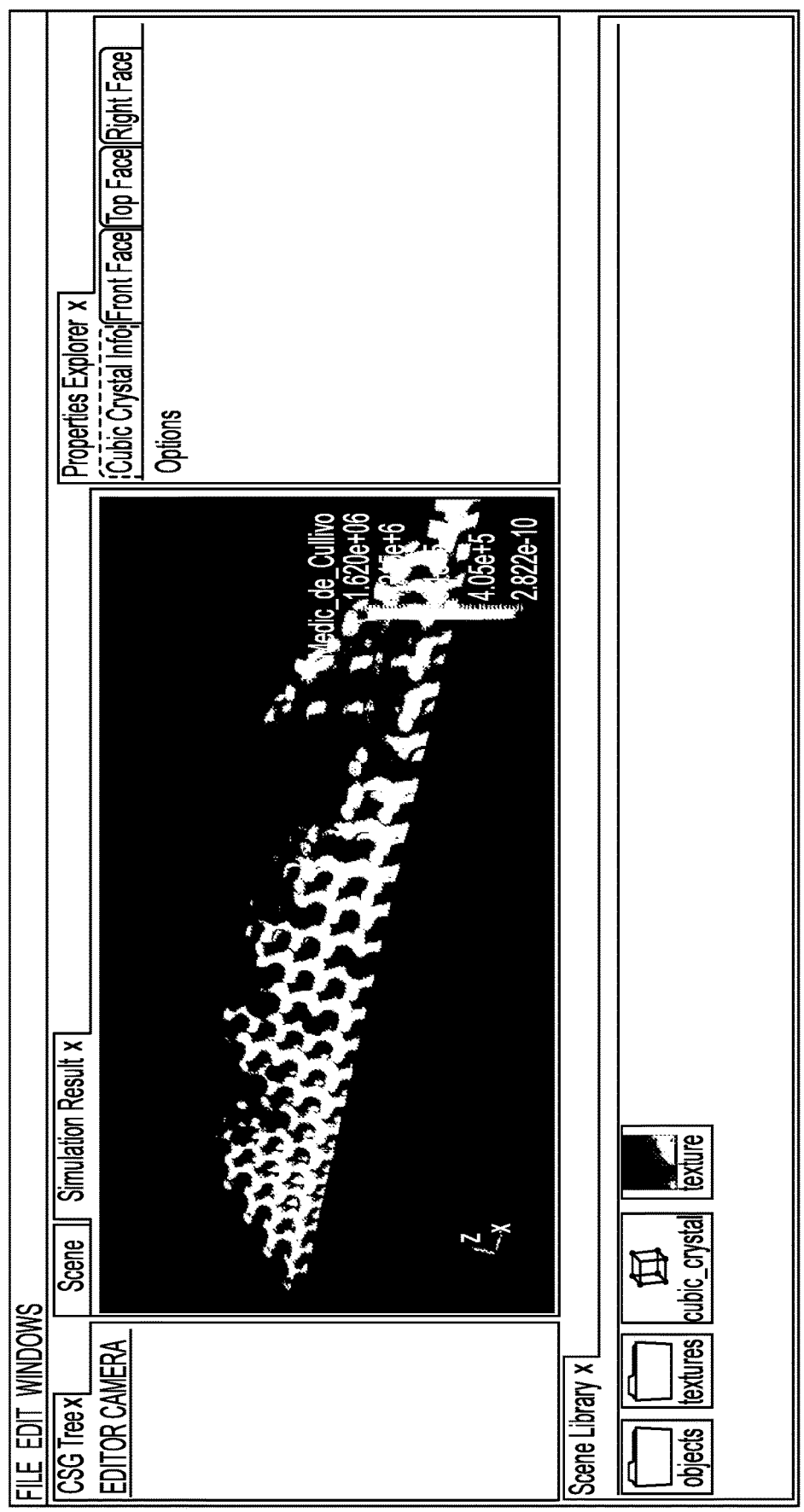
FIG. 21 shows a non-limiting example of a GUI for a procedural modeling application; in this case, a GUI showing results of a simulation performed in a 3D scene model.

In various further examples, a procedural modeling application described herein includes a GUI allowing a user to access a plurality of simulation functions including, by way of non-limiting examples, allowing a user to set up of a simulation to be performed in a 3D scene model (see, e.g., FIG. 20) and allowing a user to view results of a simulation performed in a 3D scene model (see, e.g., FIG. 21).

Example Processes

Figure 17:
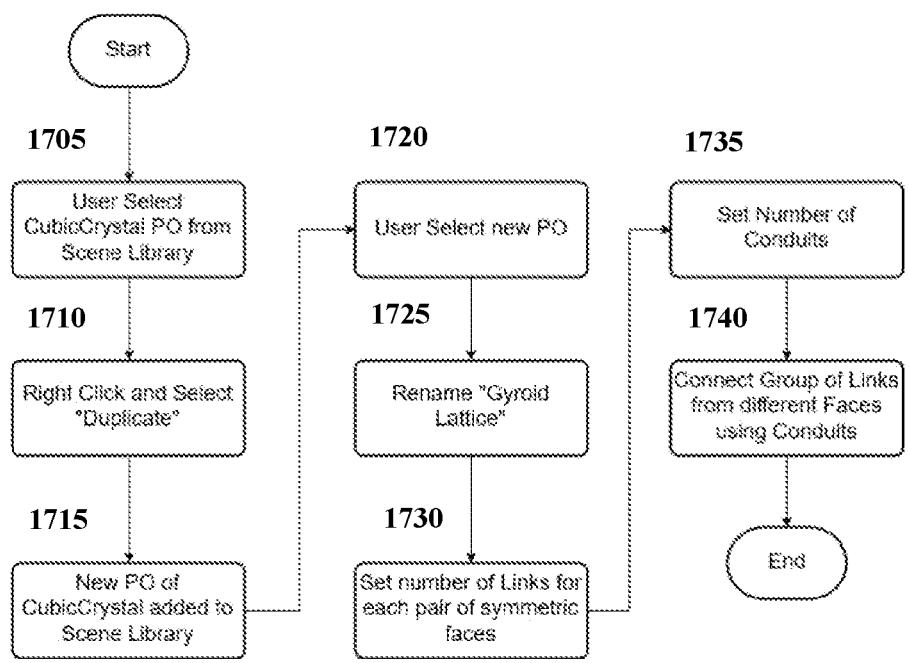
FIG. 17 shows a non-limiting example of a flow chart; in this case, a flow chart illustrating a process for a user to interact with an application to create, edit, and save a procedural object from a previously created object.

Referring to FIG. 17, in a particular embodiment, a process is provided for a user to interact with an application to create, edit, and save a procedural object from a previously created object. In this embodiment, a user selects a PO from the scene library 1705, in this case, a cubic crystal PO. Next, the user selects the PO by right clicking on the PO and selects "Duplicate" from a menu of options 1710. As a result, a new cubic crystal PO is added to the scene library 1715. The user then may select the new PO 1720 and rename the new PO to "gyroid lattice" 1725. Next, the user may set a number of links for each pair of symmetric faces on the PO 1730 and also may set a number of conduits 1735. Finally, in this example process, the user connects a group of links from different faces using the conduits 1740 to complete fluidic connectivity within the lattice.

Figure 18:
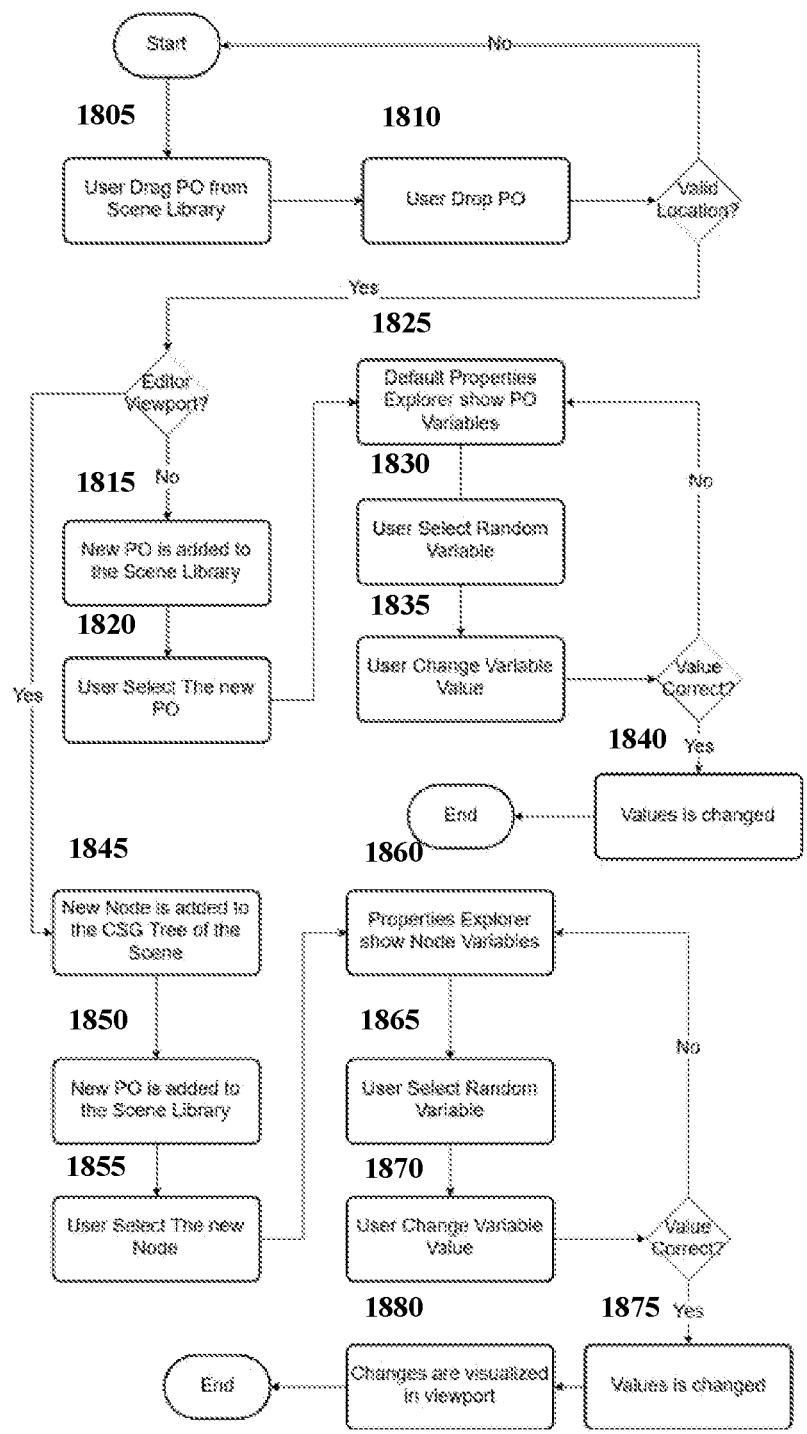
FIG. 18 shows a non-limiting example of a flow chart; in this case, a flow chart illustrating a process for a user to interact with an application to create and edit a new procedural object.

Also, referring to FIG. 18, in a particular embodiment, a process is provided for a user to interact with an application to create and edit a new procedural object. In this embodiment, a user starts the process by dragging a PO from the scene library 1805. The user then drops the PO into a location 1810. If the location is not valid, the user must start again.

Continuing to refer to FIG. 18, if the location is valid, and the user has dropped the PO into the editor viewport, the new PO is added to the scene library 1815. Subsequently, the user may select the new PO 1820 and the default properties explorer shows the PO's variables 1825. The user may select a random variable 1830 and optionally change the variable value 1835. If the value is acceptable, the value is changed 1840.

Continuing to refer to FIG. 18, if the location is valid, and the user has not dropped the PO into the editor viewport, a new node is added to the CSG tree of the scene 1845 and the new PO is added to the scene library 1850. The user may then select the new node 1855 and the properties explorer shows the node variables 1860. The user may select a random variable 1865 and optionally change the variable value 1870. If the value is acceptable, the value is changed 1875 and the changes are visualized in the viewport 1880.

3D Printing Device

In some examples, the 3D printing devices described herein comprise a static optical assembly. In further examples, the static optical assembly comprises a light engine configured to project a luxbeam comprising a plurality of pixels along a Z axis; at least one collimation lens configured to collimate the luxbeam; a microlens array (MLA) configured to focus the collimated luxbeam into a final beam of smaller diameter, wherein each pixel of the luxbeam is subdivided into a plurality of sub-pixels to multiply resolution of the final beam; a microdiaphragm array (MDA) configured to reduce noise and cross-talk between lenses of the MLA; at least one projection lens; and a movable stage configured to translate one or more of the at least one projection lenses in a X-Y plane. In further examples, with regard to the static optical assembly, the distances along the Z axis between the light engine, the collimation lens, the MLA, the at least one projection lens, and the movable stage of the static optical assembly are substantially fixed or fixed.

Figure 23:
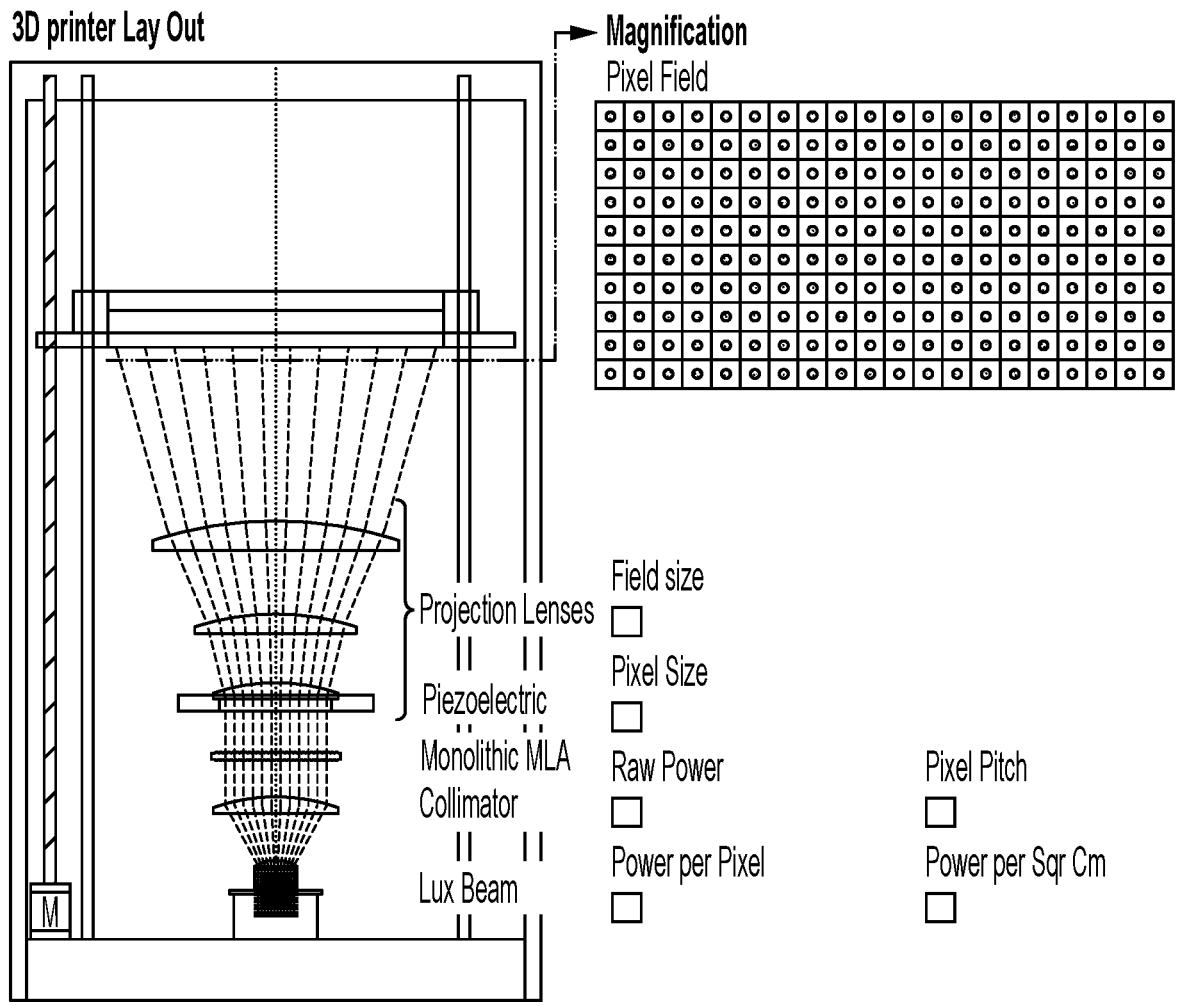
FIG. 23 shows a non-limiting example of a schematic structural diagram for a 3D printer device; in this case, a schematic structural diagram for a 3D printer device including a luxbeam generation element, a collimator lens, a monolithic MLA, and a series of projection lenses, one of which is articulated by a piezoelectric stage.

Referring to FIG. 23, in a particular embodiment, a stereolithographic 3D printing device comprises a frame structure supporting other components of the device and defining a Z axis. In this embodiment, the 3D printing device further comprises a static optical assembly. Starting at the bottom and progressing toward the top of the device along the Z axis, the static optical assembly comprises a luxbeam generator, a collimator, a monolithic MLA, a piezoelectric stage, and at least one projection lens. Further in this embodiment, a stepper motor drives a threaded rod, which adjusts the position of a printing vat comprising a printing stage on the Z axis. Other components include linear guides, a ball screw, control electronics, etc. Finally, in this embodiment, the static optical assembly is configured to project a pixel field onto the printing stage.

Slicer/Printer Synchronization Architecture

In some examples, the procedural modeling application communicates printing instructions to one or more 3D printing devices via a slicer/printer synchronization device, devices, or pipeline. Many hardware and/or software architectures are suitable for generating and managing a queue of slice files that instruct, for example, a stereolithographic 3D printing apparatus. In some examples, the procedural modeling application described herein communicates printing instructions one 3D printing device. In other examples, the procedural modeling application described herein communicates printing instructions a plurality of 3D printing devices, in series or in parallel. In further examples, the plurality of 3D printing devices may comprise, for example, 2, 3, 4, 5, 6, 7, 8, 9, 10, 20, 30, 40, 50, 60, 70 80, 90, 100, or more 3D printing devices, including increments therein.

Figure 22:
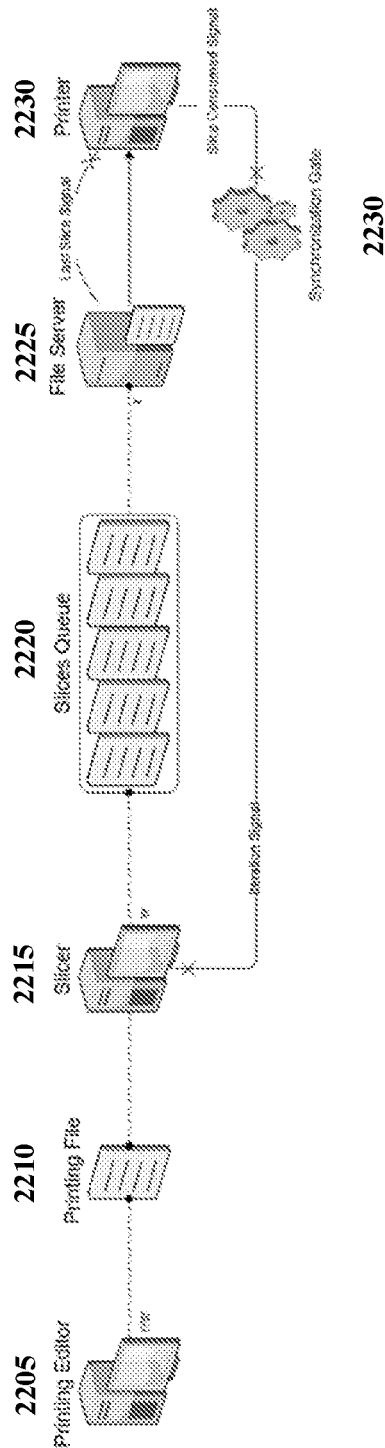
FIG. 22 shows a non-limiting example of an architecture diagram; in this case, an architecture diagram for a slicer and printer synchronization module.

Referring to FIG. 22, in a particular embodiment, a slicer/printer synchronization architecture comprises the printing editor 2205 of the presentation module of the procedural modeling application. In this embodiment, the printing editor 2205 generates and maintains a printing file 2210, which is transmitted to a slicer 2215. The slicer 2215 generates a slices queue 2220, which is transmitted to a file server 2225 for coordination with a 3D printer 2230 via a "last slice signal." Further, in this embodiment, the printer 2230 generates a "slice continued signal" sent through a synchronization gate 2230, which generates an "iteration signal" to form a feedback loop to the slicer 2215. In various examples, the slicer 2215 and/or the file server 2225 may be separate devices, may be combined with each other, and/or may be integrated with the 3D printer 2230.

Semi-Continuous Printing: Brick-Printing Process

In some examples, the 3D printing devices described herein comprise control circuitry configured to control at least a light engine, a movable stage, and a printing stage to achieve stereolithographic 3D printing. In further examples, the control circuitry is configured to control the printing stage to move at a predefined constant velocity on the Z axis. In further examples, the control circuitry is configured to control the movable stage to translate the one or more of the at least one projection lenses in the X-Y plane.

In various examples, the 3D printing devices described herein comprise control circuitry configured to control at least a light engine, a movable stage, and a printing stage to achieve stereolithographic 3D printing in a semi-continuous, substantially continuous, or continuous pattern. In particular examples, the 3D printing devices described herein are configured to execute a semi-continuous printing process. In further examples, the semi-continuous printing process comprises a brick-printing process.

In some examples, the control circuitry is configured to control the movable stage to translate one or more of the at least one projection lenses in the X-Y plane to scan the luxbeam in a predefined pattern. Many patterns are suitable for scanning the luxbeam, including, by way of non-limiting examples, row-by-row pattern, a column-by-column pattern, a cross-hatch pattern, and a pattern dictated by the geometry of the 3D object/scene to be printed. In some examples, the predefined pattern comprises a continuous space filling curve. In further examples, the predefined pattern comprises a Sierpinski Curve. In some, the predefined pattern is a substantially spiral pattern or a spiral pattern.

The printing process, in some examples, is based on a number of technical points. One point, in such examples, is the movement of the piezoelectric stage in the X-Y plane for the scanning of the light beam under the printing vat. Another point, in such examples, is the frames per second (fps) of the projected image. Yet another point, in such examples, is the movement of the printing stage at a predefined constant velocity along the Z axis.

Figure 24:
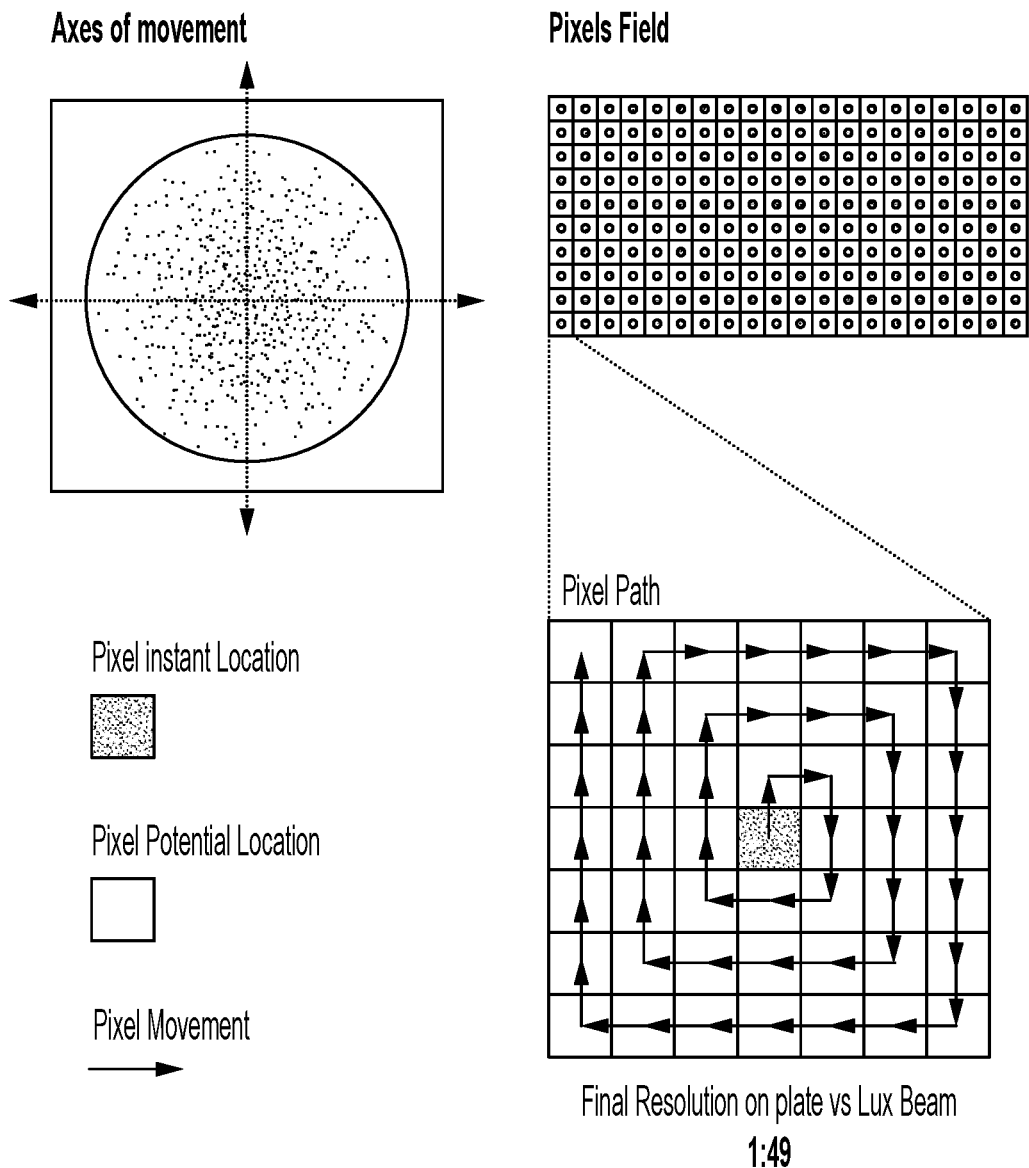
FIG. 24 shows a non-limiting example of a diagram showing piezoelectric stage movement of a projection lens and its effect on luxbeam scanning path; in this case, a scanning path demonstrating a semi-continuous brick printing process with a spiral pattern.

In particular examples, the process consists of the scanning of the light beam in a spiralized manner, as shown in FIG. 24. In further particular examples, the exposure time of every frame is defined by the quantity of sub-pixels involved in the printing area. By way of non-limiting example, if the quantity of sub-pixels is 9, the first frame is going to be exposed at the resin every frame must be exposed ⅑ time, the second ⅖, and so on until it is completed the last frame. In such examples, this process it is repeated with every pixel that is illuminated. In some examples, the scanning of the illumination pattern is delivered by the piezoelectric stage moving in X-Y plane, by way of non-limiting examples, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more μm to each side. In this example, with the described scanning is possible to "write" over the resin with very high resolution with the advantage of a continuous printing approach and in a static set-up. In some examples, the printing vat has a bottom material which is semi-permeable and/or substantially permeable to oxygen. In such examples, the permeability of the printing vat to oxygen allows the inhibition of the polymeric reaction. FIG. 24 shows the piezoelectric movement in a spiralized path.

Figure 25A:
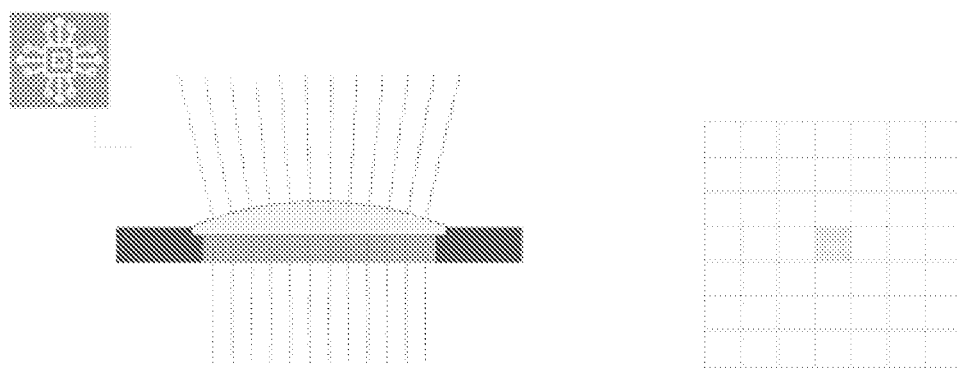
FIGS. 25A-25C show non-limiting example diagrams showing piezoelectric stage movement of a projection lens and its effect on luxbeam; in this case, a X-Y plane pixel displacement of a luxbeam within a pixel field.
Figure 25B:
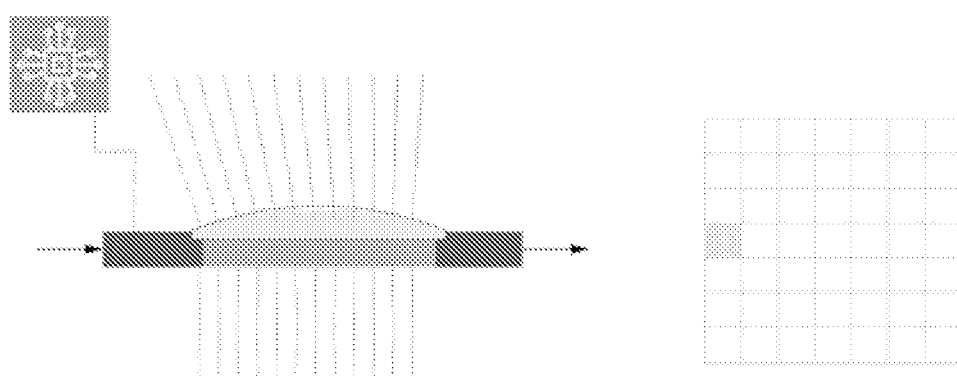
Figure 25C:
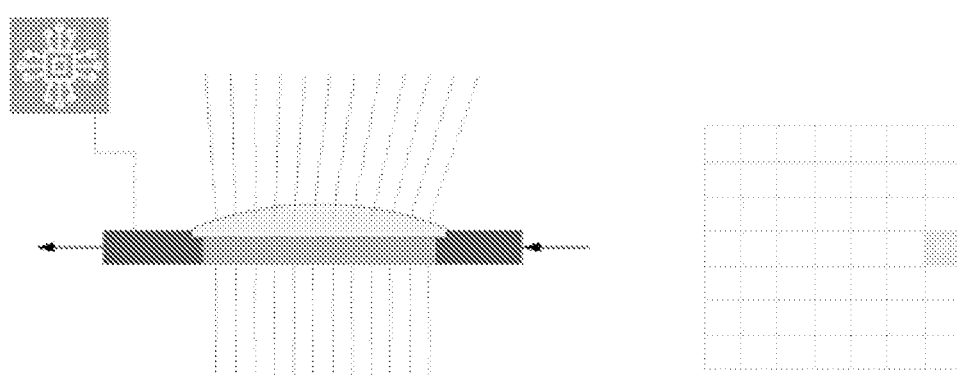
Figure 26:
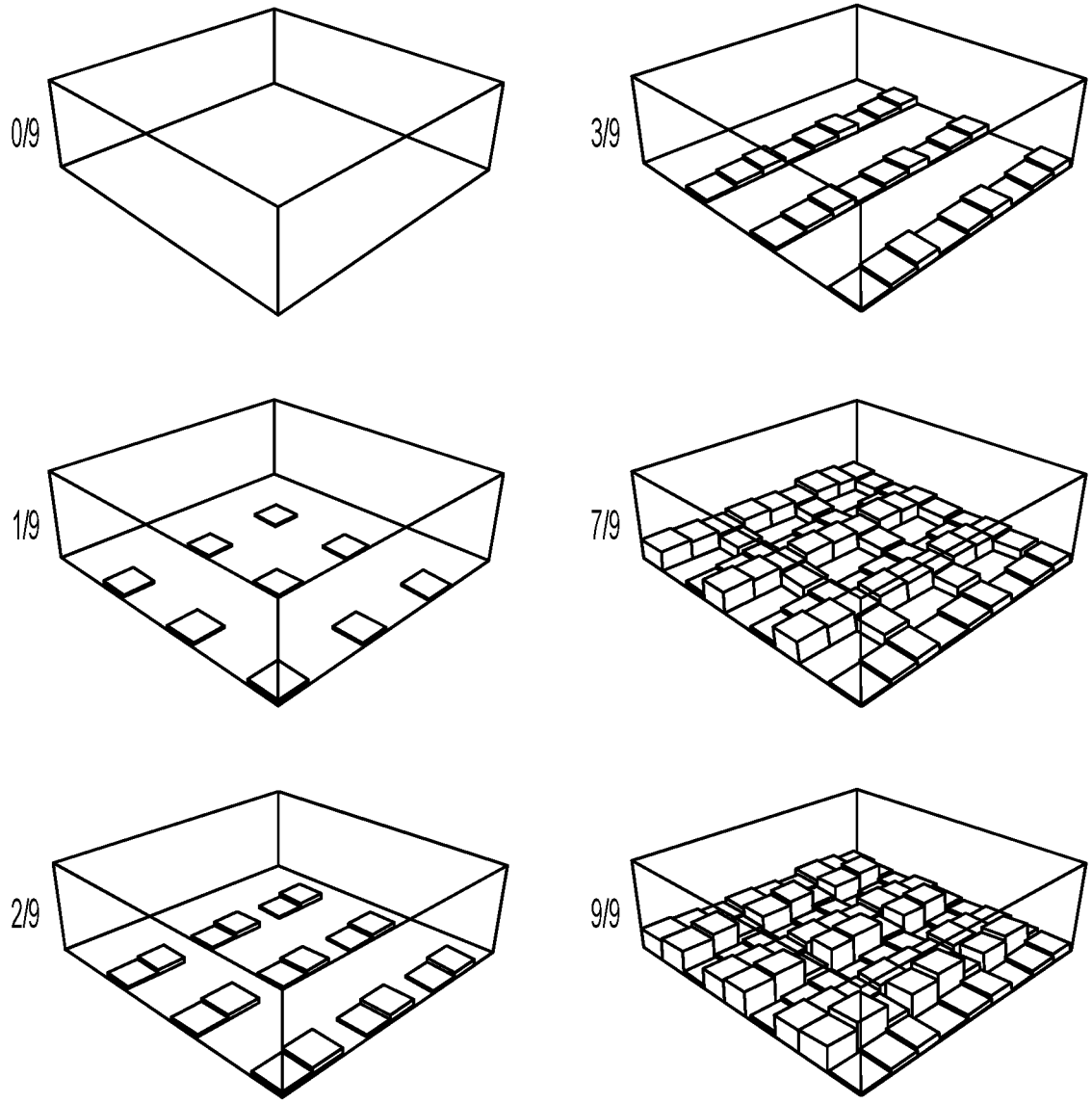
FIG. 26 shows a non-limiting example of a diagram showing a brick printing process; in this case, an object being printed by a semi-continuous brick printing process.

FIG. 25A shows neutral positioning of the piezoelectric stage in the X-Y plane with no pixel displacement due to light scanning. FIG. 25B shows rightward positioning of the piezoelectric stage in the X-Y plane generating a leftward pixel displacement due to light scanning. FIG. 25C shows leftward positioning of the piezoelectric stage in the X-Y plane generating a rightward pixel displacement due to light scanning. FIG. 26 shows a series of step during an example brick-printing process.

Example 3D Printing Device Embodiment

Figure 27:
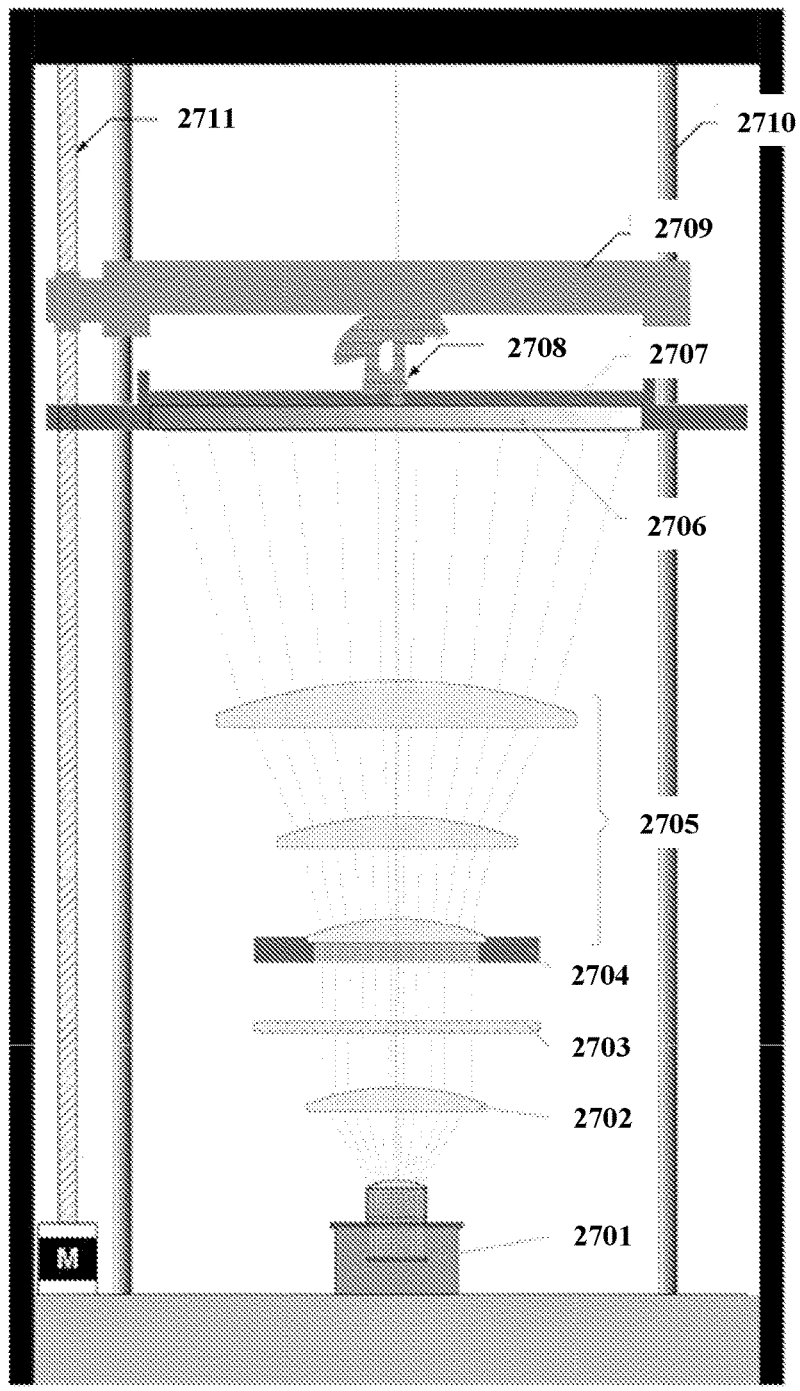
FIG. 27 shows a non-limiting example of a schematic structural diagram for a 3D printer device; in this case, a schematic structural diagram for a 3D printer device including a light engine, a collimator, a monolithic MLA, a piezoelectric element, a series of projection lenses, a vat window, a volume of photocurable (e.g., light-curable) resin, and a printing bed, as well as guides and a threaded rod, capable of generated a printing result.

Referring to FIG. 27, in a particular embodiment, light coming from the light engine 2701 is projected to the collimator 2702. After trespassing the collimator, the light reaches the monolithic MLA 2703. The monolithic MLA 2703 focuses the collimated beam, leading to a final beam of smaller diameter. This is a key pillar, in the instant embodiment, for the resolution enhancement of the static optical set-up described herein. The area of one pixel, can now be subdivided in, for example, 9, 25, or 49 sub-pixels, even up to 7498 sub-pixels, and any increment between 4 to 7498, depending on the desired printing resolution. Once light beams are focused by the MLA 2703, the light scanning is performed by the movement in the X-Y plane of a lens by the piezoelectric stage 2704. The piezoelectric stage 2704 enables the scanning of the light beam across a larger area. All the sub-pixels are magnified in diameter and projected via a series of three projection lenses 2705 on the vat window 2706 within the scanned area. This conformation and magnification is produced by the projection lenses 2705 that are located after the MLA 2703 in the light path. In this example embodiment, it is estimated that the final printing area is about 4× the initial area of 90 mm×85 mm. The printing vat contains a photocurable resin 2707. A printing result, such as a 3D object, is generated, layer-by-layer, on a printing bed 2709 as the photocurable resin 2707 is activated by the UV light of the light engine and the printing bed 2709 is advanced upward on guides 2710 by means of a threaded rod 2711 driven by a stepper motor.

Light Engine

In some examples, the 3D printing devices described herein comprise a light engine. In some examples, the light engine is a UV light source based in Digital Micromirror Devices (DMD) technology. In other examples, the light engine is a UV light source based in Liquid Crystal on Silico (LCoS) technology. In some examples, the light engine comprises a UV projector and/or a deep UV projector. In some examples, the light engine has an operating wavelength of about 350, 355, 360, 365, 370, 375, 380, 385, 390, 395, 400, 405, 410, 415, 420, 425, 430, 435, 440, 445, or 450 nm, including increments therein. In some examples, the light engine has an operating wavelength selected to initiate polymerization of a photocurable resin in the printing vat.

Figure 28:
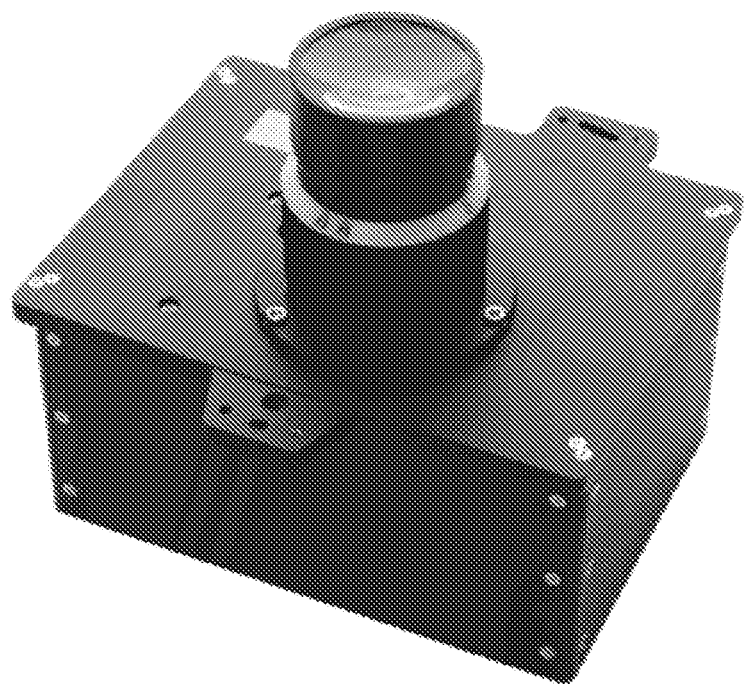
FIG. 28 shows a non-limiting example of a light engine for a 3D printing device.

A first example light engine approach described herein is based on DMD technology. In some examples, this approach utilizes an industrial UV projector (luxbeam) which works at an operating wavelength of 405 nm or 380 nm. The light engine illuminates the optical path to the vat containing the photosensitive resin. In further examples of this approach, the spatial modulation of the light is performed by a DMD which consists of an electromechanical device based on an array of aluminum-based micrometer-sized mirrors. The light is projected by UV LEDs on the tiny mirrors and reflected by the activated mirrors. Each mirror has two states: "on" and "off." When they are on, they can reflect the incident light. Each tiny mirror represents one pixel. In some examples of this approach, the pixel pitch of the DMD is 5.4 μm. In some examples, the light engine has a working distance of 177.8 millimeters with a correspondent pixel-pitch, for example, 35 μm and an area of 90×50 mm². In one embodiment, the luxbeam has a resolution of 2560×1600 pixels and an output of 7 W. The irradiance of the luxbeam, in some examples at the working distance is 150 mW/cm². FIG. 28 shows a non-limiting example of a suitable luxbeam.

Figure 29:
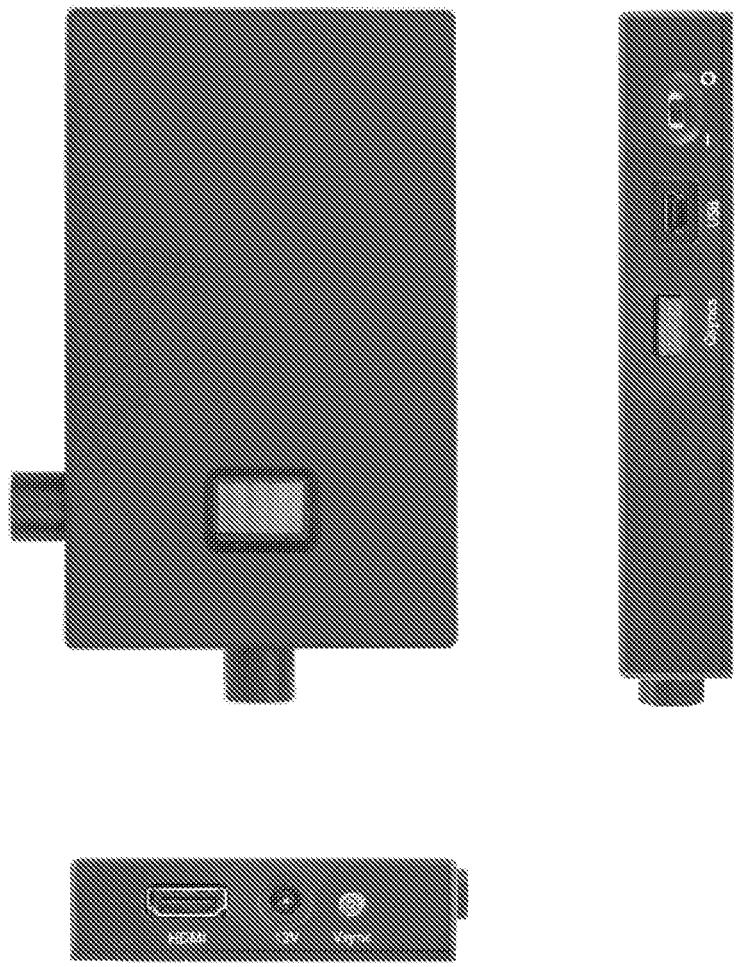
FIG. 29 shows a non-limiting example of an amplitude modulation element for a 3D printing device.

A second example light engine approach described herein is based on LCoS technology. In some examples, the LCoS is responsible of the spatial light modulation (amplitude-based). In further examples, the LCoS comprises an LCD panel at the top and a mirror at the backplane. The LCD enables the pixels where the incident light can hit the back mirror and is reflected towards the optical pathway until the vat. In an example, the pixel pitch of the LCoS may be 3.5 μm and has may have a resolution of 4K×2K (4096×2400) pixels. FIG. 29 shows an example of a suitable LCoS.

In some examples, 3D printing devices described herein comprise a first light engine configured to project a first operating wavelength and a second light engine configured to project a second operating wavelength. In some examples, the second light engine operates in parallel to the first light engine and the second operating wavelength is selected to inhibit polymerization of a photocurable resin in the printing vat. In some examples, the second light engine projects an image complementary and opposite to the image projected by the first light engine, to increase fidelity and accuracy of the printed object.

Collimator

In some examples, the 3D printing devices described herein comprise a collimator. In some examples, the collimator comprises one or more collimation lenses. The collimator is an optical lens or lenses which converts an incoming divergent beam into a parallel beam. The luxbeam has a non-collimated light beam. Light beam collimation is necessary to ensure a homogeneous distribution of the light irradiance. Many optical arrangements of collimation lenses are suitable. In some examples, the collimator comprises one collimation lens. In other examples, the collimator comprises a plurality of collimation lenses. In some examples, the plurality of collimation lenses comprises, for example, 2, 3, 4, 5, 6, 7, 8, 9, 10, or more collimation lenses arranged into a collimation lens assembly or system.

Microlens Array (MLA)

Figure 30A:
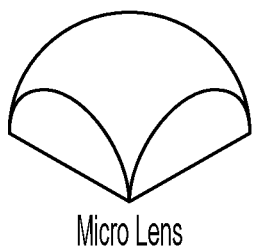
FIG. 30A shows a non-limiting example of a microlens; in this case, a single biconvex microlens.

In some examples, the 3D printing devices described herein comprise a MLA. In some examples, the MLA is an optical device comprising a squared-package array of micrometer-sized lenses (see, e.g., FIG. 30A). The MLA may be positioned in the light engine, before the light engine, or after the light engine. Many types of microlenses are suitable for the MLA and dictate the nature of the array. By way of non-limiting examples, the MLA comprises a biconvex array, a biconcave array, a monoconvex array, a monoconcave array, or a combination thereof. In a particular embodiment, the MLA comprises a monolithic biconvex array.

Figure 30B:
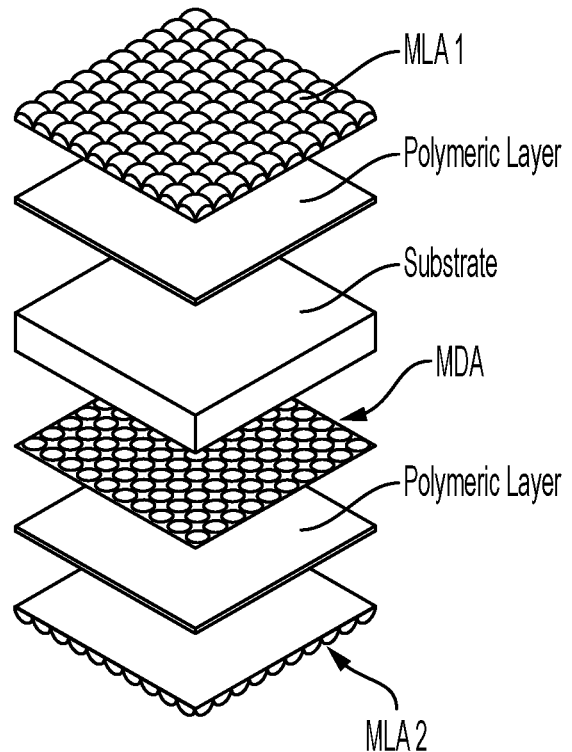
FIG. 30B shows a non-limiting example of structural diagram a MLA; in this case, a MLA comprising a planar substrate and an array of microlenses applied to each largest facing planes of the substrate.

Referring to FIG. 30B, in a particular embodiment, the MLA comprises a planar substrate with a first array of microlenses MLA 1 affixed to one side and a second array of microlenses MLA 2 affixed to the facing side. In this embodiment, on either side of the substrate a polymeric layer is also positioned between the substrate and each of the arrays of microlenses. Also, in this particular embodiment, a MDA is positioned between the substrate and one of the arrays of microlenses (e.g., MLA 2).

Many materials are suitable for the substrate including, by way of non-limiting examples, borosilicate, etched glass, or a combination thereof. Similarly, many materials are suitable for the microlenses including, by way of non-limiting examples, polymer, glass (e.g., BOROFLOAT® floated borosilicate glass or other highly transparent glass capable of withstanding thermal stress), or a combination thereof. In an particular embodiment, the main substrate is made of borosilicate and the microlenses are made of polymeric material.

Figure 30C:
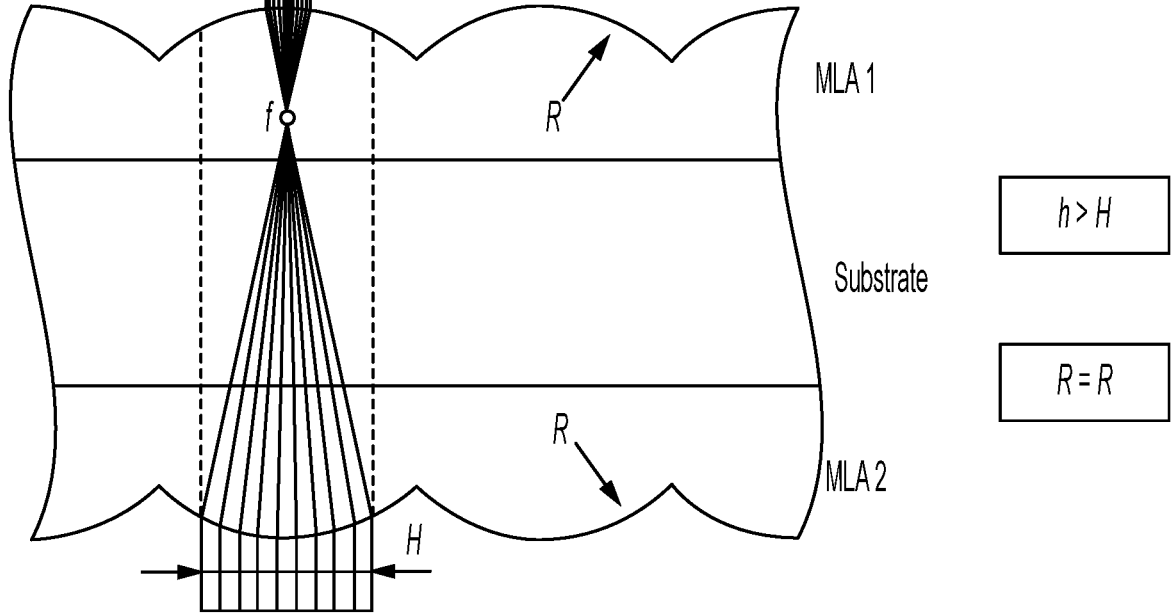
FIG. 30C shows a non-limiting example of an optical diagram of a MLA; in this case, an optical diagram including a light path through a first array of microlenses, a substrate, and a second array of microlenses.

Referring to FIG. 30C, in a particular embodiment, the path of each light beam through the facing lenses of the MLA focuses each pixel of the luxbeam.

In various examples, the MLA subdivides each pixel of the luxbeam into between 4 and 7498 sub-pixels. For example, in various examples, the MLA subdivides each pixel of the luxbeam into about 4, 8, 32, 64, 128, 256, 512, 1024, 2048, 4098 or more sub-pixels, including increments therein.

In a particular example embodiment, the MLA comprises a monolithic biconvex array of microlenses, each with a 30 μm pitch. In this particular embodiment, the dimensions of the MLA are: L: 139.12 mm, W: 88.24 mm, and H: 1.1 mm. Further, in this embodiment, the radius of curvature (ROC) is estimated to be 130 μm and the sagittal height is 1.5 μm. Finally, in this example, the MLA subdivides each pixel of the luxbeam into 9, 25, or 49 sub-pixels.

Microdiaphragm Array (MDA)

In some examples, the 3D printing devices described herein comprise one or more MDAs. In further examples, the one or more MDAs is configured to reduce noise and cross-talk between light beams passing through the lenses of the MLA. In such examples, the microdiaphragms of the one or more MDAs are numbered and aligned to correspond with the microlenses of the MLA. In some examples, each microdiaphragm of one or more MDAs has a aperture size of about 5, 10, 15, 20, 25, 30 or more μm, including increments therein. In other examples, each microdiaphragm of the one of more MDAs has an aperture size of less than or equal to about 30, 35, 30, 15, 10, 5 or less μm, including increments therein. Reducing aperture size of a microdiaphragm of the one or more MDAs may increase contrast and provide for higher resolution printing. However, reducing aperture size of a microdiaphragm of the one or more MDAs may in turn reduce an amount of energy provided to the resin for polymerization. As such, in some examples, each microdiaphragm of one or more MDAs has an aperture size of from about 5 to 10, 5 to 15, 5 to 20, 5 to 25 5 to 30, 10 to 15, 10 to 20, 10 to 25, 10 to 30, 15 to 20, 15 to 25, 15 to 30, 20 to 25, 20 to 30, or 25 to 30 μm. In an example, each microdiaphragm of the one or more MDAs has an aperture size from about 10 to 15 μm.

In some examples, the 3D printing devices described herein comprise one MDA. In some examples, the 3D printing devices described herein comprise a plurality of MDAs. The 3D printing devices described herein suitably comprise 2, 3, 4 or more MDAs. Many positions within the static optical assembly are suitable for a MDA. By way of non-limiting examples, a MDA may be positioned within the MLA and/or elsewhere within the assembly. In some examples, a MDA may be positioned between the planar substrate of the MLA and one or both of the pluralities of microlenses of the MLA. In some examples, the MDA and MLA may be disposed adjacent to one another. In some examples, the MDA and MLA may be disposed adjacent to one another and be disposed adjacent to the LCoS. In another example, the MDA and MLA may be disposed in the luxbeam path at a location away from the LCoS. In another example, the 3D printing device includes at least one MDA, but does not include an MLA. In another example, the 3D printing device includes at least one MDA and a crystal configured to focus the collimated luxbeam. The crystal may be a glass substrate with large operating temperature range and high transmissivity at the wavelength used, such as, for example BOROFLOAT® 33 borosilicate glass.

Figure 54:
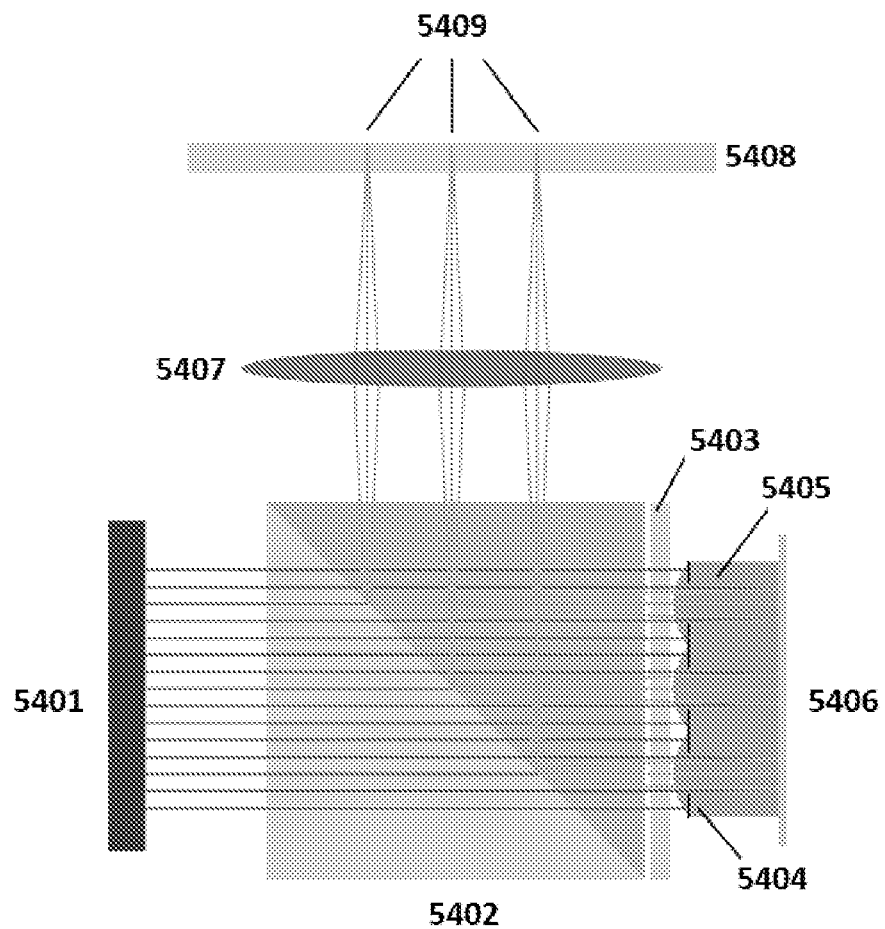
FIG. 54 shows an example 3D printer optics configuration with a microdiaphragm array and microlens array.

FIG. 54 shows an example 3D printer optics configuration with a MDA and MLA. The 3D printer optics may include a light engine 5401 configured to generate one or more light beams (e.g., UV light beam). The light beam generated by the light engine 5401 may be directed to a polarized beam splitter (PBS) 5402. The PBS 5402 may direct the light to a waveplate (e.g., quarter waveplate) 5403. The optics may further include a MDA 5404 and MLA 5406 disposed between the waveplate 5403 and LCoS 5406. In an example, the MLA 5405 may be disposed between the MDA 5404 and the LCoS 5406. The light beam may pass through the waveplate 5403, MDA 5404, and MLA 5405 to reflect off a back surface of the LCoS 5406 and back through the MLA 5405, MDA 5404, and waveplate 5403 as multiple discrete beams of light. Upon contacting the PBS 5402, the light beams may be reflected at an angle of incidence of at least about 45, 60, 90, 135 degrees. In an example, the light is reflected by the PBS 5402 at an angle of about 90 degrees. The reflected light may pass through one or more projection lenses 5407 to generate microspots 5409 on a side of the printing vat window 5408. The microspots 5409 may permit polymerization of resin in contact with or disposed adjacent to the printing vat window 5408.

Movable Stage

In some examples, the 3D printing devices described herein comprise a movable stage. In further examples, the movable stage has a principle of operation based on the piezoelectric effect, e.g., a piezoelectric movable stage. In some examples, the movable stage is configured to translate one or more projection lenses in the X-Y plane with nanometer resolution in order to scan the luxbeam across a printing area.

Many ranges of travel are suitable for the movable stages described herein. By way of non-limiting examples, suitable ranges of travel include about 10, 20, 30, 40, 50, 60, 70, 80, 90, 100, 200, 300, 400, 500, 600, 700, 800, 900, 1000 μm or more, including increments therein, in the X direction. By way of non-limiting examples, suitable ranges of travel include about 10, 20, 30, 40, 50, 60, 70, 80, 90, 100, 200, 300, 400, 500, 600, 700, 800, 900, 1000 μm or more, including increments therein, in the Y direction. In some examples, the movable stage is a piezoelectric stage and has a travel range of 100 μm in X and 100 μm in Y. In further particular examples, the working frequency is in the kHz range.

Many increments of travel are suitable for the movable stages described herein. By way of non-limiting examples, suitable increments of travel include about 10, 20, 30, 40, 50, 60, 70, 80, 90, 100, 200, 300, 400, 500, 600, 700, 800, 900, 1000 nm or more, including increments therein, in the X direction. By way of further non-limiting examples, suitable increments of travel include about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 μm or more, including increments therein, in the X direction. By way of non-limiting examples, suitable increments of travel include about 10, 20, 30, 40, 50, 60, 70, 80, 90, 100, 200, 300, 400, 500, 600, 700, 800, 900, 1000 nm or more, including increments therein, in the Y direction. By way of further non-limiting examples, suitable increments of travel include about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 μm or more, including increments therein, in the Y direction.

In some examples, the movable stage has a travel (translation) resolution in the X, Y, or both X and Y directions of less than or equal to a length of the sub-pixels that each pixel of the light engine is divided into.

Figure 31:
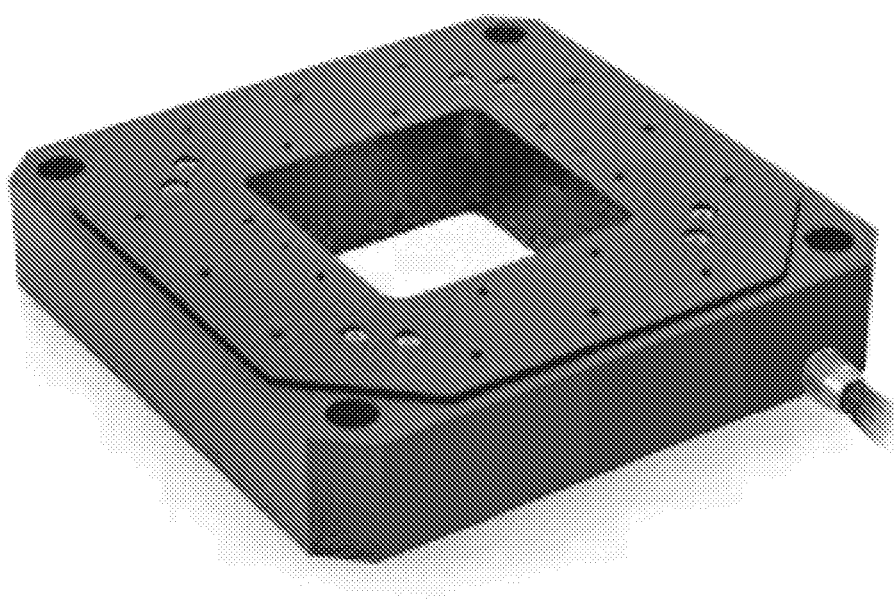
FIG. 31 shows a non-limiting example of a piezoelectric stage for a 3D printing device.

FIG. 31 shows a non-limiting example of a suitable piezoelectric stage.

Projection Lenses

In some examples, the 3D printing devices described herein comprise one or more projection lenses. In further examples, the 3D printing devices described herein comprise one projection lens. In some examples, the 3D printing devices described herein comprise a plurality of projection lenses, by way of non-limiting examples, 2, 3, 4, 5, 6, 7, 8, 9, 10 or more projection lenses. In such examples, the projection lenses may be arranged into a projection lens assembly or system.

In some examples, the one or more projection lenses is concentric set-up of lenses which has the main purpose of configuring the final conformation of the light beam to ensure a good distribution of energy and beam spatial quality at the printing vat. The projection lenses is composed by aspheric lenses designed to tailor the quality demand of particular printing resolutions. In some examples, the one or more projection lenses expands the final printing area. In some examples, the one or more projection lenses expands the final printing area to about 2×, 3×, 4×, 5×, 6×, 7×, 8×, 9×, 10×, 20×, 30×, 40×, 50×, 60×, 70×, 80×, 90×, 100× or more the light generating area of the light engine, including increments therein. In some examples, the one or more projection lenses reduces the final printing area.

Printing Vat

In some examples, the 3D printing devices described herein comprise a printing vat. In some examples, the vat is a container of photosensitive resin utilized in a stereolithographic 3D printing process. In some examples, the material at the bottom of the vat is permeable or semi-permeable to oxygen to enable termination of photopolymerization. In some examples, the printing vat is configured for sterile 3D printing and the light-curable resin is maintained in a sterile state. The printing vat may include one or more optically transparent surfaces (e.g., vat window). The one or more optically transparent surfaces may permit transmission of the luxbeam from the light engine to through a portion of the printing vat to polymerize the light-curable resin. Non-limiting examples of optically transparent surfaces (e.g., vat windows) include glass or optically clear polymers such as, for example, cyclic olefin copolymers.

Second Wave Generator

In some examples, the 3D printing device may include a second wave generator. The second wave generator may be disposed adjacent to an end of optically transparent surface of the printing vat (e.g., disposed adjacent to an end of the vat glass). The second wave generator may project a beam of light into an end of the optically transparent surface of the vat (e.g., vat window) such that the beam of light undergoes total internal reflection within and along the long dimension of the optically transparent surface. The total internal reflection may generate an evanescent field that transmits external to the optically transparent surface and through the resin disposed adjacent to the optically transparent surface. The evanescent field may reduce, substantially prevent, or prevent polymerization of light-curable resin disposed adjacent to or contacting the surface of the printing vat to reduce or prevent adhesion of the polymerized resin to the surface of the printing vat window. The evanescent field may reduce or prevent polymerization within about 10, 20, 30, 50, 75, 100, 125, 150, 200, or more nanometers from the surface of the printing vat window. In an example, the evanescent field reduces or prevents polymerization within about 100 nm from the optically transparent surface of the printing vat. The air incidence angle and critical refraction angle at which the wavelength of light is projected into the optically transparent surface (e.g., vat window) and internally reflects to permit total internal reflectance may be determined by Equations 1 and 2.

$$\theta_C = \sin^{-1}\left(\frac{n_R}{n_G}\right) \quad (1)$$

$$\theta_A = \sin^{-1}\left(\frac{n_G}{n_A}\sin\theta_C\right) \quad (2)$$

where $n_R$ is the index of refraction of the resin, $n_G$ is the index of refraction of the optically transparent surface (e.g., vat window), and $n_A$ is the index of refraction of air. The wavelength of the light beam may be any wavelength of light that reduces or inhibits polymerization. For example, the wavelength of the light beam may be a UV wavelength (e.g., from about 350 to about 450 nm) or may be red wavelengths (e.g., from about 600 to 650 nm). The wavelength of the light beam may be at least about 350, 355, 360, 365, 370, 375, 380, 385, 390, 395, 400, 405, 410, 415, 420, 425, 430, 435, 440, 445, or 450 nm, including increments therein. The wavelength of the light beam may be at least about 575, 580, 585, 590, 595, 600, 605, 610, 615, 620, 625, 630, 635, 640, 645, 650, 655, 660, 665, 670, 675 or more nm, including increments therein. In an example, the wavelength of the light beam may be from about 375 nm to 400 nm. In another example, the wavelength of the second light beam may be from about 600 nm to 650 nm. The wavelength of the light beam may be greater than or less than, but not equal to, the wavelength used to polymerize the resin.

Figure 55A:
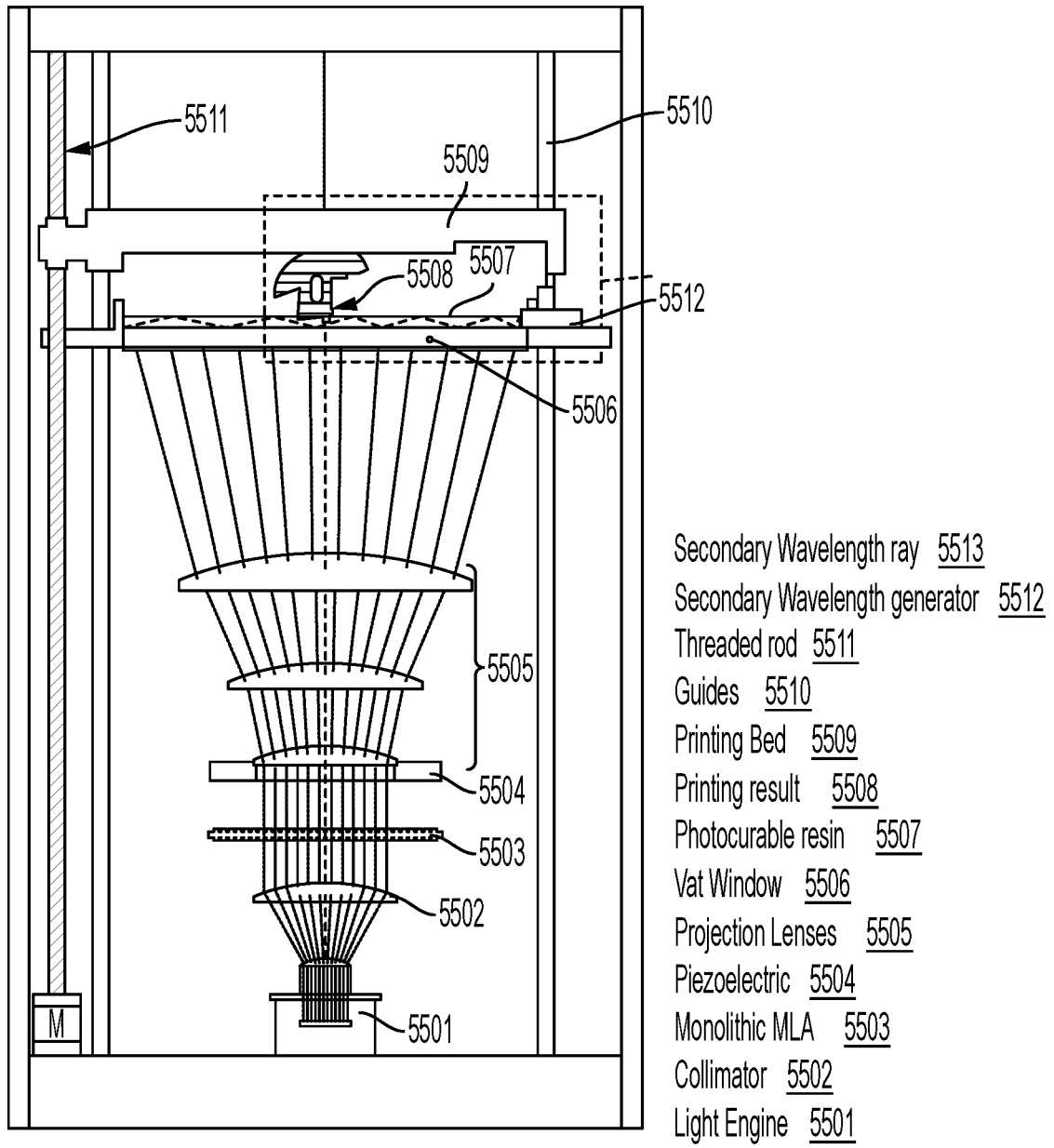
FIGS. 55A and 55B show example schematic of a 3D printer device including a secondary wavelength generator.
Figure 55B:
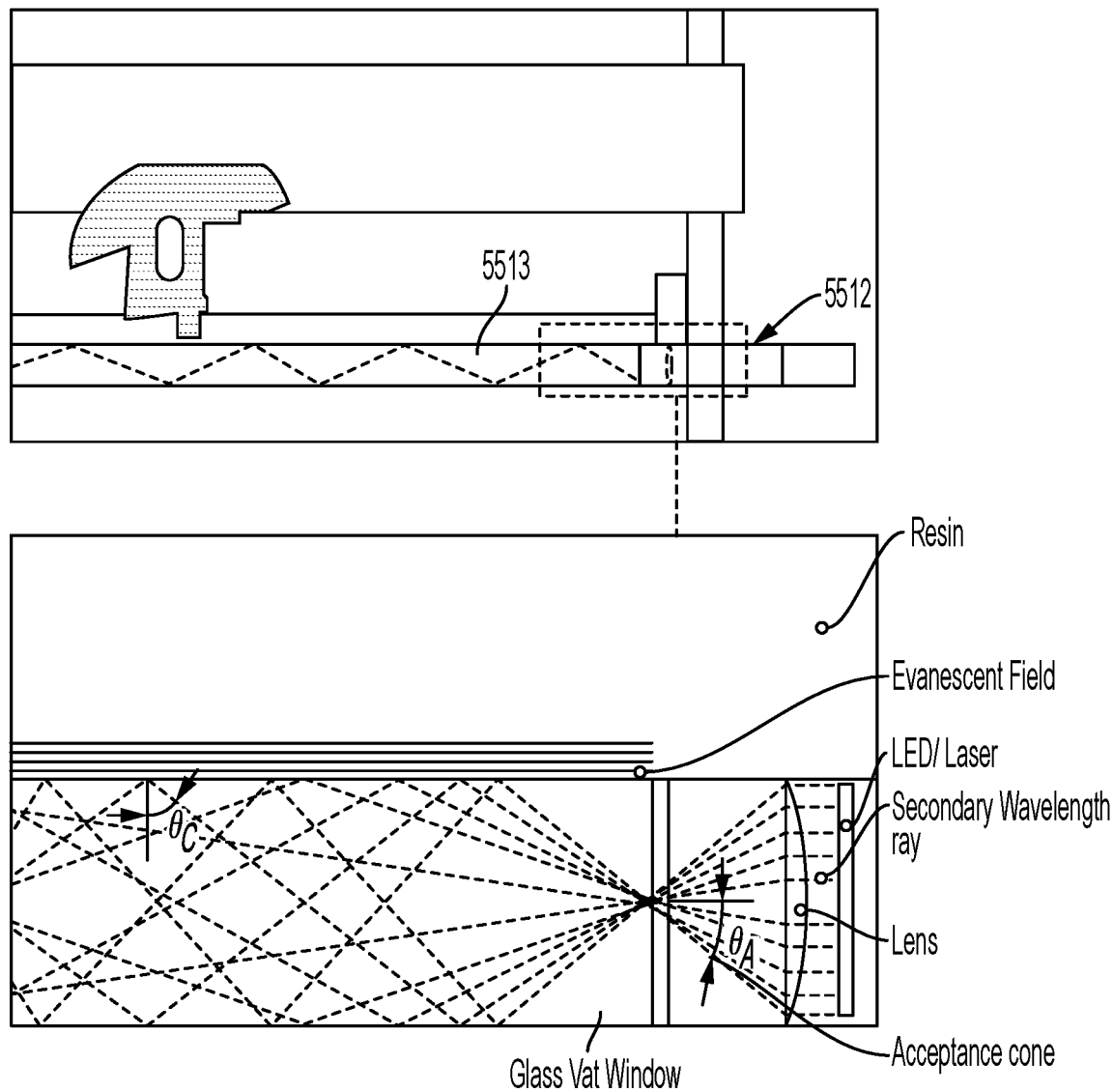

FIGS. 55A and 55B show example schematic of a 3D printer device including a secondary wavelength generator. Referring to FIG. 55A, light coming from the light engine 5501 is projected to the collimator 5502. After trespassing the collimator, the light reaches the MLA 5503. The MLA 5503 focuses the collimated beam, leading to one or more beams of smaller diameter. Once light beams are focused by the MLA 5503, the light scanning is performed by the movement in the X-Y plane of a lens by the piezoelectric stage 5504. The piezoelectric stage 5504 enables the scanning of the light beam across a larger area. All the sub-pixels are magnified in diameter and projected via a series of three projection lenses 5505 on the vat window 5506 within the scanned area. This conformation and magnification is produced by the projection lenses 5505 that are located after the MLA 5503 in the light path. The printing vat contains a photocurable resin 5507. A printing result 5508, such as a 3D object, is generated, layer-by-layer, on a printing bed 5509 as the photocurable resin 5507 is activated by the UV light of the light engine and the printing bed 5509 is advanced upward on guides 5510 by means of a threaded rod 5511 driven by a stepper motor. The 3D printing device includes a secondary wave generator 5512 configured to project a beam of light 5513 through a long dimension of the vat window 5506. FIG. 55B shows an expanded schematic of the secondary wave generator 5512 and vat window 5506 interface. The beam of light 5513 projected through a long dimension of the vat window 5506 undergoes total internal reflectance to generate an evanescent field that reduces or inhibits polymerization of the resin in contact with or adjacent to a surface of the vat window 5506. The light source for the beam of light 5513 may be a LED or a laser. The second wave generator may include one or more lenses configured to shape or direct the light to permit total internal reflectance of the light beam 5513.

Printing Vat Coating

In some examples, the 3D printing device may include one or more coatings disposed on the vat window or other surfaces of the printing vat to reduce, substantially prevent, or prevent adhesion of polymerized resin on the vat window. The coating may be any coating type that inhibits polymerization at the interface or otherwise includes anti-adhesive properties. In an example, the coating is a mesoporous coating. The mesoporous coating may include one or more base compounds, such as, but not limited to metal oxides, silicas, organosilicas, carbons, metal-organic framework, zeolites, or any combination thereof. The coating may be applied using sol-gel chemistry, physical deposition techniques, dip-coating, spin-coating, or any other coating process.

The coating may have any thickness useful for reducing or preventing adhesion of the polymerized resin. For example, the coating may have a thickness of at least about 5, 10, 25, 50, 75, 100, 125, 150, 175, 200, or more nm. The coating may have a thickness from about 5 to 10, 5 to 25, 5 to 50, 5 to 75, 5 to 100, 5 to 125, 5 to 150, 5 to 175, 5 to 200, 10 to 25, 10 to 50, 10 to 75, 10 to 100, 10 to 125, 10 to 150, 10 to 175, 10 to 200, 25 to 50, 25 to 75, 25 to 100, 25 to 125, 25 to 150, 25 to 175, 25 to 200, 50 to 75, 50 to 100, 50 to 125, 50 to 150, 50 to 175, 50 to 200, 75 to 100, 75 to 125, 75 to 150, 75 to 175, 75 to 200, 100 to 125, 100 to 150, 100 to 175, 100 to 200, 125 to 150, 125 to 175, 125 to 200, 150 to 175, 150 to 200, of 175 to 200 nm. In an example, the coating has a thickness from about 25 to 100 nm. The coating may have pores with diameters from about 2 to 50 nm. Interpore distance may vary from about 5 to 10, 5 to 15, or 5 to 20 nm. In an example, the interpore distance ranges from 5 to 20 nm. The coating may have a contact angle of at least about 10, 15, 20, 25, 30, 40, 50, or 60 degrees. In an example, the coating has a contact angle of at least about 25 degrees.

Figure 56A:
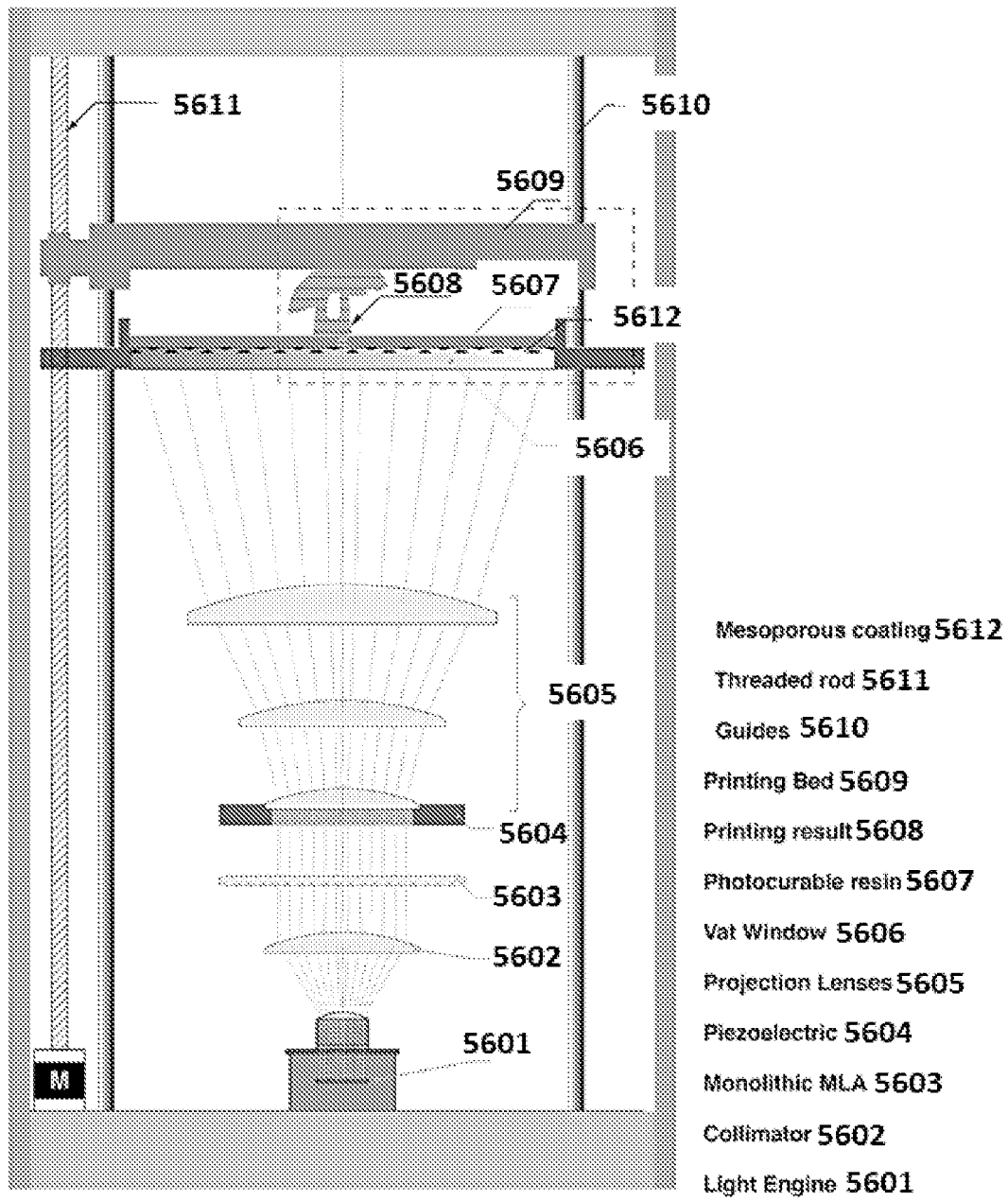
FIGS. 56A and 56B show an example schematic of a 3D printer device including a coating on the vat window.
Figure 56B:
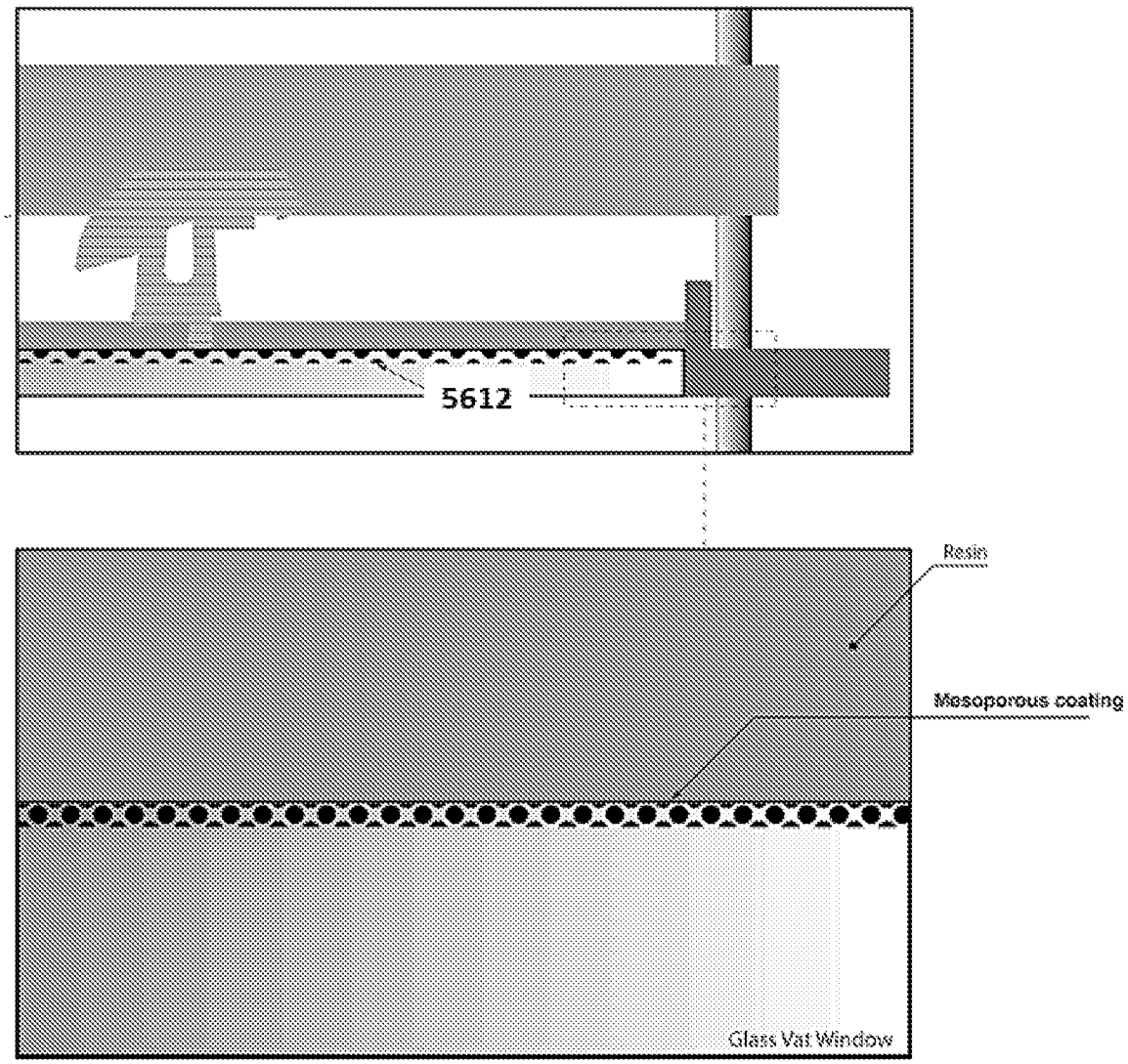

FIGS. 56A and 56B show example schematic of a 3D printer device including a coating on the vat window. Referring to FIG. 56A, light coming from the light engine 5601 is projected to the collimator 5602. After trespassing the collimator, the light reaches the MLA 5603. The MLA 5603 focuses the collimated beam, leading to one or more beams of smaller diameter. Once light beams are focused by the MLA 5603, the light scanning is performed by the movement in the X-Y plane of a lens by the piezoelectric stage 5604. The piezoelectric stage 5604 enables the scanning of the light beam across a larger area. All the sub-pixels are magnified in diameter and projected via a series of three projection lenses 5605 on the vat window 5606 within the scanned area. This conformation and magnification is produced by the projection lenses 5605 that are located after the MLA 5603 in the light path. The printing vat contains a photocurable resin 5607. A printing result 5608, such as a 3D object, is generated, layer-by-layer, on a printing bed 5609 as the photocurable resin 5607 is activated by the UV light of the light engine and the printing bed 5609 is advanced upward on guides 5610 by means of a threaded rod 5611 driven by a stepper motor. The 3D printing device includes a coating 5612 disposed on a surface of the vat window 5606. FIG. 56B shows an expanded schematic of the coating 5612 and vat window 5506 interface. The coating 5512 is disposed on the surface of the vat window 5506 contacting the resin. The coating may reduce or prevent the polymerized resin from adhering to the surface of the vat window 5606.

Printing Bed (Stage)

In some examples, the 3D printing devices described herein comprise a printing bed. In some examples, the light-curable resin is photopolymerized on the surface of the printing stage. The printing stage is articulated to move in the Z axis under the control of circuitry to achieve a printing process. For example, the printing stage may be assembled on guide rods and mounted to a threaded rod that is driven by a stepper motor. In some examples, the 3D printing devices described herein utilize a bottom-up printing approach and the printing stage moves accordingly in the Z axis. In some examples, the 3D printing devices described herein utilize a top-down printing approach and the printing stage moves accordingly in the Z axis.

Example 3D Objects/Scenes

The platforms, systems, and devices (collectively "printer system") provided herein are applicable to the printing of porous structures based in crystallographic geometry spatially distributed in a periodic manner. In an example, the printer system is employed to generate a such a structure. In some examples, the crystallographic geometry may comprise or be a crystal lattice based on a unit cell. The unit cell may comprise a shape. The shape of the unit cell may be any shape, such as the shapes described elsewhere herein. In an example, the shape of the unit cell may comprise a gyroid, a double gyroid, or a modified gyroid or modified double gyroids. For 3D printing purposes, in some cases, a gyroid may be a suitable geometry since it is self-supported, avoiding the addition of external support for the fabrication of a 3D object including said structure. In some examples, the porous structure comprises channels with a diameter that ranges from 150 μm to 600 μm and an intermembrane space (e.g., the material that separates two independent circuits) that ranges from 200 μm to 400 μm at its thinner point. In such examples, to achieve a sufficient level of detail, a voxel of 15 μm on each edge is needed to ensure a smooth termination at the 300 μm size level of structure. The smaller the voxel, the smoother the surface at the macroscale.

The printer system provided herein may also be applicable to the printing of bioreactors. In some examples, the printer system is employed to generate a bioreactor, such as a miniaturized bioreactor. In some examples, the bioreactor is composed of multiple minimodules. Each minimodule may have a shape, and the mini-modules may be arranged, i.e., printed, into a macrostructure. Provided herein are also examples of such bioreactors with various macrostructures and minimodules. The bioreactors provided herein comprise various macrostructures, various minimodules of different shapes, and various characteristics detailed elsewhere herein. Provided herein are also methods of manufacturing and using such bioreactors.

In some examples, the printer system herein may generate minimodules of a defined size, for example, such that one or both channels of the structure (e.g., the minimodule and/or minimodules joined into a macrostructure such as a bioreactor or layer of a bioreactor) accommodate flow of a set size of objects (e.g., flow of biological organisms and cells). In one embodiment, at least one of the channels of the structure is constructed to limit number of cells flowing through the channel at any one point, for example flow of a single cell, but not multiple cells flowing together. In some examples, the channel diameter is slightly larger than a single cell, for example the channel is about 5%, 10%, 15%, 20%, 25%, 30%, 35%, or 40% wider than the diameter of a single cell, including increments therein. In some examples, the cell is between about 0.5 μm and about 100 μm. In some examples, the cell is a prokaryotic cell and the single cell between about 0.5 μm and about 5 μm. In some examples, the cell is a microorganism, such as a bacteria, a yeast, a fungi and cell is between about 0.5 μm and about 30 μm, or between about 3 μm and about 30 μm. In some examples, the cell is a eukaryotic cell and the single cell is between about 10 μm and about 100 μm, or about between about 10 μm and about 30 μm.

In some examples, a minimodule may be printed to have a channel diameter of about 8 μm to 2000 μm. In some examples, a minimodule is printed to have an edge of 40 μm to 9797 μm. In examples herein, a minimodule is printed to have a volume of about 68417 to $9.4 \times 10^{11}$ cubic micrometers.

In some examples, the minimodules can have a regular cubic wrap structure having a length "L" of its edge. L can be related to the sweeping diameter. In some examples, L is equal to the two thirds of the sweeping diameter of a microchannel, times the square root of two, times the square root of three. The total surface and volume of the microchannel s corresponding to the liquid component can be equal to the corresponding dimensions of gaseous component if the radius of both components is the same within a minimodules. In some examples, the radius of the components can be different. In some examples, when both radii are equal, the microchannel radius cannot be greater to 0.7 times the sweeping radius. The shortest distance between two minimodules of two different faces is equal to the sweeping radius times the square root of two, minus the addition of each component channel radius.

In some examples, the area of the first channel with a DG may be equivalent to the area of the second channel within a DG, and wherein the area of the matrix phase is the sum of the area of the first channel and the area of the second channel. The distance between the matrix phase separating the channels and the center of each channel is a constant.

In some examples, the printer system may print a series of minimodules in a macrostructure. In some examples, the minimodule is a modified double gyroid (DG) that is assembled into a macrostructure to create a 3D object such as a bioreactor. In some examples, minimodules may be arranged in layers within the macrostructure. An assembly of interconnected minimodules which are oriented identically is referred to as a "layer." The layer can be arranged, for example, in a rhomboid shape such that in some examples, if the same number of modules are connected in the selected directions, the resultant growth is not proportional and as such the growth of the layers is irregular with respect to one another. In some examples, the layer is arranged in a square shape or such that the resultant growth is proportional.

In some examples, an assembly of layers of minimodules ("first matrix") can be co-located with a second assembly of layer of minimodules ("second matrix") whereby the second matrix occupies the free spaces left by the first matrix and whereby the matrices occupying the same volume have no point of contact and maintain a constant minimum distance.

In some examples, the minimodules may be assembled into a hollow pyramid macrostructure. In some examples, a hollow pyramid macrostructure may make a hollow pyramid bioreactor provided elsewhere herein. A hollow pyramid may have a volume of hollow center and of increasing transverse section. In some examples, a hollow pyramid may have an increase in volume between layers (this is the number of minimodules that are added between one layer and the next in the flow direction) and are ordered by (i) an alternating sense of growth between its edges of the outer perimeter; and (ii) an increase of its internal perimeter (i.e., the perimeter of the internal hollow center). For example, if N is the number of modules in one of the edges of the external perimeter of the hollow pyramid, and n is the number of minimodules that make up one of the edges of the internal perimeter of the hollow pyramid, then if at one layer, N=(8;8) then n=(4;4). This logic is repeated alternately between the outer edges of the pyramid in each layer and in a clockwise sense (considering the direction of the flow). The result is a stepped pyramid where its steps form a faceted spiral. The internal perimeter also has a spiral growth, but with a lower frequency than the external perimeter, and the direction of growth for the internal perimeter is opposite to that of the external perimeter.

In some examples, provided herein are methods and systems (e.g., the 3D printing device, other systems, such as hardware, software, and any method, system, or material provided herein) for generating a lamella macrostructure. In some examples, a lamella macrostructure may be used as a lamella bioreactor. In some examples, the bioreactor employs a lamella macrostructure composed of a plurality of minimodules. The minimodules may be DGs or may comprise other shapes. A lamella macrostructure has a sheet of constant thickness and of increasing cross section comprised of minimodules. The constant thickness of the sheet allows even access of substances into the bioreactor, such as from a feeding circuit. The increase in volume between layers (this is the number of modules that are added between one layer and the next in the flow direction) may be determined by the bioreactor and may be ordered by an alternating sense of growth between the shortest edges of the sheets. In the lamella macrostructure, there may be one or more than one sheet, for example 2, 3, 4, 5, 6, 7, 8 or more than 8 sheets arranged in parallel. The space between each sheet can be utilized to place the feeding circuit, or a portion thereof which feeds the modules in the sheet.

In some examples, the methods and systems provided herein may be used to make a tree such as a chessboard macrostructure. The chessboard macrostructure may make a chessboard bioreactor. In some examples, the minimodules of any shape (e.g., a DG or any other minimodule shape provided elsewhere herein) may be assembled into a tree-chess macrostructure, which has at least one hollow column of constant cross-section that crosses longitudinally the layers of minimodules. In some examples, a tree-chess macrostructure has 1, 2, 3, 4, or more than 4 such columns. The columns can be used to provide an area to transport liquid media and other substances through channels that follow the longitudinal column.

In some examples, the systems and methods of 3D printing provided herein, such as the printer systems may provide the capacity for a continuous printable surface with a high resolution, such as to construct bioreactors with macrostructures comprising repeating minimodules. In some examples, the printing surface may be up to about 320 mm by 320 mm. In some examples, the printing surface is up to about 320 mm by 320 mm and each fully saturated cube of 1×1×1 mm of printing area holds up to about 14.616 minimodules (e.g., such as DGs or modified DGs). some examples, the printing volume is up to about 320 mm by 320 mm×1000 mm (X,Y,Z coordinates of the printing volume) and the printing volume holds up to about 1,496,704,035 minimodules or less. Even though in many examples, the methods, devices, and systems of 3D printing are used to make bioreactors, such 3D printing methods, devices and systems may be used to make any object, such as any 3D object. Likewise, even though, in many examples, the reaction vessels, such as bioreactors are made using the 3D printing systems and method described herein, such bioreactors can be made using other methodologies in other examples.

Provided herein are methods for constructing 3D objects using techniques such as 3D printing which may comprise using the methods and systems provided elsewhere herein. In some examples, the methods and/or systems provided herein may be used to construct 3D structures which may have various applications. In some cases, a 3D structure to be constructed or manufactured may comprise parts, components, sections or units, such as sub-units or modules, which in some cases, can be assembled to make the structure or object. As an example, a 3D object may be a reaction vessel or bioreactor. A bioreactor may be according to any bioreactor provided elsewhere herein. A bioreactor may comprise one or more minimodules. The minimodules of a bioreactor may be assembled to make a macrostructure. A macrostructure may be the macrostructure of a bioreactor provided herein.

In some examples, in the methods of the present disclosure, a space can be mathematically described by a continuous and/or ordered matrix. The matrix may comprise any number of dimensions, such as, 1, 2, 3, 4, 5, 6, 7, 8, or more. In an example, a matrix may be a 3D matrix. The space may be a 3D space. In some cases, the matrix may be continuous and ordered, such as a continuous and ordered three-dimensional (3D) matrix. The matrix may delimit the available spaces where elements may be placed to functionalize the space according to the requirements of the space they occupy. This method may be implemented using a computer. Provided herein is a computer system which may be used to perform the methods of the present disclosure. In some examples, the methods may comprise computer-implemented methods, such as software, code, or a set of instructions to perform the methods described herein. Such methods may be explained in further detail elsewhere herein.

In some cases, the minimodules can be assembled into structures (e.g., macrostructures) providing for targeted control of media and gas flow and distribution in the structure (e.g., bioreactor). In other examples, the same approach may be implemented to make a plurality of parts, units, components, modules, or minimodules to construct a structure other than a reactor or bioreactor. The 3D objects, structures or module made using the methods or systems provided herein may comprise various applications.

Figures 37A, 37B:
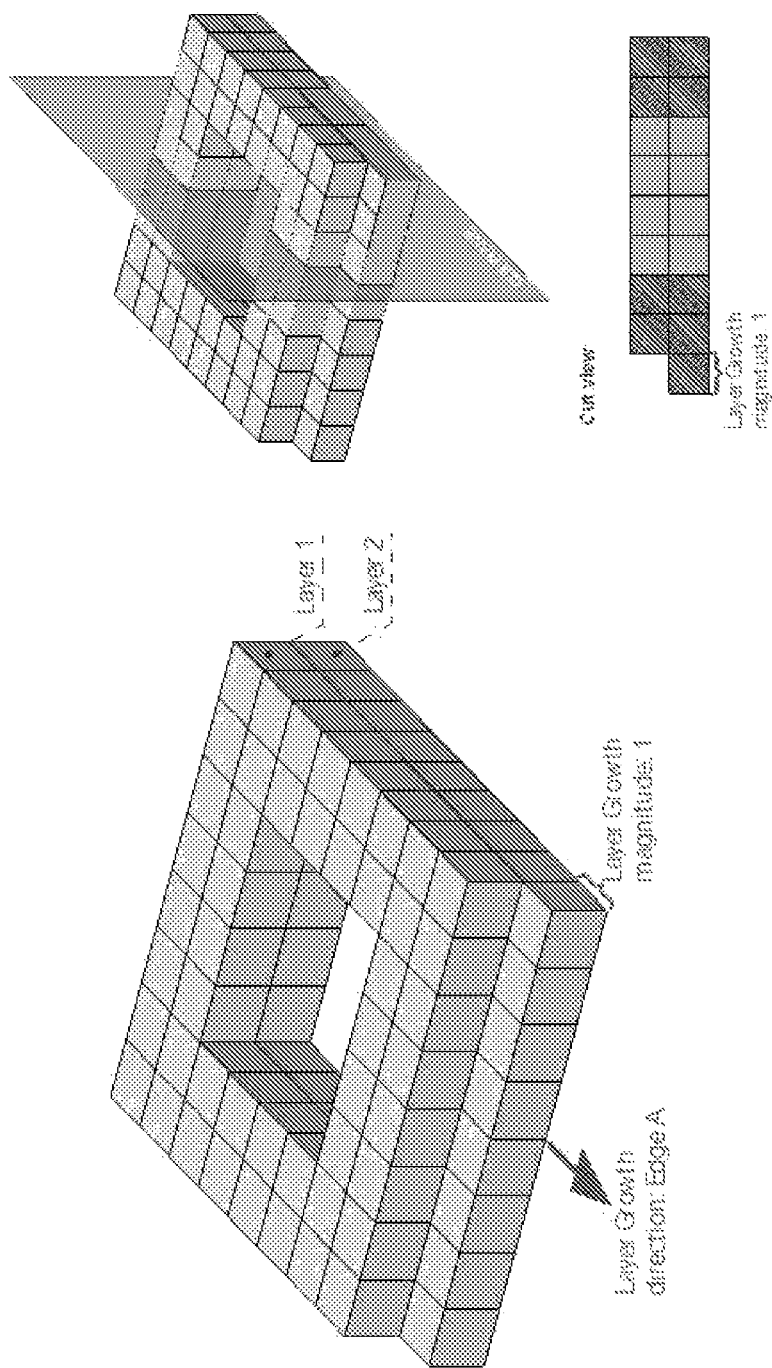
FIGS. 37A and 37B provide an example of growth for a hollow pyramid shape.

In some examples, the minimodules may comprise a shape or structure. The shape or structure may comprise any shape or structure provided elsewhere herein. In an example, a shape or structure of a minimodule may comprise a modified double gyroid (DG) that may be assembled into a macrostructure to create a production bioreactor provided herein. FIGS. 33A-33F illustrate assembly starting with a first minimodule (e.g., DG) and assembling additional minimodules such that the geometry is repeated to form a three-dimensional (3-D) matrix whose growth may be limited to two of the three possible dimensions. The connected points of one minimodule to another minimodule may be referred to as a "mouth." This first assembly of interconnected minimodules which may be oriented identically is referred to as a "layer." The layer can be arranged, for example, in a rhomboid shape such that in some examples, is the same number of modules are connected in the selected directions, the resultant growth is not proportional and as such the growth of the layers is irregular with respect to one another. In some examples, the layer may be arranged in a square shape or such that the resultant growth is proportional. FIGS. 37D-37F illustrates one example of layer assembly and growth. Layer assembly and growth may occur in any direction.

The minimodules may be the building blocks of a larger structure which may be a bioreactor. Minimodules may be constructed by the assembly of a plurality of smaller units such as unit cells which may be voxels that can be used to define a space or a structure in the space. A unit cell may comprise a shape. The shape of a minimodule may comprise any shape, such as any geometric shape and any size. A minimodule may be a crystallographic cell which may be used to order or define a space. For example, a space or a characteristic thereof may be defined, constructed, or shaped due to the presence or absence of a unit cell or a position thereof in the space. For example, in a given area of the space, a high density of an example unit cell or voxel may be provided to define or make a solid object. For example, a large numbers of a unit cells or voxels may be located within a small area, therefore, the area may be dense of unit cells or voxels and may be defined as or perceived by a user, an entity, a software, a machine, or an artificial intelligence (AI) as a solid structure such as a wall with a given thickness. In another example, the unit cells may be sparse in a given area. In such case, the unit cells or voxels may be assembled to make a hollow space, a substantially void space, a channel, a hole, or alike. For example, a number of unit cells of a suitable shape may be assembled to make a minimodule or building block such as a conduit, or a hollow chamber, such as a hollow chamber of a bioreactor (e.g., chamber 4840). Provided herein are methods for building such constructs. The method of building such constructs may be implemented by the computer systems, such as software components provided herein, AI, machine learning, other computer-implemented methods, and any combination thereof. In some examples, the computer-implemented methods may provide a set of instructions (e.g., executable instructions) which may be used by the devices provided herein to 3D print given structures, such as a bioreactor provided herein.

A minimodule may be constructed by an assembly of a plurality of smaller units such as voxels or unit cells. In some examples, a minimodule may be comprised of crystallographic cells that can be used to define and/or order a space such as a 3D space according to the methods of the present disclosure. The shape of a unit cell may belong to a given class. Examples of a class of a unit cell or crystallographic cell may comprise primitive, body centered, face centered, side centered, other classes, and combinations thereof. Examples of the shape of the unit cell may comprise a cubical shape, a spherical shape, a rectangular shape, a pyramidal shape, a gyroid shape, a double gyroid shape, a triclinic shape, a monoclinic shape, an orthorhombic shape, a trigonal shape, a hexagonal, or any other geometric shape. The shape of a unit cell may comprise a Bravais lattice. The Bravais lattice may comprise a shape provided herein. Examples of the Bravais lattices and shapes of the unit cells or the crystallographic cells are provided in Table 1.1. The unit cell may be used as a voxel to order or generate a space and to make a minimodule.

TABLE 1.1

Bravais lattices in three-dimensions.

| Bravais lattice | Parameters | Simple (P) | Volume centered (I) | Base centered (C) | Face centered (F) |
|---|---|---|---|---|---|
| Triclinic | $a_1 \neq a_2 \neq a_3$<br>$\alpha_{12} \neq \alpha_{23} \neq \alpha_{31}$ | 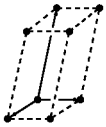 | | | |
| Monoclinic | $a_1 \neq a_2 \neq a_3$<br>$\alpha_{23} = \alpha_{31} = 90°$<br>$\alpha_{12} \neq 90°$ | 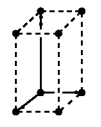 | | 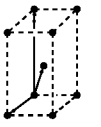 | |

TABLE 1.1-continued

Bravais lattices in three-dimensions.

| Bravais lattice | Parameters | Simple (P) | Volume centered (I) | Base centered (C) | Face centered (F) |
|---|---|---|---|---|---|
| Orthorhombic | $a_1 \neq a_2 \neq a_3$<br>$\alpha_{12} = \alpha_{23} = \alpha_{31} = 90°$ | ▦ | ▦ | ▦ | ▦ |
| Tetragonal | $a_1 = a_2 \neq a_3$<br>$\alpha_{12} = \alpha_{23} = \alpha_{31} = 90°$ | ▦ | ▦ | | |
| Trigonal | $a_1 = a_2 = a_3$<br>$\alpha_{12} = \alpha_{23} = \alpha_{31} < 120°$ | ▦ | | | |
| Cubic | $a_1 = a_2 = a_3$<br>$\alpha_{12} = \alpha_{23} = \alpha_{31} = 90°$ | ▦ | ▦ | | ▦ |
| Hexagonal | $a_1 = a_2 \neq a_3$<br>$\alpha_{12} = 120°$<br>$\alpha_{23} = \alpha_{31} = 90°$ | ▦ | | | |

A crystallographic cell or unit cell may comprise one or more elements, in some examples, a finite number of elements. An element may be a set of coordinates that may be given a meaning. Examples of an element may comprise a point, an axis, a proper axis, an improper axis, a center, a plane, or another element. In some examples, the assembly of unit cells and elements may form a structure, such as a macrostructure or a minimodule. In an example, such assemblies may form a hollow cylinder which may be configured to allow a flow of a fluid such as a gas or a liquid. For example, an assembly of unit cells, elements, and/or combinations thereof may make a channel, a conduit, a chamber, or another minimodule or building block of a bioreactor described herein, such as a channel (e.g., channel 4820, 4810, or any other channel provide elsewhere herein). In some examples, the assembly of unit cells and elements may form a solid structure, such as a solid wall, a solid block, or another structure.

In some cases, the arrangement of elements within the unit cells (e.g., within a crystallographic cell or within a crystal) may be important to minimize or avoid to the extent possible potential disruptions in the functional continuity within the considered volume or structure that is made by the assembly of such unit cells and/or elements. In some examples, the arrangement of unit cells and/or elements can be performed by example mathematical instructions, equations, or formulations which may comprise a mathematical function, a mathematical operation, and/or a mathematical operator. An example of such mathematical operator may be a symmetry operator.

A mathematical operator may be generally referred to as a mapping or function that can act on elements of a first space (e.g., a 3D space) to produce elements of another space. In some cases, the second space may be the same as the first space. An operator may comprise a linear map which can act on a vector space. In some cases, an operator may preserve a property of the space and/or the elements such as their continuity. An operator may be a linear operator, a bounded operator, or another type of operator. Examples of operations which may be performed on the elements may comprise a translation operator, a rotation operator, an inversion operator, a reflection operator, and identity operator. An example operator which may be used to perform the methods of the present disclosure may be a symmetry operator.

In some examples, the minimodules of a bioreactor may comprise a double-gyroid or modified double-gyroid shape. A double gyroid (DG) comprises two gyroids and may include two intergrown nonoverlapping domains. A modified double gyroid (DG) may include two intergrown non-overlapping domains, which may be bounded by two constant-mean-curvature (CMC) surfaces separated by a matrix phase. A modified double gyroid structure may comprise minor modifications to the connections of a non-modified double gyroid in order to adapt the structure to a given macrostructure or function. Modifications may include blocking of a portion of the connections or intersections (e.g., "mouths"), modifying the diameter of one or both phase channels of the structure, or complete or partial elimination of any of the phase channels present in a DG structure. A DG or modified DG may include a first gyroid structure intertwined with a second gyroid structure. The two channels may be separated, such as by a porous membrane.

In an example, in a bioreactor provided herein, on the edges of each layer, the unconnected mouths of the units (e.g., minimodules) can be used to connect the layer with other functionalities, such as the input for media flow or for gas and the output of spent media (e.g., harvesting layer 4610 and/or harvesting channel 4696), spent gas (e.g., a gas intake channel, a gas harvest channel, not shown) and output of cells or bioproduct produced by cells. In some cases, the output of the cells or bioproduct produced by cells may be the same as output of spent media or be different from it.

Figure 34B:
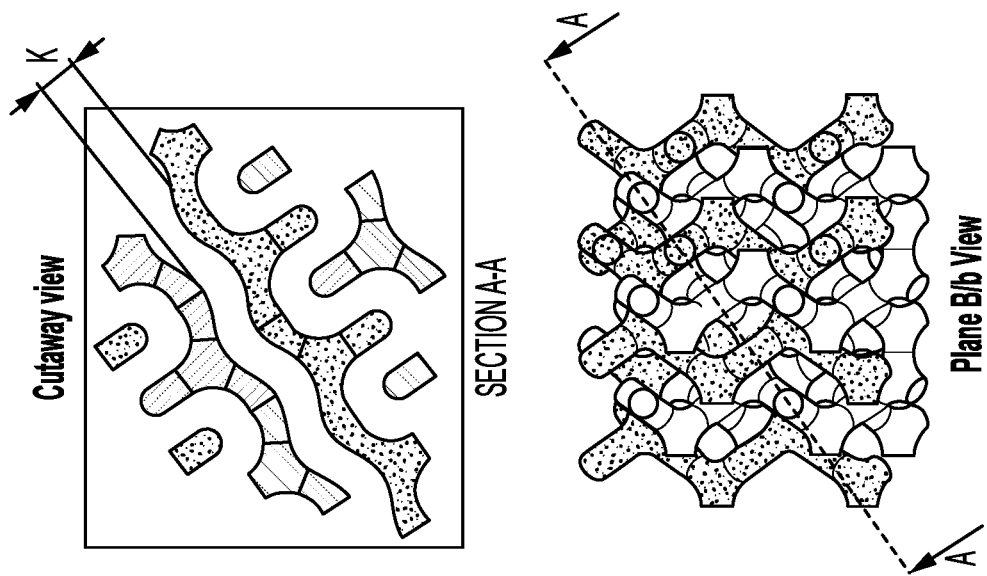
FIGS. 34A-34F show examples of layer assemblies of various shapes, for example square and square-like assembly shapes.
Figure 34A:
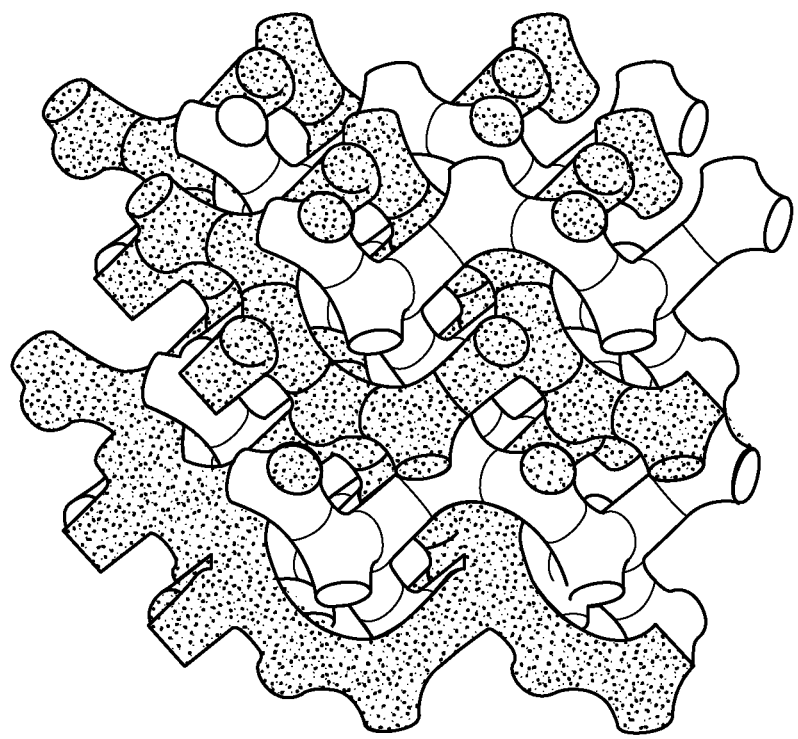
Figures 34C, 34D:
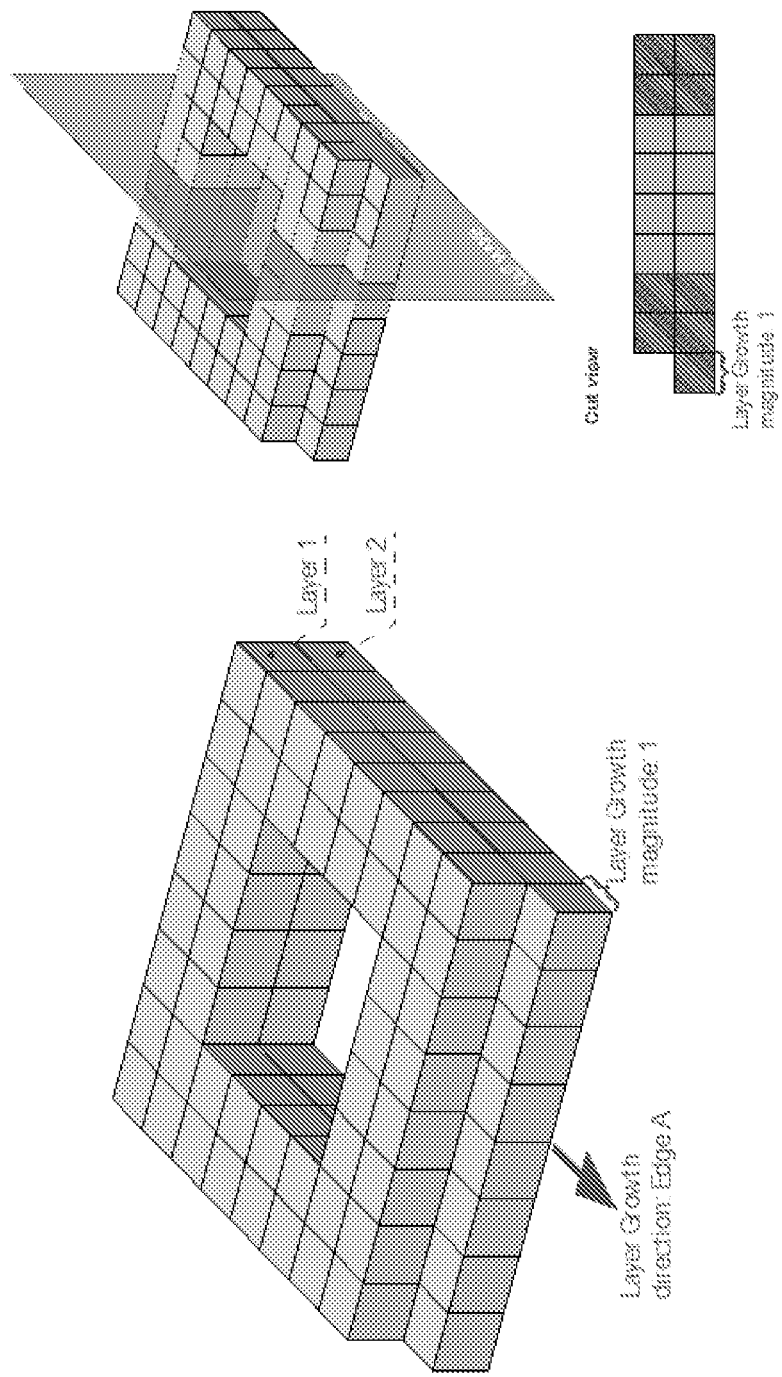
Figure 34F:
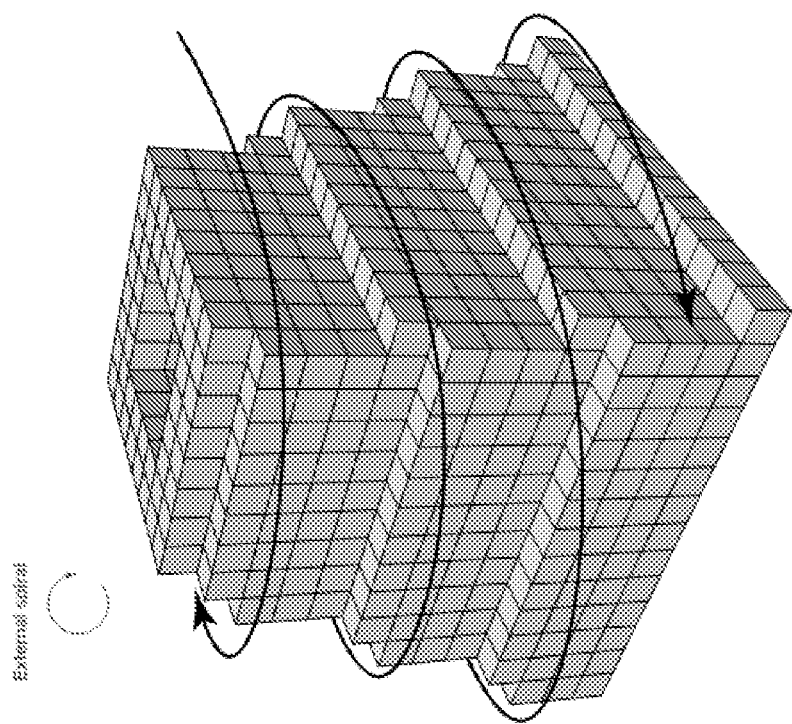
Figure 34E:
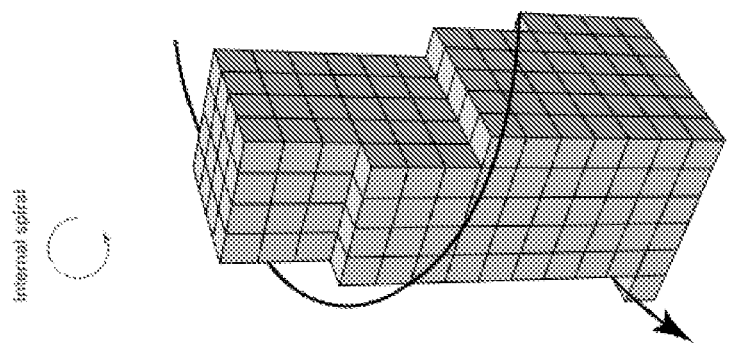
Figure 35A:
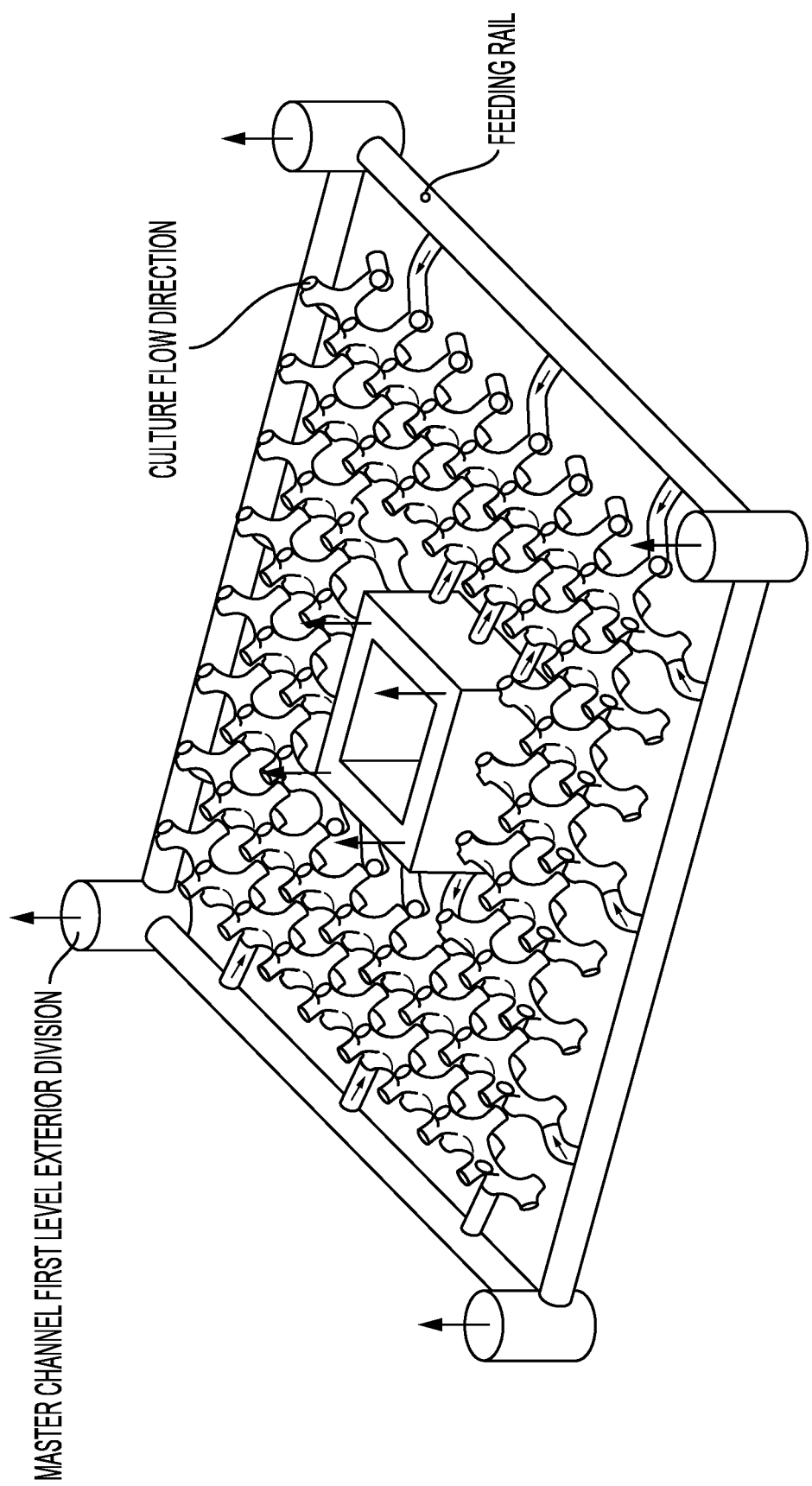
FIGS. 35A-35F show examples of module layers connected to example feeding circuits.
Figure 35B:
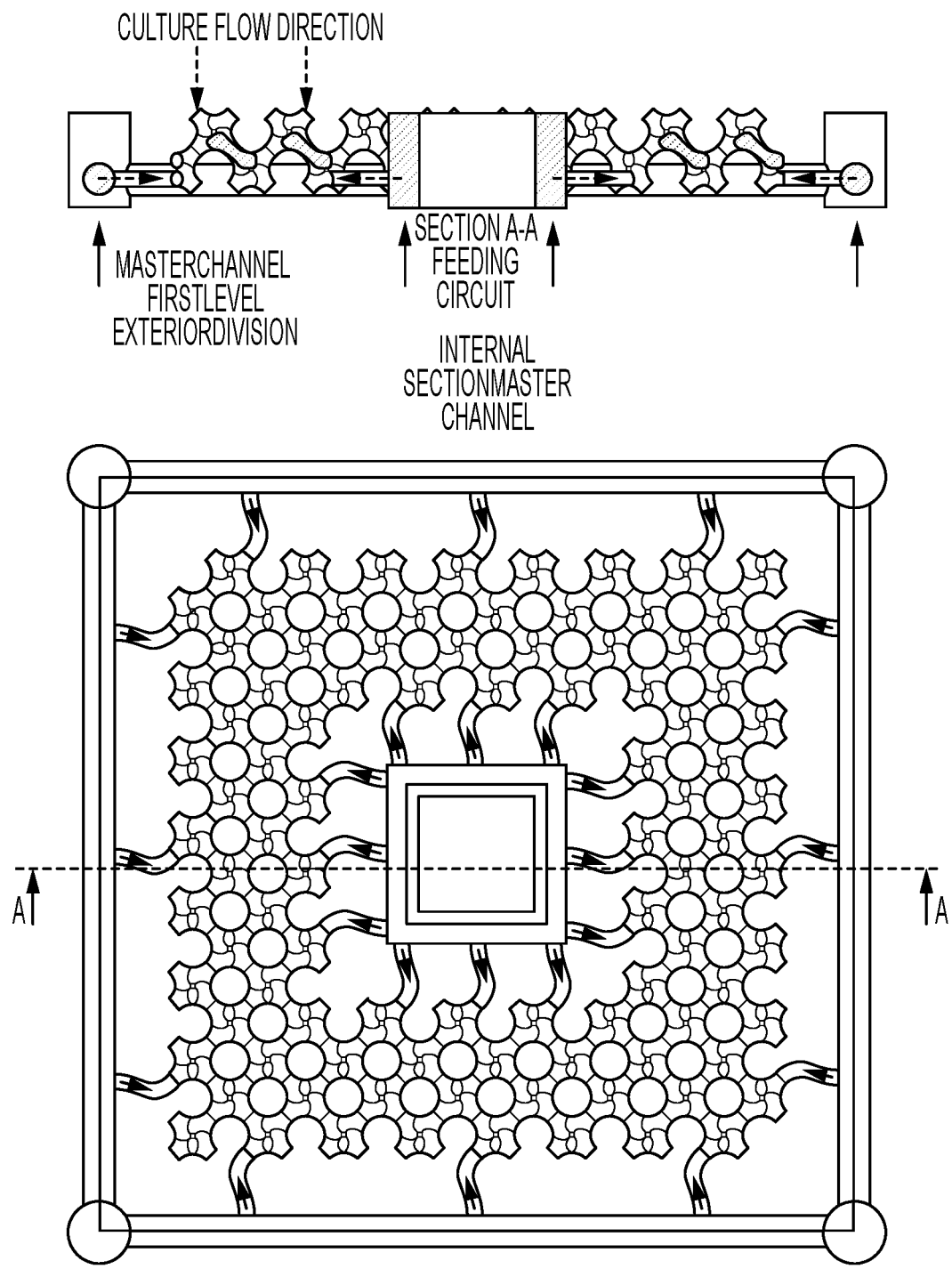
Figure 35C:
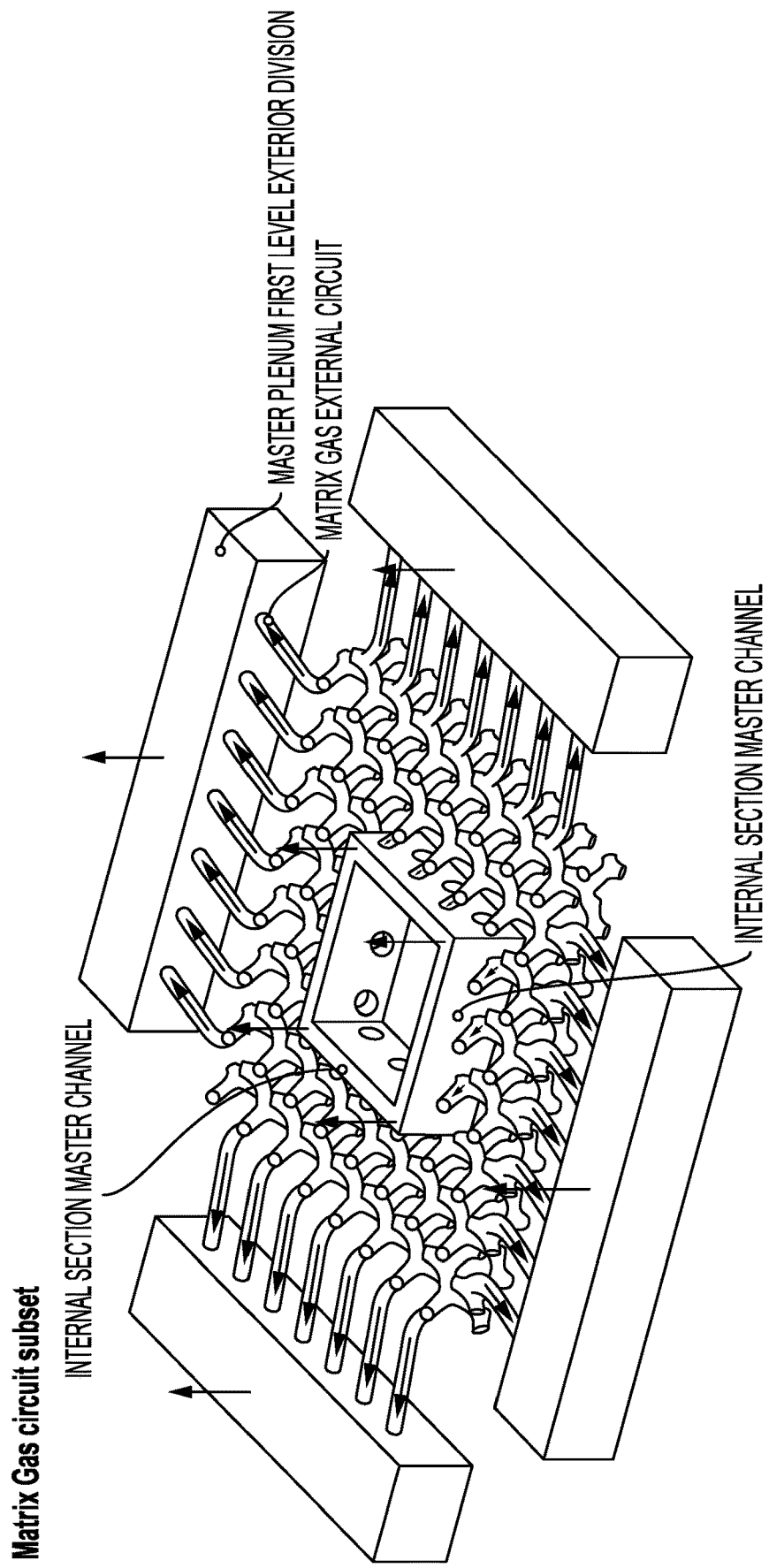
Figure 35D:
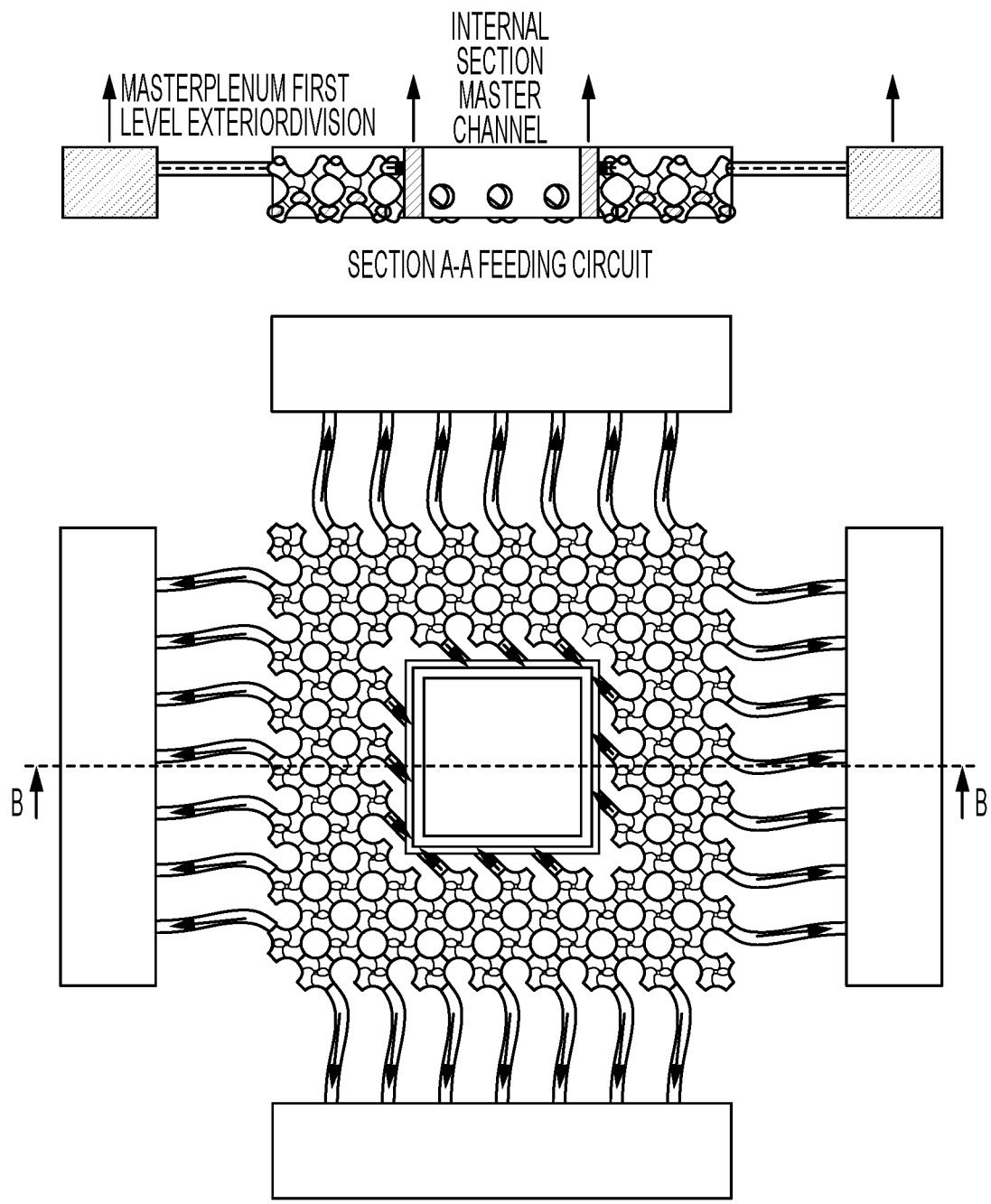
Figure 35E:
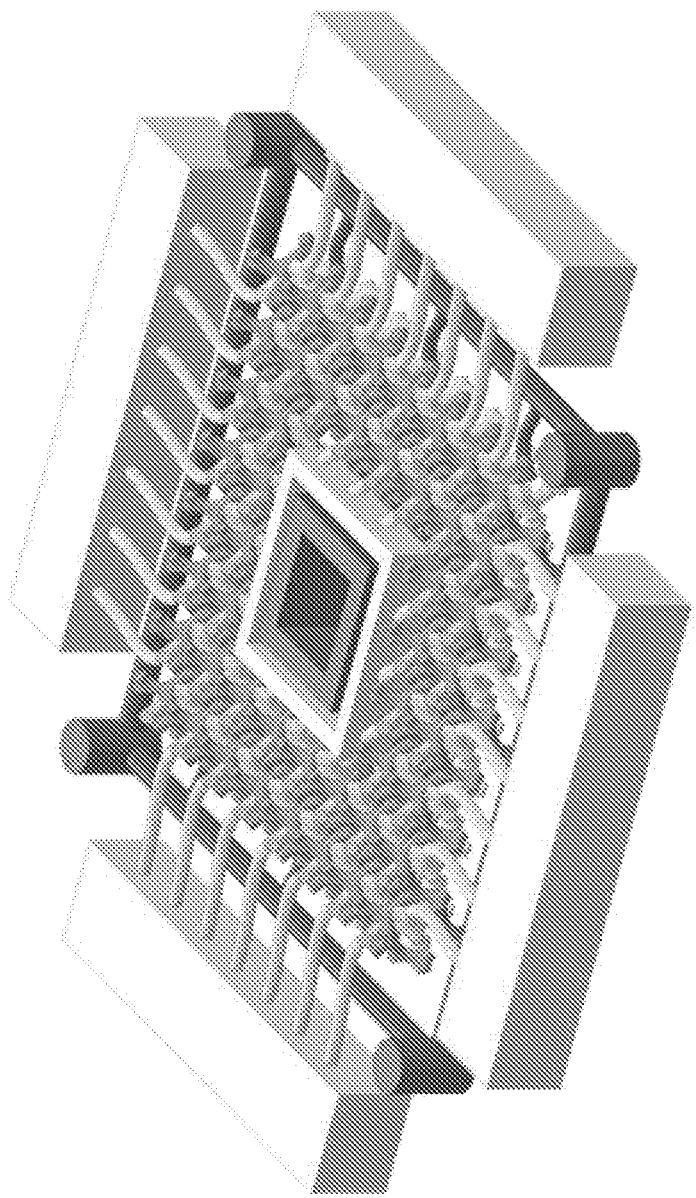
Figure 35F:
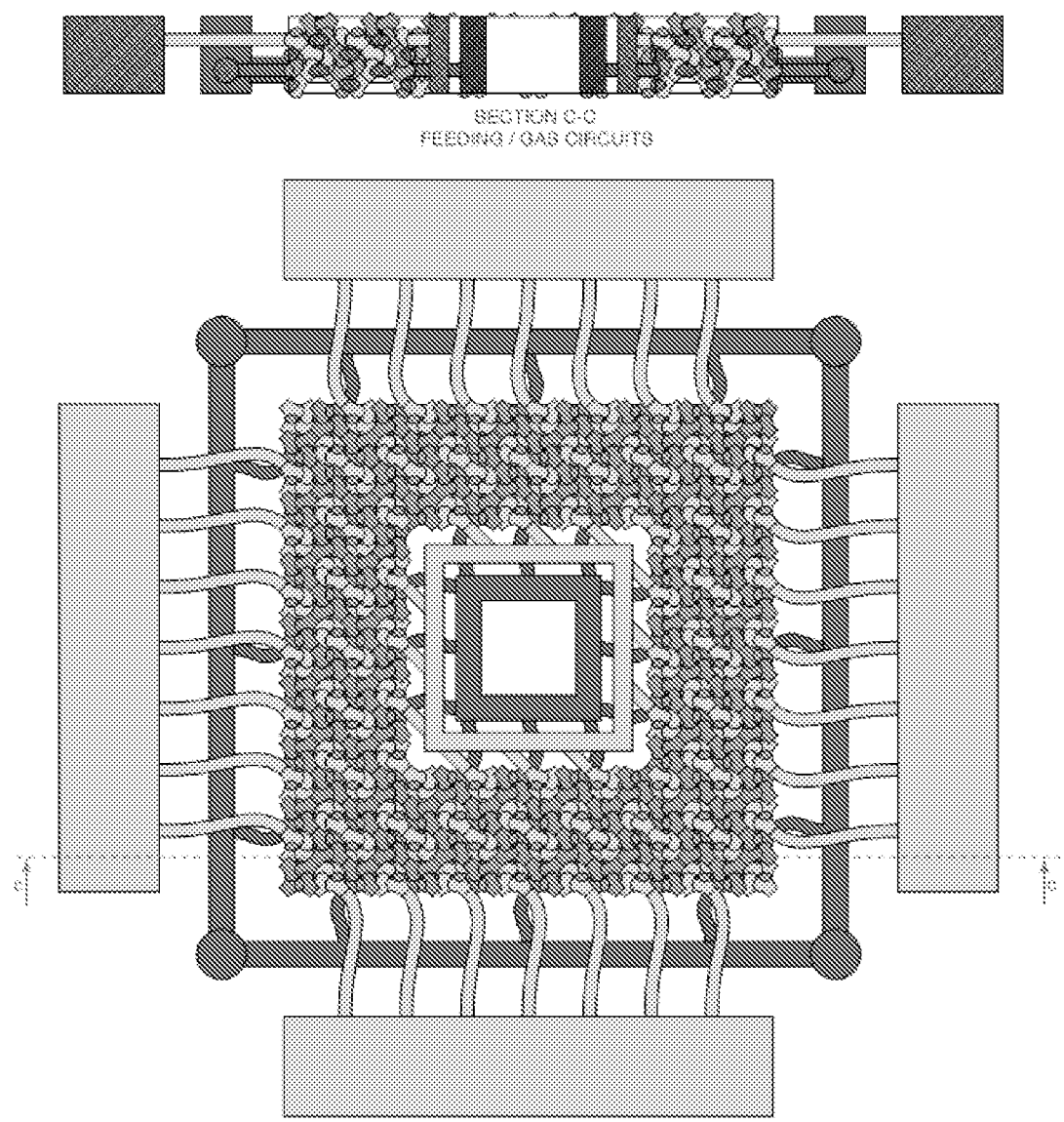

In some examples, an assembly of layers of the minimodules ("first matrix") can be co-located with a second assembly of layer of minimodules ("second matrix") whereby the second matrix may occupy the free spaces left by the first matrix and whereby the matrices occupying the same volume may have no point of contact and may maintain a constant minimum distance. In further examples, higher order assemblies of layers of minimodules can be achieved by co-locating one or more subsequent matrices (e.g., second matrix, third matrix, fourth matrix, fifth matrix, etc.) with an initial matrix whereby the one or more subsequent matrices occupy the free spaces left by the initial matrix and whereby the matrices occupying the same volume may have no point of contact and may maintain a constant minimum distance. An example assembly of two matrices is shown in FIGS. 34A-34F. FIG. 34A shows an example of a portion of a double gyroid inscribed in a cube. FIG. 34B shows an orthogonal and cut away view of the structure of FIG. 34A. FIGS. 34C and 34D show an example of the direction of growth of a second layer with respect to the first layer. FIG. 34E shows and an example of the volume subtracted from a pyramid and counterclockwise growth. FIG. 34F shows an example of clockwise direction of growth of a macrostructure along a vertical axis of a hollow pyramid.

Examples of Macrostructures

Hollow Pyramid Macrostructure

Figure 36:
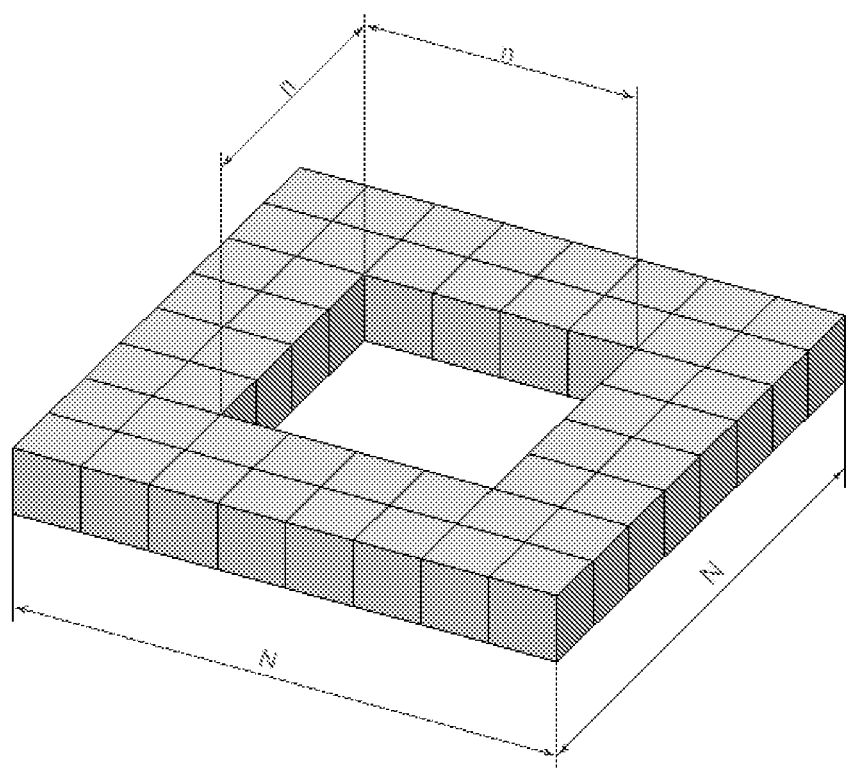
FIG. 36 shows an example layer for a hollow pyramid shape.

In some examples, the minimodules may be assembled into a hollow pyramid macrostructure. A hollow pyramid macrostructure may have a volume of hollow center and of increasing transverse section. Using the hollow pyramid macrostructure, the feeding circuit can serve both the external and internal perimeters. For the construction of a hollow pyramid, the matrix may have an initial layer that may be linked to a distributor and a layer that may in turn connect to the collector. The number of upper mouths of the initial layer, as of the lower ones of the layer that connect to the collector may belong to the set M=$2^n$. This way, the connecting channels, or trees, may branch in pairs in a balanced manner. A tree may be a distributed structure (input) and collection (output) of a bioreactor. In some cases, the bioreactor may be bubble-free. In both the input and the output of the bioreactor and/or a module thereof, a channel may transition or branch from a single channel to multiple channels, for example to $2^n$ channels. The increase in volume between layers (this is the number of minimodules that are added between one layer and the next in the flow direction) may be determined by the bioreactor and may be ordered by (i) an alternating sense of growth between its edges of the outer perimeter; and (ii) an increase of its internal perimeter (i.e., the perimeter of the internal hollow center). For example, if N is the number of modules in one of the edges of the external perimeter of the hollow pyramid, and n is the number of minimodules that make up one of the edges of the internal perimeter of the hollow pyramid, then if at one layer N=(8;8) then n=(4;4) (see, e.g., FIG. 36). This logic may be repeated alternately between the outer edges of the pyramid in each layer and in a clockwise sense (considering the direction of the flow). The result may be a stepped pyramid where its steps form a faceted spiral. In some examples, the internal perimeter may have a spiral growth, in some cases, with a lower frequency than the external perimeter, and the direction of growth for the internal perimeter may be opposite to that of the external perimeter (see FIGS. 37A and 37B). In some examples, the interaction between the internal-external spirals and the direction of the flow may result in a vortex-type movement of flowing media within the hollow pyramid structure.

In some examples, the feeding system of the bioreactor may be connected to the bioreactor through one or more channels such as sub-channels. A subchannel of the feeding circuit can surround the perimeter of one or more layers in a bioreactor at an example distance (e.g., an equivalent distance) on each face of a given layer. The subchannels can connect at one or more mouths of minimodules as the edges of a layer. An example set of connections is shown in FIGS. 36A-36F.

Figure 38:
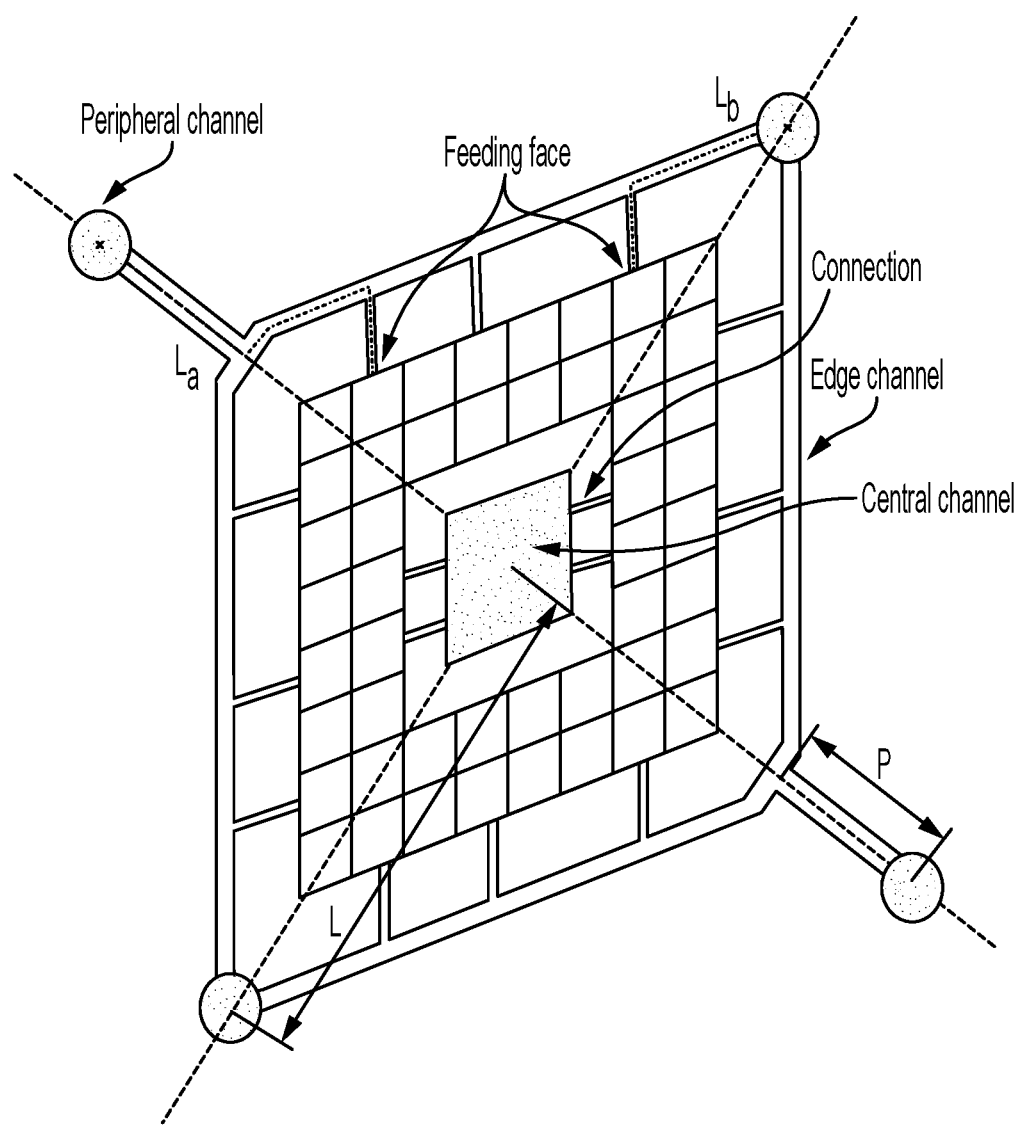
FIG. 38 shows an example of an external feed circuit for a hollow pyramid shape.

In some examples, the feeding circuit may connect at 1, 2, 3, 4, 5, 6, 7, 8 or more than 8 points to the bioreactor. In an example, the feeding circuit may serve a hollow pyramid macrostructure bioreactor and the feeding circuit may have a division of 5 subchannels. One or more of these subchannels may extends into the inside of the pyramid inner channel and the rest feed sub-channels parallel to the edges of each layer (external channels). The pressure and flow balance of the feed circuit may be maintained through proportionality of the external and/or inner channels of the feeding system. An example feeding circuit for a hollow pyramid shape is shown in FIG. 38.

Lamella Macrostructure

In some examples, the macrostructure of the bioreactor may be a lamella. In some examples, the feeding system may be connected the bioreactor through one or more subchannels. A subchannel of the feeding circuit can surround the perimeter of one or more layers in a bioreactor at an equivalent distance on each face of a given layer. The subchannels can connect at one or more mouths of minimodules as the edges of a layer. An example set of connections is shown in FIGS. 35A-35F.

Figure 39:
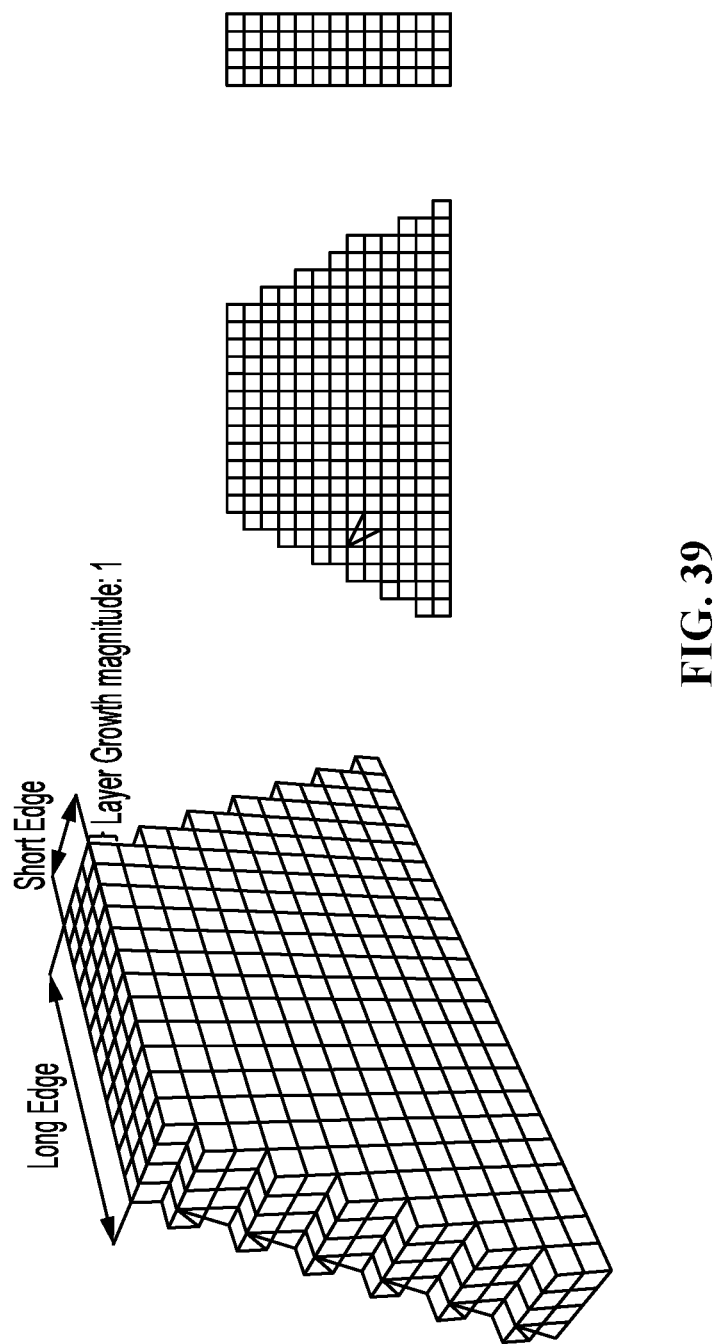
FIG. 39 shows an example of a lamella macrostructure.
Figure 40:
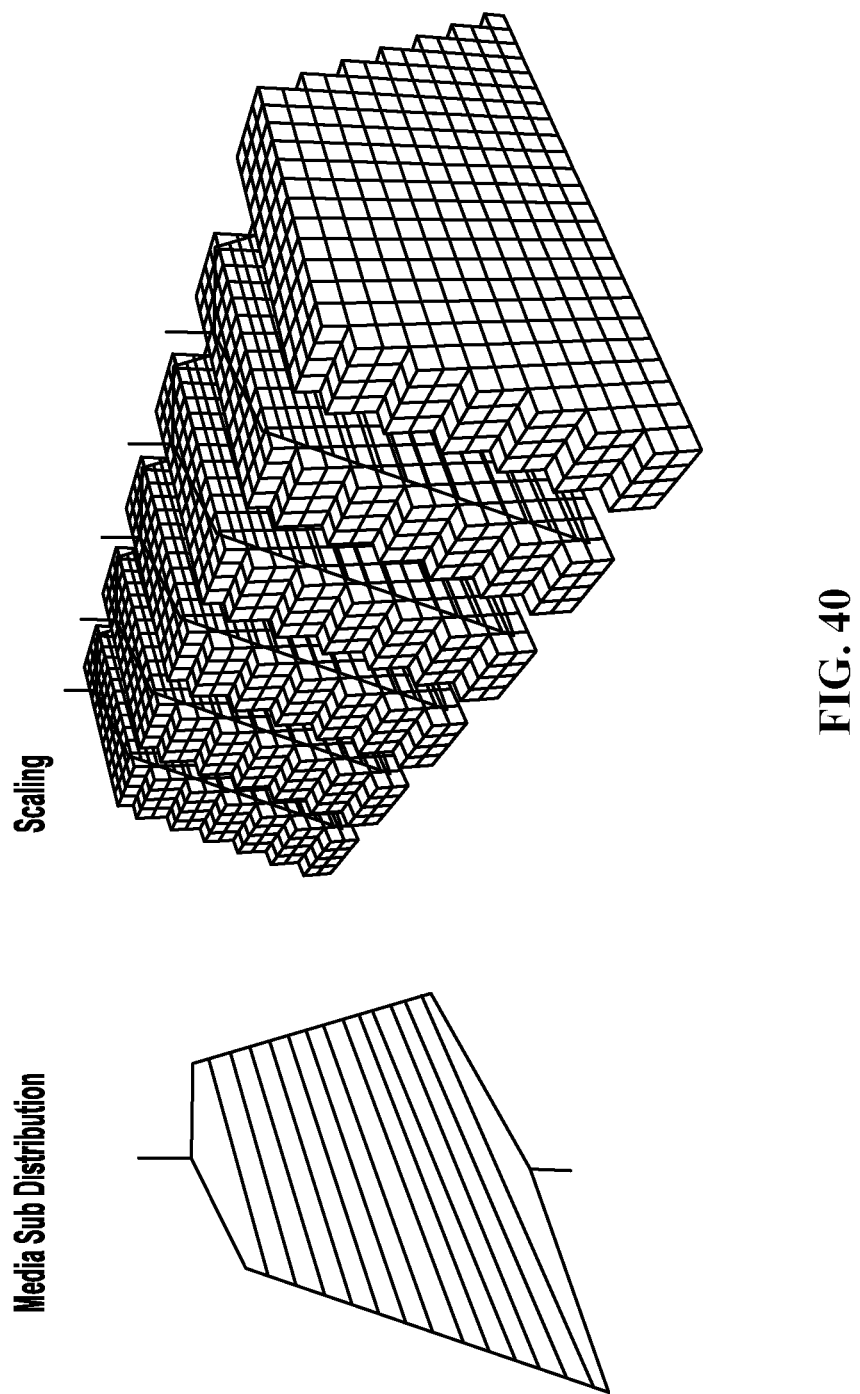
FIG. 40 shows an example of lamella macrostructures with feeding circuits.

In some examples, the bioreactor may employ a lamella macrostructure composed of minimodules. Such minimodules may comprise any shape or structure. The shape or structure may be according to the shapes or structures provided anywhere herein, such as DGs or other shapes. A lamella macrostructure may have a sheet of constant thickness and of increasing cross section comprised of minimodules. The constant thickness of the sheet may allow even or homogeneous access of substances from the feeding circuit. The increase in volume between layers (this is the number of modules that are added between one layer and the next in the flow direction) may be determined by the bioreactor and may be ordered by an alternating sense of growth between the shortest edges of the sheets (see e.g., FIG. 39). In the lamella macrostructure, there may be one or more than one sheet, for example 2, 3, 4, 5, 6, 7, 8 or more than 8 sheets which may be arranged in parallel or in a different configuration. The space between each sheet can be utilized to place the feeding circuit, or a portion thereof which may feed the modules in the sheet (see e.g., FIG. 40).

Chess Macrostructure

Figure 41:
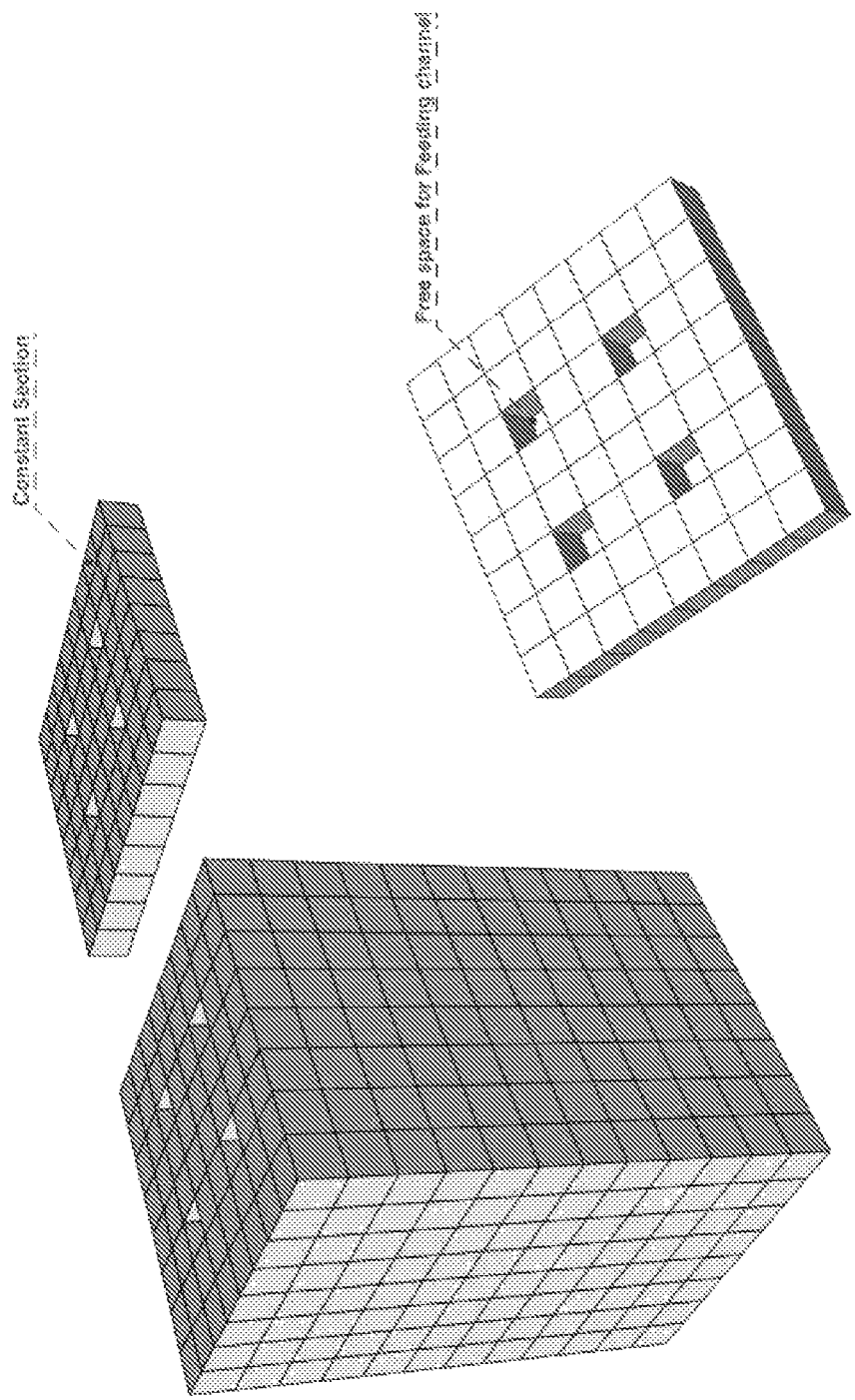
FIG. 41 shows an example macrostructure.
Figure 42:
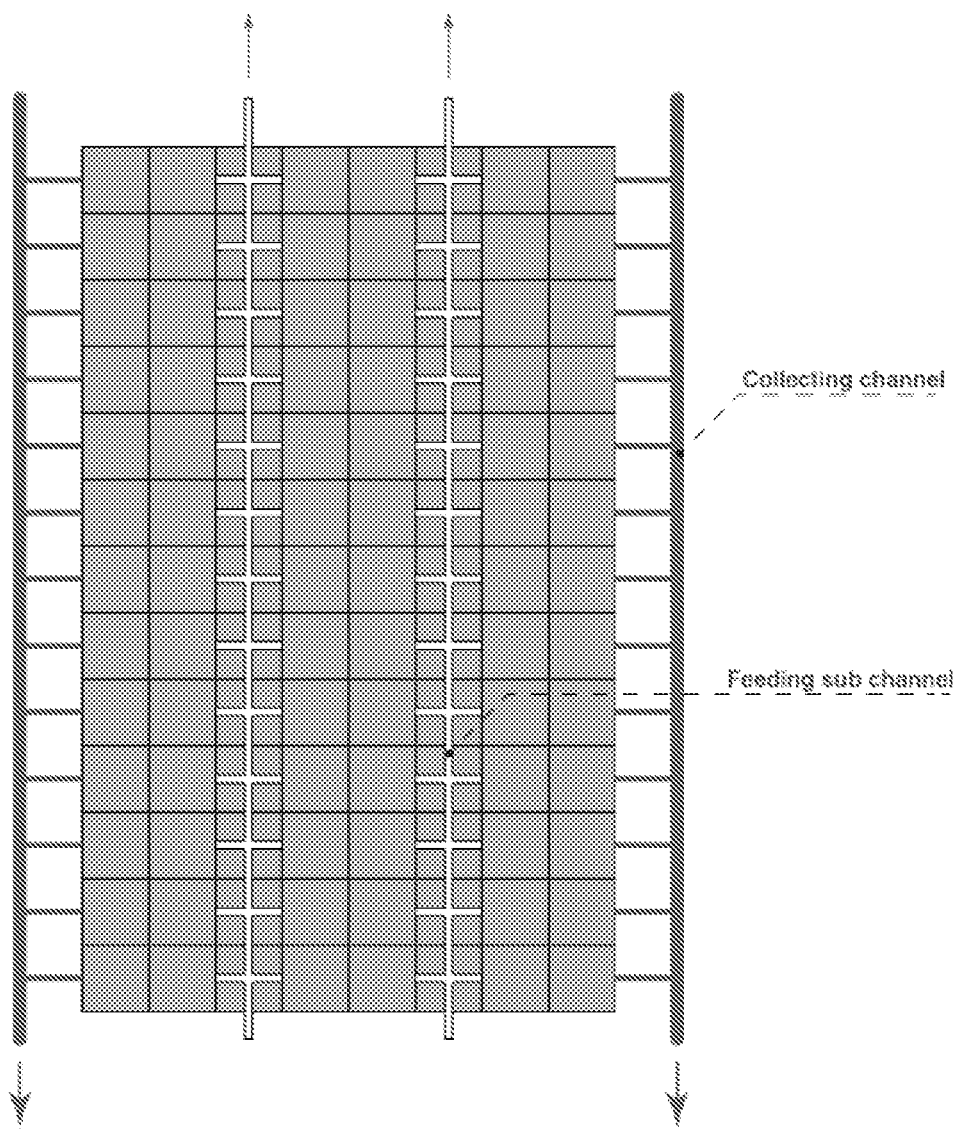
FIG. 42 shows an example feeding and collection arrangement.

In some examples, the minimodules may be assembled into a tree-chess macrostructure, which may have at least one hollow column of constant cross-section that may cross (e.g., longitudinally or in another direction) the layers of minimodules. In some examples, a tree-chess macrostructure may have 1, 2, 3, 4, or more than 4 such columns. The columns can be used to provide an area to transport liquid media and other substances through channels and/or other features that follow the longitudinal column. Collection of spent media, gas, cells and bioproducts can be made on one or more or all of the external faces of the structure, which may be driven by the pressure difference between the center of the column and the faces or using another technique or force. An example tree-chess macrostructure is shown in FIG. 41, and example feeding and collection arrangement is shown in FIG. 42.

Spherical Macrostructure

Figure 52:
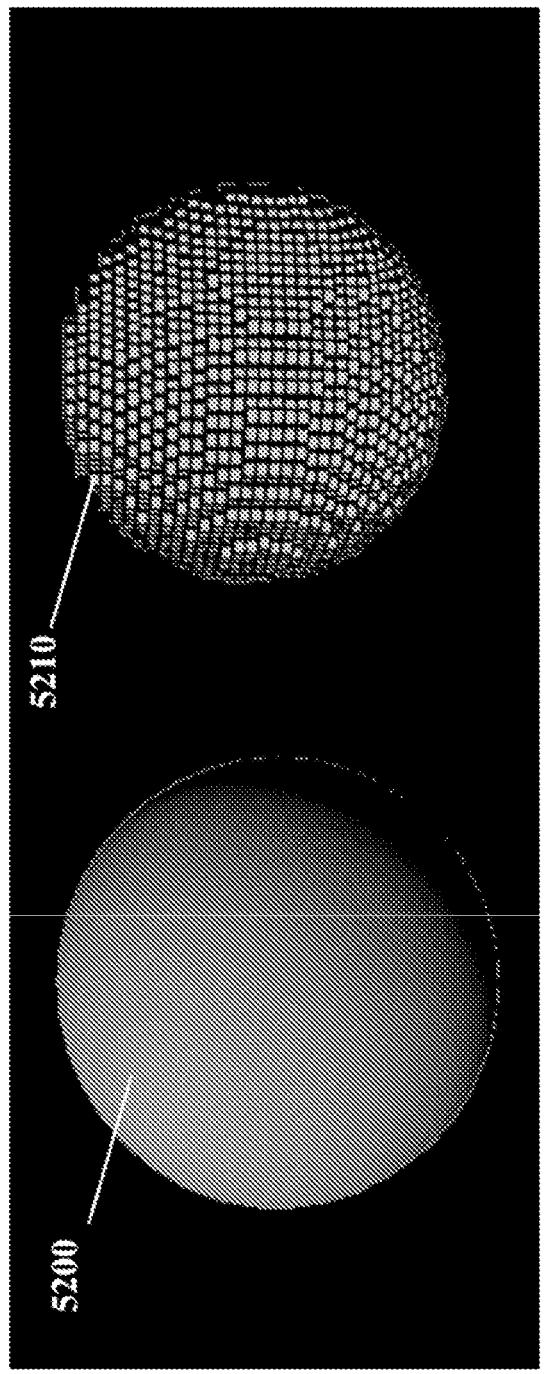
FIG. 52 shows an example 3D spherical macrostructure and its voxelized representation.

In some examples, the minimodules may be assembled into a spherical macrostructure. The spherical structure may be used to make a spherical bioreactor. An example of constructing a spherical macrostructure using a plurality of minimodules is shown in FIG. 52. A plurality of minimodules 5210 are assembled into a 3D spherical macrostructure shape.

Figure 46:
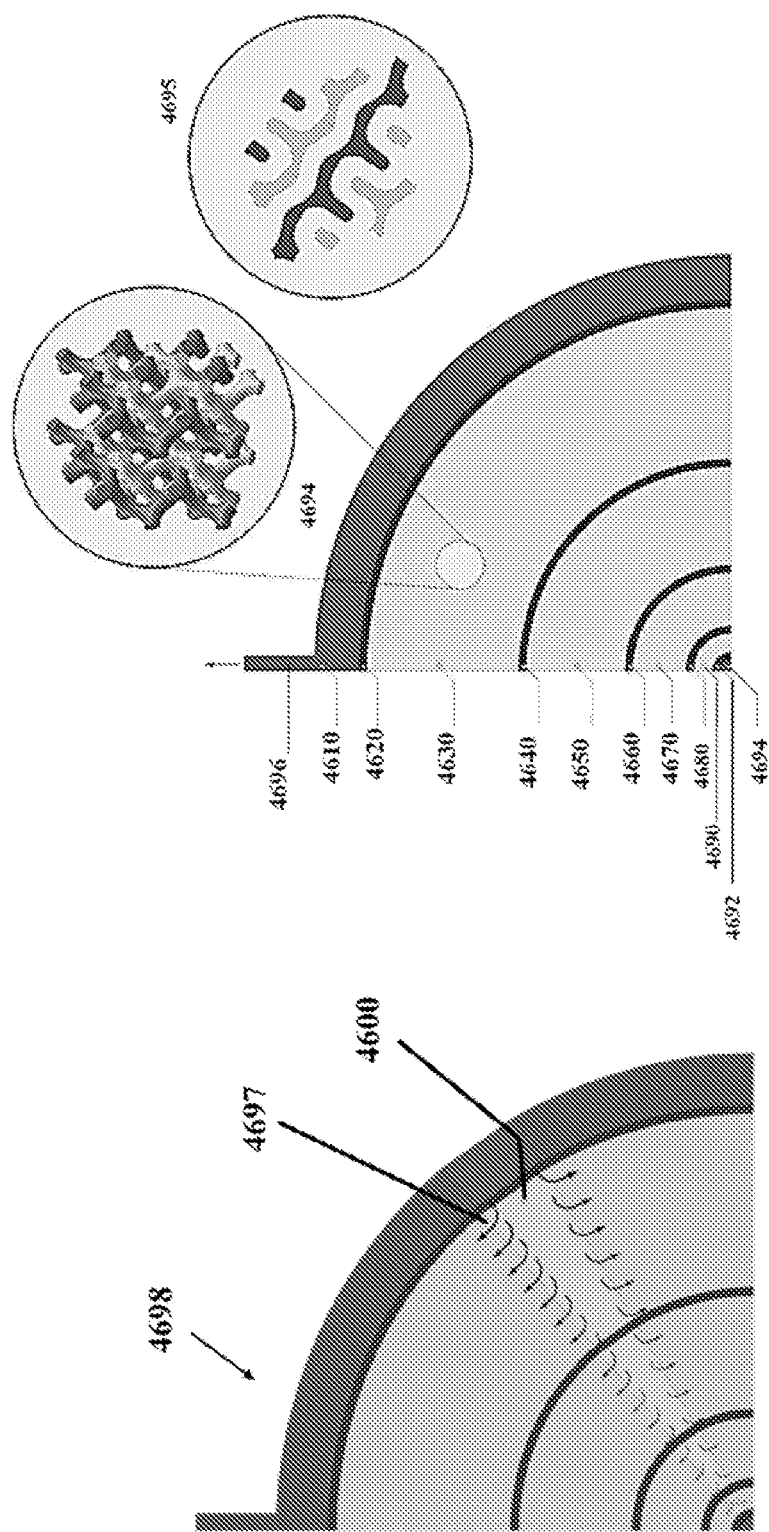
FIGS. 46A and 46B show sectional views of an example spherical bioreactor and its components.
Figure 47:
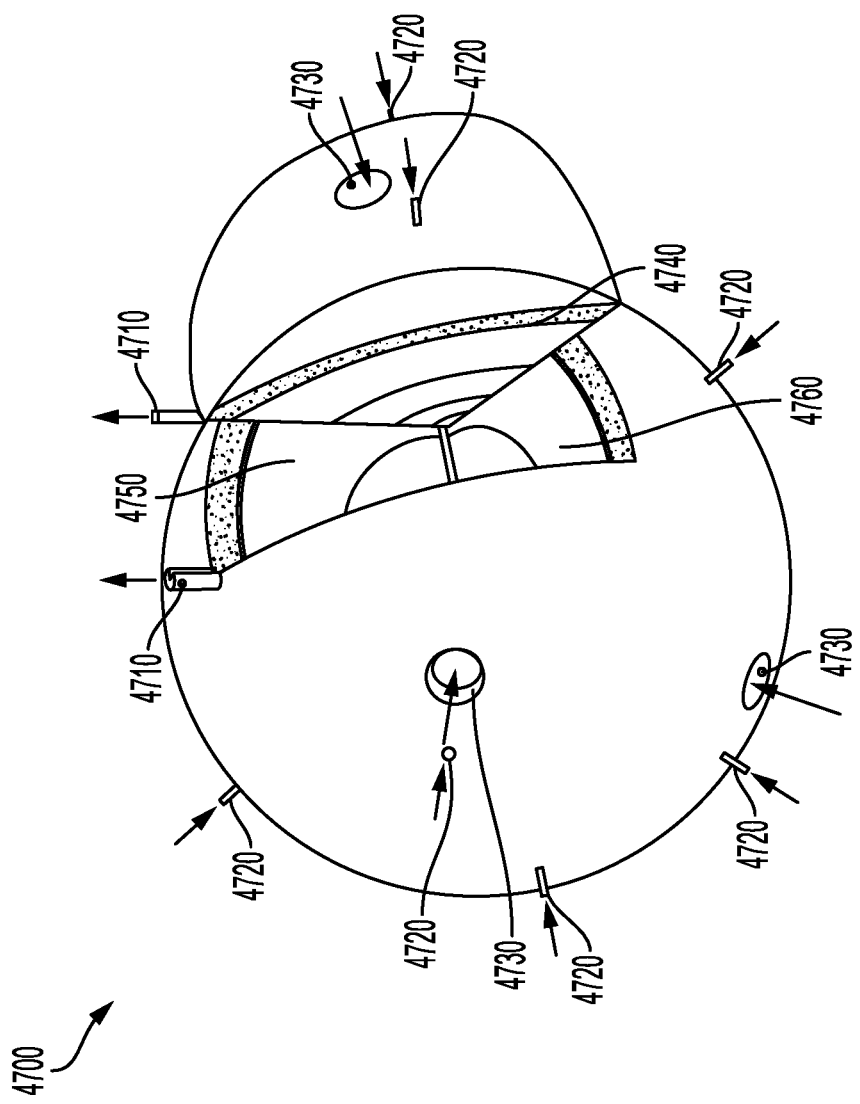
FIG. 47 shows an example of a spherical bioreactor.

Examples of a spherical bioreactor are shown in FIGS. 46A, 46B, and 47 and described in further detail elsewhere herein.

Connection Systems

Figure 43A:
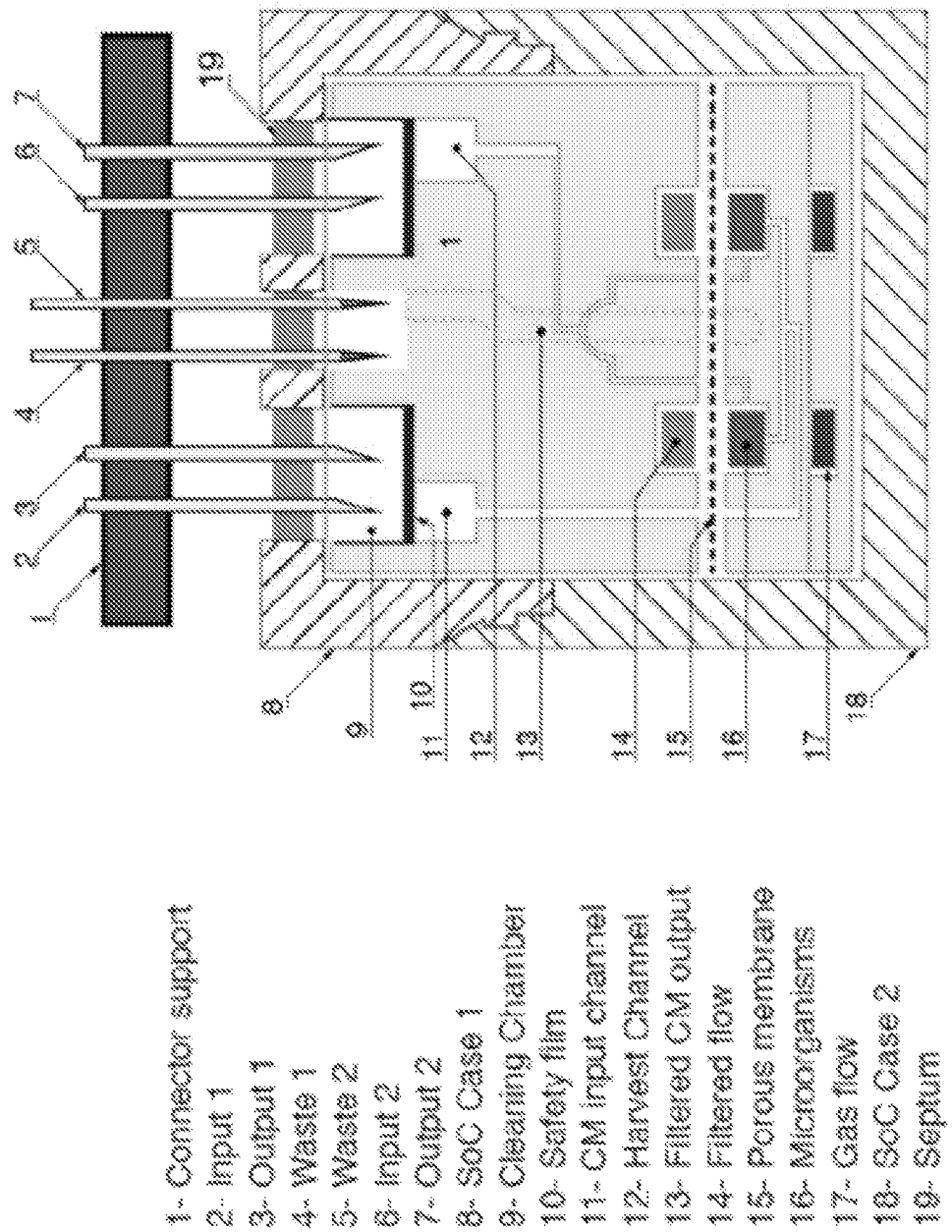

The modules may be connected, coupled, or in fluid communication by one or more connection systems. FIGS. 43A and 43B shows an example connection system may comprise a connector between cell chip module and a fluid source or fluid collection module. The connector may comprise a support and a set of hollow needles which may permit in the ingress and egress of fluid and/or fluid containing cells. In some examples, the connector, through the needles connects to a first module such as a cell chip module. The cell chip module may be a cell chip module described elsewhere herein. The needles can be arranged as sets such that each set of needles can include a needle for input of fluid and another for output of fluid from the cell chip module. One end of the needle may be used for entry into a chamber or channel in the cell chip module and the other end of the needle can be connected to a fluid source, to a collection device or another module.

In some examples, the set of needles may comprise at least one input needle and one output needle. In some examples, there may be a plurality of sets of needles. Each set of needles can be directed to a separate chamber and/or a separate channel to which fluid may be directed for input or removed for output.

In some examples, a bioreactor system provided herein may comprise one or more modules. The one or more modules may comprise a cell chip module, a sandbox bioreactor, a production bioreactor, and/or more modules. The device may further comprise one or more connectors which may connect the modules to one another or to external pieces, devices, sources, modules, etc. For example, the connector can connect the cell chip module to one or more sources of fluid such as culture medium, nutrient supplements, chemical inputs, trypsin, wash/buffer solutions that can be used to supply the cell chip module with fluid and optionally, remove spent fluid. In some examples, the connector can connect the cell chip module to a second module such as a sandbox bioreactor or a production bioreactor, such as for transferring cells from one module to the other.

In an examples, the connection system may further comprise a cleaning chamber such that the needles may be cleansed and/or sterilized prior to entering a module such as a cell chip module. In an example, the cleaning chamber may comprise one or more chambers (e.g., separate chambers) at one end of the cell chip module. In some examples, the cleaning chamber(s) may be bounded on a first end by a septum that may contain the cleaning chamber from the environment and through which the needles can perforate from one end into the cleaning chamber. In some examples, the cleaning chamber can be bounded on a second end by a safety film or other boundary, which can contain cleaning or sterilization fluid (or gas) within the cleaning chamber. The connector in such examples, may be connected at the other end of the needles to a fluid source such as with cleaning or sanitization agent, and wash solution(s).

On the other side of the safety film or boundary may be a channel. Once cleaned and sterilized, the needles can be placed through the safety film or boundary into the channel. The channel can be a culture medium channel which flows culture medium from the needle to other locations in the cell chip. The channel can be a cell harvesting channel, from which cells present in the chip (such as cells growing and multiplying in the chip) can then be directed to the channel and then through a needle to a separate module or harvesting component. The channel can be a waste channel through which spent media can be directed and removed from the chip.

FIG. 43C shows an example of connections made by the connector system to components containing culture media, sanitization agent, as well as to waste collection and to a sandbox module. Connecting tubes or channels connect from the connector system and may, in some cases, utilize valves to direct fluids from the connector to the appropriate source, collector or module.

Figure 43E:
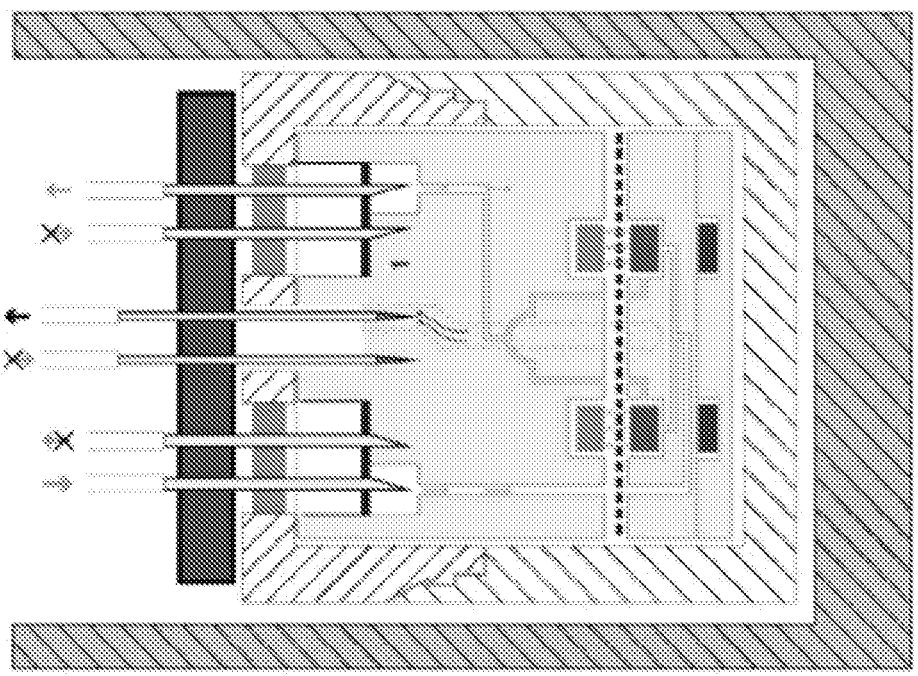
Figure 43D:
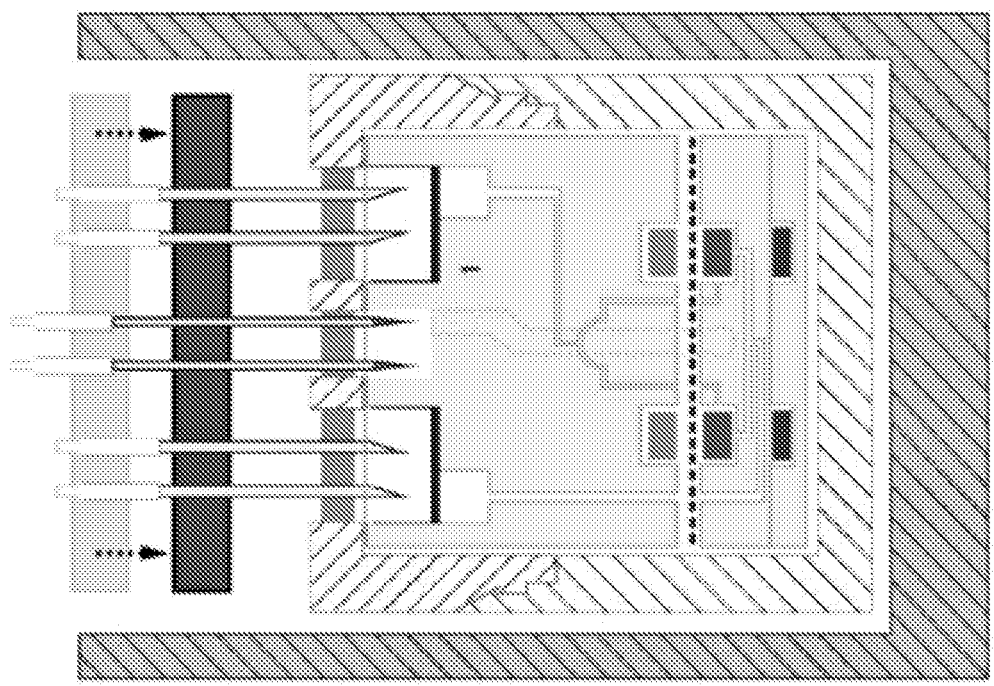

FIG. 43D shows an example of the connection system with the needles penetrating a first chamber in a cell chip module, such as for cleaning and sterilization or other purposes, illustrating an example of the connection system during the process of cleaning, having fluid flow from a component containing sanitization fluid to the sanitizing chambers in the cell chip and having one of each set of needles to remove spent sanitization fluid.

FIG. 43E shows an example of the connection system with the needles penetrating a second chamber after cleaning/sterilization. The first set of needles (left) may be positioned such that the input needle enters a culture media channel/chamber and may allow new culture media to flow into the cell chip module. The middle set of needles may be positioned so that one needle is positioned for output of spent media and culture waste from a channel in the cell chip module. The third set of needles (right) may be positioned so just the output needle enters a chamber/channel and is positioned for output of media and cells from the cell chip module.

Materials for Constructing Bioreactor Modules and Other Printed Objects

The systems, components, and modules described herein can be fabricated from a variety of materials and such materials can be tailored depending on the cells grown and cell environments employed. In some examples, components and modules or parts thereof are fabricated by 3D printing using the printing system herein. The printing can employ commercially available resins and ultra-violet (UV) curable biocompatible polymers. In some examples, the biomaterial used may include a combination of three subcomponents, a biocompatible polymer, a photoinitiator, and UV absorber.

Example resins include, but are not limited to, Poly Caprolactone (PCL), Poly Ethylene Glycol (PEG), PEG-Diacrylate (PEGDA), Poly-Glycol Acid (PGA), Polylactic Acid (PLA), Polylactic-Co-Glycolic Acid, Poly propylene Fumarate (PPF), Polyurethane (PU), Poly-Vinyl Alcohol (PVA), silk, Poly(glycerol sebacate) Acrylate (PGSA), epoxy-based resins, natural polymers-based resins, bioceramic-based resins, alginate-based resins, GelMA-based resins, nano-composite-based resin, bioink, and cellulose-based resins.

Computer Systems

Figure 32:
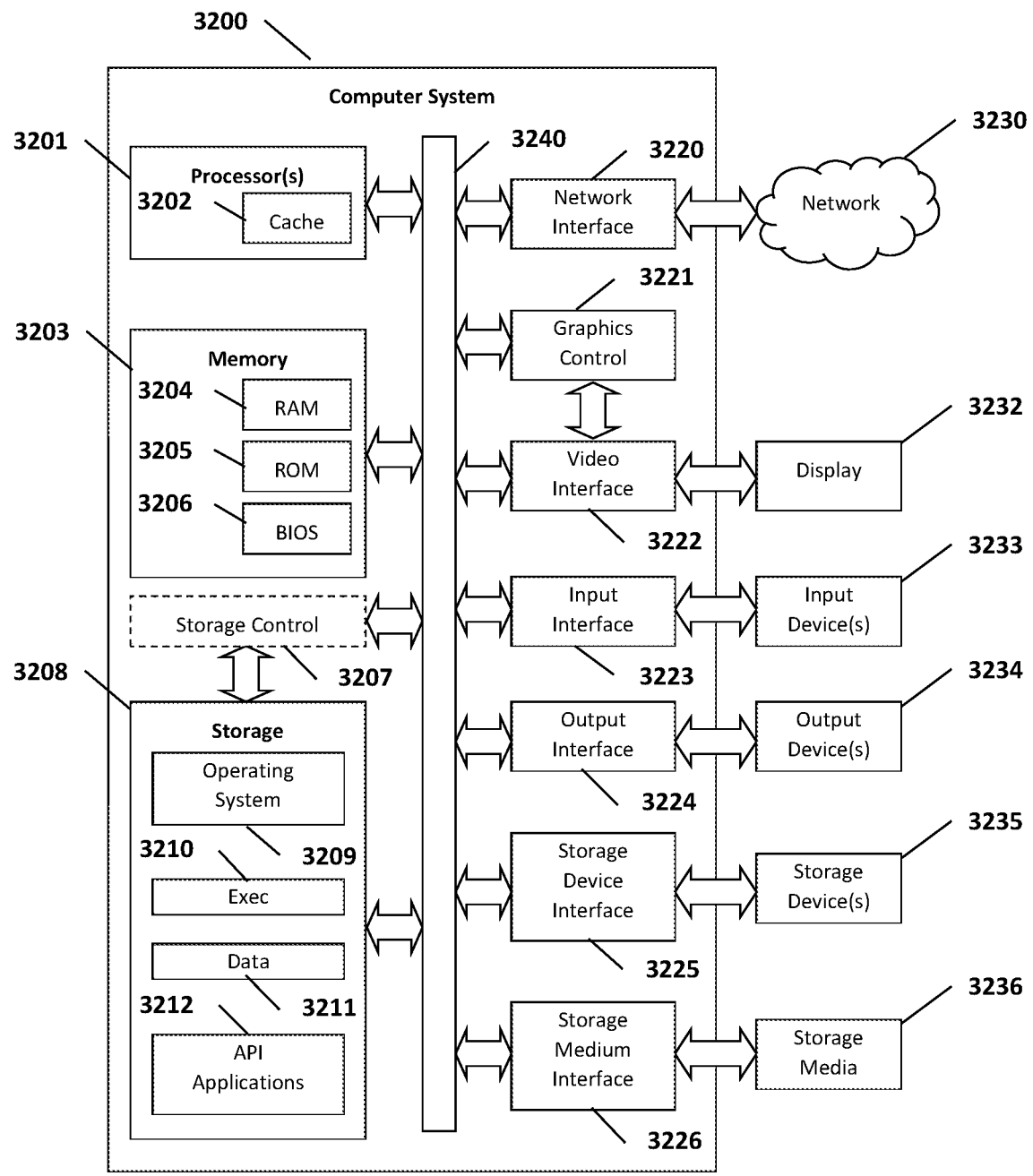
FIG. 32 shows a non-limiting example of a processing (e.g., computing) device; in this case, a device with one or more processors, memory, storage, and a network interface.
Figure 33A:
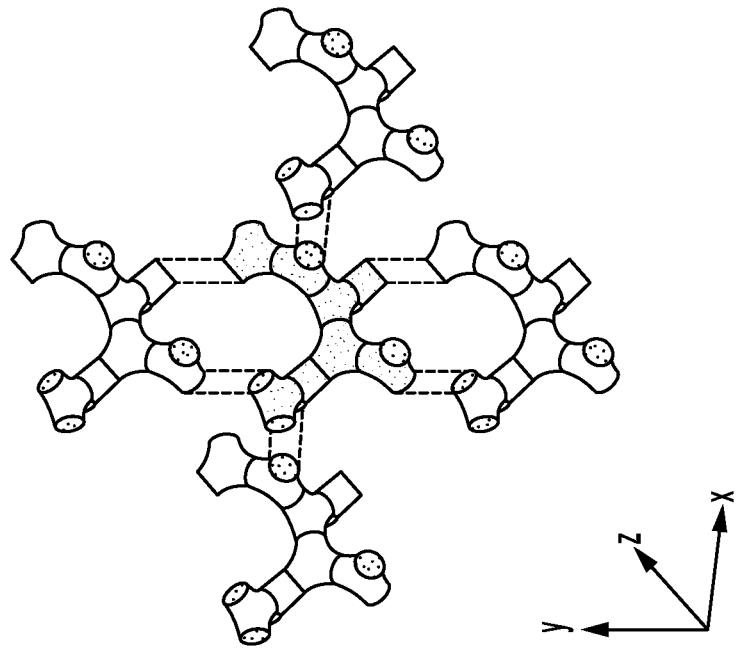
FIGS. 33A-33F show an example schema for an assembly of minimodules into macrostructures.
Figure 33B:
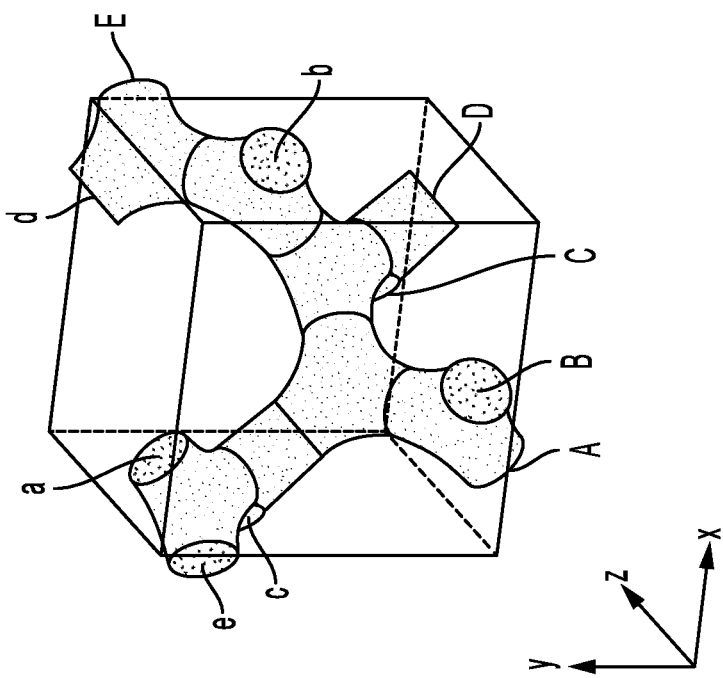
Figure 33C:
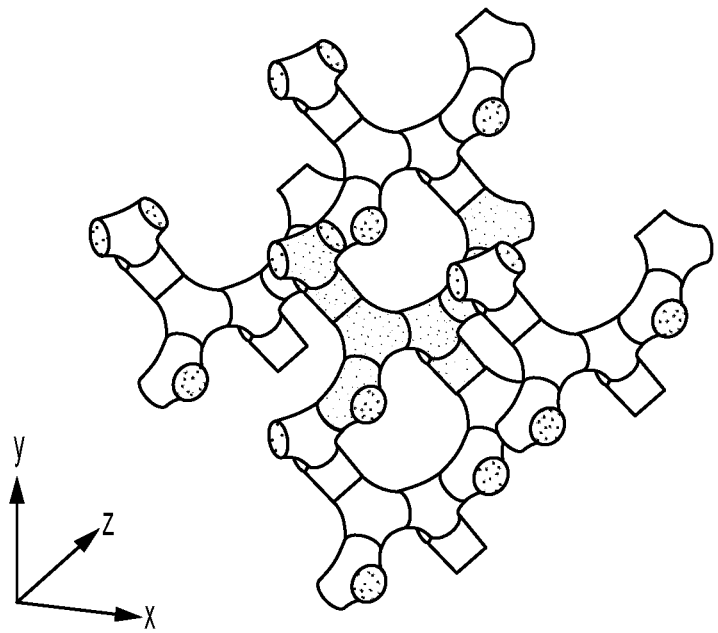
Figure 33D:
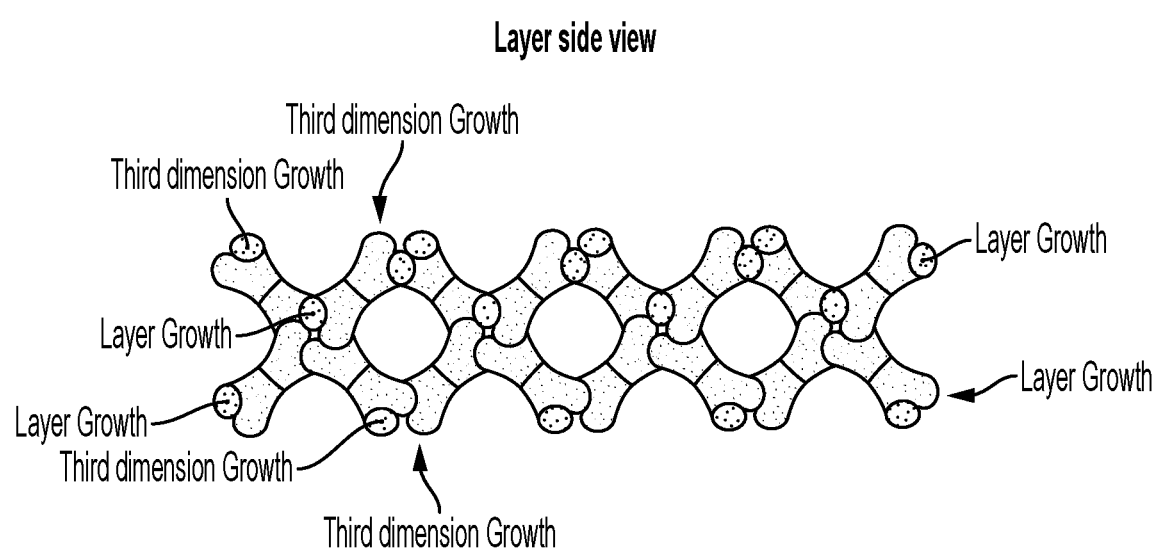
Figure 33E:
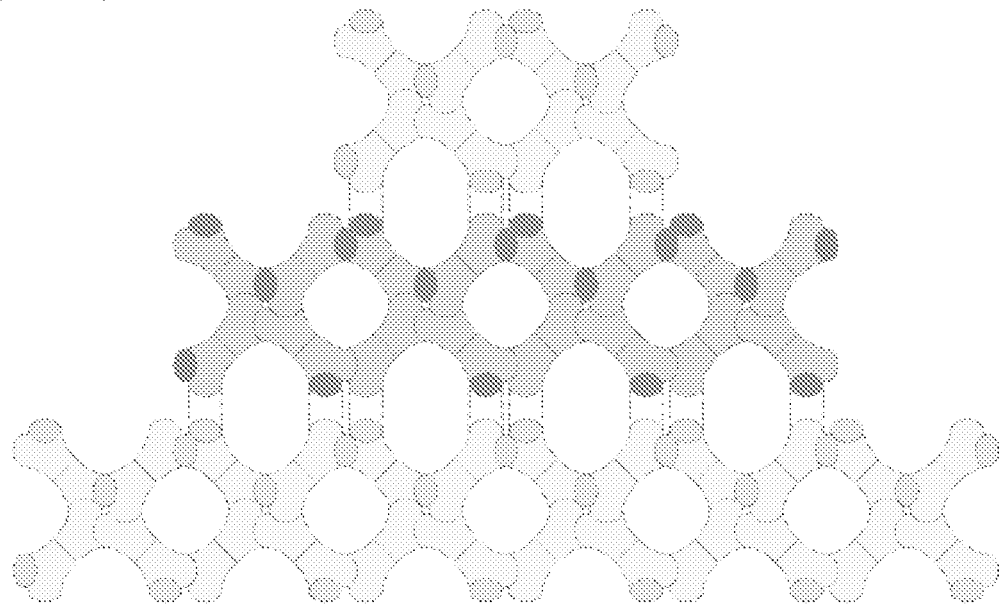
Figure 33F:
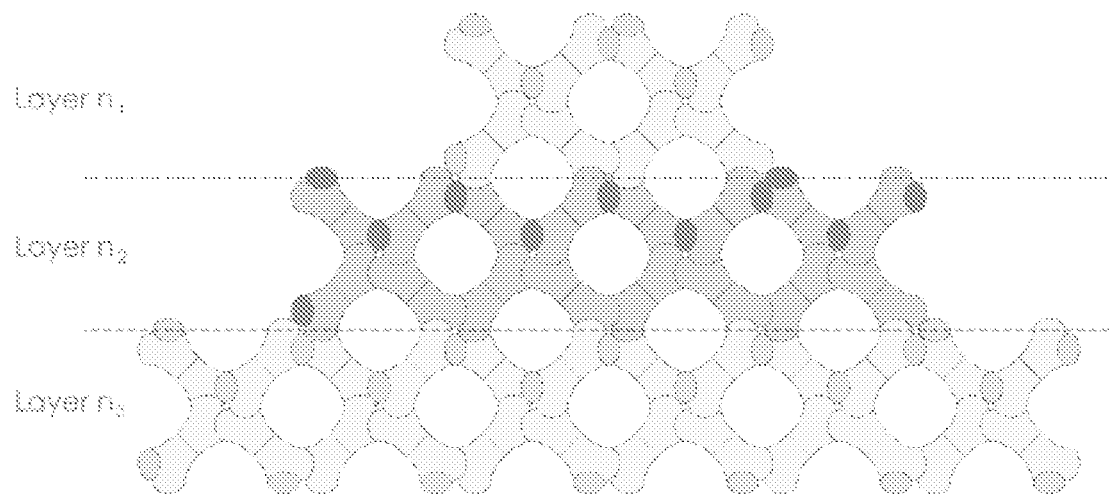

Referring to FIG. 32, a block diagram is shown depicting an example machine that includes at least one processor 3200 (e.g., a processing or computing system) within which a set of instructions can execute for causing a device to perform or execute any one or more of the aspects and/or methodologies for static code scheduling of the present disclosure.

Processing device 3200 may include one or more processors 3201, a memory 3203, and a storage 3208 that communicate with each other, and with other components, via a bus 3240. The bus 3240 may also link a display 3232, one or more input devices 3233 (which may, for example, include a keypad, a keyboard, a mouse, a stylus, etc.), one or more output devices 3234, one or more storage devices 3235, and various tangible storage media 3236. All of these elements may interface directly or via one or more interfaces or adaptors to the bus 3240. For instance, the various tangible storage media 3236 can interface with the bus 3240 via storage medium interface 3226. Processing device 3200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processing device 3200 includes one or more processor(s) 3201 (e.g., central processing units (CPUs), general purpose graphics processing units (GPGPUs), or quantum processing units (QPUs)) that carry out functions. Processor(s) 3201 optionally contains a cache memory unit 3202 for temporary local storage of instructions, data, or computer addresses. Processor(s) 3201 are configured to assist in execution of computer-readable instructions. Processing device 3200 may provide functionality for the components depicted in FIG. 32 as a result of the processor(s) 3201 executing non-transitory, processor-executable instructions embodied in one or more tangible computer-readable storage media, such as memory 3203, storage 3208, storage devices 3235, and/or storage medium 3236. The computer-readable media may store software that may implement the method of the present disclosure, and processor(s) 3201 may execute the software. Memory 3203 may read the software from one or more other computer-readable media (such as mass storage device(s) 3235, 3236) or from one or more other sources through a suitable interface, such as network interface 3220. The software may cause processor(s) 3201 to carry out one or more processes or one or more steps of one or more processes described or illustrated herein. Carrying out such processes or steps may include defining data structures stored in memory 3203 and modifying the data structures as directed by the software.

The memory 3203 may include various components (e.g., machine readable media) including, but not limited to, a random access memory component (e.g., RAM 3204) (e.g., static RAM (SRAM), dynamic RAM (DRAM), ferroelectric random access memory (FRAM), phase-change random access memory (PRAM), etc.), a read-only memory component (e.g., ROM 3205), and any combinations thereof. ROM 3205 may act to communicate data and instructions unidirectionally to processor(s) 3201, and RAM 3204 may act to communicate data and instructions bidirectionally with processor(s) 3201. ROM 3205 and RAM 3204 may include any suitable tangible computer-readable media described below. In one example, a basic input/output system 3206 (BIOS), including basic routines that help to transfer information between elements within processing device 3200, such as during start-up, may be stored in the memory 3203.

Fixed storage 3208 is connected bidirectionally to processor(s) 3201, optionally through storage control unit 3207. Fixed storage 3208 provides additional data storage capacity and may also include any suitable tangible computer-readable media described herein. Storage 3208 may be used to store operating system 3209, executable(s) 3210, data 3211, applications 3212 (application programs), and the like. Storage 3208 can also include an optical disk drive, a solid-state memory device (e.g., flash-based systems), or a combination of any of the above. Information in storage 3208 may, in appropriate cases, be incorporated as virtual memory in memory 3203.

In one example, storage device(s) 3235 may be removably interfaced with processing device 3200 (e.g., via an external port connector (not shown)) via a storage device interface 3225. Particularly, storage device(s) 3235 and an associated machine-readable medium may provide non-volatile and/or volatile storage of machine-readable instructions, data structures, program modules, and/or other data for the processing device 3200. In one example, software may reside, completely or partially, within a machine-readable medium on storage device(s) 3235. In another example, software may reside, completely or partially, within processor(s) 3201.

Bus 3240 connects a wide variety of subsystems. Herein, reference to a bus may encompass one or more digital signal lines serving a common function, where appropriate. Bus 3240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processing device 3200 may also include an input device 3233. In one example, a user of processing device 3200 may enter commands and/or other information into processing device 3200 via input device(s) 3233. Examples of an input device(s) 3233 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some examples, the input device is a Kinect, Leap Motion, or the like. Input device(s) 3233 may be interfaced to bus 3240 via any of a variety of input interfaces 3223 (e.g., input interface 3223) including, but not limited to, serial, parallel, game port, USB, FIREWIRE, THUNDERBOLT, or any combination of the above.

In some examples, when Processing device 3200 is connected to network 3230, processing device 3200 may communicate with other devices, specifically mobile devices and enterprise systems, distributed computing systems, cloud storage systems, cloud computing systems, and the like, connected to network 3230. Communications to and from processing device 3200 may be sent through network interface 3220. For example, network interface 3220 may receive incoming communications (such as requests or responses from other devices) in the form of one or more packets (such as Internet Protocol (IP) packets) from network 3230, and processing device 3200 may store the incoming communications in memory 3203 for processing. Processing device 3200 may similarly store outgoing communications (such as requests or responses to other devices) in the form of one or more packets in memory 3203 and communicated to network 3230 from network interface 3220. Processor(s) 3201 may access these communication packets stored in memory 3203 for processing.

Examples of the network interface 3220 include, but are not limited to, a network interface card, a modem, and any combination thereof. Examples of a network 3230 or network segment 3230 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 3230, may employ a wired and/or a wireless mode of communication. In general, any network topology may be used.

Information and data can be displayed through a display 3232. Examples of a display 3232 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 3232 can interface to the processor(s) 3201, memory 3203, and fixed storage 3208, as well as other devices, such as input device(s) 3233, via the bus 3240. The display 3232 is linked to the bus 3240 via a video interface 3222, and transport of data between the display 3232 and the bus 3240 can be controlled via the graphics control 3221. In some examples, the display is a video projector. In some examples, the display is a head-mounted display (HMD) such as a VR headset. In some examples, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In some examples, the display is a combination of devices such as those disclosed herein.

In addition to a display 3232, processing device 3200 may include one or more other peripheral output devices 3234 including, but not limited to, an audio speaker, a printer, a storage device, and any combinations thereof. Such peripheral output devices may be connected to the bus 3240 via an output interface 3224. Examples of an output interface 3224 include, but are not limited to, a serial port, a parallel connection, a USB port, a FIREWIRE port, a THUNDERBOLT port, and any combinations thereof.

In addition, or as an alternative, processing device 3200 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable processing devices include, by way of non-limiting examples, server computers, desktop computers, laptop computers, notebook computers, sub-notebook computers, netbook computers, netpad computers, handheld computers, Internet appliances, mobile smartphones, and tablet computers.

In some embodiments, the processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some examples, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer-Readable Storage Medium

In some examples, the platforms, systems, media, and methods disclosed herein include one or more non-transitory computer-readable storage media encoded with a program including instructions executable by the operating system of an optionally networked computing device. In some examples, a computer-readable storage medium is a tangible component of a computing device. In some examples, a computer-readable storage medium is optionally removable from a computing device. In some examples, a computer-readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Executable Instructions

In some examples, the platforms, systems, media, and methods disclosed herein include at least one set of executable instructions (e.g., a computer program, a computer application), or use of the same. A computer program includes a sequence of instructions, executable by one or more processor(s) of the computing device's CPU, written to perform a specified task. Computer-readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer-readable instructions may be combined or distributed as desired in various environments. In some examples, a computer program may comprise one sequence of instructions. In some examples, a computer program comprises a plurality of sequences of instructions. In some examples, a computer program may be provided from one location. In some examples, a computer program may be provided from a plurality of locations. In some examples, a computer program includes one or more software modules. In some examples, a computer program may include, in part or in whole, one or more web applications, one or more mobile applications, one or more stand-alone applications, one or more web browser plug-ins, extensions, add-ins, or add-ons, or combinations thereof. The functionality of the computer-readable instructions may comprise methods of constructing a space using a plurality of minimodules and methods of building structures such as bioreactors as described in further detail elsewhere herein.

Web Application

In some examples, a computer program includes a web application. In light of the disclosure provided herein, those of skill in the art will recognize that a web application, in some examples, utilizes one or more software frameworks and one or more database systems. In some examples, a web application is created upon a software framework such as Microsoft® .NET or Ruby on Rails (RoR). In some examples, a web application utilizes one or more database systems including, by way of non-limiting examples, relational, non-relational, object oriented, associative, XML, and document-oriented database systems. In some examples, suitable relational database systems include, by way of non-limiting examples, Microsoft® SQL Server, mySQL™, and Oracle®. Those of skill in the art will also recognize that a web application, in some examples, may be written in one or more versions of one or more languages. A web application may be written in one or more markup languages, presentation definition languages, client-side scripting languages, server-side coding languages, database query languages, or combinations thereof. In some examples, a web application is written to some extent in a markup language such as Hypertext Markup Language (HTML), Extensible Hypertext Markup Language (XHTML), or eXtensible Markup Language (XML). In some examples, a web application is written to some extent in a presentation definition language such as Cascading Style Sheets (CSS). In some examples, a web application is written to some extent in a client-side scripting language such as Asynchronous JavaScript and XML (AJAX), Flash® ActionScript, JavaScript, or Silverlight®. In some examples, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some examples, a web application is written to some extent in a database query language such as Structured Query Language (SQL). In some examples, a web application integrates enterprise server products such as IBM® Lotus Domino®. In some examples, a web application includes a media player element. In various further examples, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some examples, a computer program includes a mobile application provided to a mobile computing device. In some examples, the mobile application is provided to a mobile computing device at the time it is manufactured. In some examples, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, and Samsung® Apps.

Standalone Application

In some examples, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some examples, a computer program includes one or more executable complied applications.

Software Modules

In some examples, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In some examples, a software module comprises a file, a section of code, a programming object, a programming structure, or combinations thereof. In further various examples, a software module comprises a plurality of files, a plurality of sections of code, a plurality of programming objects, a plurality of programming structures, or combinations thereof. In some examples, the one or more software modules comprise, by way of non-limiting examples, a web application, a mobile application, and a standalone application. In some examples, software modules are in one computer program or application. In some examples, software modules are in more than one computer program or application. In some examples, software modules are hosted on one machine. In some examples, software modules are hosted on more than one machine. In some examples, software modules are hosted on a distributed computing platform such as a cloud computing platform. In some examples, software modules are hosted on one or more machines in one location. In other examples, software modules are hosted on one or more machines in more than one location.

Databases

In some examples, the platforms, systems, media, and methods disclosed herein include one or more databases, or use of the same. In view of the disclosure provided herein, those of skill in the art will recognize that many databases are suitable for storage and retrieval of procedural object, 3D scene, signed distance function, rendering, printing, and 3D object information. In some examples, suitable databases include, by way of non-limiting examples, relational databases, non-relational databases, object oriented databases, object databases, entity-relationship model databases, associative databases, XML databases, and document oriented databases. Further non-limiting examples include SQL, PostgreSQL, MySQL, Oracle, DB2, Sybase, and MongoDB. In some examples, a database is Internet-based. In some examples, a database is web-based. In some examples, a database is cloud computing-based. In a particular embodiment, a database is a distributed database. In some examples, a database is based on one or more local computer storage devices.

Bioreactors and Method of Fabrication of Bioreactors

The devices and systems provided herein, such as the device and systems for 3D printing may be used to construct a multi-dimensional (e.g., 3D) structure of any shape or any kind which may perform any function. In some examples, the methods and systems provided herein may be used to make bioreactors. Provided herein are also such bioreactors, their structures, designs, morphologies, applications, and their method of manufacturing and methods of use.

In some examples, provided herein are reaction vessels such as bioreactors and methods of manufacturing of such reaction vessels. In some examples, provided are systems comprising a reaction vessel. The reaction vessel may comprise or be a reactor. The reaction vessel and/or reactor may be configured to perform any suitable reaction or process. In some examples, the reactor may perform a chemical reaction to generate a chemical. In some examples, the reactor may synthesize a biological material. A biological material may comprise or be a cell, a component of a cell, such as organelles, nucleus, DNA, any intracellular component or material, and/or any combination thereof. In some examples, the reaction vessel or reactor may comprise or be a bioreactor. The systems comprising a bioreactor may be similar to the systems provided in Application number PCT/US19/55231 which is incorporated by reference herein in its entirety for all purposes.

The method of generating a reaction vessel such as a bioreactor may comprise providing a procedural modeling application. The procedural modeling application may be according to a procedural modeling application provided elsewhere herein, other applications, or any combination thereof. In some examples, the method of generating a reaction vessel such as a bioreactor may comprise performing a function. The application may be configured to perform a function upon a request or input from a user or independent of a user. For example, performing a function using the procedural modeling application may comprise artificial intelligence (AI) and/or machine learning implications. In some examples, performing a function may comprise adding a plurality of units to a scene. Units may be according to any units provided elsewhere herein. In some examples, a unit may comprise a module or a minimodule. For example, a minimodule may be added to a scene. The scene may be any scene described elsewhere herein. In some examples, the scene may be a 3D scene. For example, a minimodule may be added to a 3D scene.

In some examples, the method of generating a reaction vessel such as a bioreactor, for example using a procedural modeling application may further comprise assembling the plurality of units (e.g., minimodules) into a structure to create the reaction vessel or reactor (e.g., bioreactor). The method may further comprise creating a constructive solid geometry (CSG) tree for the scene, representing the scene (e.g., 3D scene) as signed distance function, rendering the scene by utilizing ray marching, generating a queue of slice files, and transmitting the slice files to a stereolithographic 3D printing device or another device. The device (e.g., a 3D printing device or system) may comprise or be any device or system provided elsewhere herein, another device, and/or any combination thereof.

Provided herein are reaction vessels such as bioreactors which may be made and used according to the methods of the present disclosure. In some examples, the reaction vessel (e.g., bioreactors) provided herein may comprise or be systems, components for producing and maintaining cells and for producing and isolating cells and products made by cells. Provided herein are also methods of making and using such systems. The systems and components, and methods may provide flexibility to tailor production for different types of cells, types of cellular environments, and types of molecules produced. The systems, components and their methods of manufacture and use may also provide flexibility of scale. For example, the systems, components, and methods described herein may provide for production scale-up without the altering or significantly altering bench-scale growth conditions.

In some examples, the bioreactors provided herein may be used for growing cells. The bioreactors may comprise any size or scale. In some examples, the bioreactors may be on a microbioreactor scale, such that the system can be constructed as a benchtop bioreactor with a capacity to grow and produce cells and/or cell products in both small and large amounts. This system and methods of use are advantageous in their scalability, flexibility, and conservation of resources.

In some examples, the bioreactors provided herein may be bubble-free bioreactors. In some cases, a process conducted in a reactor or bioreactor may benefit from or may need a procedure for homogenizing the media inside the reactor. In some cases, a mixing or an equivalent to mixing may be needed or beneficial to homogenize the contents of the reactor in given areas. Traditionally, in some cases, in conventional reactors, mixing approaches such as propellers or bubbles are used to provide homogenization in the reactor. Such mixing may create turbulence inside the bioreactor which may perform the homogenization and may increase the rate of mass transfer, heat transfer, and fluid transfer in the internal regions of the reactor. However, in many cases, turbulence may not be suitable or optimal. A turbulent flow inside a reactor may make it more difficult to control the conditions precisely. Therefore, in some cases, avoiding mixing, bubbles, and/or propellers may be beneficial. Provided herein are bioreactors which may in some cases be capable of and/or configured to perform their functions with no essential need for a propeller or gas or a method of mixing that may create turbulence inside the bioreactor. For example, bubbles and turbulent flows can be avoided inside the bioreactor. In some examples, the bioreactors provided herein comprise a laminar flow therein throughout the process (e.g., a process or reaction performed by the bioreactor such as cell growth). The internal and external structures, topologies, and characteristics provided elsewhere herein may make it possible to manufacture and use a bioreactor that can perform its intended function with a laminar flow and may not need bubbles or turbulence for homogenization. In some examples, a homogenized laminar flow of gas and/or liquid flow may be provided in the reactor.

In some examples, the reaction vessel (e.g., bioreactor) may comprise interconnected bioreactor components, such as modules or micromodules which may individually or combinatorially perform a process or reaction, such as to produce or grow cells or perform other functions. The cells may be any kind of cells. Examples of cells may comprise bacterial cells, fungal cells, yeast cells, eukaryotic cells, plant cells, or algal cells. The cells may be recombinant cells.

In some examples, the reaction vessel or bioreactor may comprise or be a production bioreactor module or a production layer (e.g., production layer 4694 shown in FIG. 47). The production bioreactor or the production layer 4696 of the bioreactor may provide an environment for scaled-up growth and production of cells and/or bioproduct from cells or other biological species.

A reaction vessel provided herein, such as a bioreactor (e.g., bioreactor 4700 or any other bioreactor provided elsewhere herein), may comprise a multi-dimensional structure such as a 3D structure which may comprise one or more (e.g., multiple) minimodules. The bioreactor may include greater than or equal to 1, 2, 4, 6, 8, 10, or more minimodules, including increments therein. The minimodules may create one or more (e.g., a series) of channels and chambers for the growth and movement of cells and for the flow of liquid media, gasses and bioproduct.

The minimodules of the production bioreactor can comprise a shape, such as a geometric shape. Such geometric shapes may comprise a gyroid. A gyroid may comprise or be implemented in a variety of shapes and/or structures. In some examples, shapes and/or structures may comprise crystallographic structures.

In some examples, a minimodule may comprise a shape such as double gyroid, modified double gyroid, or any shaped that may be described as a triply periodic minimal surface (TPMS), This type of surface may form a lattice system that can grow in any direction or across any dimension of any coordinate system. For example, the lattice may grow on one or more axes of a Cartesian coordinate system, such as X, Y, and/or Z. In some examples, the growth may occur periodically.

In some cases, TPMS may be free of self-intersections and may divide a given volume into two (or more) independent sub-volumes. A self-intersection may comprise a surface with a single normal vector per point which may define the surface. If the surface divides the volume in which it is circumscribed into two independent and congruent sub volumes, this surface is called a balanced surface. In some examples, TPMS may be described in terms of a fundamental patch or asymmetric unit from which the entire surface may be built up by its symmetry elements.

In some examples, the minimodules may be fluidically connected (e.g., interconnected) with one another such that gasses, media, and/or byproduct can flow from one minimodule to another minimodule.

In some examples, the minimodules of the production bioreactor may comprise a shape. The shape may be any shape, such as any geometric representation. The shapes of the minimodules may be provided elsewhere herein, such as in Table 1.1. In some cases, the shapes may further comprise a modification or transition. For example, the modification may be to the shape of the minimodule, to its connections, and/or both. The modification or transition in the shape may be minor or major. The modification or transition may adapt the structure or shape (e.g., of the minimodule) to a given macrostructure or function. In some examples, modifications may comprise blocking of a portion of the connections or intersections (e.g., 'mouths'), modifying the diameter of the one or more channels of the structure, or complete or other changes in the shape.

In an example, a shape of the minimodules of a bioreactor may comprise or be a double-gyroid shape or a modified double-gyroid shape. A double gyroid (DG) shape may comprise two gyroids and/or two intergrown nonoverlapping domains. A modified double gyroid (DG) shape may include two intergrown nonoverlapping domains, which may be bounded by two constant-mean-curvature (CMC) surfaces separated by a matrix phase. For example, a modified double gyroid structure may comprise modifications to the connections of a non-modified double gyroid in order to adapt the structure to a given macrostructure or function. The modifications may be minor or major. In some examples, modifications may comprise blocking of a portion of the connections or intersections (e.g., 'mouths'), modifying the diameter of one or both phase channels of the structure, or complete or partial elimination of any of the phase channels present in the shape a DG structure. A DG or modified DG may include a first gyroid structure intertwined with a second gyroid structure. The two channels may be separated by a porous membrane (matrix phase). The matrix phase can diffuse gas molecules in a manner that may be based at least in part on a specific pressure and gas composition. When both liquid and gaseous components microchannel radius are equal, the matrix phase surface can be equal to the sum of these. The two CMC surfaces may create two continuous channels when multiple DG's are interconnected (e.g., fitted together). These two channels may create two nonoverlapping channels for the flow of liquid media and/or gas. The porous membrane may provide a surface on which certain cell types can adhere and grow. In some examples, one channel may provide liquid media throughout the production bioreactor. In some examples, both channels may provide liquid. In some examples, one channel may provide liquid media and the other channel may provide gas to the production bioreactor. In some examples, the diameter of the microchannel of the minimodules can vary as suitable for specific cell types, production needs and characteristics and the like.

In some examples, the minimodules can have a regular cubic wrap structure having a length "L" of its edge. L can be related to the sweeping diameter. In some examples, L may be equal to the two thirds of the sweeping diameter of a microchannel, times the square root of two, times the square root of three. The total surface and volume of the microchannels corresponding to the liquid component can be equal to the corresponding dimensions of gaseous component if the radius of both components is the same within a minimodules. In some examples, the radius of the components can be different. In some examples when both radii are equal, the microchannel radius may not be greater than 0.7 times the sweeping radius. In some cases, the shortest distance between two minimodules of two different faces may be substantially equal to the sweeping radius times the square root of two, minus the addition of each component channel radius.

In some examples, the area of the first channel with a DG shape may be equivalent to the area of the second channel within a DG, and the area of the matrix phase may be the sum of the area of the first channel and the area of the second channel.

In some examples, for example in the DG shape, the distance between the matrix phase separating the channels and the center of each channel may be a constant.

The rate at which media and gas flow through the production layer (e.g., production layer 4696 or any other production layer, production layer, or production bioreactor provided anywhere herein) in a bioreactor of any shape (e.g., a bioreactor with a DG shape or another shape provided elsewhere herein) can be determined by a variety of factors such as the selected cell type and cell density, as well as stress conditions to be generated on the cells. The rate of gas diffusion through the matrix into the liquid media may be determined by a variety of factors such as gas composition and the pressure of gas in the gas channel formed by the structures as well as the membrane thickness and the material selected for manufacturing the channels and surrounding areas. The gas flow rate and working pressure may be related to culture cell density. In some examples, the gas flow may be equal to the gaseous component volume per minute. In some examples, the gas flow may be greater than or equal to about 2, 3, 5, or 10 times the gaseous component volume per minute. In some examples, the working pressure may vary from about 1 atmosphere (atm) to 5 atm. In some examples, the working pressure may be greater than or equal to about 1 atm, 2 atm, 3 atm, 4 atm, 5 atm, or more.

A shape of the minimodule of a bioreactor may be configured to provide given characteristics. Each shape may comprise examples advantages. For example, an example advantage of the DG shape may be the mitigation of gravitational forces that may, in other structures, provide an uneven exposure to media and for gas exchange. The DG shape may create a three-dimensional (3D) laminar forces such that the variation in distance of any one cell to a structural wall may be averaged out to provide a more constant and even exposure among the cell population. Additionally, the DG shape may contribute to avoiding stagnant areas of liquid or gas, where flow may not occur or may be interrupted. This may allow for the use of higher throughput through the bioreactor with lower velocities and may result in a lower sheer stress on the cells. This may avoid turbulence in the bioreactor. This may make it possible to achieve homogenization while using a laminar flow in the bioreactor.

In some examples, the average fluid velocity a channel of the bioreactor (e.g., a DG bioreactor) may be greater than or equal to about 1 μm/second, 3 μm/second, 5 μm/second, 10 μm/second, 15 μm/second, 20 μm/second, 50 μm/second, 100 μm/second, 200 μm/second, or more. For example, the DG structures may provide a suitable and optimized diffusion of media and gases as compared to some other bioreactor systems. In some examples, the velocity of the liquid media flowing through the channel within a DG may be greater than the free fall velocity of the cell flowing through the same channel.

The DG structures of the minimodules may provide an increased surface area over many other shape options, and this increased surface area may provide surface area for cell growth as well as improvements in liquid media flow, mixing and gas exchange. When L equals L1, the surface of each component can be described as $Y=3258.6 \cdot X E(-1)$, where Y is square millimeters/microliter and X equals the radius defined by L1.

In some examples, the minimodules structures of the bioreactor (e.g., DG structures or structures comprising any shape provided elsewhere herein) may be fitted together into a macrostructure or macroshape that makes up the production bioreactor. The macrostructure or macroshape may comprise any shape, any geometry, any geometric representation, any size, and/or any combination thereof. In some examples, the macrostructure may be a cube, a pyramid, sphere, a cylinder, a multi-dimensional geometric shape, and/or any combination thereof. As an example, the macrostructure may be a hollow pyramid, a lamella pyramid, a chessboard arrangement, a log, a sphere, or a different shape.

In some examples, the macrostructure and the shape and the number of minimodules within the production bioreactor can be tailored to various factors such as cell division rate of the cells to be grown, regulating the velocities of liquid media, gas exchange, cell movement through the bioreactor, and other factors. Each macrostructure can provide different possibilities to interact with cells, and it may be chosen given the specific process the production bioreactor is intended to perform.

An example bioreactor may comprise a macrostructure shape. For example, a plurality of minimodules may be assembled to make a macrostructure. The macrostructure may have various shapes. A macrostructure may be a sphere, a pyramid, a hollow pyramid, a lamella, or another shape, structure or topology, such as the macrostructure shapes and/or topologies provided elsewhere herein.

In some examples, a reactor may comprise a pyramid or a hollow pyramid macrostructure shape. Such structure may enable a suitable environment for growth while keeping constant velocities and cell density throughout the bioreactor. More sensitive strains may require more interventions over time, in which case hollow pyramids may provide that capacity.

In some examples, a bioreactor may comprise a Lamella pyramid macrostructure shape. Such macrostructure shape may enable a suitable environment for growth and development, such as by keeping both velocity and density consistent (e.g., substantially constant). In some cases, suitable access to a subset of cells, or in some cases, to each cell may be provided for a given duration of time, in some cases, at each moment in time. The Lamella pyramid microstructure may also enable direct intervention and treatment.

In an example, a bioreactor may comprise a chessboard macrostructure shape or a log arrangement shape. The chessboard and log arrangements may provide a suitable access (e.g., in some cases, complete access) to a subset of the cells, in some cases, to every cell of the bioreactor for a given duration of time, in some cases at every point in time of the process. In some examples, the chessboard and/or log arrangements may provide or facilitate control over homogenous velocity and/or density of the fluid and/or the cells in the bioreactor. In some examples, the cells may enter at a given point or location in the bioreactor (e.g., at the top of the macrostructure) and a cell collection device may be present in a given location in the bioreactor (e.g., at the base of the macrostructure).

In an example, a bioreactor may comprise a spherical macrostructure shape. An example of a spherical bioreactor 4700 is shown in FIG. 47. The spherical bioreactor may be a bubble-free spherical bioreactor. For example, the bioreactor may be manufactured using the methods of the present disclosure and the bioreactor may comprise minimal bubbles to substantially no bubbles. In some cases, some bubbles may exist in the bioreactor. In some examples, a spherical bioreactor 4700 may comprise a number of planes of symmetry (symmetry planes). For example, the bioreactor may comprise one or more units which may repeat to construct the structure of the bioreactor. As an example, the spherical bioreactor shown 4700 comprises three symmetry planes (e.g., plane 4740, 4750, and 4760). The symmetry planes may divide the structure of the spherical bioreactor into a number of repeating units (e.g., eight repeating units in this example). The repeating units may be similar or substantially identical to each other. For example, in the spherical bioreactor 4700, a repeating unit may be one eight of sphere. An example of such repeating unit 4698 is shown in FIG. 46A. The repeating unit 4698 may form one eighth of the volume of the bioreactor 4700. Stated a different way, 8 repeating units which may be, at least to some extent similar to the repeating unit 4698 may repeat (e.g., symmetrically in volume) to form the spherical bioreactor 4700. In some examples, the repeating units may be completely similar or identical. In some examples, the repeating units may be to some extent similar. In some examples, the repeating units may be to some extent different and may comprise some differences compared to one another. A similar concept and/or approach may be used to construct a bioreactor with a different macrostructure shape and/or topology.

The bioreactor (e.g., a spherical bioreactor) may comprise one or more channels. The channels of the bioreactor may comprise one or more harvesting exhaust channels 4710 which may be used for harvesting the cells. The channels of the bioreactor may comprise one or more gas intake channels 4720. The gas intake channels may be used to infuse gas into the bioreactor, such as to a gas chamber (e.g., 4620 or 4840). The channels may comprise one or more liquid (e.g., culture medium) intake channels 4730 which may be used to inject a liquid supply, such as growth media into the bioreactor. Providing liquid supply may be according to the methods and systems provided anywhere herein for any bioreactor macrostructure. In each structure or configurations, the entire system may be optimized, and adjustments may be made as suitable.

In some examples, the various gas intake channels 4710 of the bioreactor may be to some extent similar to one another. In some examples, the various gas intake channels of the bioreactor may be to some extent different from one another. For example, gas intake channels, each of which may comprise an opening for injecting gas, may be provided to supply gas into a given region of the bioreactor, which may be at a given distance from the center of the sphere. In some examples, the gas intake channels provided for delivering gas to different regions (e.g., located at a different radial distance from the center of the sphere) of the bioreactor may comprise some similarities and some differences based on their intended application.

Sectional views of an example spherical bioreactor are provided in FIGS. 46A and 46B. FIG. 46A shows a culture media intake channel 4600 which may be used to infuse a liquid supply into the bioreactor. The liquid supply may comprise culture media. The liquid supply may comprise additional components. The liquid supply or media may be according to the supply and media provided elsewhere herein or combinations thereof.

As an example, FIG. 46B shows a sectional view of a section of an example spherical bioreactor according to the methods and systems provided herein. The bioreactor may comprise one or more channels, such as a plurality of channels. The channels may comprise a harvesting channel 4696. In some cases, the harvesting channel may be according to the channels provided elsewhere herein. The bioreactor may further comprise a harvesting layer 4610, one or more gas chambers, one or more culture layers, and other components and/or modules. The harvesting channel and harvesting layer may be used to harvest liquid medium and cells from the bioreactor. In some examples, the bioreactor may further comprise similar harvesting channels for gas (not shown in the figure) to harvest a used gas from the bioreactor. In the example shown in FIG. 46B, the bioreactor comprises a first gas chamber 4620, a fourth culture layer 4630, a second gas chamber 4640, a third culture layer 4650, a third gas chamber 4660, a second culture layer 4670, a fourth gas chamber 4680, a first culture layer 4690, a fifth gas chamber 4692, and other components. A bioreactor provided herein, such as the spherical bioreactor, or any other bioreactor comprising any macrostructure shape may comprise any number of layers, any number of channels, such as any number of culture layers, any number of gas chambers, and/or other components, modules, channels, or chambers, in any configuration and any combination thereof.

The bioreactor (e.g., a spherical bioreactor, such as the bioreactor shown in FIG. 46B) may comprise one or more culture layers and/or one or more production layers or production volumes. The culture layer (e.g., 4630, 4650, 4670, 4690, and/or other culture layers) may be a layer of the bioreactor where cells may be cultured. In some examples, the production volume may be in the culture layer. For example, the culture layer of the bioreactor may comprise a production layer. The production layer may comprise a plurality of channels therein, example of which are shown as production channels 4690. The production channels 4694. The production channels 4690 may be saturated. For example, a large number of channels (e.g., a high density of channels) may be fitted in a relatively small volume. Alternatively, the channels may not be saturated. A sectional view of the production channels 4695 is shown in FIG. 46B as an example.

A bioreactor comprising a macrostructure of a given shape, such as any macrostructure shape provided elsewhere herein, for example, a pyramid, a hollow pyramid, a chessboard, a log, a sphere, a cube, a cylindrical, or any other macrostructure provided herein may comprise a plurality of minimodules which may be assembled to make the macrostructure. The arrangement of the minimodules (e.g., a DG minimodule or a minimodule of any shape, e.g., any minimodule provided anywhere herein) into a macrostructure may provide a mechanism for determining and optimizing liquid media and gas flow within the bioreactor. In some examples, the macrostructure is comprised of layers or levels of the minimodules. In some examples, the minimodules may be arranged in levels or layers and the velocity of liquid media in each level may substantially the same. Alternatively, or in addition, the velocity of the liquid media in each level or layer may vary. For example, the velocity of the liquid media may increase or decrease between levels or layers. The velocity of the liquid media may vary from minimodule to minimodule or may be substantially the same between or across minimodules.

In some examples, the bioreactor (e.g., production bioreactor or a production volume or layer of a bioreactor) may further comprise a liquid media input device. The liquid media device may be structured to provide liquid media to each level of minimodules within the macrostructure. In some examples, the volume of liquid media provided to each level may maintain a substantially constant cell density in each of the levels.

The bioreactor may comprise one or more microchannels. The microchannels may comprise various sizes. In some cases, the microchannel radius may be linked to the radius of the cells, cell density or to other parameters (e.g., filamentous arrangements, chain arrange, etc.). In some examples, cell density can vary from $1 \times 10^6$ cells/ml to $1 \times 10^{12}$ cells/ml. In some examples, the velocity of the liquid media through each minimodule may be determined by the cell division rate such that the time for a cell to traverse a single minimodule or level of minimodules may be substantially the same as the cell division rate or may be proportional to the cell division rate, such that a cell may divide greater than or equal to 1, 2, 3, 4, 5, or more than 5 times during the transit. In some examples, a first level may comprise an example volume "x" of liquid media such that with a given number of cells, the density in x, and a second level with a 2x volume of liquid media, and in the duration the cells transit from the first level to the second level, the number of cells doubles (e.g., a subset of cells (e.g., each cell) may divide on average one time) so that the density in the second level may remain x (e.g., a constant cell density between the levels).

Additional optimization can be achieved by determining the expected number of cells at the base of the macrostructure, the terminal end of the macrostructure where the cells and/or bioproduct arrive before exiting the structure through the output to a collection container. Expected cell number also can be determined for the different levels of the macrostructure. Based on the expected cell number at the base and different levels, the flow of gas and liquid media can be adjusted for each level to compensate for the increased gas and liquid media requirements as the number of cells increase through cell division, cell movement and cell accumulation as they progress through the bioreactor towards the base of the structure.

Liquid Media Supply in Bioreactors

A bioreactor may comprise one or more components to supply liquid media to the bioreactor or a module thereof. Components can comprise one or more of a culture media formulator, an electroporator or other sterilization device, a reservoir, a pump, a bubble sensor and a bubble trap. The culture media formulator may generate the liquid media for the bioreactor by mixing the components of the media, and water as appropriate for the cells to be grown in the modules. An electroporator can be interconnected to the media generator, for example to clean the media and provide a sterile starting media for supply to the one or modules for growing cells. A bubble sensor and bubble trap can be included to detect and/or remove any gas bubbles in the liquid media which may have been introduced in media generation, cleaning, or for any other reason.

In some examples, the system (e.g., a bioreactor) may comprise one or more reservoirs for holding reserve media, e.g., before supplying it to a module or a minimodule. In some examples, the system (e.g., bioreactor) may comprise at least 2, 3, 4, 6, 8, 10, or more reservoirs, including increments therein. The reservoirs can be filled asynchronously, so that one reservoir fills while another, already fully filled, may be used to supply the bioreactor and/or a module thereof with liquid media. The separation of reservoirs in this manner may be advantageous to isolate the cell growth modules of the system (e.g., bioreactor) from connection to example electrical currents. The reservoir being filled may have any exposure to electrical current that may flow from upstream components such as an electroporator. The filled reservoir may be isolated from electrical current flow such that it may not transmit current to downstream components and modules of the system (e.g., bioreactor). In some examples, the volume of the reservoir may be linked to throughput of the production bioreactor over the division time of cell chosen for the process. In some examples, multiple reservoirs may be installed in parallel and uncoupled from each other. In some examples, multiple reservoirs may be installed in series. In some examples, multiple reservoirs may be installed in a combination of series and parallel configuration, in another configuration, and/or in any combination thereof.

In some examples, the liquid media supply components of the system (e.g., bioreactor system) may further comprise one or more sensors. The sensors can measure parameters including pH and temperature of the media. A sensor may be an in-line sensor or may be connected to a sampling device that samples media intermittently from one ore components of the liquid media supply. The supply system can provide liquid media at a range of rates dependent on the use, scale and operation of the system. In some examples, the liquid media supply can provide from about 100 microliters to about 1000 liters per hour to the bioreactor or a module thereof, such as a chamber for cell growth. In some examples, the liquid media supply may provide from about 0.5 liter to 1000 liters per hour to the bioreactor or a module, channel, or chamber thereof, such as a cell growth chamber. In some examples, the liquid media supply may provide from about 0.5 liter to 5 liters per hour to the bioreactor or a module, component, channel, or chamber thereof. In some examples, the liquid media supply may provide from about 10 liters to 80 liters per hour to the bioreactor or a module, a component, a channel, or a chamber thereof, such as a channel or chamber for cell growth. In some examples, the liquid media supply may provide form about 100 liters to 1000 liters per hour to the bioreactor or a module, a component, a channel, or a chamber thereof, such as a channel or chamber for cell growth.

The liquid media supply components may comprise one or more pumps for flowing media from a reservoir or media formulator to a component of the bioreactor system such as a cell chip, sandbox bioreactor or production bioreactor. In some examples, the system (e.g., the bioreactor system) may comprise greater than or equal to 1, 2, 3, 4, 6, 8, 10, or more pumps, including increments therein. The pumps may be the same type of pump or may be different types of pumps. Example pumps may comprise a syringe pump, a peristaltic pump, and/or a pressure pump.

In some cases, the liquid media supply system may be configured to provide unidirectional flow through a given region, module, component, channel, or chamber of the bioreactor. In some examples, the pump may be a syringe pump that may be used to supply media to the cell chip. The cell chip may be a cell chip or a cell chip module provided elsewhere herein. In some examples, the pump may be a syringe pump that may be used to supply media to the sandbox bioreactor. In some examples, the pump may be a peristaltic pump used to supply media to the production bioreactor. In some examples, the system (e.g., bioreactor system) may comprise three pumps, two syringe pumps, supplying the cell chip and the sandbox reactor and a peristaltic pump supplying the production bioreactor. The pumps may work synchronously or individually. In some examples, all three pumps may work synchronously. The one or more pumps may supply media (e.g., with a high degree volume and rate accuracy) to the bioreactor or a module or component thereof, such as modules downstream of the pumps (e.g., downstream modules) The downstream modules may be according to the downstream modules provided elsewhere herein. In some examples, the accuracy may be within 1, 2, 3, 4 or 5 nanoliters.

Gas Supply and Gas Composition in Bioreactors

In some examples, the systems provided herein (e.g., a bioreactor system) may be compatible for use with cells that may benefit from or need a specific gas composition, such as cells which may need oxygen to grow and/or survive. The materials for use in constructing the bioreactor modules may comprise glass, acrylic, collagen, polydimethylsiloxane (PDMS), poly(ethylene glycol) (PEGDA), Poly(D,L-Lactide), silk, cellulose, GelMA, alginate, ceramic, and/or other biocompatible polymers that may allow for oxygenation of the media. In some examples, the system (e.g., the bioreactor system) may further comprise a controller which may control the diffusion of oxygen and other gas solutions in the bioreactor or a module thereof. In some examples, a gas solution may be formulated out of pure component gases, such as from gas storage tanks or other supply mechanisms, for example to establish a mixture or pure gas solution at various concentrations and flow rates. Alternatively or in addition, the gas mixture may be provided by a purified air mixture. Gas solution can be used to provide an aeration environment and may control pH. The gas solution may provide carbon, nitrogen, phosphorus, sulfur, and/or other media components to the liquid phase. In some examples, the system may have more than one gas controller or mechanism such that different gas solutions can be provided to different modules, components, parts, channels, or chambers within the system (e.g., within a given part of a bioreactor).

In some examples, a flow of gas and/or liquid within the structures of a bioreactor may be along a linear axis, such as a single linear axis. Examples of this may comprise a lamella bioreactor, a hollow pyramid reactor, or a bioreactor comprising another macrostructure. In such examples, in some cases, the flow may be described based on an average displacement in a single axis.

Referring to FIGS. 46A and 46B, In some examples, in a spherical bioreactor, a channel for delivering liquid supply (e.g., channel 4600), a channel for infusing gas (e.g., gas chambers 4620, 4640, 4660, 4680, and 4692), and one or more inoculation channels (not shown) may pass through the production structures (e.g., production volume 4694 which may be inside the culture layers 4630, 4650, 4670, and 4690) to reach the suitable points respectively. The direction and/or rate of liquid and gas supply in a bioreactor may affect the rate of cell or microorganism growth in the bioreactor. For example, channel 4600 in FIG. 46A extend in the direction of a radius of the spherical bioreactor and may act as a liquid supply channel (e.g., a culture media intake channel). In some examples, a channel such as channel 4600 may be used to infuse liquid media such as culture media to different parts (e.g., different layers) of a bioreactor (e.g., spherical bioreactor). The direction of liquid flow 4697 may be an angular direction, such as shown in FIG. 46A. In some examples, the direction of liquid flow may be angular, radial (radial direction of liquid flow is not shown on the figure), and/or a combination of both. The liquid media may flow into the bioreactors, such as in the layers thereof and may deliver culture media to the cells to be grown in the bioreactor (e.g., in the culture layers 4630, 4650, 4670, 4690, and any other culture layer). Liquid media may reach the cells and provide nutrition for them to survive and/or grow. The topology and macrostructure of the bioreactor, as well as the direction and method of liquid and gas infusion and flow inside it may affect the rate of cell growth.

In some examples, the bioreactor, e.g., bioreactor shown in FIGS. 46A, 46B, and/or 47 may comprise one or more inoculation channels (not shown in the figures). In an example, a bioreactor comprises a single inoculation channel. In some cases, the one or more inoculation channels may be used to treat and/or inoculate the cells as needed.

Figure 48:
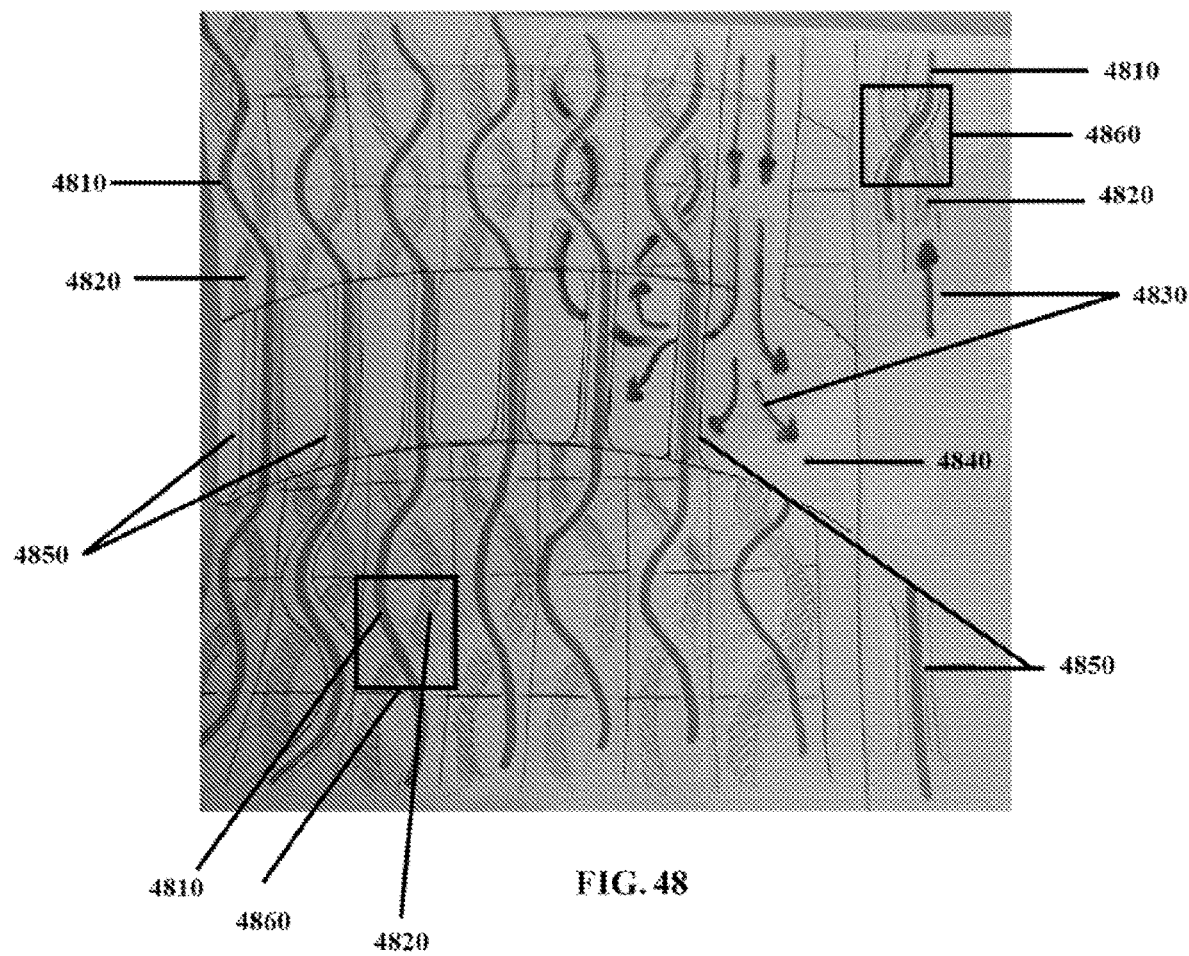
FIG. 48 shows examples of internal minimodules or building blocks of an example bioreactor and internal components such as channels, conduits, and chambers configured for fluid flow in a bioreactor.

FIG. 48 schematically illustrates a view of the channels and chambers inside a bioreactor provided herein and the flow of gas and liquid supply (e.g., culture media, water, nutrients, and more) therein. The bioreactor shown in FIG. 48 may comprise any macrostructure shape and any minimodule shape. In an example, the bioreactor shown in FIG. 48 may be a spherical bioreactor, such as bioreactor 4700 shown in FIG. 47.

Gas (e.g., gas flow 4830) may be injected into the bioreactor through an opening (e.g., an opening of a gas intake channels 4720 shown in FIG. 47) and be subjected to flow gas flow channels 4820. The injected gas may comprise a fresh gas feed with a suitable composition (e.g., according to the gas composition provided elsewhere herein). In some cases, a gas intake channel, or another intake channel which may be substantially similar to the gas intake channels 4720 may be used to exhaust or remove gas from the bioreactor after the gas has passed through certain areas of the bioreactor and may have reached the cells inside the bioreactor.

In some examples, different methods may be used for exhausting gas from the bioreactor. Examples of such approaches may comprise using an outer layer or outer shell around the bioreactor (e.g., a membrane around the bioreactor) which may be exposed to the outside environment. Such outer layer or membrane may be porous and may allow for gas exhaust from the bioreactor. Alternatively or in addition, the bioreactor may comprise a gas harvest layer (not shown) and/or a gas harvest channel (not shown) which may be to some extent similar to and/or to some extent different than the harvesting channel 4690 and harvesting layer 4610. For example, a gas harvest channel may be located in a different region from the harvest channel 4696, it may be configured to have a gas flow therein, and it may be used to exhaust a gas from the bioreactor, after such gas has passed through a subset of regions of the bioreactor. A gas may be exhausted from the bioreactor using any of these approaches. In some cases, similar approach may be applied to a bioreactor other than a spherical bioreactor 4700.

Liquid may be injected into the bioreactor through an opening (e.g., an opening of a liquid intake channel 4730) and be subjected to flow in a liquid flow channel (e.g., liquid flow channel 4810). Liquid may comprise culture medium or a composition listed elsewhere herein which may be supplied to the bioreactor to help grow cells. Liquid may flow through the structures of the bioreactor. Liquid may comprise culture medium. In some cases, liquid may comprise cells suspended therein. Liquid compositions may be according to liquid compositions provided elsewhere herein.

Inside the bioreactor, there may exist a plurality of minimodules. A minimodule may be a minimodule of the bioreactor. A minimodule itself may be constructed of smaller units. In some cases, a plurality of unit cells may assemble to make a minimodule such as minimodule. In some examples, a minimodule (e.g., a minimodule such as building block 4860) may comprise at least a liquid flow channel 4810 and a gas flow channel 4820 into which gas flow (e.g., gas flow 4830) may be injected and subjected to flow. A minimodule (e.g., a building block 4860) may repeat throughout the structure of the bioreactor. Although FIG. 48 illustrates gas and fluid flow in a spherical bioreactor as an example, a similar scheme may be used in other bioreactor topologies and structures.

The bioreactor may further comprise a gas chamber 4840 (e.g., similar to gas chambers 4620, 4640, 4660, 4680, and 4692). The gas chamber 4840 may have any topology and/or structure in an example bioreactor of any shape and/or structure. In a spherical bioreactor 4700, a gas chamber may be a hollow spherical chamber. For example, in some cases, such as shown in FIG. 48, gas flow channels 4820 and liquid flow channels 4810 may not cross or pass through the spherical hollow gas chamber (e.g., 4810). The hollow gas chamber 4840 may accommodate a plurality of culture channels 4850 in which cells or microorganisms may be cultured. In some cases, such as shown in FIG. 48, the culture channels 4850 may be in inside the gas chamber 4840.

Gas flow and liquid flow may flow through their respective channels (e.g., channel 4810 and 4820) in the minimodules (e.g., building blocks 4860), and when such channels reach the gas chamber 4840, gas flow and liquid flow may enter and pass through the culture channels 4850 accommodated in the gas chamber. Therefore, the culture channels 4850 may be provided with both a gas supply and a liquid supply which may help the cells grow and/or survive. In some examples, a channel may be a conduit.

Figure 45:
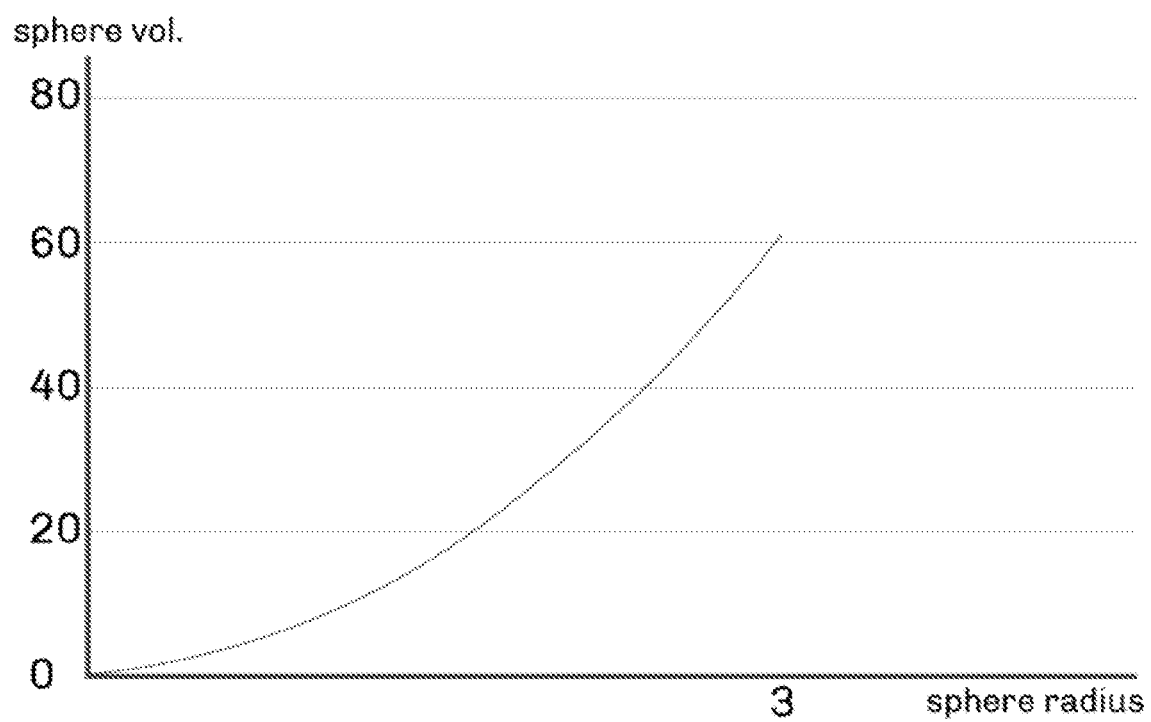
FIG. 45 shows a cubical growth rate of a spherical structure with respect to its radius.

The macrostructure or topology of a bioreactor may be chosen based on the application and the target characteristics of the process (e.g., cell growth). In some cases, a spherical bioreactor may be more suitable than other geometries and may provide some advantages over other bioreactor topologies and/or macrostructure shapes, such as lamella, pyramid, hollow pyramid, or other structures of the bioreactor. An example characteristic of a spherical bioreactor is that the volume of a sphere or the volume of an example shell (the volume between two respective radii of the sphere) in the sphere follows a cubic relationship with respect to its radius (e.g., $V=(4\pi r^3)/3$, where V=volume and r=radius). An example graph representing this is shown in FIG. 45. The volume of bioreactor or a spherical shell thereof may correspond to or comprise a volume in which a cell or a microorganism grows. Therefore, a volume in which the cells grow may increase cubically relative to a linear increase in the radius of the sphere, for example based on a radial distance from the center of the sphere. This may not be the same in a bioreactor comprising a pyramid or lamella structure. This characteristic may be advantageous in that an increased growth trend or rate (e.g., cubic) may have more similarity with the trend of multiplication rate (e.g., natural growth rate) of example microorganisms or cell which may be growing in the bioreactor compared to other bioreactor topologies and structures, and in many cases, this may be beneficial. For example, maintaining a consistent and/or homogeneous pressure, fluid flow, cell growth, and cell concentration may be convenient, efficient, and/or feasible in a spherical bioreactor and suitable conditions for growing cells may be provided. In an example, cell apoptosis as a result of over-populating the cells in a given area may be prevented.

Methods of Use of Bioreactors

Figure 44:
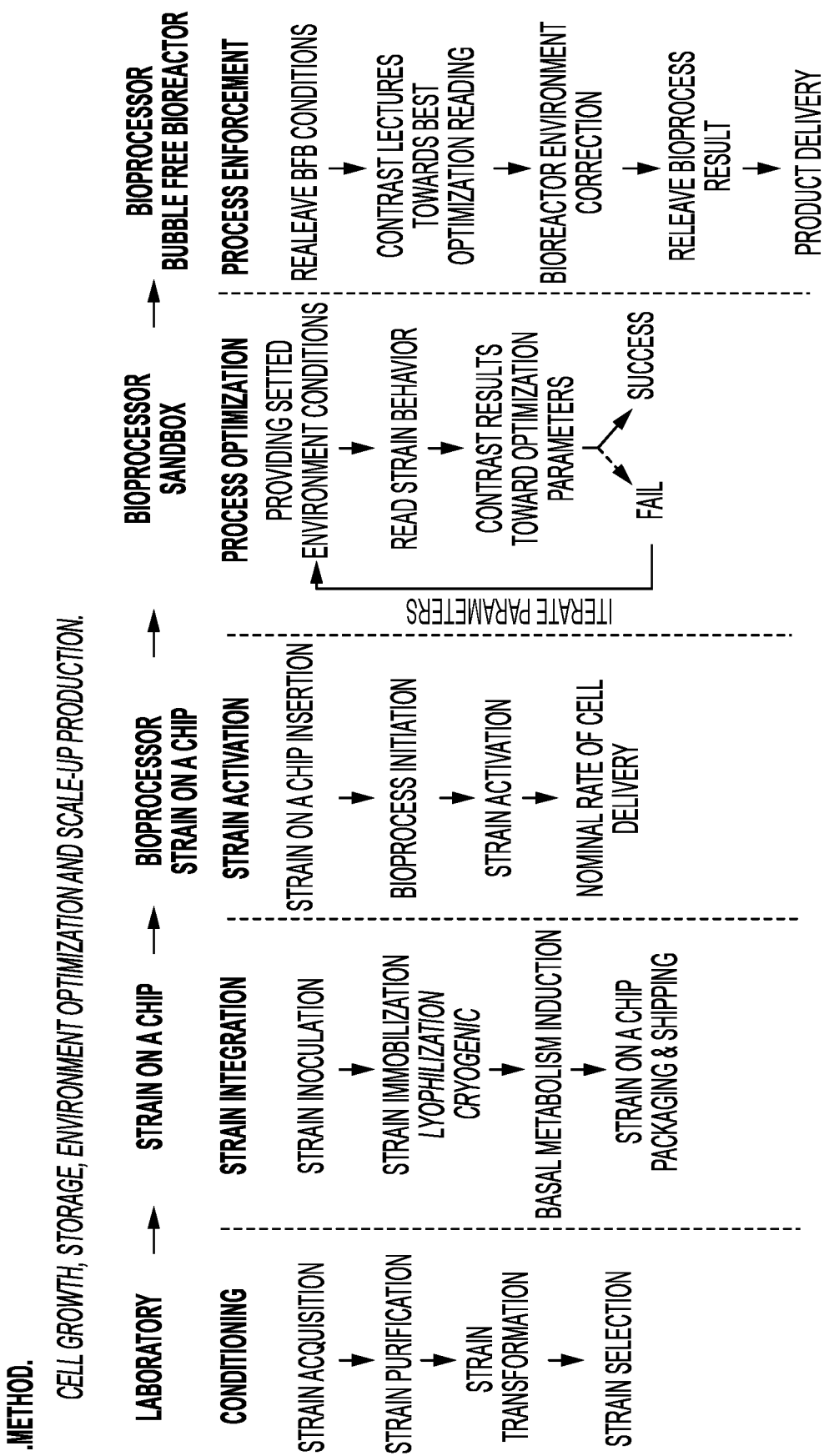
FIG. 44 shows schema for example methods of cell growth, storage, environment optimization and scale-up production.

In some examples, a reaction vessel or bioreactor provided herein may be used to produce or grow cells. FIG. 44 shows an example method for utilizing a reaction vessel or bioreactor provided herein to produce cells. In some cases, the bioreactor may comprise an output channel. In some cases, the cells may be collected through the output channel of the bioreactor or a module thereof. In some examples, the cells may be collected within the bioreactor or a module thereof and may be further stored in the bioreactor or a module thereof, such as storage of cells within a cell chip module of the bioreactor.

In some examples, the bioreactor may be utilized to produce a bioproduct (e.g., from the cells), such as a small molecule, protein, antibody, metabolite or other product produced by the cells grown in the bioreactor. The bioproduct can be collected through the output channel of the bioreactor and separated from the growing cells, such as by diffusion through a porous membrane or by filtration or using another technique. In some examples, the bioproduct may be internal to the cell. To harvest the bioproduct, the cells may be collected and/or lysed, and the bioproduct can then be further purified if/when needed. In some examples, the bioproduct may be secreted from the cells and may be collected without harvesting or lysing the cells.

The bioreactors described herein and systems including such bioreactors have the flexibility to optimize for growth and scale-up of a variety of cell types. In some examples, the bioreactor of the system is a production bioreactor for scaling-up growth of cells, producing a large volume or cells, or growing cells under conditions to produce and harvest a bioproduct in a continuous and/or large-scale manner. In some examples, the system, including a production bioreactor, may comprise one or more additional modules. An example of the additional modules may comprise a cell chip module. In some examples, the system can include a cell chip module utilized for initial growth of cells and/or for storage of cells to provide a particular type of cell(s) to a production bioreactor, where such production bioreactor is then utilized for scaling up growth or production of cells and/or production of a bioproduct. Another example of the additional modules may comprise a sandbox module. In some examples, the system can include a sandbox module (such as in series or in any other configuration) with a production bioreactor module (with or without a cell chip module as part of the system), where such sandbox module is included to test, analyze and/or optimize cell growth conditions prior to scale-up in the bioreactor production module.

Systems including the bioreactors can be utilized to produce a wide variety of cell types and bioproducts. For example, a system includes a bioreactor described elsewhere herein alone or with one or more of a cell chip module and/or a sandbox modules (also referred to herein elsewhere as a sandbox bioreactor) can accommodate production of stem cells and/or other types of cell therapies including autologous and allogeneic productions. The system can accommodate production of stem cells and other types of cell therapies including autologous and allogeneic productions. In some examples, it can be carried out the expansion, gene delivery, or activation of t-cells for personalized chimeric antigen receptor T cell (CAR-T) treatments. In some examples, stem cells can be undifferentiated, grown, and/or differentiated.

In some examples, the cells to be grown in the system may be prokaryotic cells, such as bacterial cells. In some examples, the cells grown may be eukaryotic cells, such as a yeast cell, fungal cell, algae cell, plant cell, avian cell, or mammalian cells. The cells can be free-floating in culture or can be adherent cells, that may adhere to one or more surfaces, such as surfaces within the bioreactor and/or other modules of the system. The cells can be transformed or otherwise engineered to produce a bioproduct such as a heterologous protein, antibody, small molecule, and/or metabolite.

In some examples, the systems, including a bioreactor described herein, can accommodate production of viruses, phages, and/or antigens thereof.

In some examples, the systems, including a bioreactor described herein, can accommodate production of non-naturally occurring organisms, non-naturally occurring viruses, synthetic organisms, and/or xenobots.

In some examples, the systems, devices, and methods described herein may be used at zero gravity or under microgravity conditions such that the cells are grown in a zero gravity or microgravity condition.

Methods and Materials for Constructing Bioreactor Modules

The systems, components and modules herein can be fabricated from a variety of materials and such materials can be tailored depending on the cells grown and cell environments employed. In some examples, components and modules or parts thereof may be fabricated by 3D printing. In some examples, 3D printing may be performed using the methods and/or systems provided elsewhere herein, other methods and/or systems, and/or any combination thereof. The printing can employ commercially available resins and ultra-violet (UV) curable biocompatible polymers. In some examples, each minimodule shape may discretely designed in a virtual environment. In some examples, components and modules may be provided by commercially available components that may be combined and arranged together as described herein. In some examples, the biomaterial used may include a combination of three subcomponents, a biocompatible polymer, a photoinitiator and UV absorber.

Devices and systems of the present disclosure may be formed by 3D printing, such as stereolithography. In some examples, a computer-aided manufacturing (CAM) or computer-aided design (CAD) model of a device of the present disclosure may be provided to a 3D printing system that may employs stereolithography. Such method may comprise providing a container having a resin comprising a photoinitiator and one or more polymer precursors. For example, a light source (e.g., ultra-violet (UV) laser or any other suitable light) may be used to draw a pre-programmed design or structure into the surface of the container having the resin. The resin may be a photopolymer that photochemically solidifies to form a single layer upon contact with the light (e.g., UV laser). Additional resin may be added and solidified in the manufacturing process. In some examples, the manufacturing process may comprise or be a layer-by-layer manufacturing process. Stereolithography may be used to construct objects and/or modules in any direction. In some examples, stereolithography may be used to construct modules in an additive top-down or bottom-up manufacturing approach.

In some examples, constructing a reactor, a bioreactor, or a module thereof may comprise self-assembly of polymers, e.g., block co-polymers, to form 3D structures (e.g., a gyroid, a geometric shape or construct of any shape, form, geometry, or size) or subtractive manufacturing methods.

Subtractive manufacturing methods may comprise chemical or mechanical removal of sacrificial materials. For example, sacrificial materials may be formed using adhesive manufacturing with a sintering laser. The sacrificial material may be immersed, dipped, or otherwise coated in biocompatible polymers. The sacrificial material may then be dissolved or mechanically removed to form 3D shapes or structures (e.g., gyroids) from the biocompatible polymers
Example 3D Printed Bioreactor A bubble free bioreactor may be printed using 3D printing devices and methods described elsewhere herein. FIG. 57A shows an example printing process. The tubing and matrix of the bioreactor along with auxiliary structures may be configured using 3D modeling. The 3D model may be converted into slides for 3D printing. Prior to printing, bio-polymeric resin may be formulated and the printer controller may be prepared. The bioreactor may then be printed using a 3D printing device and, after printing the bioreactor may be post processed. FIG. 57B shows a digital rendering of 3D printed bioreactor and cross-sectional views as a function of location height. The first cross-sectional view shows inlet and outlet ports of the reactor. The second cross-sectional view shows the internal structure of the gyroid shape. The third cross-sectional view shows the reactor main channels that connect to the gyroid channels.

Figure 58:
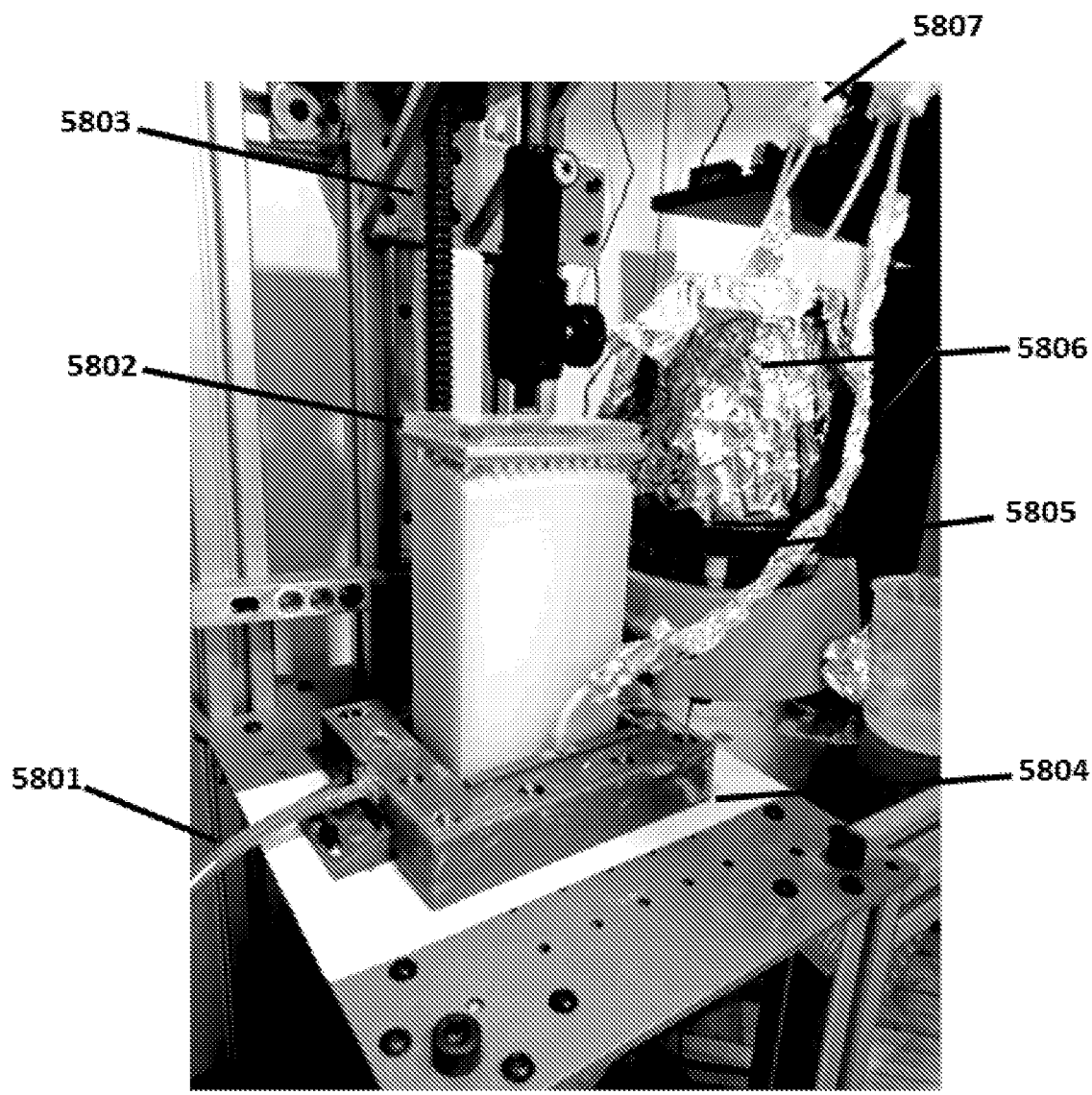
FIG. 58 shows an example 3D printer device and printed bioreactor.

An example 3D printer device and printed bioreactor is shown in FIG. 58. The printed bioreactor comprising doubly gyroid crystals with a total void volume of approximately 500 milliliters (mL). The gyroid channel diameter is 500 μm with an intermembrane thickness of 300 μm. In other examples, the intermembrane thickness may be less than about 300 μm. For example, the intermembrane thickness may be less than about 275, 250, 225, 200, 175, 150, 125, 100, 75, or less μm. The example 3D printer device includes a printing vat 5804 with drainage tube 5801. The material within the printing vat 5804 is pumped inside the printing vat 5804 through a recirculation system. The recirculation system includes a reservoir 5806 containing photocurable bio-resin, magnetic stirrer 5805 for mixing the bio-resin, and recirculating peristaltic pumps 5807 for pumping the bio-resin into the printing vat 5804. The bioreactor may be disposed between the printing vat 5804 and the printing platform 5802. The printing platform 5802 may be connected to a recirculating ball screw 5803 configured to raise the printing platform 5802.

Examples

In some examples, the executable instructions provided herein may comprise a method for constructing a space or structure by a plurality of units, minimodules, unit cells, and elements according the methods provided elsewhere herein. Such methods may comprise assembling a plurality of minimodules to construct a macrostructure. The macrostructure may comprise any shape provided elsewhere herein, such as a sphere, a pyramid, a hollow pyramid, a lamella, a chessboard, or any other macrostructure. In some examples, the macrostructure may form a bioreactor. The bioreactor may be constructed of a plurality of minimodules assembled using the methods provided herein. The methods may comprise providing a mathematical model and one or more operators and/or operations to manipulate a minimodule (e.g., a crystallographic unit or a crystal) using computer-implemented methods, such as software (e.g., computer systems provided elsewhere herein).

Provided herein are structures which can be used as bioreactors. Provided are also method of constructing such structures. In some examples, a structure may be 3D printed using the methods provided herein. The method of constructing the structures may comprise stereolithography and/or crystallography. In some examples, the computer-readable instructions may comprise methods of constructing a space using a plurality of minimodules and methods of building structures such as bioreactors.

In an example, a structure (e.g., a conduit or any other structure) may be made using the methods provided herein. In some cases, a unit cell may be defined by or simulated with a distribution of lattice points within the body of the unit cell or lattice structure. A point may be an element. The body may be the body of a crystal or unit cell. The element may be in the unit cell. For example, in a unit cell or lattice, an arrangement of point may represent the position or location of atoms. For example, the points may be represented as atoms of a lattice. The atoms in a lattice may be capable to vibrate in such a way to minimize a total surface of the lattice as a result of an equilibrium (e.g., an equilibrium of electrostatic forces) which may connect the atoms and/or may keep them in place. In some cases, a structure may be defined by the minimized surface made as a result of the placement of the points or elements. Alternatively or in addition, in some cases, it may be suitable and/or convenient to make and/or define a structure (e.g., a conduit or another structure) based on a trajectory which may connect a subset of lattice points.

The structures that can be built and used according to the methods of the present disclosure may comprise one or more minimodules. In some examples, a minimodule may be a building block of the bioreactor. Minimodules may comprise one or more external minimodules (e.g., building blocks) and/or one or more internal minimodules (e.g., building blocks). In some examples an external and/or an internal minimodule (e.g., building block) may comprise one or more conduits. An example may comprise an external conduit, such as a conduit within an external minimodule of a bioreactor provided herein. The function of an external minimodule may comprise feeding one or more internal minimodule, for example by supplying liquid and/or gas into one or more internal minimodule from an external source such as a reservoir. A reservoir may be a reservoir of a bioreactor system provided elsewhere herein. In some examples, an external minimodule may be a bioreactor feeding system provided elsewhere herein, such as systems for supplying gas and liquid into the bioreactors or a part thereof.

In some examples, a method of making an internal minimodule or a component thereof (e.g., a conduit of an external minimodule) may be to some extent similar and/or to some extent different from a method of making an internal minimodule or a component thereof (e.g., a component inside a bioreactor, an internal channel, an internal conduit, or another component of an internal minimodule of a bioreactor). For example, in some cases, an internal minimodule may comprise or be a unit cell. A unit cell may be symmetric. In some examples, an external minimodule (e.g., a building block making an external feeding system such as an external conduit) may not be a unit and/or may not be symmetric. In some cases, the mathematical or crystallographic representation of an external minimodule may reside in the input and/or output links of the minimodules (e.g., building blocks).

Minimodules or building blocks may comprise transitional minimodules or building blocks. In some examples, a transitional minimodule may connect of facilitate a communication between an internal minimodule and an external minimodule. In some cases, the characteristics of a transitional minimodule may depend on or be related to the internal and external minimodules and/or external sources (e.g., an external unit such as a reservoir or another external component of the bioreactor system). In an example, one or more conduits and/or channel may go through one or more internal minimodules of a number of neighboring volumes (e.g., two neighboring volumes). A transitional minimodule may connect the one or more conduits or facilitate a communication between them. For example, a transitional minimodule may facilitate a flow of a fluid between one conduit to another.

A fluid flow within the minimodules of the bioreactor may comprise characteristics involving fluid mechanics (e.g., the regime of flow), heat profiles, composition profiles, as well as fluid transfer, heat transfer, and mass transfer between various fluids and regions. In some examples, these characteristics and/or properties may be accounted for, designed and/or controlled. In some cases, the design and/or construction of transitional minimodules may account for the mentioned characteristics.

The methods of construction of the transitional building blocks may be performed by a user who may provide instructions (e.g., executable instructions and/or computer implemented methods of any kind). In some examples, the user may perform manual designs using an example drawing tool (e.g., AUTOCAD or any other drawing tool) and provide it to the computer implemented methods provided elsewhere herein to accomplish the design and/or construction of a minimodule (e.g., internal minimodule, external minimodule, and/or transitional minimodule). In some cases, such design and construction by a user may be time consuming. Alternatively, or in addition, the design of a build block (e.g., a transitional minimodule) may be accomplished by or facilitated by an artificial intelligence-driven generative design which may automate the design and/or construction of minimodules, at least to some extent. An artificial intelligence-driven generative design may in some cases improve characteristics such as fluid mechanics (e.g., the regime of flow), heat profiles, composition profiles, as well as fluid transfer, heat transfer, and mass transfer between various fluids and regions in the minimodules. In some examples, the two minimodules that need to be connected may be labeled. Alternatively or in addition, a number of external variables of the structure may also be labeled. The labeling procedure may be used to provide a set of training data that can train a deep learning algorithm. In some examples, an algorithm may comprise a neural network. Examples of algorithms and/or neural networks may comprise generative adversarial networks, and variational autoencoders.

Figure 49:
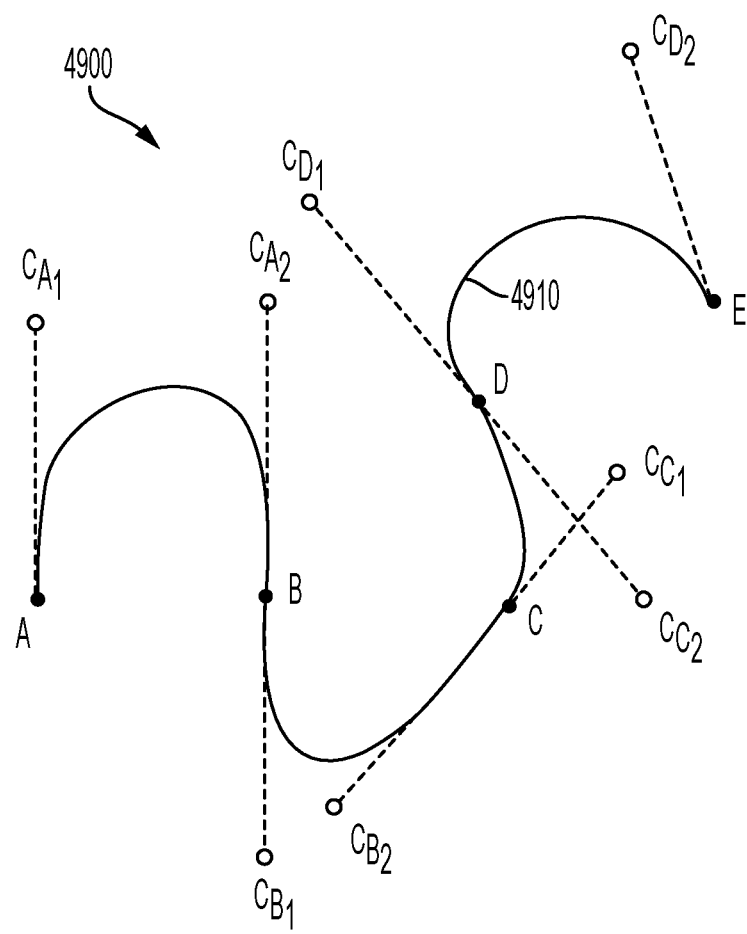
FIG. 49 shows a mathematical representation of a structure according to the methods and systems of the present disclosure.

In some examples, a structure can be mathematically represented. A structure can comprise or be an internal and/or external minimodules. In an example, a structure to be represented may be a conduit. The conduit may be internal or external. An example of a mathematical representation of conduits driven by lattice points (e.g., elements) is shown in FIG. 49. The mathematical representation of conduits 4900 may comprise one or more curves (e.g., parametric curves) 4910. The curves 4910 may be mathematically represented or formulated using polynomial equations. Polynomials may be suitable for such representation, for example because of their simplicity and performance. Polynomials may comprise a flexibility to represent curves as and/or where needed for various application, such as for constructing minimodules and structures. In some examples, various mathematical equations may be used to represent curves, examples of mathematical equations which may be used may comprise polynomials, sines, cosines, logarithmic, exponential, and/or any other mathematical equation as suitable. In some examples, Bezier curves may be used (e.g., in 3D). In some cases, lattice point may be used as control points and/or at the extremes of the curves. Examples of extreme points may comprise points A, B, C, D, and E in FIG. 49. Examples of control points may comprise points $C_{A1}$, $C_{A2}$, $C_{B1}$, $C_{B2}$, $C_{C1}$, $C_{C2}$, $C_{D1}$, and $C_{D2}$ in FIG. 49.

Figure 50:
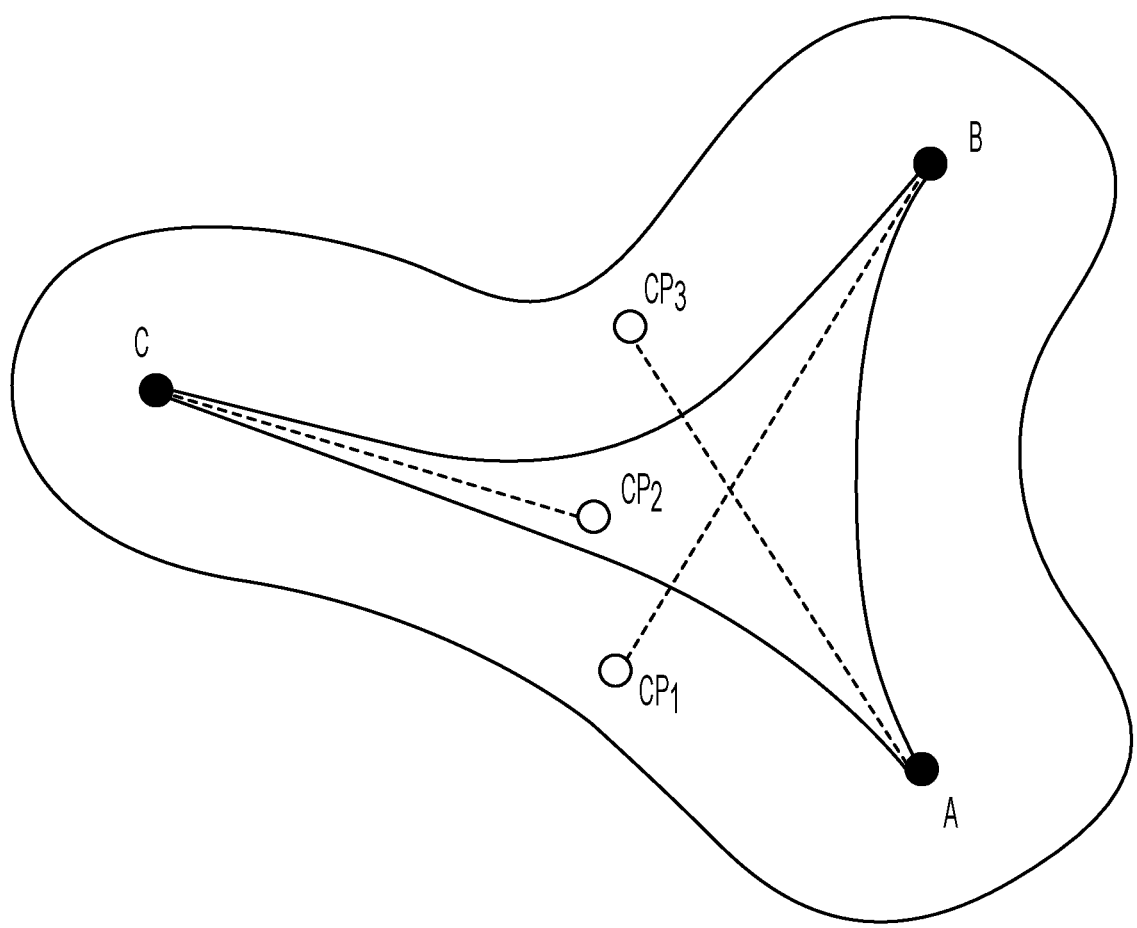
FIG. 50 shows a mathematical and geometrical representation of a structure according to the methods and systems of the present disclosure.

Provided herein are methods for mathematical representation of a chamber. In some examples, a chamber may be within a minimodule. In some examples, a chamber may be a resulting shape from an intersection of paths going through a lattice point. The representation may vary based on the type of the chamber and the structure among other factors. In some examples, conduits or channels may generate chambers, for example, from the colliding paths going through a lattice point. The design in each case may depend on the characteristics of a bioreactor in which such conduits and/or chambers may be used. An example representation of this is shown in FIG. 50. In this figure, $C_{P1}$ and $C_{P3}$ are control points of A. $C_{P1}$ and $C_{P2}$ are control points of C. $C_{P2}$ and $C_{P3}$ are control points of B.

Figure 51B:
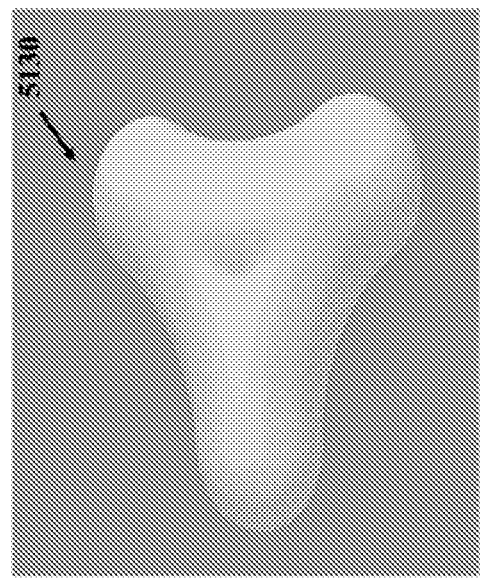
FIGS. 51A and 51B show example structures such as shapes or minimodules that can be built according to the methods of the present disclosure.
Figure 51A:
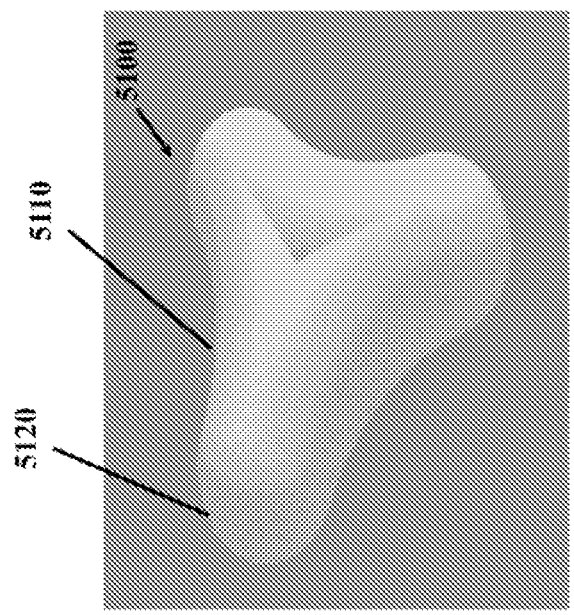

In some cases, a function, such as a mathematical function or a mathematical operator may be used to generate a chamber. For example, a chamber may be generated by an intersection function used for the curves (e.g., 3D curves). In some cases, further modeling may not be needed for completing the representation of the chamber and/or constructing it. Alternatively, in some cases, further modeling may be suitable, helpful or needed for at least performing a subset of the steps of the process. FIG. 51A shows an example representation 5100 of an example structure. Representation 5100 may be an implicit chamber. In some examples, when two or more paths (e.g., curves such as 2D or 3D curves such as curve 5110) may reach the same point (e.g., intersect at the same point, such as at the intersection point 5120), an intersection mathematical function or operator may join, connect, and/or unify the two curves or paths, such that it makes a shape such as a structure. Depending on the intersection function used to make the connection between the curves, the intersection point may be smooth (such as intersection point 5120), or it can be sharp, like and edge of a pyramid or another structure (example not shown). The generated structure (e.g., representation 5100) may be any structure. For example, the curves may be conduits and/or channels, they may intersect at a point, an intersection function may connect and/or join them and may make some further modifications to them to generate a structure such as a chamber. As an example, the intersection function used to generate representation 5100 is an exact intersection function. Another example of generating a structure using this method is shown in FIG. 51B. A similar approach can be taken to generate representation 5130 shown in FIG. 51B. As an example, the intersection function used to make representation 5130 is an exponential smooth intersection function. Representation 5130 may be an implicit chamber.

In some example a structure such as a chamber and/or a representation thereof may be explicit (e.g., explicit chambers). The choice of an implicit or explicit structure or representation thereof may depend on the target characteristics of the resulting minimodule or structure, such as a bioreactor. In some cases, a structure such as a chamber or a representation thereof may be parametric. The result may vary depending on the method used to generate the structure (e.g., chamber).

In some examples, a plurality of unit cells may be assembled to generate a minimodule. For example, a unit cell may be used as a voxel to voxelize a structure such as a minimodule of a bioreactor or the entire bioreactor. A minimodule may be a building block of the entire structure. In some cases, a minimodule or building block may inherit some properties from a unit cell that may be used to generate the minimodule. For example, in some cases, the opposite faces of a unit cell may be parallel to each other. In some cases, the adjacent faces of two minimodules or building blocks may connect equivalent links. In some cases, it may be possible to construct a voxelized structure (e.g., an upper voxelized structure) using an example unit cell as a voxel. The unit cell may comprise any shape listed herein, such a cube or other shapes (e.g., provided in Table 1.1).

An example of making a structure by an assembly of unit cells is shown in FIG. 52. This figure shows a 3D sphere and its voxelized representations using cubical unit cells. In some examples, the first step of the method may be to define the shape of the structure that is to be construct. For example, a shape of the structure may be defined by a mix of mathematical equations (e.g., parametric equations) and constructive solid geometry. The shape of the structure (e.g., a macrostructure) may be defined as a 3D object (e.g., perfect 3D shape), in some cases, regardless of the shape of a unit cell or voxel that will be used to construct it. In some examples, the structure that is to be constructed may be a macrostructure such as a bioreactor. In some cases, the structure that is to be constructed may be a minimodule. As an example, once the geometry of the macrostructure (e.g., sphere 5200) is defined, voxelization may be performed to represent the macrostructure as an assembly of a plurality of unit cells or voxels (e.g., unit cells or voxels 5210). In some cases, voxelization may be performed based on the type of the unit cell (e.g., see Table 1.1). In some examples, the arrangement of lattice points inside a unit cell may be ignored for the purpose of voxelization. During this process, minimodules and/or building blocks may be created. The entire macrostructure may comprise a plurality of such minimodules or building blocks. Such minimodules and/or building blocks can comprise internal, external, transitional, and/or any kind of minimodule or building blocks provided elsewhere herein.

The next step may comprise incorporating conduits in the structure, such as within the minimodules and/or building blocks. The properties of the conduits may be accurate and may become unified (e.g., according to the methods described elsewhere herein). Conduits may comprise prolonged conduits that may carry gases and liquid throughout the structures of the bioreactors.

External Connectors

In some examples, the structure may comprise a number of external connectors. For example, the structure may comprise a number of intake channels (e.g., channels 4720 or 4730) shown in FIG. 47. For examples, a structure such as a bioreactor (e.g., bioreactor 4700) may comprise at least about 1, 2, 3, 4, 5, 6, 7, 8, 9, 10, 12, 20, or more intake channels, including increments therein. In some cases, it may be suitable to have a relatively small number of intake channels, or in some cases, minimize the number of intake channels. The structure may further comprise a number of channels, such as internal channels (e.g., channels 4810 and 4820 shown in FIG. 48). The channels may be conduits. The external connectors (e.g., intake channels, e.g., channels 4720 or 4730)) may feed the internal channels (e.g., channels 4810 and 4820). A channel may be a conduit (e.g., conduit 1905 shown in FIG. 19). A structure may have any number of conduits. In some examples, a structure may comprise from one to several million conduits (inclusive of any number in between). It may be suitable to generate a proper (e.g., a uniform) distribution of gas and/or fluid among the channels and/or conduits, in some cases, among all the channels of a bioreactor. In some cases, it may be suitable to have a few number of intake channel, such that controlling them may become more convenient and efficient. In some cases, the methods (e.g., procedural design) of constructing the structures may comprise tracking an intake channel from an external building block or minimodule and/or connecting the conduits into different kinds of external connectors. In some cases, the connectors may have been tested in advance to ensure that the intake and output channels may distribute the entering flow uniformly through the channels (e.g., conduits) of the structure.

Tree-Like Connectors

Figure 53:
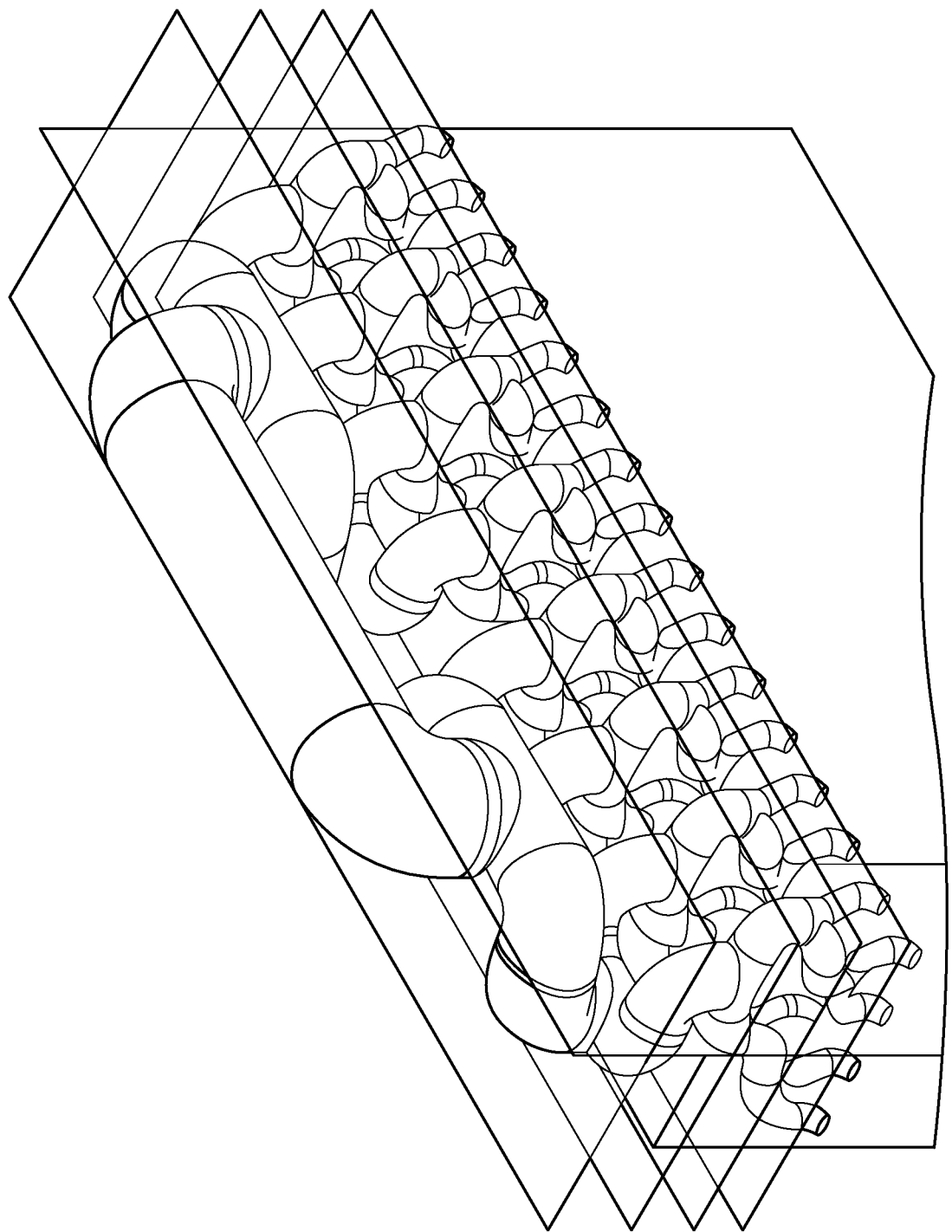
FIG. 53 shows example structures of a plurality of connectors provided herein.

The structures provided herein may comprise one or more connectors. A structure may be a bioreactor provided herein which may be 3D printed using the methods of the present disclosure. A structure such as a bioreactor or another structure that can be 3D printed according the methods provided herein may comprise one or more connectors. The connectors may comprise various shapes and forms. An example of connectors may comprise tree-like connectors. An example of tree-like connectors is shown in FIG. 53. The shape of these connectors may correspond to the shape of a tree. For example, a root of an example tree may represent an external connector (e.g., a connector on the external surface of a bioreactor). The leaves of a tree may represent the intake channels from the external minimodules of the bioreactor. In some examples, level after level, the number of input intake channels may be subdivided by a positive number (e.g., an integer>1) until one channel is reached. The resulting one channel may be the root of the tree representing the external connector.

Examples of different shapes of connectors may comprise tree-like connectors, one-face connectors, and connectors of other shapes. In some examples, the shape of one-face connectors may vary in different designs. In one-face connectors, the external connector may fill a chamber which may comprise one or more channels or conduits (e.g., a plurality of conduits) that may be connected to the intake channels of the external minimodules (e.g., external building blocks). In some examples, to facilitate a homogeneous and/or uniform distribution of fluids among the conduits, the width of the connectors, chambers, and/or conduits may be adjusted to allow for a target amount of fluid to be filled into the conduits, for example once the chamber is filled.

Provided herein are architectural designs and methods for architectural design of the structures such as bioreactors. In some examples, the methods may comprise functionalizing minimodules (e.g., building blocks). In some examples, building blocks and/or minimodules may be connected to one another by links (e.g., link 1915 shown in FIG. 19). The crystal unit cell shown in FIG. 19 may be an example of a minimodule which comprises a number of faces (e.g., face 1910 and 1920) and a number of conduits (e.g., conduit 1905). Such crystal unit cell or minimodule may be connected to other unit cells, minimodules, or building blocks through links (e.g., link 1915). In some examples, a link (e.g., link 1915) may be an external link and may be positioned in one or more faces (e.g., face 1910) of the minimodule. The minimodule may be represented as a crystal unit cell. In some cases, an example of a minimodule may be a repeating unit such as building block 4860 shown in FIG. 48. In some cases, the link may be positioned over the edge of two or more faces, such as on a side of the geometric shape (e.g., a cube or another shape) of the unit cell shown in FIG. 19. In some examples, the link may be shared by more than two faces, such as three or more faces, and it may be positioned on a vertex of the building block, such as on a vertex of the cubical unit cell crystal shown in FIG. 19, or a unit cell crystal of any other shape or kind. In some examples, two or more neighboring blocks (e.g., neighboring minimodules or neighboring crystal unit cells) may be matchable (e.g., connectable) if they share the same position within the faces to be connected and if the link attached to them share the same cross-section shape. The link may then connect to two neighboring minimodules.

In some examples, the design of a bioreactor may comprise a diverse number of phase volumes that may connect to one another. The phase volumes may in some cases be important for a macrostructure constructed of a plurality of internal minimodules (e.g., building blocks). For example, in some cases, the method for connecting minimodules and/or building block may comprise considering the medium inside such minimodules. For example, a minimodule may be configured to allow a fluid such as a as or a liquid to flow therein. An example of such minimodule may be a conduit or a channel or another structure (e.g., of a bioreactor). For example, a consistent unified conduit may be built as a result of connecting two neighboring conduits and the medium that is transported in such conduits may also match. This matching may be accomplished by labeling the conduits used in the building blocks or minimodules (e.g., within a volume phase). In some examples, such labels may also be associated with properties such as pressure, heat, composition of fluids, and more. In some examples, such properties may need to be preserved. For examples, such properties may not be disrupted as a result of connecting the building blocks or minimodules. In an example, two conduits may be connected to one another, each of which may have a fluid flowing therein, each of the fluids may comprise a set of properties such as rate of flow, temperature, pressure, composition, etc. The conduits may be connected while considering these properties such that as a result of connecting the conduits such properties would be preserved or would be maintained in suitable conditions. This may be accomplished by the labeling scheme described herein. In some examples, a number of such considerations are tested, studied and/or verified, for example, prior to finalizing a structural design.

Minimodules or building blocks may comprise transitional minimodules and/or building blocks. A transitional minimodule may comprise a transitional phase volume. A transitional phase volume of a minimodule may take into account both the phase volumes constituted by the transitional minimodules to be connected and the suitable characteristics of the neighboring phase volumes of those transitional minimodules.

In some examples, a connector may be configured to carry a medium (e.g., a fluid such as gas or liquid) from outside of a bioreactor to an input conduit or an intake channel (e.g., an intake channel such as intake channel 4720 or 4730) in an external building block or minimodule of the bioreactor, in some cases to all of the intake channels. Connectors may comprise a plurality of levels. Connectors may comprise lower-level connectors. In some examples, a lower-level connector (e.g., a first level connector) may comprise a structure that may transform a conduit into a bigger intake channel that may progressively result in a number of intake channels (e.g., intake channel 4720 or 4730) at the exterior of a bioreactor (e.g., bioreactor 4700).

Connectors may further comprise high level or higher-level connectors. A higher-level connector may build progressively (e.g., layer after layer) bigger intake channels from the lower-level connectors. Such connectors may be external connectors, tree-like connectors, and/or one-face connectors the functionalities thereof may be according to the information provided elsewhere herein.

Simulations and Models

Provided herein are methods for modeling and/or simulating a unit cell (e.g., a crystallographic unit cell) and a behavior and/or a function thereof. Such simulations may facilitate determination of design characteristics based on intended applications and/or intended results with respect to a bioreactor generated. Simulations may comprise computational simulations and/or numerical simulations. Examples of simulations or models may comprise an integral simulation, a Lattice Boltzmann simulation, a finite elements simulation, functional microfluidic feedback and correction (e.g., at the second and/or third levels), phase continuity, and other methods.

As an example, a finite elements analysis (FEA) may be used for solving problems related to designing and/or constructing the structures of the present disclosure. In some examples, FEA may be used to predict, model, and/or simulate a behavior of a 3D or 3D model with respect to various factors comprising external forces, heat, fluid flow, and other factors such as physical phenomena. In some cases, simulations may be used in the process of product development as a feedback for improving the quality of the design. In some cases, FEA may start by subdividing an object into a plurality of finite elements (e.g., millions of finite elements). This may be an important procedure for the efficiency and accuracy of the predictions. In some cases, performing a FEA may be time-consuming, for example, due to the topology of the crystal structure. The manner in which the structure is divided into finite elements may be important for the efficiency and/or accuracy of the model.

In some examples, modeling or simulations may comprise a Lattice Boltzmann method. In some examples, Lattice Boltzmann simulations may be compatible with an implicit representation of the model or structures. The method may further comprise using a function to improve the performance and/or accuracy of the Lattice Boltzmann simulations. In some examples, such function may be a mathematical function or operator such as a signed distance function.

The method of simulation of crystal structures may comprise pre-computation of building blocks. In some examples, the building blocks or minimodules may be substantially similar, in some cases, identical. A categorization of minimodules with a limited number (e.g., a small number of samples) of samples may be performed. For example, it may be possible to pre-compute experiments with a diverse number of input variables to a subset or all of the samples. A pre-computation may be used to speed up the simulation of the bioreactor. The pre-computation may be performed on a subset of the structures (e.g., samples). In some examples, the design of the internal and external minimodules or building blocks may be improved. Such improvement may be regardless of the macrostructure of the bioreactor as a whole. Alternatively, in some cases, the macrostructure of the bioreactor may be accounted for as well.

In some examples, the methods and systems may comprise a database of simulations and methods of making and using thereof. For examples, the simulations that are calculated and performed can be saved and stored in a database. The database of simulations may be used to provide insight in subsequent simulations. The simulations may be performed at a given speed. The speed of the simulation may be increased by using previous calculations. In some cases, faster approximations may be provided. For example, such approximations may be based on the information stored in the database of simulations or other calculations stored elsewhere. This may make the simulations less expensive computationally.

The methods of the present disclosure may comprise artificial intelligence and/or machine learning. In some examples, a subset of information may provide training data for an algorithm such as an AI-driven platform, for example based on deep learning. The purpose of this may comprise generating faster and/or better predictions and simulations. In some examples, labeling the minimodules or building blocks may facilitate storing previous simulations and/or meta-information derived from experimentation or pre-computation. In some examples, the database of simulations may be used for storing such data. The training data may be used to train a model. The platform (e.g., AI-driven platform) may provide information through performing faster, more efficient, and/or more accurate simulations. This may be part of the product development cycle according to the methods provided herein. A method may comprise user-performed simulations, AI-performed simulations, and/or combinations thereof. The methods may comprise iterative processes. Using AI may increase the speed, efficiency, and/or accuracy of iterations. The resulting design and/or production configurations may comprise constructive considerations and functional consideration among other factors. Example design characteristics may comprise mechanical strength, industrial compatibility, and more.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A stereolithographic 3D printing device comprising:
   a) a static optical assembly comprising:
      i. a light engine configured to project a luxbeam comprising a plurality of pixels along a Z axis;
      ii. at least one collimation lens configured to collimate the luxbeam;
      iii. a microlens array (MLA) configured to focus the collimated luxbeam to a final beam of smaller diameter, wherein each pixel of the luxbeam is subdivided into a plurality of sub-pixels to multiply resolution of the final beam;
      iv. a microdiaphragm array (MDA) configured to reduce noise and cross-talk between lenses of the MLA;
      v. at least one projection lens; and
      vi. a movable stage configured to translate one or more of the at least one projection lenses in a X-Y plane;
      wherein the distances along the Z axis between the light engine, the collimation lens, the MLA, the at least one projection lens, and the movable stage of the static optical assembly are fixed;
   b) a printing vat comprising a printing stage movable on the Z axis; and
   c) control circuitry configured to control at least the light engine, the movable stage, and the printing stage to achieve stereolithographic 3D printing.

2. The 3D printing device of claim 1, wherein the light engine comprises a UV projector or a deep UV projector.

3. The 3D printing device of claim 2, wherein the light engine has an operating wavelength between 370 nm and 415 nm.

4. The 3D printing device of claim 3, wherein the light engine has an operating wavelength of about 405 nm.

5. The 3D printing device of claim 3, wherein the light engine has an operating wavelength of about 380 nm.

6. The 3D printing device of claim 1, wherein the light engine is a first light engine configured to project a first operating wavelength and the 3D printing device further comprises a second light engine configured to project a second operating wavelength.

7. The 3D printing device of claim 6, wherein the second light engine operates in parallel to the first light engine and the second operating wavelength is selected to inhibit polymerization of a photocurable resin in the printing vat.

8. The 3D printing device of claim 1, wherein the light engine comprises a digital micromirror device (DMD).

9. The 3D printing device of claim 8, wherein the DMD has a resolution of about 2560 pixels by about 1600 pixels.

10. The 3D printing device of claim 1, wherein the light engine comprises a Liquid Crystal on Silico (LCoS) device.

11. The 3D printing device of claim 10, wherein the LCoS device has a resolution of about 4096 pixels by about 2400 pixels.

12. The 3D printing device of claim 1, wherein the light engine has a light generating area of about 90 mm by about 50 mm.

13. The 3D printing device of claim 1, wherein the light engine has a light generating area of about 140 mm by about 90 mm.

14. The 3D printing device of claim 1, comprising a system of collimation lenses.

15. The 3D printing device of claim 14, wherein the system of collimation lenses comprises 2 to 6 collimation lenses.

16. The 3D printing device of claim 1, wherein the movable stage comprises a piezoelectric mechanism configured to translate the one or more of the at least one projection lenses in the X-Y plane.

17. The 3D printing device of claim 16, wherein the piezoelectric mechanism translates the one or more of the at least one projection lenses in the X-Y plane with nanometer resolution.

18. The 3D printing device of claim 16, wherein the stage has a translation range of at least 50 μm on the X axis and at least 50 μm on the Y axis.

19. The 3D printing device of claim 18, wherein the stage has a translation range of about 100 μm on the X axis and about 100 μm on the Y axis.

20. The 3D printing device of claim 16, wherein the stage has a translation resolution of less than or equal to a length of the sub-pixels.

21. The 3D printing device of claim 1, wherein the MLA comprises a biconvex array, a biconcave array, a monoconvex array, a monoconcave array, or a combination thereof.

22. The 3D printing device of claim 21, wherein the MLA comprises a monolithic biconvex array.

23. The 3D printing device of claim 21, wherein the MLA comprises a planar substrate and a plurality of microlenses on each of the two largest facing sides of the substrate plane.

24. The 3D printing device of claim 23, wherein the planar substrate is borosilicate or etched glass and the plurality of microlenses are polymeric or glass.

25. The 3D printing device of claim 23, wherein the MDA is positioned between the planar substrate and one of the pluralities of microlenses of the MLA.

26. The 3D printing device of claim 1, comprising a plurality of MDAs.

27. The 3D printing device of claim 1, wherein the MDA has a diaphragm aperture size of 10 μm to 15 μm.

28. The 3D printing device of claim 1, wherein the MLA subdivides each pixel of the luxbeam into between 4 and 7498 sub-pixels.

29. The 3D printing device of claim 28, wherein the MLA subdivides each pixel of the luxbeam into between 4 and 100 sub-pixels.

30. The 3D printing device of claim 29, wherein the MLA subdivides each pixel of the luxbeam into 9 sub-pixels.

31. The 3D printing device of claim 29, wherein the MLA subdivides each pixel of the luxbeam into 25 sub-pixels.

32. The 3D printing device of claim 29, wherein the MLA subdivides each pixel of the luxbeam into 49 sub-pixels.

33. The 3D printing device of claim 1, wherein the at least one projection lens expands the final printing area.

34. The 3D printing device of claim 1, wherein the at least one projection lens reduces the final printing area.

35. The 3D printing device of claim 1, wherein the final printing area is at least 2× the light generating area of the light engine.

36. The 3D printing device of claim 1, wherein the final printing area is at least 4× the light generating area of the light engine.

37. The 3D printing device of claim 1, wherein the control circuitry is configured to control at least the light engine, the movable stage, and the printing stage to achieve stereolithographic 3D printing in a semi-continuous, substantially continuous, or continuous pattern.

38. The 3D printing device of claim 37, wherein the control circuitry is configured to control the printing stage to move at a predefined constant velocity on the Z axis.

39. The 3D printing device of claim 37, wherein the control circuitry is configured to control the movable stage to translate the one or more of the at least one projection lenses in the X-Y plane to scan the luxbeam in a predefined pattern.

40. The 3D printing device of claim 39, wherein the predefined pattern comprises a spiral pattern.

41. The 3D printing device of claim 39, wherein the predefined pattern comprises a continuous space filling curve.

42. The 3D printing device of claim 41, wherein the predefined pattern comprises a Sierpinski curve.

43. The 3D printing device of claim 37, wherein the control circuitry is configured to control at least the light engine, the movable stage, and the printing stage to achieve stereolithographic 3D printing of a porous structure comprising gyroid geometry spatially distributed in a periodic manner.

44. The 3D printing device of claim 1, further comprising a robotic gantry configured to scroll the static optical assembly in the X-Y plane relative to the printing vat.

45. The 3D printing device of claim 44, wherein the control circuitry is further configured to control the robotic gantry.

46. The 3D printing device of claim 1, wherein the control circuitry is configured to control the printing stage to achieve bottom-up stereolithographic 3D printing.

47. The 3D printing device of claim 1, wherein the control circuitry is configured to control the printing stage to achieve top-down stereolithographic 3D printing.

48. The 3D printing device of claim 1, wherein the printing vat comprises a multiphase light-curable resin.

49. The 3D printing device of claim 1, wherein the printing vat comprises a sterile light-curable resin.

* * * * *